(12) United States Patent
Matsubara et al.

(10) Patent No.: US 8,025,936 B2
(45) Date of Patent: Sep. 27, 2011

(54) OPTICAL COMPENSATION FILM, POLARIZING PLATE AND LIQUID CRYSTAL DISPLAY DEVICE

(75) Inventors: Ryota Matsubara, Tokyo (JP); Yuta Takahashi, Kanagawa (JP); Akira Ikeda, Kanagawa (JP); Masaru Yoshikawa, Kanagawa (JP); Takafumi Hosokawa, Kanagawa (JP); Michio Nagai, Kanagawa (JP); Makoto Takahashi, Kanagawa (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 254 days.

(21) Appl. No.: 12/085,933

(22) PCT Filed: Nov. 30, 2006

(86) PCT No.: PCT/JP2006/324405
§ 371 (c)(1),
(2), (4) Date: Jun. 2, 2008

(87) PCT Pub. No.: WO2007/064039
PCT Pub. Date: Jun. 7, 2007

(65) Prior Publication Data
US 2009/0091690 A1    Apr. 9, 2009

(30) Foreign Application Priority Data

Dec. 1, 2005 (JP) ................................. 2005-348516
Jan. 18, 2006 (JP) ................................. 2006-010453
Mar. 15, 2006 (JP) ................................. 2006-071633

(51) Int. Cl.
*G02B 5/30* (2006.01)
*G02F 1/13363* (2006.01)
*C09K 19/52* (2006.01)

(52) U.S. Cl. .......... 428/1.1; 428/1.31; 428/1.5; 349/117

(58) Field of Classification Search .................. 428/1.1, 428/1.31, 1.5; 252/299.01; 349/117
See application file for complete search history.

(56) References Cited

U.S. PATENT DOCUMENTS 6,081,312 A    6/2000  Aminaka et al.
(Continued)

FOREIGN PATENT DOCUMENTS

JP            07-333431 A        12/1995
(Continued)

OTHER PUBLICATIONS

"Liquid-crystal orientation induced by polymeric surfaces", J.C. Dubois et al., Journal of Applied Physics, vol. 47, No. 4, Apr. 1976, pp. 1270-1274.
(Continued)

*Primary Examiner* — Shean C Wu
(74) *Attorney, Agent, or Firm* — Buchanan Ingersoll & Rooney PC

(57) ABSTRACT

The present invention aims to provide an optical compensation film that allows superior phase difference between a first optically anisotropic layer and a second optically anisotropic layer and excellent wavelength dispersibility in terms of front and inclined retardation of liquid crystal layers in liquid crystal cells, a polarizing plate containing the optical compensation film, and a liquid-crystal display device that can display superior images with less color change due to the polarizing plate.

In order to attain the object, an optical compensation film etc. is provided that comprises at least a first optically anisotropic layer and a second optically anisotropic layer, wherein the first optically anisotropic layer satisfies at least one of the following Equations (i) to (iii):

$1 \leq Re_1 450)(0°)/Re_1 650)(0°) \leq 1.25$:     Equation (i)

$1 \leq Re_1 450)(40°)/Re_1 650)(40°) \leq 1.25$:     Equation (ii)

$1 \leq Re_1 450)(-40°)/Re_1 650)(-40°) \leq 1.25$:     Equation (iii).

14 Claims, 8 Drawing Sheets

U.S. PATENT DOCUMENTS

| | | | | |
|---|---|---|---|---|
| 7,431,972 B2 * | 10/2008 | Nagai et al. | ............. | 428/1.1 |
| 2005/0056811 A1 * | 3/2005 | Nishikawa et al. | ...... | 252/299.01 |

FOREIGN PATENT DOCUMENTS

| | | |
|---|---|---|
| JP | 08-050206 A | 2/1996 |
| JP | 2692035 B2 | 12/1997 |
| JP | 10-312166 A | 11/1998 |
| JP | 3342417 B2 | 11/2002 |
| JP | 2003-233073 A | 8/2003 |
| JP | 2004-184864 A | 7/2004 |
| JP | 2005-037808 A | 2/2005 |
| JP | 2005-122155 A | 5/2005 |
| JP | 2005-122156 A | 5/2005 |
| JP | 2005-265889 A | 9/2005 |

OTHER PUBLICATIONS

"Relationship between pretilt angle and surface energy of the blended films based on poly(vinyl cinnamate) and alkanoyl cinnamic acid", Jong-Woo Lee et al., Synthetic Metals 117 (2001), pp. 267-269.

Official Action dated Mar. 29, 2011, issued by the Japanese Patent Office in corresponding application No. 2005-348516, and partial translation of the Official Action.

Official Action dated Jul. 12, 2011, issued by the Japanese Patent Office in corresponding Japanese Patent Application No. 2005-348516, and English language translation of the Official Action.

* cited by examiner

OFF Display　　　　　　　　ON Display

OFF Display　　　　　　　　ON Display

OPTICAL COMPENSATION FILM, POLARIZING PLATE AND LIQUID CRYSTAL DISPLAY DEVICE

TECHNICAL FIELD

The present invention relates to optical compensation films, and polarizing plates and liquid crystal display devices that utilize the optical compensation films.

BACKGROUND ART

Liquid crystal display devices are typically equipped with liquid crystal cells and polarizing plates. The polarizing plates, typically formed of a protective film and a polarizing film, are produced by dying a polarizing film of polyvinyl alcohol films by use of iodine and stretching the film, then laminating the protective film to the both sides. In liquid crystal display devices of transmission-type, in some cases, the polarizing plates are attached to both sides of liquid crystal cells and also one or more optical compensation films are disposed. Liquid crystal display devices of reflection-type are typically formed from a reflective plate, a liquid crystal cell, one or more of optical compensation films, and a polarizing plate in this order.

The liquid crystal cells are typically formed from liquid crystal molecules, two sheets of substrates to enclose them, and electrode layers to apply a voltage to the liquid crystal molecules. There are many proposals for the liquid crystal cells that can display ON or OFF depending on the difference of orientation conditions of the liquid crystal molecules; examples of the display mode adapted to transmissive and reflective types include TN (Twisted Nematic), IPS (In-Plane Switching), OCB (Optically Compensatory Bend), VA (Vertically Aligned), ECB (Electrically Controlled Birefringence) and FFS (Fringe Field Switching).

The optical compensation films are utilized in various liquid crystal display devices in order to erase image colors or to widen view angles. Stretched birefringent polymer films are conventionally utilized for the optical compensation films. In addition, optical compensation films having an optical compensation layer formed from lower-molecular-weight or higher-molecular-weight liquid crystal molecules on a transparent support are proposed as alternatives of the optical compensation films of the stretched birefringent polymer films. The liquid crystal molecules, by virtue of wide variety of orientation configurations, can achieve optical properties that are impossible for the conventional stretched birefringent polymer films. In addition, combined constructions of protective films and optical compensation films are also proposed by way that a birefringent property is added to a protective film of polarizing plates.

The optical properties of the optical compensation films depend on the optical properties of liquid crystal cells, more specifically, depend on the difference of the display mode described above. The liquid crystal molecules may bring about the production of optical compensation films having various optical properties corresponding to various display modes of liquid crystal cells. The optical compensation films with liquid crystal molecules have been already proposed variously corresponding to display modes. For example, optical compensation films for parallel aligned liquid crystal cells perform to optically compensate the liquid crystal molecules aligned parallel on a surface of substrates as well as to increase view properties of orthogonal transmissivity of polarizing plates (see Patent Literature 1).

As such, the optical compensation films are nowadays an indispensable member for liquid crystal display devices, thus it has become essential to control precisely retardation of the optical compensation films.

Concerning the control of the retardation, for example, an optical compensation film with an optically anisotropic layer is proposed in Patent literature 2, in which the retardation can be easily adjusted through orientation control of liquid crystal compounds. Non-Patent Literature 1 describes that orientation of rod-like liquid crystal compounds on orienting films depends on a magnitude relation of the surface tensions of the orienting films and the liquid crystal compounds. Non-Patent Literature 2 describes that pretilt angle differs depending on carbon chain lengths of the orienting films at the time of orienting rod-like liquid crystal compounds.

However, there appears no description in the Non-Patent Literatures 1 and 2 with respect to the orientation of disc-like liquid crystal compounds described in the Patent Literature 2.

On the other hand, a technique is proposed to control the orientation of the disc-like liquid crystal compounds on the basis of I/O values of the orienting films (see Patent Literature 3); however, there is no disclosure with respect to the relation between the orienting films and liquid crystal compounds or properties of liquid crystal compounds.

Accordingly, such techniques are currently demanded to be developed that can control easily the retardation of optically anisotropic layers by way of defining the relation between the orienting films and liquid crystal compounds or selecting properties of liquid crystal compounds, and can improve contrast and reduce color-shift as a function of view angles through optically compensating liquid crystal cells by use of the optical compensation films.

Furthermore, in relation to the optical compensation films, inexpensive liquid crystal display devices are desired in which the contrast is improved and color-change as a function of view angles is reduced through optically compensating liquid crystal cells and lessening luminescence defects.

Patent Literature 4 proposes a method for producing an optical compensation film that can satisfy desirable optical properties and also attain progress of productivity by use of liquid crystal compounds having a polymerizable group. Patent Literatures 5 and 6 propose methods for producing an optical compensation film using liquid crystal compounds with polymerizable groups other than those of Patent Literature 4.

However, it is believed that these proposals could hardly attain the objects described above, since there is no description of techniques with respect to improvement of storage stability that is an essential or inherent problem in relation to polymerizable liquid crystal compounds.

Patent Literature 1: Japanese Patent (JP-B) No. 3342417
Patent Literature 2: Japanese Patent Application Laid-Open (JP-A) No. 08-50206
Patent Literature 3: JP-A No. 07-333431
Patent Literature 4: JP-B No. 2692035
Patent Literature 5: JP-A No. 2005-122155
Patent Literature 6: JP-A No. 2005-122156
Non-Patent Literature 1: J. Applied Physics (1976) 47, p. 1270
Non-Patent Literature 2: Synthetic Metals (2001) 117, p. 267

DISCLOSURE OF INVENTION

The present invention aims to solve the problems in the art and to attain the objects below.

It is an object of the present invention to provide an optical compensation film that allows superior phase difference between a first optically anisotropic layer and a second optically anisotropic layer and excellent wavelength dispersibility in terms of front and inclined retardation of liquid crystal layers in liquid crystal cells; it is another object of the present invention to provide a polarizing plate; it is still another object of the present invention to provide a liquid-crystal display device that can display superior images with less color change due to the polarizing plate.

In addition, it is still another object of the present invention to provide an optical compensation film that can easily control the retardation of optically anisotropic layer due to defining the relation between orientation films and liquid-crystal compounds or properties of liquid-crystal compounds.

In addition, it is still another object of the present invention to provide an optical compensation film with higher productivity, lower cost and less luminescent spots or defects without compensating optical properties.

In an aspect, the present invention is an optical compensation film, including at least a first optically anisotropic layer and a second optically anisotropic layer, wherein the first optically anisotropic layer satisfies at least one of the following Expressions (i) to (iii):

$$1 \leq Re_1 450)(0°)/Re_1 650)(0°) \leq 1.25: \quad \text{Equation (i)}$$

$$1 \leq Re_1 450)(40°)/Re_1 650)(40°) \leq 1.25: \quad \text{Equation (ii)}$$

$$1 \leq Re_1 450)(-40°)/Re_1 650)(-40°) \leq 1.25: \quad \text{Equation (iii)}$$

in Expressions (i) to (iii), $Re_1\lambda(\theta)$ is defined as the value of Re retardation in the first optically anisotropic layer determined in the condition that a light of wavelength λ (nm) is entered with an incident angle θ° from the normal line with the retardant phase axis being defined as the rotation axis (when the values of $Re_1\lambda(\theta)$ and $Re_1\lambda(-\theta)$ are different, the magnitude is decided so as to become $Re_1\lambda(\theta)>Re_1\lambda(-\theta)$).

Preferably, the first optically anisotropic layer is composed of at least any one of a disc-like liquid-crystal compound and a rod-like liquid crystal compound.

Preferably, the second optically anisotropic layer satisfies at least one of Expressions (iv) to (vi) below:

$$0.3 \leq Re_2 450)(0°)/Re_2 650)(0°) \leq 1.1: \quad \text{Expression (iv)}$$

$$0.3 \leq Re_2 450)(40°)/Re_2 650)(40°) \leq 1.1: \quad \text{Expression (v)}$$

$$0.3 \leq Re_2 450)(-40°)/Re_2 650)(-40°) \leq 1.1: \quad \text{Expression (vi)}$$

in Expressions (iv) to (vi), $Re_2\lambda(\theta)$ is defined as the value of Re retardation in the second optically anisotropic layer determined in the condition that a light of wavelength λ (nm) is entered with an incident angle θ° from the normal line with the retardant phase axis being defined as the rotation axis (when the values of $Re_2\lambda(\theta)$ and $Re_2\lambda(-\theta)$ are different, the magnitude is decided so as to become $Re_2\lambda(\theta)>Re_2\lambda(-\theta)$).

Preferably, the first optically anisotropic layer and the second optically anisotropic layer satisfy at least one of Expressions (vii) to (ix) below:

$$Re_1 450)(0°)/Re_1 650)(0°) > Re_2 450)(0°)/Re_2 650)(0°): \quad \text{Expression (vii)}$$

$$Re_1 450)(40°)/Re_1 650)(40°) > Re_2 450)(40°)/Re_2 650)(40°): \quad \text{Expression (viii)}$$

$$Re_1 450)(-40°)/Re_1 650)(-40°) > Re_2 450)(-40°)/Re_2 650)(-40°): \quad \text{Expression (ix)}$$

Preferably, the liquid crystal compound comprises at least a compound expressed by the general formula (DI) below:

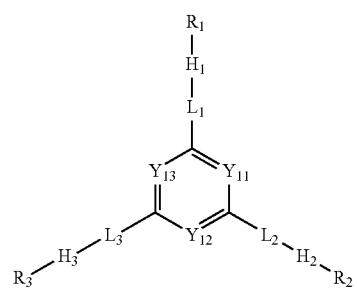

General Formula (DI)

in the general formula (DI), $Y_{11}$, $Y_{12}$ and $Y_{13}$ represent each independently a methine or nitrogen atom; $L_1$, $L_2$ and $L_3$ represent each independently a connecting group of single bond or divalent bond; $H_1$, $H_2$ and $H_3$ represent each independently one expressed by the general formula (DI-A) or (DI-B); $R_1$, $R_2$ and $R_3$ represent each independently one expressed by the general formula (DI-R);

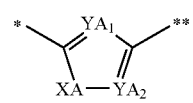

General formula (DI-A)

in the general formula (DI-A), $YA_1$ and $YA_2$ represent each independently a methine or nitrogen atom; XA represents one of oxygen atom, sulfur atom, methylene and imino; * indicates a site to bond with $L_1$ to $L_3$; ** indicates a site to bond with $R_1$ to $R_3$;

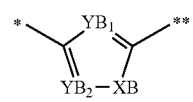

General formula (DI-B)

in the general formula (DI-B), $YB_1$ and $YB_2$ represent each independently a methine or nitrogen atom; XB represents one of oxygen atom, sulfur atom, methylene and imino; * indicates a site to bond with $L_1$ to $L_3$; ** indicates a site to bond with $R_1$ to $R_3$;

$$\text{*-(-L}_{21}\text{-M)}_{n1}\text{-L}_{22}\text{-L}_{23}\text{-Q}_1 \quad \text{General formula (DI-R):}$$

in the general formula (DI-R), * indicates a site to bond with a five-membered ring of general formula (DI); $L_{21}$ represents a connecting group of single bond or divalent bond; $L_{22}$ represents a divalent connecting group selected from —O—, —O—CO—, —CO—O—, —O—CO—O—, —S—, —NH—, —SO$_2$—, —CH$_2$—, —CH═CH— and —C≡C—; $L_{23}$ represents a divalent connecting group selected from —O—, —S—, —C(═O)—, —SO$_2$—, —NH—, —CH$_2$—, —CH═CH—, and —C≡C—; M represents a divalent connecting group having at least a cyclic structure; $Q_1$ represents independently a polymerizable group or hydrogen atom; n1 is an integer of 0 to 4.

Preferably, the average inclination angle of the liquid crystal compound is no more than 45°.

Preferably, the second optically anisotropic layer is formed of a cellulose acylate film.

In another aspect, the present invention provides a polarizing plate including a polarizing film, and optical compensation films described above on at least one side of the polarizing film.

In another aspect, the present invention provides a liquid-crystal display device, including a liquid crystal cell and the polarizing plate described above.

Preferably, in the liquid-crystal display device described above, the liquid-crystal layer of the liquid-crystal cell satisfies at least one of Expressions (x) to (xii):

$$1.0 \leq [Re_1c450)(0°)/Re_1c650)(0°)] \leq 1.25: \quad \text{Expression (x)}$$

$$1.0 \leq [Re_1c450)(40°)/Re_1c650)(40°)] \leq 1.25: \quad \text{Expression (xi)}$$

$$1.0 \leq [Re_1c450)(-40°)/Re_1c650)(-40°)] \leq 1.25: \quad \text{Expression (xii)}$$

in which $Re_1c\lambda(\theta)$ is defined as the value of Re retardation determined in the condition that a light of wavelength $\lambda$ (nm) is entered with an incident angle $\theta°$ from the normal line with the retardant phase axis being defined as the rotation axis (when the values of $Re_1c\lambda(\theta)$ and $Re_1c\lambda(-\theta)$ are different, the magnitude is decided so as to become $Re_1c\lambda(\theta)>Re_1c\lambda(-\theta)$).

Preferably, the first optically anisotropic layer and the liquid-crystal layer of the liquid-crystal cell respectively have optical characteristics satisfying at least one of Expressions (xiii) to (xv):

$$0.9<[Re_1c450)(0°)/Re_1c650)(0°)]/[Re_1450)(0°)/Re_1650)(0°)]<1.1: \quad \text{Expression (xiii)}$$

$$0.9<[Re_1c450)(40°)/Re_1c650)(40°)]/[Re_1450)(40°)/Re_1650)(40°)]<1.1: \quad \text{Expression (xiv)}$$

$$0.9<[Re_1c450)(-40°)/Re_1c650)(-40°)]/[Re_1450)(-40°)/Re_1650)(-40°)]<1.1: \quad \text{Expression (xv)}$$

Preferably, the liquid crystal cell is composed of one selected from OCB, TN, ECB, IPS and FFS.

In another aspect, the present invention provides an optical compensation film, including an optically anisotropic layer, wherein the optically anisotropic layer comprises an orientation film and a liquid crystal compound, and $\gamma s^d_{(AL)}$ and $\gamma s^d_{(LC)}$ satisfy the following relation:

$$\gamma s^d_{(LC)} - \gamma s^d_{(AL)} \geq -4.0 \text{ erg/cm}^2$$

wherein $\gamma s^d_{(AL)}$ is a dispersion force component of surface free energy of the orientation film and $\gamma s^d_{(LC)}$ is a dispersion force component of surface free energy of the liquid-crystal compound.

Preferably, in the optical compensation film described above, the liquid crystal compound comprises at least a compound expressed by the general formula (DI) below:

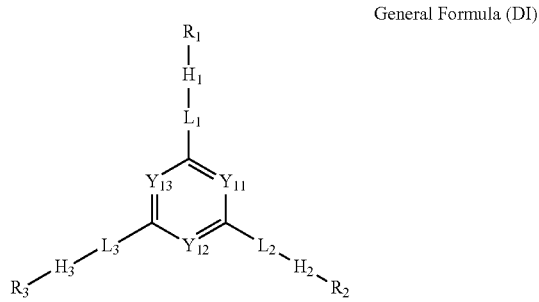

General Formula (DI)

in the general formula (DI), $Y_{11}$, $Y_{12}$ and $Y_{13}$ represent each independently a methine or nitrogen atom; $L_1$, $L_2$ and $L_3$ represent each independently a connecting group of single bond or divalent bond; $H_1$, $H_2$ and $H_3$ represent each independently one expressed by the general formula (DI-A) or (DI-B); $R_1$, $R_2$ and $R_3$ represent each independently one expressed by the general formula (DI-R);

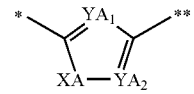

General formula (DI-A)

in the general formula (DI-A), $YA_1$ and $YA_2$ represent each independently a methine or nitrogen atom; XA represents one of oxygen atom, sulfur atom, methylene and imino; * indicates a site to bond with $L_1$ to $L_3$; ** indicates a site to bond with $R_1$ to $R_3$;

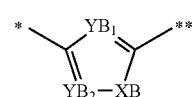

General formula (DI-B)

in the general formula (DI-B), $YB_1$ and $YB_2$ represent each independently a methine or nitrogen atom; XB represents one of oxygen atom, sulfur atom, methylene and imino; * indicates a site to bond with $L_1$ to $L_3$; ** indicates a site to bond with $R_1$ to $R_3$;

$$*-(-L_{21}-M)_{n1}-L_{22}-L_{23}-Q_1 \quad \text{General formula (DI-R):}$$

in the general formula (DI-R), * indicates a site to bond with a five-membered ring of general formula (DI); $L_{21}$ represents a connecting group of single bond or divalent bond; $L_{22}$ represents a divalent connecting group selected from —O—, —O—CO—, —CO—O—, —O—CO—O—, —S—, —NH—, —SO$_2$—, —CH$_2$—, —CH=CH— and —C≡C—; $L_{23}$ represents a divalent connecting group selected from —O—, —S—, —C(=O)—, —SO$_2$—, —NH—, —CH$_2$—, —CH=CH—, and —C≡C—; M represents a divalent connecting group having at least a cyclic structure; $Q_1$ represents independently a polymerizable group or hydrogen atom; n1 is an integer of 0 to 4.

Preferably, the average inclination angle of the liquid crystal compound is no more than 45°; the orientation film comprises a vinyl alcohol compound.

In another aspect, the present invention provides a polarizing plate including a polarizing film, and optical compensation films described above on at least one side of the polarizing film.

In another aspect, the present invention provides a liquid-crystal display device, including a liquid crystal cell and the polarizing plate described above.

Preferably, in the liquid-crystal display device described above, the liquid-crystal layer of the liquid-crystal cell satisfies at least one of Expressions (x) to (xii):

$$1.0 \leq [Re_1c450)(0°)/Re_1c650)(0°)] \leq 1.25: \quad \text{Expression (x)}$$

$$1.0 \leq [Re_1c450)(40°)/Re_1c650)(40°)] \leq 1.25: \quad \text{Expression (xi)}$$

$$1.0 \leq [Re_1c450)(-40°)/Re_1c650)(-40°)] \leq 1.25: \quad \text{Expression (xii)}$$

in which $Re_1c\lambda(\theta)$ is defined as the value of Re retardation determined in the condition that a light of wavelength $\lambda$ (nm) is entered with an incident angle $\theta°$ from the normal line with the retardant phase axis being defined as the rotation axis (when the values of $Re_1c\lambda(\theta)$ and $Re_1c\lambda(-\theta)$ are different, the magnitude is decided so as to become $Re_1c\lambda(\theta)>Re_1c\lambda(-\theta)$).

Preferably, the first optically anisotropic layer and the liquid-crystal layer of the liquid-crystal cell satisfy at least one of the first optically anisotropic layer and the liquid-crystal layer of the liquid-crystal cell respectively have optical characteristics satisfying at least one of Expressions (xiii) to (xv):

$$0.9<[Re_1c450)(0°)/Re_1c650)(0°)]/[Re_1450)(0°)/Re_1650)(0°)]<1.1: \quad \text{Expression (xiii)}$$

$$0.9<[Re_1c450)(40°)/Re_1c650)(40°)]/[Re_1450)(40°)/Re_1650)(40°)]<1.1: \quad \text{Expression (xiv)}$$

$$0.9<[Re_1c450)(-40°)/Re_1c650)(-40°)]/[Re_1450)(-40°)/Re_1650)(-40°)]<1.1: \quad \text{Expression (xv)}$$

Preferably, in the liquid-crystal display device described above, the liquid crystal cell is composed of one selected from OCB, TN, ECB, IPS and FFS.

In the optical compensation film of the second embodiment according to the present invention that comprises an orientation film and an optically anisotropic layer containing a liquid crystal compound, the retardation of optically anisotropic layer in the optical compensation film can be easily controlled through defining the difference between the dispersion force component of surface free energy of the orientation film and the dispersion force component of surface free energy of the liquid-crystal compound to be no less than 4.0 erg/cm$^2$, or selecting a disc-like liquid-crystal compound as the liquid-crystal compound.

In accordance with the first embodiment of the present invention, an optical compensation film and a polarizing plate can be provided that allow superior phase difference between a first optically anisotropic layer and a second optically anisotropic layer and excellent wavelength dispersibility in terms of front and inclined retardation of liquid crystal layers in liquid crystal cells and also a liquid-crystal display device that displays superior images with less color change due to the polarizing plate.

In accordance with the second embodiment of the present invention, an optical compensation film can be provided that allows to easily control the retardation of optically anisotropic layer due to defining the relation between orientation films and liquid-crystal compounds or properties of liquid-crystal compounds.

More specifically, the phase difference between optically anisotropic layers can be controlled through adjusting the surface free energies of orientation films and liquid crystal compounds and controlling the difference between the surface free energies. In addition, the disc-like liquid-crystal compound for the liquid-crystal compound allows to provide an optical compensation film having a suited wavelength dispersibility of retardation in terms of liquid-crystal cells at black display, thus the compensation of front black-display and visual-angle at black condition can be taken over almost entire wavelengths. As a result, employment of the optical compensation film may mitigate light defect in the front and inclined direction at black display, and the front black-float and view-angle contrast can be remarkably improved in liquid-crystal display devices. Furthermore, the liquid-crystal display devices may suppress the light defect in the front and inclined direction at black display over almost entire wavelengths, thus such a previous problem in the art can be significantly improved that color shift appears at black display depending on view angles.

In accordance with the third embodiment of the present invention, an optical compensation film can be produced with higher productivity, lower cost and less luminescent spots or defects without compensating optical properties.

BEST MODE FOR CARRYING OUT THE INVENTION

First Embodiment

Optical Compensation Film

Figure 1:
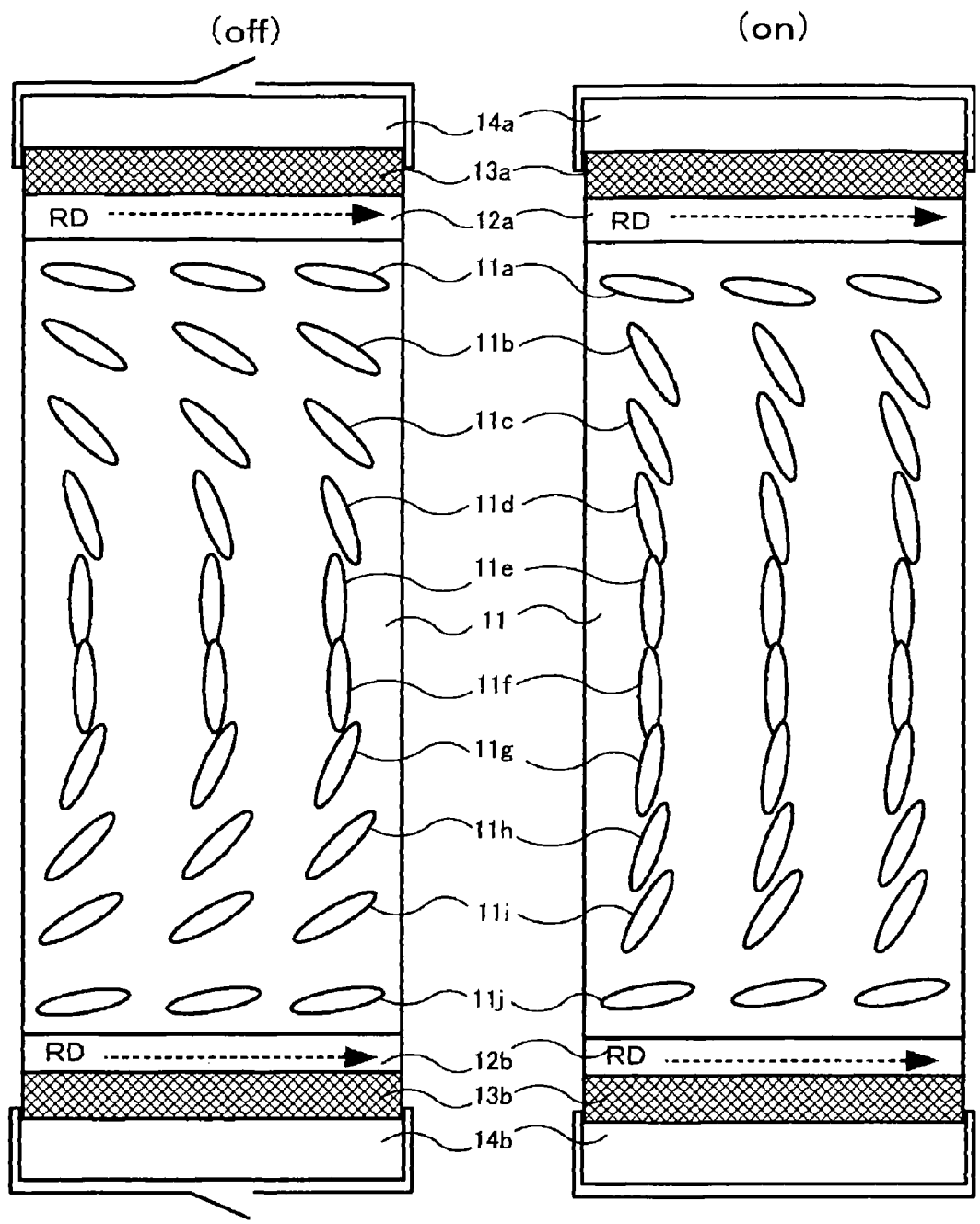
FIG. 1 is a schematic cross-section that shows an orientation of a liquid crystal compound in a bend-orientation liquid-crystal cell.

In the first embodiment, the optical compensation film is one that comprises a first optically anisotropic layer and a second optically anisotropic layer.

The optical compensation film has a function to solve such a problem of view-angle dependence through compensating phase difference of liquid crystal layers at near substrate interface that transmissivity or brightness changes depending on average orientation of liquid crystal molecules inclined at near substrate interface of liquid crystal devices, briefly speaking, the transmissivity or brightness changes when the view angle changes. The view-angle dependence can be improved, substantially perfect black display can be taken, and front contrast ratio can be increased by way of disposing the inventive optical compensation film at interface with substrates of the liquid crystal display devices.

In the inventive optical compensation film, the view-angle dependence can be improved by both optical properties of the first and the second optically anisotropic layers.

First Optically Anisotropic Layer

The first optically anisotropic layer may be designed so as to compensate the optical properties of liquid crystal compounds within liquid crystal cells of black display in liquid crystal display devices and then directly to form on the surface of the second optically anisotropic layer alternatively then to form on an orientation film provided on the second optically anisotropic layer.

Optical Property of First Optically Anisotropic Layer

The first optically anisotropic layer has a function to improve the coloring of black display etc. derived from wavelength-dispersion property or wavelength dependence that refractive-index anisotropy of liquid crystal layers exhibits in TN-type liquid crystal displays etc. in normally black mode.

In order to perform the function, it is preferred that the first optically anisotropic layer satisfies at least one of the following Expressions (i) to (iii):

$$1 \leq Re_1 450)(0°)/Re_1 650)(0°) \leq 1.25: \quad \text{Equation (i)}$$

$$1 \leq Re_1 450)(40°)/Re_1 650)(40°) \leq 1.25: \quad \text{Equation (ii)}$$

$$1 \leq Re_1 450)(-40°)/Re_1 650)(-40°) \leq 1.25: \quad \text{Equation (iii)}$$

in Expressions (i) to (iii), $Re_1\lambda(\theta)$ is defined as the value of Re retardation in the first optically anisotropic layer determined in the condition that a light of wavelength $\lambda$ (nm) is entered with an incident angle $\theta°$ from the normal line with the retardant phase axis being defined as the rotation axis (when the values of $Re_1\lambda(\theta)$ and $Re_1\lambda(-\theta)$ are different, the magnitude is decided so as to become $Re_1\lambda(\theta) > Re_1\lambda(-\theta)$).

As expressed by the Expression (i), the wavelength dispersion in the front retardation of the first optically anisotropic layer is $1 \leq Re_1 450)(0°)/Re_1 650)(0°) \leq 1.25$, preferably $Re_1 450)(0°)/Re_1 650)(0°) \leq 1.2$, more preferably $Re_1 450)(0°)/Re_1 650)(0°) \leq 1.18$.

In cases where $Re_1 450)(0°)/Re_1 650)(0°)$ is less than 1 or more than 1.25, the color or contrast at the front side may be deteriorated.

As expressed by the Expression (ii), the wavelength dispersion in the retardation inclined $40°$ with the retardant phase axis being defined as the center is preferably $1 \leq Re_1 450)(40°)/Re_1 650)(40°) \leq 1.25$, more preferably $1 \leq Re_1 450)(40°)/Re_1 650)(40°) \leq 1.18$.

In cases where $Re_1 450)(40°)/Re_1 650)(40°)$ is less than 1 or more than 1.25, the color from inclined angles or the viewable angle may be deteriorated.

As expressed by the Expression (iii), the wavelength dispersion in the retardation inclined $-40°$ with the retardant phase axis being defined as the center is preferably $1 \leq Re_1 450)(-40°)/Re_1 650)(-40°) \leq 1.25$, more preferably $1 \leq Re_1 450)(-40°)/Re_1 650)(-40°) \leq 1.18$.

In cases where $Re_1 450)(-40°)/Re_1 650)(-40°)$ is less than 1 or more than 1.25, the color from inclined angles or the viewable angle may be deteriorated.

It is preferred that the first optically anisotropic layer satisfies any two of Expressions (i) to (iii) more preferably all Expressions. It is preferable in particular that the selection is properly carried out depending on the wavelength dispersion of liquid crystal retardation in liquid crystal cells.

When all Expressions (i) to (iii) are satisfied, such effects are significant that viewable angle, color and contrast are improved at front side and inclined angles.

It is preferred that the first optically anisotropic layer is designed so as to compensate the optical properties of liquid crystal compounds within liquid crystal cells at black display in the liquid crystal display devices. The orientation condition of liquid crystal compounds in liquid crystal cells are described in IDW'00, FMC7-2, pp. 411-414, for example.

The material of the first optically anisotropic layer may be properly selected depending on the application; preferably, the first optically anisotropic layer is formed from a liquid crystal compound, more preferably from at least one of discotic liquid crystal compounds and rod-like liquid crystal compounds. The first optically anisotropic layer may be formed directly on the surface of the second optically anisotropic layer, alternatively may be formed on an orientation film provided on the second optically anisotropic layer.

Liquid Crystal Compound

It is preferred that the liquid crystal compounds represent a liquid crystal phase capable of exhibiting favorable monodomains. The favorable monodomain may result in a polydomain configuration, which may effectively prevent optical scattering due to orientation defects at boundaries of domains. Furthermore, the favorable monodomain is desirable since phase difference plates can exhibit higher optical transmissivities.

The liquid crystal layers, which the liquid crystal compounds exhibit, are exemplified by columnar phases and discotic nematic phases (ND phase). Among these liquid crystal phases, most preferable are the discotic nematic phases (ND phase) that can exhibit a favorable monodomain and also a hybrid alignment.

It is preferred that anisotropic wavelength dispersion of the liquid crystal compounds is as low as possible. More specifically, it is preferred that Re(450)/Re(650) is 1.25 or less, more preferably 1.20 or less, particularly preferably 1.15 or less; in which the phase difference of liquid crystal compounds is expressed as $Re(\lambda)$. This value is appropriately optimized in relation to wavelength dispersion of phase difference of liquid crystals in the cells.

In the hybrid alignment, the angle between a physical symmetry axis of liquid crystal compounds and the plane of supports, i.e. inclination angle, increases or decreases along with the distance from the face of polarizing films in the depth direction of optically anisotropic layers (i.e. perpendicular to (transparent) supports). It is preferred that the angle decreases as the distance increases. The inclination angle may vary in such manners as continuous increase, continuous decrease, intermittent increase, intermittent decrease, combination of continuous increase and decrease, or intermittent change with increase and decrease. The intermittent change contains a region where the inclination angle shows no change in the thickness direction. Such partial regions with no angle change are allowable as long as the increase or decrease appears as a whole. Preferably, the inclination angle alters continuously.

In general, the average direction of physical symmetry axes of disc-like liquid crystal compounds (hereinafter, referred to as "discotic liquid crystal compound") can be adjusted by properly selecting the discotic liquid crystal compounds, materials of orientation films, or rubbing processes. The direction of physical symmetry axes of the discotic liquid crystal compounds at surface side (air side) can be adjusted by properly selecting the discotic liquid crystal compounds or the additives thereof.

Examples of the additives of the discotic liquid crystal compounds include plasticizers, surfactants, polymerizable monomers, polymers, and low-molecular-weight compounds. The change of orientation direction of long axes can be adjusted by properly selecting the liquid crystal compounds or the additives thereof as described above.

The plasticizers of the liquid crystal compounds and the polymerizable polymers are employed from the viewpoint of compatibility with the liquid crystal compounds in the present invention, ability to change the inclination angle of the discotic liquid crystal compounds, and non-hindrance for alignment.

Preferably, the surfactants are fluorine-containing compounds; such surfactants are described in JA-A No. 2001-330725.

It is preferred that the polymers and the low-molecular-weight compounds affect the inclination angle of the discotic liquid crystal compounds. Specifically, the polymers are preferably cellulose esters; such celluloses are described in JP-A No. 2000-155216, in particular paragraph [0178] thereof. The content of the polymer is preferably 0.1 to 10% by mass, more preferably 0.1 to 8% by mass based on discotic liquid crystal compounds in a range not to disturb the alignment of the discotic liquid crystal compounds.

The liquid crystal compounds exhibit the liquid crystal phases at 20° C. to 300° C., more preferably 40° C. to 280° C., particularly preferably 60° C. to 250° C. Here, the term "exhibit the liquid crystal phases at 20° C. to 300° C." encompasses the cases where the liquid crystal temperature include 20° C., e.g. 10° C. to 22° C. and those where the liquid crystal temperature include 300° C., e.g. 298° C. to 310° C.; which are similar with respect to 40° C. to 280° C. and 60° C. to 250° C. described above.

The first optically anisotropic layer may be formed by applying a coating liquid containing a discotic liquid crystal compound and optionally a polymerization initiator and other ingredients on the orientation film.

The solvent used for preparing the coating film is preferably organic solvents. Examples of the organic solvent include amides such as N,N-dimethylformamide, sulfoxides such as dimethylsulfoxide, heterocyclic compounds such as pyridine, hydrocarbons such as benzene and hexane, alkyl halides such as chloroform, dichloromethane and tetrachloroethane, esters such methylacetate and butylacetate, kotones such as acetone and methyl ethyl ketone, and ethers such as tetrahydrofurane and 1,2-dimethoxyethane. Among these, alkyl halides and ketones are preferable. These organic solvents may be used alone or in combination.

The coating liquid may be applied by such conventional processes as wire bar coating processes, extrusion coating processes, direct gravure coating processes, reverse gravure coating processes, and die coating processes.

The aligned discotic liquid crystal compounds may be fixed while maintaining the aligned condition. The fixation may be carried out by a polymerization reaction. The polymerization reaction may be one of thermal polymerization reactions using thermal polymerization initiators and photopolymerization reactions using photopolymerization initiators; among these, photopolymerization reactions are preferable. Examples of the photopolymerization initiators include α-carbonyl compounds described in U.S. Pat. Nos. 2,367,661 and 2,367,670, acyloin ethers described in U.S. Pat. No. 2,448,828, α-hydrocarbon-substituted aromatic acyloin compounds described in U.S. Pat. No. 2,722,512, and polynuclear quinone compounds described in U.S. Pat. Nos. 3,046,127 and 2,951,758, combination of triarylimidazole dimers and p-aminophenylketones described in U.S. Pat. No. 3,549,367; acridine and phenazine compounds described in JP-A No. 60-105667 and U.S. Pat. No. 4,239,850, and oxadiazole compounds described in U.S. Pat. No. 4,212,970.

The content of the photopolymerization initiator is preferably 0.01 to 20% by mass based on the solid content of the coating liquid, more preferably 0.5 to 5% by mass. The optical irradiation for polymerizing the liquid crystal molecules are preferably carried out using UV rays. The irradiation energy is preferably 20 to 50 J/cm$^2$, more preferably 20 to 5000 mJ/cm$^2$, particularly preferably 100 to 800 mJ/cm$^2$. The optical irradiation may be carried out under heating in order to promote the photopolymerization reaction. A protective layer may be arranged on the first optically anisotropic layer.

Discotic Liquid Crystal Compound

Examples of the discotic liquid crystal compounds include benzene derivatives described in "C. Destrade et al., Mol. Cryst. vol. 71, p. 111 (1981)", toluxene derivatives described in "C. Destrade et al., Mol. Cryst. vol. 122, p. 141 (1985)" and "Physics Lett. A, vol 78, p. 82 (1990)", cyclohexane derivatives described in "B. Kohne et al., Angew. Chem. vol. 96, p. 70 (1984)", and aza crowns and phenylacetylene macrocycles described in "J. M. Lehn, J. Chem. Commun., p. 1794 (1985)" and "J. Zhang, J. Am. Chem. Soc. vol. 116, p. 2655 (1994).

The discotic liquid crystal compounds also include liquid crystal compounds having such a configuration that linear alkyl, alkoxy or substituted benzoyloxy groups are substituted as the side chains radially around the parent nuclear of the molecular center. It is also preferred that the discotic liquid crystal compounds have a rotation symmetry as a whole and exhibit a certain orientation.

As described above, when an optically anisotropic layer is formed from the liquid crystal compound, the liquid crystal compound in the resulting optically anisotropic layer may turn into non-crystalline. In cases, for example, where low-molecular-weight discotic liquid crystal compounds have an optically or thermally sensitive group and the optically anisotropic layer is formed by polymerization, crosslinking or polymerization through the reaction of the optically or thermally sensitive group, compounds in the optically anisotropic layer may lose its liquid-crystalline properties.

Favorable examples of the discotic liquid crystal compounds are described in JP-A No. 08-50206; the polymerization of the discotic liquid crystal compounds is described in JP-A No. 08-27284.

In order to fix the discotic liquid crystal compounds by polymerization, a polymerizable group should be attached as a substituent to a disc-like core of the discotic liquid crystal compounds. However, when the polymerizable group is bonded directly to disc-like cores, the orientation condition is hardly maintained through the polymerization reaction; therefore, it is preferred that a connecting group is introduced between a disc-like core and a polymerizable group.

The discotic liquid crystal compounds having the polymerizable group are preferably one expressed by the structural formula (A) and those expressed by the general formula (DI), particularly preferable are those expressed by the general formula (DI).

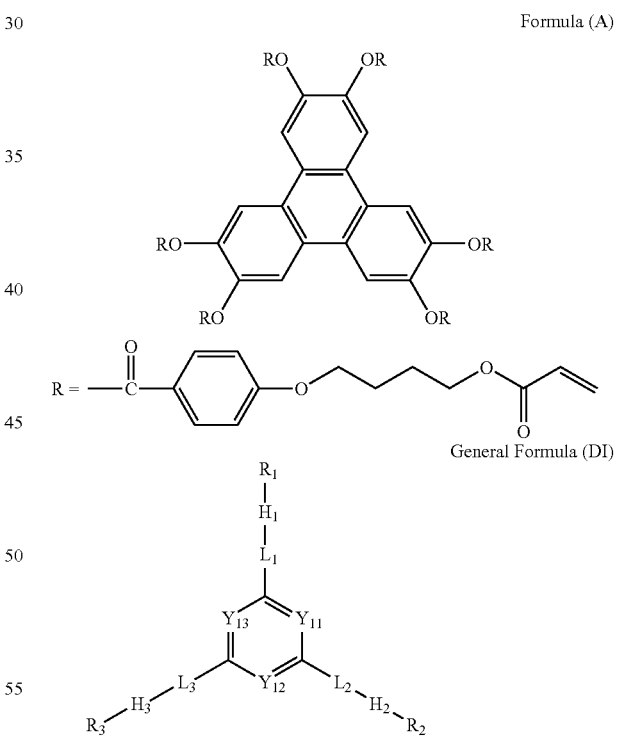

Formula (A)

General Formula (DI)

In the general formula (DI), $Y_{11}$, $Y_{12}$, and $Y_{13}$ are each independently a methine or nitrogen atom.

In cases where $Y_{11}$, $Y_{12}$, and $Y_{13}$ are the methine, there may exist a substituent. Examples of the substituent include alkyl groups, alkoxy groups, aryloxy groups, acyl groups, alkoxy carbonyl groups, acyloxy groups, acylamino groups, alkoxy carbonylamino groups, alkylthio groups, arylthio groups, halogen atoms and cyano group. More preferable examples thereof are alkyl groups, alkoxy groups, alkoxy carbonyl groups, acyloxy groups, halogen atoms and cyano groups; still more preferable examples are alkyl groups with 1 to 12 carbon atoms, alkoxy groups with 1 to 12 carbon atoms, alkoxy carbonyl groups with 2 to 12 carbon atoms, acyloxy groups with 2 to 12 carbon atoms, halogen atoms and cyano group.

In the general formula (DI), $L_1$, $L_2$ and $L_3$ are each independently a single bond or divalent connecting group.

In cases where $L_1$, $L_2$ and $L_3$ are each a divalent connecting group, it is preferred that $L_1$, $L_2$ and $L_3$ are each independently one selected from the divalent connecting groups consisting of —O—, —S—, —C(=O)—, —NH—, —SO$_2$—, —CH=CH—, —C≡C— and combination thereof. In cases where these groups contain a hydrogen atom, the hydrogen atom may be replaced by a substituent.

The substituent is preferably one of halogen atoms, cyano group, nitro group, alkyl groups with 1 to 6 carbon atoms, halogen-substituted alkyl groups with 1 to 6 carbon atoms, alkoxy groups with 1 to 6 carbon atoms, acyl groups with 2 to 6 carbon atoms, alkylthio groups with 1 to 6 carbon atoms, acyloxy groups with 2 to 6 carbon atoms, alkoxy carbonyl groups with 2 to 6 carbon atoms, carbamoyl group, alkyl-substituted carbamoyl group with 2 to 6 carbon atoms, and acylamino groups with 2 to 6 carbon atoms, more preferably are halogen atoms and alkyl groups with 1 to 6 carbon atoms.

The divalent connecting groups of $L_1$, $L_2$ and $L_3$ may be a divalent cyclic group having at least one cyclic structure.

The divalent cyclic group is preferably a five-membered ring, six-membered ring or seven-membered ring, more preferably a five-membered ring or six-membered ring, particularly preferably a six-membered ring. The ring in the cyclic group may be a condensed ring or a single ring, more preferably a single ring.

In addition, the ring of the cyclic group may be an aromatic ring, aliphatic ring or hetero ring. Examples of the aromatic ring include a benzene ring and naphthalene ring; examples of the aliphatic ring include a cyclohexane ring; examples of the hetero ring include a pyridine ring and pyrimidine ring. Preferably, the cyclic group is of aromatic or hetero ring.

A preferable example of the divalent cyclic groups of $L_1$, $L_2$ and $L_3$ having a benzene ring is 1,4-phenylene. Preferable examples of the cyclic group having a naphthalene ring include naphthalene-1,5-diyl and naphthalene-2,6-diyl. Preferable examples of the cyclic group having a cyclohexane ring include 1,4-cyclohexylene. Preferable examples of the cyclic group having a pyridine ring include pyridine-2,5-diyl. Preferable examples of the cyclic group having a pyrimidine ring include pyrimidine-2,5-diyl.

The divalent cyclic groups of $L_1$, $L_2$ and $L_3$ may have a substituent. Examples of the substituent include halogen atoms, cyano group, nitro group, alkyl groups with 1 to 16 carbon atoms, alkenyl groups with 1 to 16 carbon atoms, alkynyl groups with 1 to 16 carbon atoms, halogen-substituted alkyl groups with 1 to 16 carbon atoms, alkoxy groups with 1 to 16 carbon atoms, acyl groups with 2 to 16 carbon atoms, alkylthio groups with 1 to 16 carbon atoms, acyloxy groups with 2 to 16 carbon atoms, alkoxy carbonyl groups with 2 to 16 carbon atoms, carbamoyl group, alkyl-substituted carbamoyl groups with 2 to 16 carbon atoms and acylamino groups with 2 to 16 carbon atoms.

The $L_1$, $L_2$ and $L_3$ are preferably a single bond, *—O—CO—, *—CO—O—, *—CH=CH—, *—C≡C—, *-M-, *—O—CO-M-, *—CO—O-M-, *—CH=CH-M-, *—C≡C-M-, *-M-O—CO—, *-M-CO—O—, *-M-CH=CH— or *-M-C≡C—. In particular, a single bond, *—CH=CH—, *—C≡C—, *—CH=CH-M- and *—C≡C-M- are preferable, a single bond is particularly preferable. The mark * indicates the site at which the bond is formed with the six-membered ring containing $Y_{11}$, $Y_{12}$ and $Y_{13}$ expressed by the general formula (I), and M represents a divalent cyclic group.

$H_1$, $H_2$ and $H_3$ in the general formula (DI) represent each independently one expressed by the general formulas (DI-A) and (DI-B).

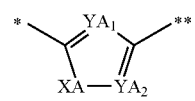

General formula (DI-A)

In the general formula (DI-A), $YA_1$ and $YA_2$ represent each independently a methine or nitrogen atom. XA represents an oxygen atom, sulfur atom, methylene or imino; * indicates the site at which a bond is formed with one of $L_1$ to $L_3$, and ** indicates the site at which a bond is formed with one of $R_1$ to $R_3$.

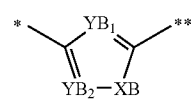

General formula (DI-B)

In the general formula (DI-B), $YB_1$ and $YB_2$ represent each independently a methine or nitrogen atom. XA represents an oxygen atom, sulfur atom, methylene or imino; * indicates the site at which a bond is formed with one of $L_1$ to $L_3$, and ** indicates the site at which a bond is formed with one of $R_1$ to $R_3$.

In the general formula (DI), $R_1$, $R_2$ and $R_3$ represent each independently the general formula (DI-R) below.

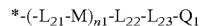

*-(-$L_{21}$-M)$_{n1}$-$L_{22}$-$L_{23}$-$Q_1$    General Formula (DI-R):

The mark * in the general formula (DI-R) indicates the site at which a bond is formed with the five-membered ring of the general formula (DI).

In the general formula (DI-R), $L_{21}$ represents a single bond or a divalent connecting group. In cases where the $L_{21}$ is a divalent connecting group, preferably the divalent connecting group is one selected from —O—, —S—, —C(=O)—, —NH—, —SO$_2$—, —CH=CH—, —C≡C— and combination thereof. In cases where these groups contain a hydrogen atom, the hydrogen atom may be replaced by a substituent.

The substituent is preferably one of halogen atoms, cyano group, nitro group, alkyl groups with 1 to 6 carbon atoms, halogen-substituted alkyl groups with 1 to 6 carbon atoms, alkoxy groups with 1 to 6 carbon atoms, acyl groups with 2 to 6 carbon atoms, alkylthio groups with 1 to 6 carbon atoms, acyloxy groups with 2 to 6 carbon atoms, alkoxy carbonyl groups with 2 to 6 carbon atoms, carbamoyl group, alkyl-substituted carbamoyl groups with 2 to 6 carbon atoms, and acylamino groups with 2 to 6 carbon atoms, more preferably are halogen atoms and alkyl groups with 1 to 6 carbon atoms.

Preferably, $L_{21}$ is a single bond, —O—CO—, —CO—O—, —CH=CH— or —C≡C—, more preferably a single bond.

The divalent connecting group of $L_{21}$ may be a divalent cyclic group having at least one cyclic structure.

The divalent cyclic group is preferably a five-membered ring, six-membered ring or seven-membered ring, more preferably a five-membered ring or six-membered ring, particularly preferably a six-membered ring. The ring in the cyclic group may be a condensed ring or a single ring, more preferably a single ring.

In addition, the ring of the cyclic group may be an aromatic ring, aliphatic ring or hetero ring. Examples of the aromatic ring include a benzene ring, naphthalene ring, anthracene ring and phenanthrene ring; examples of the aliphatic ring include a cyclohexane ring; examples of the hetero ring include a pyridine ring and pyrimidine ring.

Preferable examples of the divalent cyclic groups of $L_{21}$ having a benzene ring are 1,4-phenylene and 1,3-phenylene. Preferable examples of the cyclic group having a naphthalene ring include naphthalene-1,4-diyl, naphthalene-1,5-diyl, naphthalene-1,6-diyl, naphthalene-2,5-diyl, naphthalene-2,6-diyl and naphthalene-2,7-diyl. Preferable examples of the cyclic group having a cyclohexane ring include 1,4-cyclohexylene. Preferable examples of the cyclic group having a pyridine ring include pyridine-2,5-diyl. Preferable examples of the cyclic group having a pyrimidine ring include pyrimidine-2,5-diyl. Preferable examples of the divalent cyclic group include 1,4-phenylene, 1,3-phenylene, and naphthalene-2,6-diyl in particular.

The divalent cyclic group of $L_{21}$ may have a substituent. Examples of the substituent include halogen atoms (fluorine, chlorine, bromine and iodine atoms), cyano group, nitro group, alkyl groups with 1 to 16 carbon atoms, alkenyl groups with 1 to 16 carbon atoms, alkynyl groups with 1 to 16 carbon atoms, halogen-substituted alkyl groups with 1 to 16 carbon atoms, alkoxy groups with 1 to 16 carbon atoms, acyl groups with 2 to 16 carbon atoms, alkylthio groups with 1 to 16 carbon atoms, acyloxy groups with 2 to 16 carbon atoms, alkoxy carbonyl groups with 2 to 16 carbon atoms, carbamoyl group, alkyl-substituted carbamoyl groups with 2 to 16 carbon atoms and acylamino groups with 2 to 16 carbon atoms. Among these, halogen atoms, cyano group, alkyl groups with 1 to 6 carbon atoms and halogen-substituted alkyl groups with 1 to 6 carbon atoms are preferable, halogen atoms, alkyl groups with 1 to 4 carbon atoms and halogen-substituted alkyl groups with 1 to 4 carbon atoms are more preferable, and in particular halogen atoms, alkyl groups with 1 to 3 carbon atoms and trifluoromethyl group are preferable.

In the general formula (DI-R), n1 represents an integer of 0 to 4. The n1 is preferably an integer of 1 to 3, particular preferably 1 or 2.

In the general formula (DI-R), $L_{22}$ is one of —O—, —O—CO—, —CO—O—, —O—CO—O—, —S—, —NH—, —SO$_2$—, —CH$_2$—, —CH=CH— or —C≡C—; preferably, —O—, —O—CO—, —CO—O—, —O—CO—O—, —CH$_2$—, —CH=CH—, and —C≡C—; more preferably, —O—, —O—CO—, —CO—O— or —CH$_2$—. In cases where these groups contain a hydrogen atom, the hydrogen atom may be replaced by a substituent.

The substituent is preferably one of halogen atoms, cyano group, nitro group, alkyl groups with 1 to 6 carbon atoms, halogen-substituted alkyl groups with 1 to 6 carbon atoms, alkoxy groups with 1 to 6 carbon atoms, acyl groups with 2 to 6 carbon atoms, alkylthio groups with 1 to 6 carbon atoms, acyloxy groups with 2 to 6 carbon atoms, alkoxy carbonyl groups with 2 to 6 carbon atoms, carbamoyl group, alkyl-substituted carbamoyl groups with 2 to 6 carbon atoms, and acylamino groups with 2 to 6 carbon atoms; more preferably are halogen atoms and alkyl groups with 1 to 6 carbon atoms.

In the general formula (DI-R), $L_{23}$ is a divalent connecting group selected from the group consisting of —O—, —S—, —C(=O)—, —SO$_2$—, —NH—, —CH$_2$—, —CH=CH—, —C≡C— and combination thereof. The hydrogen atoms in —NH—, —CH$_2$— and —CH=CH— may be replaced by other substituents.

The substituent is preferably one of halogen atoms, cyano group, nitro group, alkyl groups with 1 to 6 carbon atoms, halogen-substituted alkyl groups with 1 to 6 carbon atoms, alkoxy groups with 1 to 6 carbon atoms, acyl groups with 2 to 6 carbon atoms, alkylthio groups with 1 to 6 carbon atoms, acyloxy groups with 2 to 6 carbon atoms, alkoxy carbonyl groups with 2 to 6 carbon atoms, carbamoyl group, alkyl-substituted carbamoyl groups with 2 to 6 carbon atoms, and acylamino groups with 2 to 6 carbon atoms. Among these, particularly preferable are halogen atoms and alkyl groups with 1 to 6 carbon atoms. The substitution by these groups may enhance the solubility in solvent in the process for preparing liquid crystal compositions from liquid crystal compounds in the present invention.

Preferably, the $L_{23}$ is one of —O—, —C(=O)—, —CH$_2$—, —CH=CH—, —C≡C— and combination thereof. Preferably, the $L_{23}$ contains 1 to 20 carbon atoms, particularly preferably 2 to 14 carbon atoms. Furthermore, the $L_{23}$ contains 1 to 16 of —CH$_2$—, particularly preferably 2 to 12 of —CH$_2$—.

In the general formula (DI), $Q_1$ independently represents a polymerizable group or hydrogen atom. The $Q_1$ is preferably a polymerizable group from the viewpoint to make heat-insensitive the phase difference of liquid crystal compounds. Preferably, the polymerization reaction is an addition polymerization including ring-opening polymerization or a condensation polymerization. It is, therefore, preferable that the polymerizable group is a functional group able to undergo the addition polymerization or condensation polymerization. Examples of the polymerizable groups able to undergo the addition polymerization are shown below.

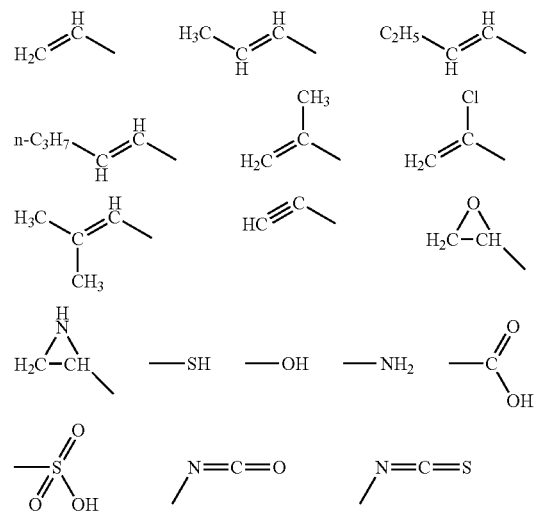

It is particularly preferable that the polymerizable group is a functional group able to undergo the condensation polymerization reaction, for example, a polymerizable ethylenically unsaturated group or a ring-opening polymerizable group. The polymerizable ethylenically unsaturated groups are exemplified by those expressed by formulas (M-1) to (M-6) shown below.

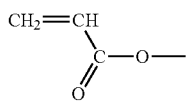 (M-1)

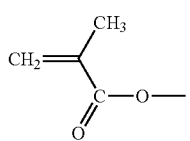 (M-2)

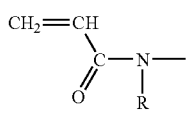 (M-3)

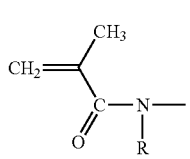 (M-4)

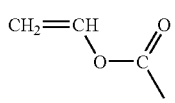 (M-5)

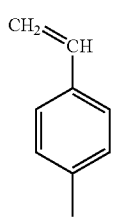 (M-6)

In the formulas (M-3) and (M-4), R is a hydrogen atom or alkyl group; preferably, R is a hydrogen atom or methyl group. Among the groups expressed by the formulas (M-1) and (M-6), preferable are the groups expressed by the formulas (M-1) and (M-2), in particular the groups expressed by the formula (M-1).

The ring-opening polymerizable group is preferably a cyclic ether group, more preferably an epoxy or oxethanyl group, particularly preferably an epoxy group.

The compounds expressed by the general formula (DII) are also particularly preferable for the discotic liquid crystal compounds.

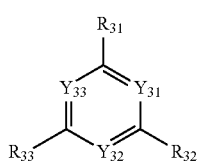

General Formula (DII)

In the general formula (DII), $Y_{31}$, $Y_{3}2$ and $Y_{33}$ have substantially the same meanings as those of $Y_{11}$, $Y_{12}$ and $Y_{13}$ in the general formula (DI).

$R_{31}$, $R_{32}$ and $R_{33}$ in the general formula (DII) are each independently expressed by the general formula (DII-R) below.

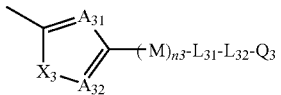

General Formula (DII-R)

In the general formula (DII-R), $A_{31}$ and $A_{32}$ represent each independently a methine or nitrogen atom. Preferably, at least one of $A_{31}$ and $A_{32}$ is a nitrogen atom, particularly preferably the both are nitrogen atoms. $X_3$ represents an oxygen atom, methylene or imino, particularly preferably is an oxygen atom. M represents a divalent cyclic ring.

The divalent cyclic group M in the general formula (DII-R) is preferably a divalent connecting group of seven-membered ring structure. The ring in the divalent cyclic group may be a condensed ring or a single ring, more preferably a single ring. In addition, the ring of the cyclic group may be an aromatic ring, aliphatic ring or hetero ring. Examples of the aromatic ring include a benzene ring, naphthalene ring, anthracene ring and phenanthrene ring; examples of the aliphatic ring include a cyclohexane ring; examples of the hetero ring include a pyridine ring and pyrimidine ring.

Preferable examples of the divalent cyclic groups of M having a benzene ring are 1,4-phenylene and 1,3-phenylene. Preferable examples of the cyclic group having a naphthalene ring include naphthalene-1,4-diyl, naphthalene-1,5-diyl, naphthalene-1,6-diyl, naphthalene-2,5-diyl, naphthalene-2,6-diyl and naphthalene-2,7-diyl. Preferable examples of the cyclic group having a cyclohexane ring include 1,4-cyclohexylene. Preferable examples of the cyclic group having a pyridine ring include pyridine-2,5-diyl. Preferable examples of the cyclic group having a pyrimidine ring include pyrimidine-2,5-diyl. Preferable examples of the divalent cyclic group include 1,4-phenylene, 1,3-phenylene, and naphthalene-2,6-diyl in particular.

The divalent cyclic group of M may have a substituent. Examples of the substituent include halogen atoms (fluorine, chlorine, bromine and iodine atoms), cyano group, nitro group, alkyl groups with 1 to 16 carbon atoms, alkenyl groups with 1 to 16 carbon atoms, alkynyl groups with 1 to 16 carbon atoms, halogen-substituted alkyl groups with 1 to 16 carbon atoms, alkoxy groups with 1 to 16 carbon atoms, acyl groups with 2 to 16 carbon atoms, alkylthio groups with 1 to 16 carbon atoms, acyloxy groups with 2 to 16 carbon atoms, alkoxy carbonyl groups with 2 to 16 carbon atoms, carbamoyl group, alkyl-substituted carbamoyl groups with 2 to 16 carbon atoms and acylamino groups with 2 to 16 carbon atoms. Among these, halogen atoms, cyano group, alkyl groups with 1 to 6 carbon atoms and halogen-substituted alkyl groups with 1 to 6 carbon atoms are preferable, halogen atoms, alkyl groups with 1 to 4 carbon atoms and halogen-substituted alkyl groups with 1 to 4 carbon atoms are more preferable, and in particular halogen atoms, alkyl groups with 1 to 3 carbon atoms and trifluoromethyl group are preferable.

In the general formula (DII-R), n3 represents an integer of 1 to 3, preferably 1 or 2. In the general formula (DII-R), $L_{31}$, $L_{32}$ and $Q_3$ have substantially the same meanings as those of $L_{22}$, $L_{23}$ and $Q_1$ respectively in the general formula (DI-R).

The compounds expressed by the general formulas (DI) and (DII) are exemplified by those indicated below.

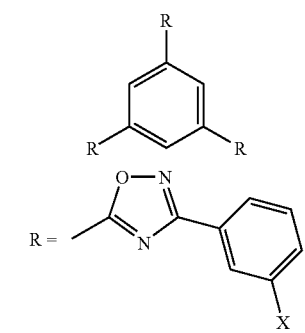

X = —OC$_4$H$_9$
  D-1
—OC$_5$H$_{11}$
  D-2
—OC$_6$H$_{13}$
  D-3
—OC$_7$H$_{15}$
  D-4
—OC$_8$H$_{16}$
  D-5
—OCH$_2$CH(CH$_3$)C$_4$H$_9$
  D-6
—O(CH$_2$)$_2$OCOCH=CH$_2$
  D-7
—O(CH$_2$)$_3$OCOCH=CH$_2$
  D-8
—O(CH$_2$)$_4$OCOCH=CH$_2$
  D-9
—O(CH$_2$)$_5$OCOCH=CH$_2$
  D-10
—O(CH$_2$)$_6$OCOCH=CH$_2$
  D-11
—O(CH$_2$)$_7$OCOCH=CH$_2$
  D-12
—O(CH$_2$)$_8$OCOCH=CH$_2$
  D-13
—O(CH$_2$)$_2$CH(CH$_3$)OCOCH=CH$_2$
  D-14
—O(CH$_2$)$_3$CH(CH$_3$)OCOCH=CH$_2$
  D-15
—O(CH$_2$CH$_2$O)$_2$COCH=CH$_2$
  D-16
—O(CH$_2$)$_4$OCOC(CH$_3$)=CH$_2$
  D-17
—O(CH$_2$)$_4$OCOCH=CHCH$_3$
  D-18
—O(CH$_2$)$_4$OCH=CH$_2$
  D-19
—O(CH$_2$)$_4$—CH—CH$_2$
               \\  /
                O
  D-20

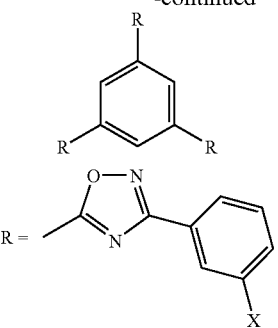

X = —OCOC$_4$H$_9$
  D-21
—OCOC$_5$H$_{11}$
  D-22
—OCOC$_6$H$_{13}$
  D-23
—OCO(CH$_2$)$_2$OCOCH=CH$_2$
  D-24
—OCO(CH$_2$)$_3$OCOCH=CH$_2$
  D-25
—OCO(CH$_2$)$_4$OCOCH=CH$_2$
  D-26
—OCO(CH$_2$)$_5$OCOCH=CH$_2$
  D-27
—OCO(CH$_2$)$_6$OCOCH=CH$_2$
  D-28
—OCO(CH$_2$)$_7$OCOCH=CH$_2$
  D-29
—OCO(CH$_2$)$_2$CH(CH$_3$)OCOCH=CH$_2$
  D-30
—OCO(CH$_2$)$_2$OCOC=CH$_2$
                    |
                    CH$_3$
  D-31
—OCO(CH$_2$)$_2$OCOCH=CHCH$_3$
  D-32
—OCO(CH$_2$)$_4$OCH=CH$_2$
  D-33
—OCO(CH$_2$)$_4$—CH—CH$_2$
                 \\  /
                  O
  D-34

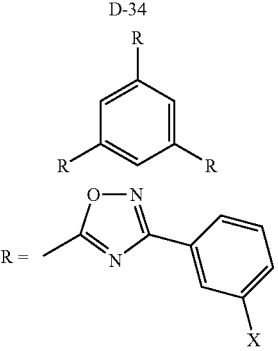

X = —OCOOC$_4$H$_9$
  D-35
—OCOOC$_5$H$_{11}$
  D-36
—OCOOC$_6$H$_{13}$
  D-37

-continued

—OCOO(CH₂)₂OCOCH=CH₂
D-38

—OCOO(CH₂)₃OCOCH=CH₂
D-39

—OCOO(CH₂)₄OCOCH=CH₂
D-40

—OCOO(CH₂)₅OCOCH=CH₂
D-41

—OCOO(CH₂)₆OCOCH=CH₂
D-42

—OCOO(CH₂)₇OCOCH=CH₂
D-43

—OCOOCH(CH₃)CH₂CH₂OCOCH=CH₂
D-44

—OCOOC(CH₂CH₂O)₂COCH=CH₂
D-45

—OCOO(CH₂)₂OCOC=CH₂
             |
             CH₃
D-46

—OCOO(CH₂)₂OCOCH(CH₂)₄OCOCH=CHCH₃
D-47

—OCOO(CH₂)₄OCH=CH₂
D-48

—OCOO(CH₂)₄—CH—CH₂
              \ /
               O
D-49

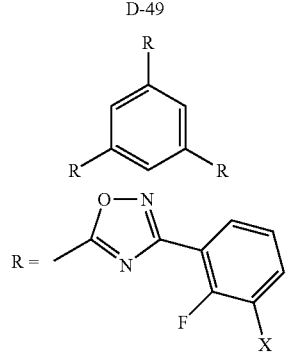

X = —OC₆H₁₃
D-50

—OCOC₅H₁₁
D-51

—OCOOC₄H₉
D-52

—O(CH₂)₄OCOCH=CH₂
D-53

—O(CH₂)₆OCOCH=CH₂
D-54

—OCO(CH₂)₃OCOCH=CH₂
D-55

—OCO(CH₂)₄OCOCH=CH₂
D-56

—OCOO(CH₂)₂OCOCH=CH₂
D-57

—OCOO(CH₂)₄OCOCH=CH₂
D-58

-continued

—O(CH₂)₂OCOC=CH₂
            |
            CH₃
D-59

—O(CH₂)₂OCOCH=CHCH₃
D-60

—O(CH₂)₄OCH=CH₂
D-61

—O(CH₂)₄—CH—CH₂
          \ /
           O
D-62

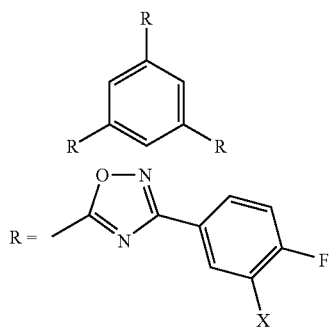

X = —OC₆H₁₃
D-63

—OCOC₅H₁₁
D-64

—OCOOC₄H₉
D-65

—O(CH₂)₄OCOCH=CH₂
D-66

—O(CH₂)₆OCOCH=CH₂
D-67

—OCO(CH₂)₃OCOCH=CH₂
D-68

—OCO(CH₂)₄OCOCH=CH₂
D-69

—OCOO(CH₂)₂OCOCH=CH₂
D-70

—OCOO(CH₂)₄OCOCH=CH₂
D-71

—O(CH₂)₂OCOC=CH₂
            |
            CH₃
D-72

—O(CH₂)₂OCOCH=CHCH₃
D-73

—O(CH₂)₄OCH=CH₂
D-74

—O(CH₂)₄—CH—CH₂
          \ /
           O
D-75

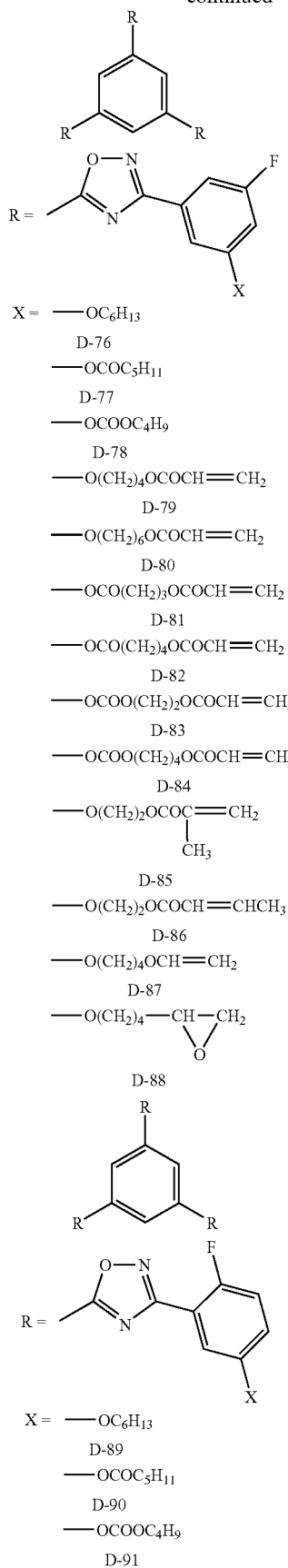

X = —OC$_6$H$_{13}$
D-76
—OCOC$_5$H$_{11}$
D-77
—OCOOC$_4$H$_9$
D-78
—O(CH$_2$)$_4$OCOCH=CH$_2$
D-79
—O(CH$_2$)$_6$OCOCH=CH$_2$
D-80
—OCO(CH$_2$)$_3$OCOCH=CH$_2$
D-81
—OCO(CH$_2$)$_4$OCOCH=CH$_2$
D-82
—OCOO(CH$_2$)$_2$OCOCH=CH$_2$
D-83
—OCOO(CH$_2$)$_4$OCOCH=CH$_2$
D-84
—O(CH$_2$)$_2$OCOC(CH$_3$)=CH$_2$
D-85
—O(CH$_2$)$_2$OCOCH=CHCH$_3$
D-86
—O(CH$_2$)$_4$OCH=CH$_2$
D-87
—O(CH$_2$)$_4$—CH(—O—)CH$_2$ (epoxide)
D-88

X = —OC$_6$H$_{13}$
D-89
—OCOC$_5$H$_{11}$
D-90
—OCOOC$_4$H$_9$
D-91

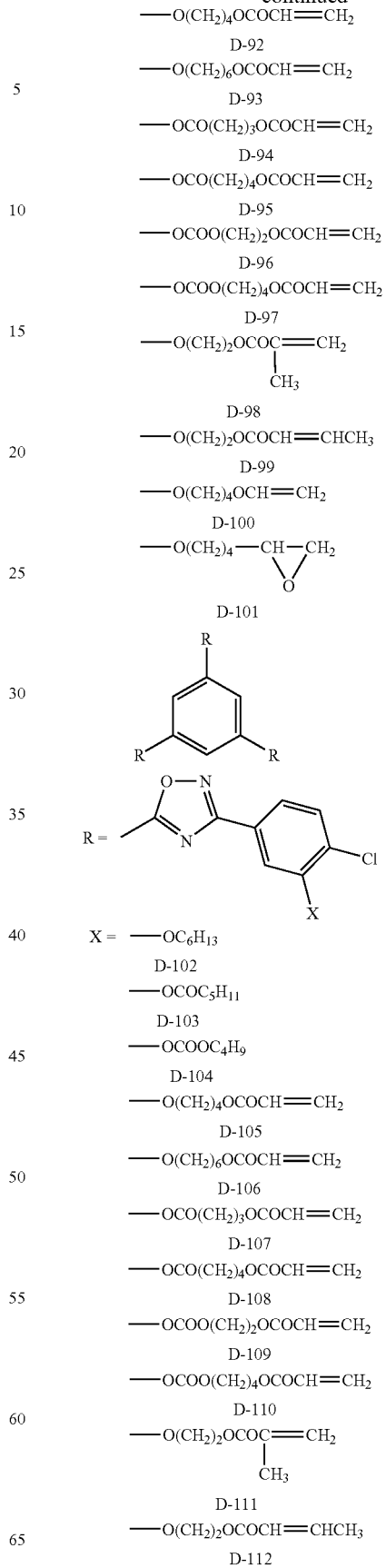

—O(CH$_2$)$_4$OCOCH=CH$_2$
D-92
—O(CH$_2$)$_6$OCOCH=CH$_2$
D-93
—OCO(CH$_2$)$_3$OCOCH=CH$_2$
D-94
—OCO(CH$_2$)$_4$OCOCH=CH$_2$
D-95
—OCOO(CH$_2$)$_2$OCOCH=CH$_2$
D-96
—OCOO(CH$_2$)$_4$OCOCH=CH$_2$
D-97
—O(CH$_2$)$_2$OCOC(CH$_3$)=CH$_2$
D-98
—O(CH$_2$)$_2$OCOCH=CHCH$_3$
D-99
—O(CH$_2$)$_4$OCH=CH$_2$
D-100
—O(CH$_2$)$_4$—CH(—O—)CH$_2$ (epoxide)
D-101

X = —OC$_6$H$_{13}$
D-102
—OCOC$_5$H$_{11}$
D-103
—OCOOC$_4$H$_9$
D-104
—O(CH$_2$)$_4$OCOCH=CH$_2$
D-105
—O(CH$_2$)$_6$OCOCH=CH$_2$
D-106
—OCO(CH$_2$)$_3$OCOCH=CH$_2$
D-107
—OCO(CH$_2$)$_4$OCOCH=CH$_2$
D-108
—OCOO(CH$_2$)$_2$OCOCH=CH$_2$
D-109
—OCOO(CH$_2$)$_4$OCOCH=CH$_2$
D-110
—O(CH$_2$)$_2$OCOC(CH$_3$)=CH$_2$
D-111
—O(CH$_2$)$_2$OCOCH=CHCH$_3$
D-112

-continued

—O(CH₂)₄OCH=CH₂
D-113

—O(CH₂)₄—CH—CH₂
           \O/
D-114

R = [3,5-disubstituted phenyl attached to 1,2,4-oxadiazole with 4-bromo-3-X-phenyl]

X = —OC₆H₁₃
D-115

—OCOC₅H₁₁
D-116

—OCOOC₄H₉
D-117

—O(CH₂)₄OCOCH=CH₂
D-118

—O(CH₂)₆OCOCH=CH₂
D-119

—OCO(CH₂)₃OCOCH=CH₂
D-120

—OCO(CH₂)₄OCOCH=CH₂
D-121

—OCOO(CH₂)₂OCOCH=CH₂
D-122

—OCOO(CH₂)₄OCOCH=CH₂
D-123

—O(CH₂)₂OCOC=CH₂
              |
              CH₃
D-124

—O(CH₂)₂OCOCH=CHCH₃
D-125

—O(CH₂)₄OCH=CH₂
D-126

—O(CH₂)₄—CH—CH₂
           \O/
D-127

R = [3,5-disubstituted phenyl attached to 1,2,4-oxadiazole with 4-methyl-3-X-phenyl]

X = —OC₆H₁₃
D-128

-continued

—OCOC₅H₁₁
D-129

—OCOOC₄H₉
D-130

—O(CH₂)₄OCOCH=CH₂
D-131

—O(CH₂)₆OCOCH=CH₂
D-132

—OCO(CH₂)₃OCOCH=CH₂
D-133

—OCO(CH₂)₄OCOCH=CH₂
D-134

—OCOO(CH₂)₂OCOCH=CH₂
D-135

—OCOO(CH₂)₄OCOCH=CH₂
D-136

—O(CH₂)₂OCOC=CH₂
              |
              CH₃
D-137

—O(CH₂)₂OCOCH=CHCH₃
D-138

—O(CH₂)₄OCH=CH₂
D-139

—O(CH₂)₄—CH—CH₂
           \O/
D-140

R = [3,5-disubstituted phenyl attached to 1,2,4-oxadiazole with 3-X-phenyl]

X = —OC₆H₁₃
D-141

—OCOC₅H₁₁
D-142

—OCOOC₄H₉
D-143

—O(CH₂)₄OCOCH=CH₂
D-144

—O(CH₂)₆OCOCH=CH₂
D-145

—OCO(CH₂)₃OCOCH=CH₂
D-146

—OCO(CH₂)₄OCOCH=CH₂
D-147

—OCOO(CH₂)₂OCOCH=CH₂
D-148

—OCOO(CH₂)₄OCOCH=CH₂
D-149

—O(CH₂)₂OCOC(CH₃)=CH₂
D-150

—O(CH₂)₂OCOCH=CHCH₃
D-151

—O(CH₂)₄OCH=CH₂
D-152

—O(CH₂)₄—CH—CH₂ (epoxide)
D-153

R = (1,2,4-oxadiazole with 3-X-phenyl)

X = —OC₆H₁₃
D-154

—OCOC₅H₁₁
D-155

—OCOOC₄H₉
D-156

—O(CH₂)₄OCOCH=CH₂
D-157

—O(CH₂)₆OCOCH=CH₂
D-158

—OCO(CH₂)₃OCOCH=CH₂
D-159

—OCO(CH₂)₄OCOCH=CH₂
D-160

—OCOO(CH₂)₂OCOCH=CH₂
D-161

—OCOO(CH₂)₄OCOCH=CH₂
D-162

—O(CH₂)₂OCOC(CH₃)=CH₂
D-163

—O(CH₂)₂OCOCH=CHCH₃
D-164

—O(CH₂)₄OCH=CH₂
D-165

—O(CH₂)₄—CH—CH₂ (epoxide)
D-166

R = (1,2,4-thiadiazole with 3-X-phenyl)
X = —O(CH₂)₄OCOCH=CH₂
D-167

R = (1,2,4-oxadiazole isomer with 3-X-phenyl)
X = —O(CH₂)₄OCOCH=CH₂
D-168

R = (oxazole with 3-X-phenyl)
X = —O(CH₂)₄OCOCH=CH₂
D-169

R = (furan with 3-X-phenyl)
X = —O(CH₂)₄OCOCH=CH₂
D-170

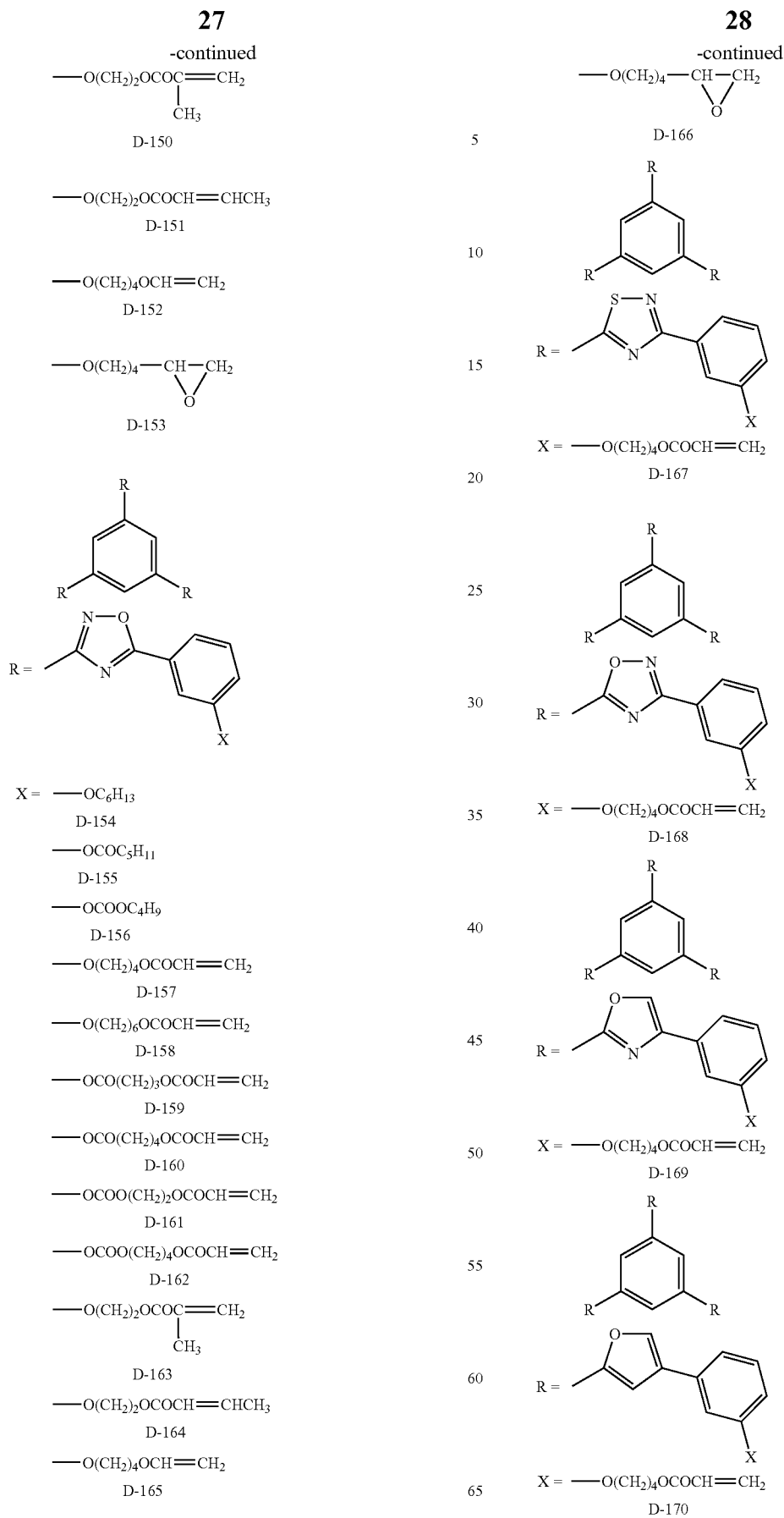

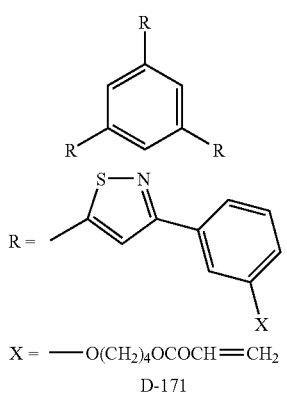
X = —O(CH$_2$)$_4$OCOCH═CH$_2$
D-171
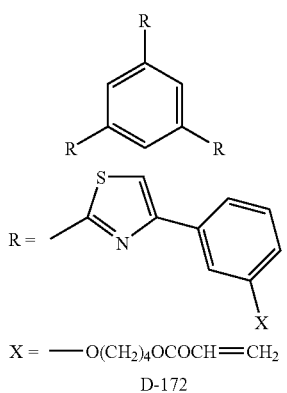
X = —O(CH$_2$)$_4$OCOCH═CH$_2$
D-172
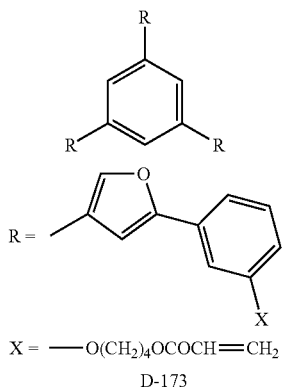
X = —O(CH$_2$)$_4$OCOCH═CH$_2$
D-173
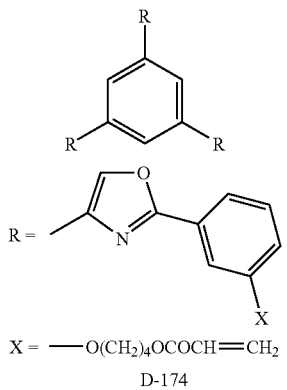
X = —O(CH$_2$)$_4$OCOCH═CH$_2$
D-174
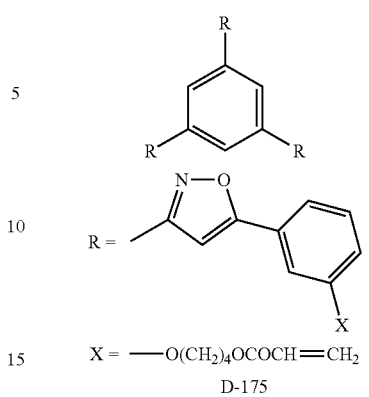
X = —O(CH$_2$)$_4$OCOCH═CH$_2$
D-175
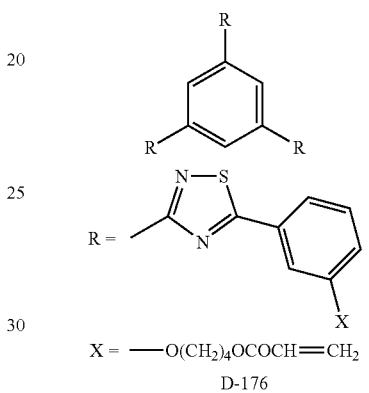
X = —O(CH$_2$)$_4$OCOCH═CH$_2$
D-176
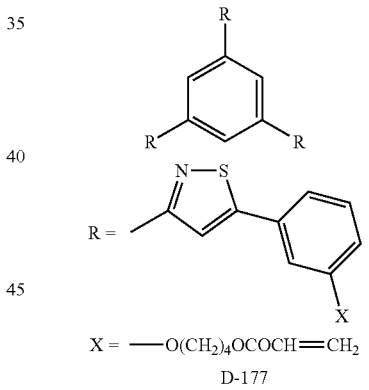
X = —O(CH$_2$)$_4$OCOCH═CH$_2$
D-177
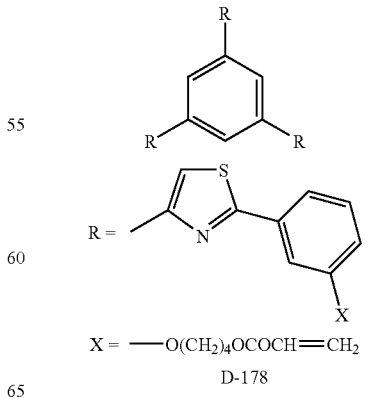
X = —O(CH$_2$)$_4$OCOCH═CH$_2$
D-178

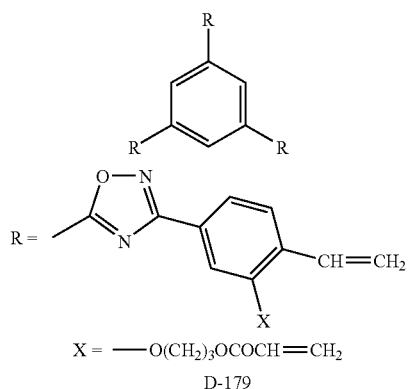
D-179
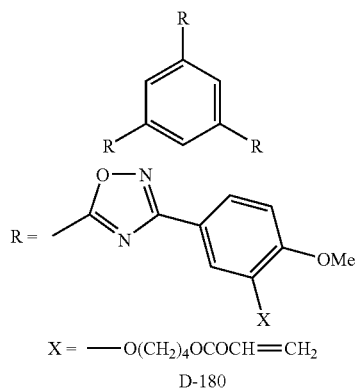
D-180
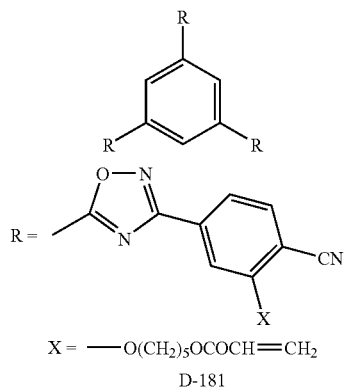
D-181
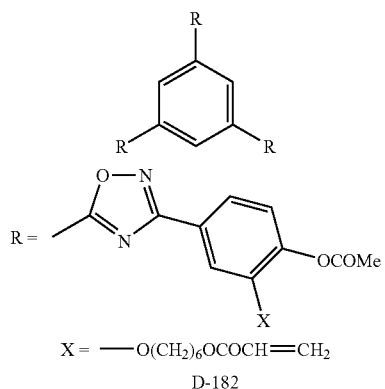
D-182
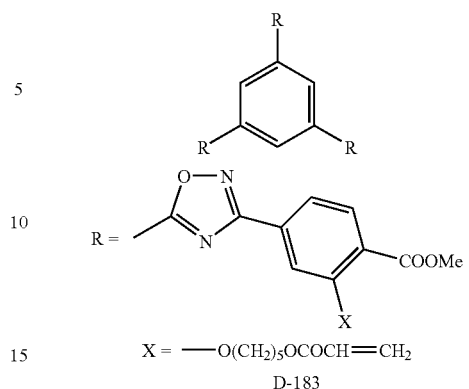
D-183
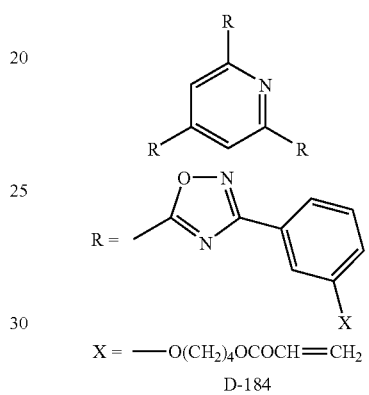
D-184
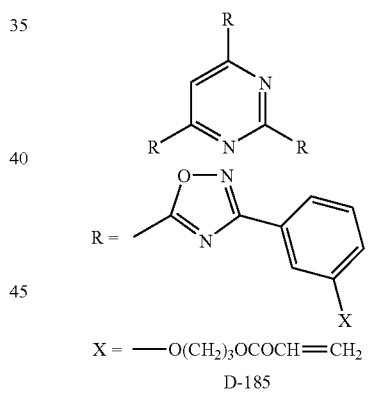
D-185
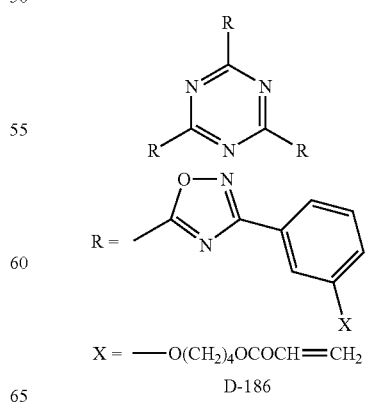
D-186

-continued

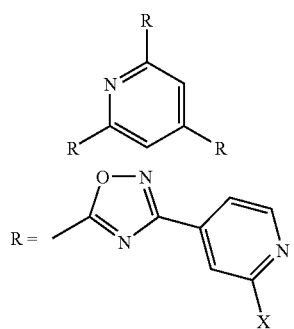

X = —O(CH₂)₃OCOCH=CH₂
D-187

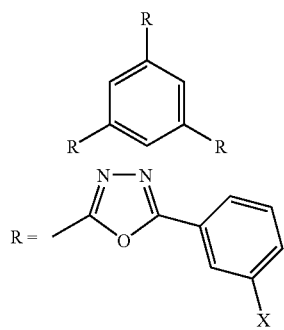

X = —OC₆H₁₃
D-188

—OCOC₅H₁₁
D-189

—OCOOC₄H₉
D-190

—O(CH₂)₄OCOCH=CH₂
D-191

—O(CH₂)₆OCOCH=CH₂
D-192

—OCO(CH₂)₃OCOCH=CH₂
D-193

—OCO(CH₂)₄OCOCH=CH₂
D-194

—OCOO(CH₂)₂OCOCH=CH₂
D-195

—OCOO(CH₂)₄OCOCH=CH₂
D-196

—O(CH₂)₂OCOC(CH₃)=CH₂
D-197

—O(CH₂)₂OCOCH=CHCH₃
D-198

—O(CH₂)₄OCH=CH₂
D-199

—O(CH₂)₄—CH—CH₂
         \\O/
D-200

-continued

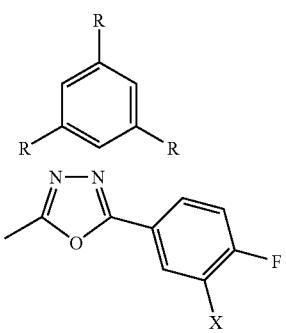

X = —OC₆H₁₃
D-201

—OCOC₅H₁₁
D-202

—OCOOC₄H₉
D-203

—O(CH₂)₄OCOCH=CH₂
D-204

—O(CH₂)₆OCOCH=CH₂
D-205

—OCO(CH₂)₃OCOCH=CH₂
D-206

—OCO(CH₂)₄OCOCH=CH₂
D-207

—OCOO(CH₂)₂OCOCH=CH₂
D-208

—OCOO(CH₂)₄OCOCH=CH₂
D-209

—O(CH₂)₂OCOC(CH₃)=CH₂
D-210

—O(CH₂)₂OCOCH=CHCH₃
D-211

—O(CH₂)₄OCH=CH₂
D-212

—O(CH₂)₄—CH—CH₂
         \\O/
D-213

X = —O(CH₂)₄OCOCH=CH₂
D-214

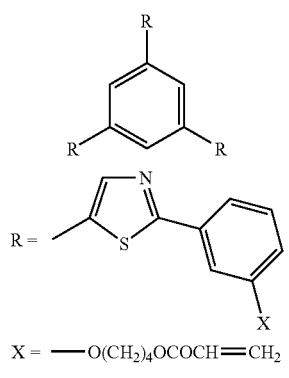
X = —O(CH₂)₄OCOCH=CH₂
D-215
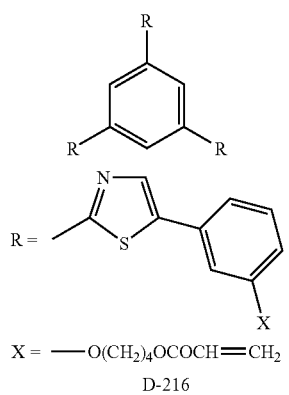
X = —O(CH₂)₄OCOCH=CH₂
D-216
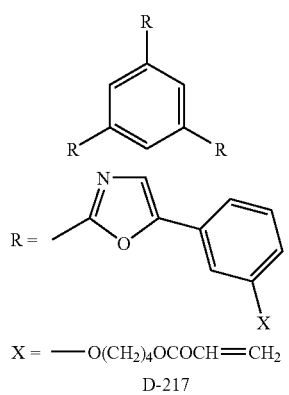
X = —O(CH₂)₄OCOCH=CH₂
D-217
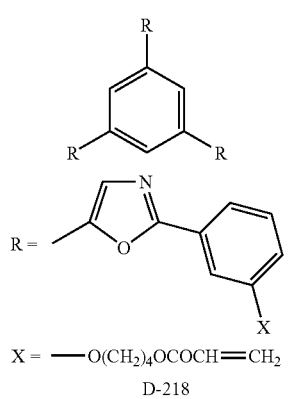
X = —O(CH₂)₄OCOCH=CH₂
D-218
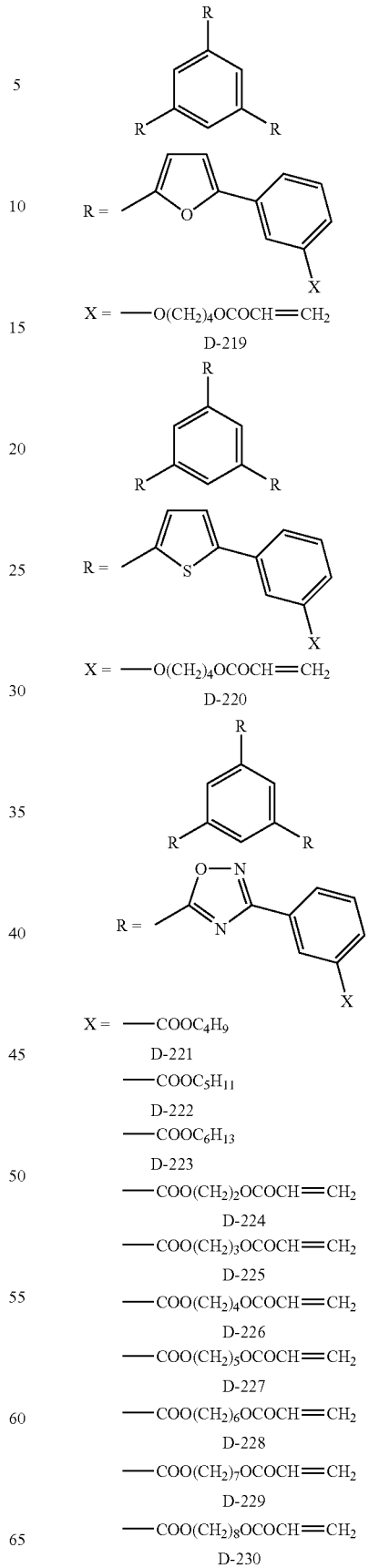

—COO(CH₂CH₂O)₂COCH═CH₂
D-231
—COO(CH₂)₂CH(CH₃)OCOCH═CH₂
D-232
—COO(CH₂)₃CH(CH₃)OCOCH═CH₂
D-233
—COO(CH₂)₄CH(CH₃)OCOCH═CH₂
D-234
—COOCH₂CH(CH₃)CH₂OCOCH═CH₂
D-235
—COO(CH₂)₂CH(CH₃)(CH₂)₂OCOCH═CH₂
D-236
—COOCH(CH₃)(CH₂)₂OCOCH═CH₂
D-237
—COO(CH₂)₅OCOC(CH₃)═CH₂
D-238
—COO(CH₂)₄OCH═CH₂
D-239
—COO(CH₂)₄—CH—CH₂
         \\_O_/
D-240

[Structure: 1,3,5-trisubstituted benzene with R groups; R = 3-substituted phenyl-1,2,4-oxadiazol-5-yl with X substituent]

X = —COOC₄H₉
D-241
—COOC₅H₁₁
D-242
—COOC₆H₁₃
D-243
—COO(CH₂)₂OCOCH═CH₂
D-244
—COO(CH₂)₃OCOCH═CH₂
D-245
—COO(CH₂)₄OCOCH═CH₂
D-246
—COO(CH₂)₅OCOCH═CH₂
D-247
—COO(CH₂)₆OCOCH═CH₂
D-248
—COO(CH₂)₇OCOCH═CH₂
D-249
—COO(CH₂)₈OCOCH═CH₂
D-250
—COO(CH₂CH₂O)₂COCH═CH₂
D-251
—COO(CH₂)₂CH(CH₃)OCOCH═CH₂
D-252
—COO(CH₂)₃CH(CH₃)OCOCH═CH₂
D-253
—COO(CH₂)₄CH(CH₃)OCOCH═CH₂
D-254
—COOCH₂CH(CH₃)CH₂OCOCH═CH₂
D-255
—COO(CH₂)₂CH(CH₃)(CH₂)₂OCOCH═CH₂
D-256
—COOCH(CH₃)(CH₂)₂OCOCH═CH₂
D-257
—COO(CH₂)₅OCOC(CH₃)═CH₂
D-258
—COO(CH₂)₄OCH═CH₂
D-259
—COO(CH₂)₄—CH—CH₂
         \\_O_/
D-260

[Structure: 1,3,5-trisubstituted benzene with R groups; R = 2-(3-substituted phenyl)-1,3,4-oxadiazol-5-yl with X substituent]

X = —COOC₄H₉
D-261
—COOC₅H₁₁
D-262
—COOC₆H₁₃
D-263
—COO(CH₂)₂OCOCH═CH₂
D-264
—COO(CH₂)₃OCOCH═CH₂
D-265
—COO(CH₂)₄OCOCH═CH₂
D-266
—COO(CH₂)₅OCOCH═CH₂
D-267
—COO(CH₂)₆OCOCH═CH₂
D-268
—COO(CH₂)₇OCOCH═CH₂
D-269
—COO(CH₂)₈OCOCH═CH₂
D-270
—COO(CH₂CH₂O)₂COCH═CH₂
D-271
—COO(CH₂)₂CH(CH₃)OCOCH═CH₂
D-272
—COO(CH₂)₃CH(CH₃)OCOCH═CH₂
D-273
—COO(CH₂)₄CH(CH₃)OCOCH═CH₂
D-274

-continued

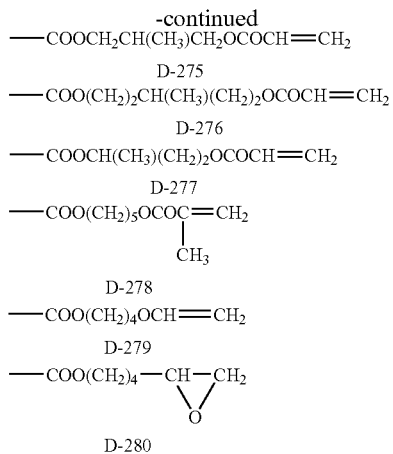

Rod-Like Liquid Crystal Compound

It is preferred that the rod-like liquid crystal compounds have a linear molecular structure. The term "linear molecular structure" means that the molecular structure of the rod-like compounds is linear in the thermodynamically most stable structure. The thermodynamically most stable structure can be determined by crystalline structure analysis or molecular orbital methods. For instance, the molecular orbital is calculated using a molecular-orbital software (e.g. WinMOPAC 2000, by FUJITSU), and the molecular structure can be determined in a way that the heat of forming the compound is the lowest. The linear molecular structure means that the angle of molecular structure is no less than 140° in the thermodynamically most stable structure calculated by the way described above.

Preferably, the rod-like compounds exhibit a liquid crystal property. More preferably, the rod-like compounds exhibit a liquid crystal property upon heating, i.e. have a thermotropic liquid crystal property. Preferably, the liquid crystal phase is a nematic or smectic phase.

These compounds are described in JP-A No. 2004-4550, for example, but not limited to. Two or more of rod-like compounds may be combined provided that the rod-like compounds have a maximum absorption wavelength (λmax) shorter than 250 nm in the UV absorption spectrum of the solution.

The synthesis processes of the rod-like compounds are described in published literatures, for example, "Mol. Cryst. Liq. Cryst., vol. 53, p. 229 (1979)", "Mol. Cryst. Liq. Cryst., vol. 89, p. 93 (1982)", "Mol. Cryst. Liq. Cryst., vol. 145, p. 111 (1987)", "Mol. Cryst. Liq. Cryst., vol. 170, p. 43 (1989)", "J. Am. Chem. Soc., vol. 113, p. 1349 (1991)", "J. Am. Chem. Soc., vol. 118, p. 5346 (1996)", "J. Am. Chem. Soc., vol. 92, p. 1582 (1970)", "J. Org. Chem. vol. 40, p. 420 (1975)", "Tetrahedron, vol. 48, No. 16, p. 3437 (1992)".

Thickness of First Optically Anisotropic Layer

The thickness of the first optically anisotropic layer may be properly selected depending on the application; preferably, the thickness is 0.1 µm to 20 µm, more preferably 0.3 µm to 10 µm, most preferably 0.5 µm to 5 µm.

Second Optically Anisotropic Layer

The second optically anisotropic layer has, along with the first optically anisotropic layer, a function to improve coloring of black display etc. derived from wavelength-dispersion property or wavelength dependence that refractive-index anisotropy of liquid crystal layers exhibits in TN-type liquid crystal displays etc. in normally black mode.

In order to perform the function, it is preferred that the second optically anisotropic layer satisfies at least one of the following Expressions (iv) to (vi):

$$0.3 \leq Re_2(450)(0°)/Re_2(650)(0°) \leq 1.1: \quad \text{Expression (iv)}$$

$$0.3 \leq Re_2(450)(40°)/Re_2(650)(40°) \leq 1.1: \quad \text{Expression (v)}$$

$$0.3 \leq Re_2(450)(-40°)/Re_2(650)(-40°) \leq 1.1: \quad \text{Expression (vi)}$$

In Expressions (iv) to (vi), $Re_2\lambda(\theta)$ is defined as the value of Re retardation in the second optically anisotropic layer measured under a condition that a light of wavelength $\lambda(\theta)$ is entered with an incident angle $\theta°$ from the normal line with the retardant phase axis being defined as the rotation axis (when the values of $Re_2\lambda(\theta)$ and $Re_2\lambda(-\theta)$ are different, the magnitude is decided so as to become $Re_2\lambda(\theta)>Re_2\lambda(-\theta)$).

It is preferred that the secondary optically anisotropic layer satisfies any two of Expressions (iv) to (vi) more preferably all Expressions.

It is preferred that the front retardation of the second optically anisotropic layer is $30 \leq Re_2 550)(0°) \leq 60$, more preferably $30 \leq Re_2 550)(0°) \leq 55$.

It is preferred that the retardation in thickness direction (hereinafter sometimes referred to as "thick retardation") of the second optically anisotropic layer is $100 \leq Rth_2 550)(0°) \leq 300$, more preferably $120 \leq Rth_2 550)(0°) \leq 250$.

It is preferred that the front retardation and the thick retardation of the second optically anisotropic layer are properly optimized by $\Delta n$ of the liquid crystal in cells and/or cell gap d. It is preferred that the front retardation decreases and the thick retardation increases in the second optically anisotropic layer along with at least one of $\Delta n$ of the cell liquid-crystal and cell gap d increases.

The material of the second optically anisotropic layer may be properly selected depending on the application; preferably the material is a polymer film. The polymer films may be conventional ones adapted to produce films by solution flow-casting processes, extrusion shaping processes etc., specific examples of such polymer films include norbornene polymers, polycarbonate polymers, polyacrylate polymers, polyester polymers, aromatic polymers such as polysulfone, triacetyl cellulose, and cellulose acylate films. Among these, cellulose acylate films are preferable.

The cellulose acylate films will be explained more specifically below.

Control of Wavelength Dispersion of Cellulose Acylate Film

It is publicly known that the cellulose acylate film exhibits different wavelength dependencies of Re and/or Rth in relation to the substitution degree (proportional to acylate degree). When the substitution degree increases, Re (Rth) tends to decrease at lower wavelengths and Re (Rth) tends to increase at higher wavelengths. In the first embodiment of the present invention, the substitution degree of the cellulose acylate is shifted 0.05 or more in a range of 2.00 to 3.00 in the thickness direction of the film. The shift is preferably 0.07 or more, more preferably 0.08 or more, still more preferably 0.09 or more, particularly preferably 0.10 or more.

It is preferred in general that the cellulose acylate film is prepared in a solution flow-casting process while stretching when the residual solvent is 2 to 100% by mass. The specific example will be explained in detail later. The present inventors have found that the stretching orientation degrees of the cellulose acylate molecules are different in the thickness direction by analyzing the films after the stretching; more specifically, the stretching orientation degrees come to higher toward the outside compared to the film inside. It is estimated that the residual solvent remained at the inner film induces relaxation of the orientation even when the inner film is stretched, resulting in higher stretching orientation degree at the outer film.

When a layer with a higher substitution degree (acylate ratio) is provided outer side of the cellulose acylate film and a layer with a lower substitution degree (acylate ratio) is provided inside of the cellulose acylate film and the layers and film are stretched in a condition remaining the residual solvent, the Re values after the stretching are significantly affected by the layer with a higher substitution degree (acylate ratio), meanwhile Rth values are affected by face orientation of the entire film due to the decrease of entire film thickness along with the drying progress. Accordingly, films with Re and Rth values having different wavelength dependencies can be produced. The outer substitution degree is preferably 2.71 to 3.00 (acetate ratio: 59.0% to 62.5% in cases of cellulose acetate), the inner substitution degree is preferably 2.56 to 2.87 (acetate ratio: 57.0% to 61.0% in cases of cellulose acetate); the outside is preferably 2.64 to 2.83 (58.0% to 60.5%), the inside is preferably 2.64 to 2.83 (58.0% to 60.5%). The thickness of the outside is preferably 0.01 to 0.5, more preferably 0.05 to 0.4 based on the total thickness of 1. The absolute values of Re and Rth and the wavelength dependency are properly controllable by additives described later.

In this specification, $Re(\lambda)$ and $Rth(\lambda)$ are in-plane retardation and thick retardation at wavelength $\lambda$ respectively.

The $Re(\lambda)$ can be determined by irradiating a light of wavelength ($\lambda$ nm) along a normal line of a film using KOBRA 21ADH (by Oji Scientific Instrument).

$Rth(\lambda)$ can be calculated using the KOBRA 21ADH from the three retardation values: the $Re(\lambda)$ described above; the retardation value measured by irradiating a light of wavelength ($\lambda$ nm) along a direction inclined +40° from the normal line of the film considering the in-plane retard phase axis (determined using KOBRA 21ADH) as the inclined axis (rotation axis); the retardation value measured by irradiating a light of wavelength ($\lambda$ nm) along a direction inclined −40° from the normal line of the film considering the in-plane retard phase axis as the inclined axis (rotation axis).

The average refractive indices can be assumably picked up from Polymer Handbook (John Wikey & Sons, Inc) and nominal values in catalogues of optical films. When the average refractive indices are unknown, they can be measured using Abbe refractometer. Representative values of average refractive indices of prevailing optical films are as follows: cellulose acylate (1.48), cycloolefin polymer (1.52), polycarbonate (1.59), polymethylmethacrylate (1.49) and polystyrene (1.59). These estimated values of average refractive indices and film thickness are input then nx, ny and nz can be calculated using the KOBRA 21ADH.

The Re/Rth (450) at wavelength 450 nm in visible region of the cellulose acylate film is 0.4 to 0.95 time as large as Re/Rth (550) at wavelength 550 nm, preferably 0.4 to 0.9 time, more preferably 0.6 to 0.8 time, and Re/Rth (650) at wavelength 650 nm is 1.05 to 1.93 time as large as Re/Rth (550) at wavelength 550 nm, preferably 1.1 to 1.9 time, more preferably 1.2 to 1.7 time. It is preferred that all of the values of Re/Rth at wavelengths 450, 550, 650 nm are in a range of 0.1 to 0.8.

The thick retardation (Rth) of thickness direction of entire cellulose acylate films performs to cancel the retardation of liquid crystal layers in the thickness direction at black display, therefore, the favorable ranges are different depending on the embodiments of liquid crystal layers. For example, liquid crystal cells of OCB mode (e.g. liquid crystal cells having a liquid crystal layer in which product of $\Delta n \cdot d$ is 0.2 to 1.5 µm, where thickness: d (µm), refractive index anisotropy: $\Delta n$) are utilized for optical compensation, the Rth is preferably 70 to 400 nm, more preferably 100 to 400 nm, particularly preferably 160 to 300 nm. The Re retardation is typically 20 to 110 nm, preferably 20 to 70 nm, more preferably 35 to 70 nm.

Cellulose Acylate

The raw cotton for the raw material of the cellulose acylate may be properly selected depending on the application from conventional raw materials (e.g. Open Technology 2001-1745 of Japanese Institute of Invention and Innovation). The synthesis of the cellulose acylate may be carried out by conventional processes (e.g. Migita et al., Mokuzai Kagaku, pp. 180-190, Kyoritsu Shuppan Co., 1968). Preferably, the viscosity average polymerization degree of the cellulose acylate is 200 to 700, more preferably 250 to 500, particularly preferably 250 to 350. Preferably, the cellulose ester used in the present invention has a narrower molecular weight distribution in terms of Mw/Mn (Mw: mass average molecular weight, Mn: number average molecular weight) measured by gel permeation chromatography. A specific value of the Mw/Mn is preferably 1.5 to 5.0, more preferably 2.0 to 4.5, particularly preferably 3.0 to 4.0.

The acyl group of the cellulose acylate is preferably an acetyl group or propionyl group, particularly preferably an acetyl group. The substitution degree of the total acyl groups is preferably 2.7 to 3.0, more preferably 2.8 to 2.95. In this specification, the substitution degree of the acyl group is the value determined in accordance with ASTM D817. The acyl group is most preferably an acetyl group. When a cellulose acetate having an acetyl group as the acyl group is used, the acetification degree is preferably 57.0% to 62.5%, more preferably 58.0% to 61.5%. The acetification degree of this range may prevent excessive increase of Re under a transportation tension at flow casting, the in-plane fluctuation of Re may be reduced, and also fluctuation of Re due to various temperatures and humidities may be reduced. The substitution degree of the sixth-site of the acyl group is preferably no less than 0.9 in view of suppressing the fluctuation of Re and Rth.

Co-Flow Casting Process

The co-flow casting process may be appropriately utilized for producing cellulose acylate films of which the acylation degree is different in the thickness direction. It is preferred that plural cellulose acylate solutions are flow-cast into two or more layers on a flat band or drum of metal supports in the co-flow casting process.

Flow-casting dies of feed block-type are often utilized for producing multi-layer flow-casting films or multi-layer films on the basis of liquid film-forming processes in the co-flow casting processes. The flow-casting dies of feed block-type are flow-casting devices in which a converging device for flowing together two or more dopes is connected at upstream of the flow-casting die. The representative structure of the flow-casting dies of feed block-type is such that a path to flow a dope of core layers is provided, another dope of front surface layers and another dope of back surface layers are flowed at both sides of the path, and the latter two solutions are joined at both sides of the former solution. Japanese Patent Application Publication (JP-B) No. 62-43846 describes, for example, a method for producing multi-layer films using the flow-casting dies of feed block-type, in which a higher-viscosity dope for resin layers of core layers and a lower-viscosity dope for front and back surface layers are subjected to the method to produce a multi-layer flow-casting film, then the film is dried and peeled.

When plural cellulose acylate solutions are flow-cast, a cellulose acylate solution may be passed from plural outlets with intervals in the progressive direction and to form a film while laminating the solution; such methods may be applied as those described in JP-A Nos. 61-158414, 01-122419 and 11-198285. The film may be formed by flow-casting the cellulose acylate solution from two outlets; such methods may be applied as those described in JP-B No. 60-27562, JP-A Nos. 61-94724, 61-947245, 61-104813, 61-158413 and 06-134933. In addition, such a method for flow-casting a cellulose acylate film, as described in JP-A No. 56-162617, may be applied that a flow of a higher-viscosity cellulose acylate solution is sandwiched by a lower-viscosity cellulose acylate solution, and the both solutions are co-extruded. In a preferable embodiment, the outside solution may contain an alcohol of poor solvent in a content higher than that of the inside solution, as described in JP-A No. 61-94724 and 61-94725.

Alternatively, two outlets for flow-casting are provided, a film is formed on a metal support through a first outlet, the film is peeled, then the side having been attached to the support is subjected to the second flow-casting to form a film, as described in JP-B No. 44-20235. The two cellulose acylate solutions to be flow-cast may be the same or different, that is, in order to provide plural cellulose acylate layers with desirable functions respectively, the intended cellulose acylate solutions are extruded from the respective outlets.

Furthermore, in the first embodiment of the present invention, the cellulose acylate solution may be flow-cast along with a liquid for other functional layer such as adhesive layer, dye layer, antistatic layer, anti-halation layer, UV absorption layer and polarizing layer.

In conventional liquids for mono-layers, it is typically necessary that cellulose acylate solutions are extruded at higher concentrations and higher viscosities in order to achieve a desirable film thickness, thus solids are likely to generate due to poor stability of cellulose acylate solutions, possibly resulting in failures due to foreign matters or inferior planarity. The flow casting of plural cellulose acylate solutions from plural outlets may make possible to extrude simultaneously higher-viscosity solutions on a metal support thus to produce films with superior surface shape and planarity, and also the use of cellulose acylate solutions with higher concentrations may achieve the decrease of drying load, resulting in higher productivity of films.

In the co-flow casting processes, other cellulose acylate solutions with a different concentration of plasticizer, UV-ray absorber and matting agent in addition to acylation degree may be flow-cast together, thereby to prepare a cellulose acylate with a laminate structure. For example, a cellulose acylate film may be prepared with a construction of skin layer/core layer/skin layer; the matting agent may exist in the skin layer at higher content than other layers or only in the skin layer; the plasticizer and/or UV ray absorber may exist in the core layer at higher content than other layers or only in the core layer. In addition, the species of the plasticizer and/or UV ray absorber may be different between the core layer and the skin layer; for example, at least one of lower-volatile plasticizers and/or UV ray absorbers may be incorporated into the skin layer, and a plasticizer or a UV ray absorber may be incorporated into the core layer. In a preferable embodiment, a stripping agent is incorporated into only the skin layer of the metal support side; an alcohol of poor solvent is incorporated into the skin layer in a content higher than that of the core layer in order to gelatinize by cooling the solution on the metal support in cooling drum processes. Tg of the skin layer may be different from Tg of the core layer; preferably, Tg of the skin layer is lower than Tg of the core layer. The viscosity of the cellulose acylate solutions at flow-casting may be different between those for the skin layer and the core layer; preferably, the viscosity for the skin layer is lower than that for the core layer, alternatively, the viscosity for the core layer may be lower than that for the skin layer.

Concerning the detail of the flow-casting process in the first embodiment, such various processes are exemplified as a dope is extruded uniformly from a pressure die onto a metal support; a dope flow-cast once on a metal support is adjusted by a doctor blade with respect to the film thickness or by a reverse roll coater with reversely rotating roll; preferably the process with the pressure die described above is employed. Examples of the pressure die include those of coat hunger-type and T die-type, these may be utilized favorably. Concerning the processes other than those described above, various conventional flow-casting processes for forming films from cellulose triacetate solutions may be favorably employed such as described in, for example, JP-A No. 61-94724, 61-148013, 04-85011, 04-286611, 05-185443, 05-185445, 06-278149 and 08-207210. The effects similar with those described in these literatures may be expected by adjusting various conditions considering the difference of boiling points of solvents.

As for the other inventions with respect to co-flow casting, JP-A No. 53-134869 describes a flow-casting process in order to increase the flow-casting speed, in which a cellulose acetate solution is flow-cast from a first outlet in 10% to 90% thickness based on total film thickness and then the remainder is flow-cast at a distance of 30% to 60% of the first outlet to its separation. JP-A No. 61-018943 describes a co-flow casting process for forming TAC films in order to increase stably the flow-casting speed, in which dope (A) containing methyl chloride, methanol and other poor solvents and dope (B) containing the poor solvents in a higher content than (A) are used, and dope (A) is applied onto the support surface in a thickness of 5 μm or more at undried condition. It is also disclosed that dopes (A) and (B) are desirably joined together during the slit using a complex slit die. The methyl chloride in this invention may be replaced with other non-chloride solvents to obtain the similar effect, thus this invention may be applied to the present invention.

JP-A No. 04-124645 describes a co-flow casting die of stripe-type in order to obtain magnetic recording layers with proper planarity, in which the cross-section of slits from a manifold to a joining portion is comb-like.

JP-A No. 08-207210 describes an invention in order to decrease solvents in films immediately after production, in which a core potion of cellulose acetate has a substitution degree of 2.7 or less, and a surface layer of cellulose acetate having a substitution degree of 2.8 or more and 0.5 to 15 μm thick is provided on at least one surface of the core portion.

JP-A No. 10-058514 describes an invention in order to prevent generation of peel residues from superior planar films, in which a surface layer dope is coated on a base-layer dope except both edges, then these are simultaneously extruded from a die to flow-cast. JP-A No. 05-040321 describes an invention of sensitive materials in which a magnetic dope and a non-magnetic dope are co-flow cast.

JP-A No. 2000-317960 describes an invention in order to produce multi-layer resin films with higher accuracy in thickness dimension, in which a lower-viscosity liquid and a higher-viscosity liquid with 2 to 10 time viscosity thereof are fed from the respective flow paths, then joined together at a joining device of feed block-type to form a parallel liquid flow with a interface, then the liquid is injected from a flow-casting die lip at 5 to 25 seconds after the joining, thereby to form a multi-layer flow-casting film.

JP-A No. 2002-221620 discloses that co-flow casting a polarizing film to control the outer layer into a lower concentration may make the slope of streak-like irregularity fluctuation having a pitch of 3 to 15 mm into less than 0.04 degree.

JP-A No. 2003-080541 describes an invention in order to suppress the generation of burrs, in which the ratio A/B of the shear viscosity (A) of a dope for forming a surface layer or back layer and the shear viscosity (B) of a dope for forming an intermediate layer is controlled at flow-casting plural dopes from dies such that A/B is 0.9 or less.

JP-A No. 2003-014933 discloses a phase-difference film, where the bleed out of additives is small, no peeling appears between layers, lubrication property is favorable and transparency is excellent.

JP-A No. 2003-014933 discloses that fine particles are preferably added to the surface layer in order to impart lubricant property to films, the addition of fine particles are unnecessary but may be allowable for the core layer. Here, the excessive amount of fine particles into core layers leads to degradation of film transparency, thus the additive amount is preferably no more than one-tenth of surface layers, and the core layers preferably contain substantially no fine particles ("substantially no" means 0 to 0.01% by mass of fine particles based on solid content). It is also disclosed that fine particles disposed on at least one side may provide the effect on lubricant property; preferably, the average primary particle size of the fine particles is no more than 20 nm in view of suppressing haze, more preferably 5 to 16 nm, particularly preferably 5 to 12 nm. The apparent specific gravity of the fine particles is preferably 70 g/L, more preferably 90 to 200 g/L, particularly preferably 100 to 200 g/L. It is described that as the apparent specific gravity comes to larger, dispersion liquids may be produced with higher concentrations, thus the haze and agglomeration are appropriately improved. Here, silicon dioxide fine particles with an average primary particle size of no more than 20 nm and an apparent specific gravity of no more than 70 g/L may be produced by burning a mixture of silicon tetrachloride gas and hydrogen in air at 1000° C. to 1200° C. It is also disclosed that the silicon dioxide fine particles are commercially available, for example, under trade names of Aerosil 200V, Aerosil R972V (by Japan Aerosil Co.).

Stretching

The cellulose acylate films exhibit their functions through stretching. It is preferred that the cellulose acylate films are stretched toward the width direction for applying into polarizing plates, as described in JP-A Nos. 62-115035, 04-152125, 04-284211, 04-298310 and 11-48271. The stretching of films may be carried out at room temperature or higher temperatures. The heating temperature is preferably no lower than the glass transition temperature. The stretching of films may be carried out mono-axially or biaxially. The films may be stretched in their drying processing, which is effectively carried out when residual solvents exist. For example, the films can be stretched by controlling the velocity of conveyer rollers such that the take-up speed of the films is higher than the peeling velocity thereof. The films can also be stretched by conveying films while supporting their edges with tenters and gradually widening the distance of tenters. The films can be stretched by use of a stretching machine after drying the films, preferably the stretching is carried out mono-axially using a Long stretching machine. The draw ratio of the films, i.e. the ratio of stretched length to original length, is preferably 0.5% to 300%, more preferably 1% to 200%, particularly preferably 1% to 100%. The cellulose acylate films are preferably produced through sequentially or continuously carrying out film-forming steps of solvent-cast processes and stretching steps of formed films; preferably, the draw ratio is 1.2 to 1.8. The stretching may be carried out through one step or multi-steps. In cases of multi-steps, the product of respective draw ratios is to be controlled into this range.

Preferably, the stretching velocity is 5 to 1000%/min, more preferably 10 to 500%/min. Preferably, the stretching temperature is 30° C. to 160° C., more preferably 70° C. to 150° C., particularly preferably 85° C. to 150° C. The stretching is preferably carried out by use of a heat roll and/or an irradiation-heat source or warm gas flow. A constant-temperature bath may also be provided in order to enhance the temperature uniformity. In cases of mono-axial stretching through roll-stretching, the ratio L/W (L: distance between rolls, W: film width of phase-different plate) is preferably 2.0 to 5.0.

Preheating Step

Preferably, a preheating step is provided before the stretching. Heat treatment may be carried out after the stretching. Preferably, the temperature of the heat processing is from 20° C. lower to 10° C. higher based on the glass transition temperature of the cellulose acylate films; preferably, the period of the heat processing is 1 second to 3 minutes. The heating process may be of zone heating or of partial heating by use of IR heaters. The both edges of films may be slit away during or after the processes. The slit debris is preferably collected and reused as the raw material. Concerning the tenters used for supporting edges of films, as described in JP-A No. 11-077718, when webs are dried while supporting the edges by the tenters, such factors as blowing process of drying gas, blowing angle, gas-velocity distribution, gas speed, gas amount, temperature difference, gas-amount difference, gas-amount ratio between upper and lower blowing, and use of drying gas with higher specific heat may be appropriately controlled, thereby deteriorated quality in terms of planarity etc. may be prevented due to increasing the speed of solution flow-casting processes or enlarging the web width.

JP-A No. 11-077822 describes an invention in order to prevent non-uniformity, in which thermoplastic films are stretched, followed by heat-treating the films with a thermal gradient in width direction of films in a heat relaxation step.

JP-A No. 04-204503 describes an invention in order to prevent non-uniformity, in which films are stretched in a solvent content of 2% to 10% based on solid content.

JP-A No. 2002-248680 describes an invention in order to inhibit curling of films by defining an engaging width of clips, in which films are stretched at a tenter-clip-engaging width $D \leq (33/(\log(\text{draw ratio}) \times \log(\text{volatile})))$ thereby to inhibit the curling and to make easy the film transportation after the stretching step.

JP-A No. 2002-337224 describes an invention in order to combine high-speed transportation of soft films and stretching, in which tenter transportation is carried out while switching pins for the first half to clips for the last half.

JP-A No. 2002-187960 describes an invention concerning optical twin axis in order to conveniently improve view-angle properties and to improve view angle, in which a cellulose-ester dope-liquid is flow-cast into a support, then a web or film separated from the support is stretched 1.0 to 4.0 times at least one direction when solvents remain within the web in a range of no more than 100% by mass, particularly 10 to 100% by mass. It is also described as a preferable embodiment that stretching at least one direction is carried out in 1.0 to 4.0 times when solvents remain within the web in a range of no more than 100% by mass, particularly 10 to 100% by mass. In addition, the other stretching processes may be exemplified as follows: plural rolls with different circumferential velocities are provided, and the stretching is carried out longitudinally by use of the different circumferential velocities; both edges of webs are fixed by clips or pins, and the stretching is carried out longitudinally while the distance of the clips or pins is expanded in a progressing direction, or the stretching is carried out traversely while expanding traversely, or the stretching is carried out longitudinally and traversely while expanding longitudinally and traversely; or combination thereof. In cases of so-called tenter processes, it is described that driving of the clip portions under a linear-drive process may lead to smooth stretching, thus the possibility of breakages may be favorably lowered.

In addition, JP-A No. 2003-014933 describes an invention in order to produce phase-difference films with less breed out of additives, less inter-layer peeling, superior lubrication property and excellent transparency, in which dope A containing a resin, additive and organic solvent and dope B containing no or less amount of additives, a resin and an organic solvent are prepared; dope A and dope B are co-flow cast on a support in a manner that dope A forms a core layer and the dope B forms a surface layer; a web is peeled off from the support after the solvent being evaporated; the web is stretched 1.1 to 1.3 times in at least one direction when the solvent remains within the resin film in a range of 3 to 50% by mass at the stretching. The literature also describes, as preferable embodiments, that the web is peeled off from the support and stretched 1.1 to 1.3 times in at least one direction at a stretching temperature of 140° C. to 200° C.; dope A containing a resin and organic solvent and dope B containing a resin, fine particles and organic solvent are prepared; dope A and dope B are co-flow cast on a support in a manner that dope A forms a core layer and the dope B forms a surface layer; a web is peeled off from the support after the solvent being evaporated; the web is stretched 1.1 to 1.3 times in at least one direction when the solvent remains within the resin film in a range of 3 to 50% by mass at the stretching, and also the stretching is carried out 1.1 to 1.3 times in at least one direction at a stretching temperature of 140° C. to 200° C.; dope A containing a resin, organic solvent and additive, dope B containing no or less amount of additives, a resin and organic solvent, and dope C containing a resin, fine particles and organic solvent are prepared; dope A, dope B and dope C are co-flow cast on a support in a manner that dope A forms a core layer, dope B forms a surface layer and dope C forms a opposite surface layer; a web is peeled off from the support after the solvent being evaporated; the web is stretched 1.1 to 1.3 times in at least one direction when the solvent remains within the resin film in a range of 3 to 50% by mass at the stretching, and also the stretching is carried out 1.1 to 1.3 times in at least one direction at a stretching temperature of 140° C. to 200° C.; the content of additives in dope A is 1 to 30% by mass based on the resin, the content of additives in dope B is 0 to 5% by mass based on the resin; the additive is a plasticizer, UV ray absorber, or retardation control agent; the organic solvents in dope A and dope B contains methylene chloride or methylacetate in a content of no less than 50% by mass based on entire solvent.

JP-A No. 2003-014933 describes a stretching process that appropriately utilizes a traverse-stretching machine so-called a tenter, in which both edges of webs are fixed by clips or pins, the webs are traversely stretched while traversely stretching the distance of clips or pins. It is also disclosed that stretching or shrinking in longitudinal direction is carried out by way of stretching or shrinking the distance of clips or pins in the conveying direction (longitudinal direction). It is also disclosed that the stretching may be carried out smoothly by way of driving clip portions using a linear-drive system, thus the possibility of breakages may be favorably lowered; plural rolls with different circumferential velocities are provided, and the stretching is carried out longitudinally by use of the different circumferential velocities. It is also described that these processes may be combined, and the stretching process may be divided into two or more steps, e.g. longitudinal stretching/traverse stretching/longitudinal stretching, or longitudinal stretching/longitudinal stretching.

JP-A No. 2003-004374 describes an invention in order to prevent foaming of webs at tenter-drying, to improve releasability and to prevent dusts, in which the width of dryers is shorter than the width of the webs so that hot gas does not blow the both edges of webs.

JP-A No. 2003-019757 describes an invention in order to prevent foaming of webs at tenter-drying, to improve releasability and to prevent dusts, in which wind-shielding plates are provided inside both edges of webs so as to shield the drying gas at supporting portions of tenters.

JP-A No. 2003-053749 describes an invention in order to carry out stably the conveyance and drying, in which X (X: dried thickness μm of both edges of films supported by pin tenters) and T (T: dried average thickness μm of product portions of films) satisfy the following relations:

when $T \leq 60, 40 \leq X \leq 200$, (i)

when $60 < T \leq 120, 40 + (T-60) \times 0.2 \leq X \leq 300$, or (ii)

when $T < 120, 52 + (T-120) \times 0.2 \leq X \leq 400$ (iii)

JP-A No. 02-182654 describes an invention in order to prevent corrugation from multi-step tenters, in which a heating room and a cooling room are provided in dryers of multi-step tenters, right and left clip chains are separately cooled.

JP-A No. 09-077315 describes an invention in order to prevent breakage, corrugation and inferior transportation, in which pin density of pin tenters is larger at inner side and smaller at outer side.

JP-A No. 09-085846 describes an invention in order to prevent foaming of webs themselves and web adhesion to sustainers in tenters, in which sustaining pins for both web edges are cooled under web-foaming temperature by use of a blowing cooler, and also the pins immediately before piercing webs are cooled to no more than +15° C. of dope-gelling temperature by use of a duct-type cooler.

JP-A No. 2003-103542 describes an invention that relates to a process for forming films from solutions in order to prevent dropout of pin tenters and to address foreign matter, in which inserting bodies of pin tenters are cooled so as to suppress the surface temperature of webs contacting with the inserting bodies below the gelling temperature of webs.

JP-A No. 11-077718 describes an invention in order to prevent quality degradation of planarity, when speed of solution flow-casting processes is raised or web width is enlarged by use of tenters, in which wind velocity is controlled to 0.5 to 20 m/sec, temperature distribution in traverse direction is controlled to no more than 10%, wind ratio at upper and lower web is controlled to 0.2 to 1, and drying gas ratio is controlled to 30 to 250 J/kmol. The favorable drying conditions are also disclosed within tenters corresponding to residual solvent amount. Specifically, webs are dried in such manner that while after a web is peeled off a support and before the residual solvent content comes to 4% by mass, the blowing angle from a blowing suction is adjusted 30° to 150° against the film plane, and the web is dried under drying gas in a condition that the difference of the upper limit and the lower limit of wind velocity is adjusted to no more than 20% of the upper limit, wherein the upper limit is defined from velocity distribution on film surface at extended position on blowing direction of drying gas; when the residual solvent content in webs is 70 to 130% by mass, the wind velocity of drying gas blown from a dryer is controlled to 0.5 to 20 m/sec at the surface of webs; when the residual solvent content in webs is 4 to 70% by mass, the web is dried by dry-gas wind blown at 5 to 40 m/sec, and the difference of the upper limit and the lower limit of temperatures is adjusted to no more than 10% of the upper limit, wherein the upper limit is defined from temperature distribution of drying gas in the width direction of webs; when the residual solvent content in webs is 4 to 200% by mass, the ratio q of drying gas amounts from upper and lower blowing suctions, situated lower and upper of webs, of driers is adjusted $0.2 \leq q \leq 1$. It is also disclosed, as a preferable embodiment, that at least one species of gas is utilized for the drying gas, the average specific heat is 31.0 to 250 J/K·mol, and the drying is carried out using the drying gas that contains vapor of organic compounds, being a liquid at room temperature, at no more than 50% of saturated vapor pressure.

JP-A No. 11-077719 discloses an invention in order to prevent deterioration of planarity or coating due to dusts or impurities in TAC producing apparatuses, in which clips of tenters are equipped with heating portions. It is also disclosed, as preferable embodiments, that devices are provided to remove foreign matter yielded at contact portions of clips and webs during from release of webs out of clips of tenters to re-support of webs; foreign matter is removed using a brush that injects a gas or liquid; residual content at contacting clips or pins and webs is 12 to 50% by mass; surface temperature of contact portions of clips or pins and webs is preferably 60° to 200°, more preferably 80° to 120°.

JP-A No. 11-090943 discloses an invention in order to prevent quality degradation due to rapture in tenters and to enhance productivity in processes using tenter clips, in which Lr=Ltt/Lt is controlled to $1.0 \leq Lr \leq 1.99$, where Lt (m) is an optional length of a tenter, Ltt (m) is a total length in conveying direction of web-supporting portions of a clip of which the tenter has the same length Lt. It is also disclosed, as a preferable embodiment, that web-supporting portions are disposed with no space viewed from the web-width direction.

JP-A No. 11-090944 discloses an invention in order to prevent planarity degradation and unstable insertion due to relaxation of webs at introducing webs into tenters, in which a relaxation-suppressing device is provided at tenter inlets so as to prevent the relaxation in web-width direction. As still preferable embodiments, it is also disclosed that the relaxation-suppressing device is a roller that rotates in a direction of 2° to 60°; a blower is provided that blows from under the webs.

JP-A No. 11-090945 discloses an invention in order to inhibit quality degradation and relaxation harmful to productivity in TAC production, in which webs separated from supports are introduced into tenters with an angle from horizontal face.

JP-A No. 2000-289903 discloses an invention in order to produce films with stable physical properties, in which a conveying device is provided that conveys separated webs while applying a tension in the width direction at the stage of 50 to 12% by mass of solvent content, the conveying device comprises a means configured to detect web width, a means configured to support webs, and variable two or more flexing sites, and the site of flexing portions is adjusted through detecting and computing the web width.

JP-A No. 2003-033933 discloses a construction in order to enhance clipping properties, to prevent web breakage for a long period, and to produce films with excellent quality, in which a guide plate for preventing curling at web edges is disposed at the sites of at least one of upper or lower edges, and the guide-plate face opposing webs is constructed from resin portions and metal portions to contact with webs disposed in conveying direction of webs. It is also disclosed, as preferable embodiments, that resin portions to contact with webs is disposed upstream in web-conveying direction and metal portions to contact with webs is disposed downstream; the gap between resin portions to contact with webs and metal portions to contact with webs is no more than 500 μm; the lengths in width direction to contact with webs of resin portions to contact with webs and metal portions to contact with webs are respectively 2 to 150 mm; the lengths in conveying direction to contact with webs of resin portions to contact with webs and metal portions to contact with webs are respectively 5 to 120 mm; resin portions to contact with webs are provided by surface processing or coating on metal guide substrates; resin portions to contact with webs are formed of a resin itself; the distance between the surfaces facing to webs of guide plates disposed upper and lower of both edges of webs is 3 to 30 mm; the distance between the surfaces facing to webs of guide plates disposed upper and lower of both edges of webs is enlarged 2 mm or more per 100 mm width in the width and inner direction; the upper and lower guide plates have a length of 10 to 300 mm at the both edges of webs, the upper and lower guide plates are disposed with a front-back deviance in the conveying direction, and the deviance distance is −200 to +200 mm; the surface facing to webs of upper guide plate is formed of a resin or metal itself; the resin portions to contact with webs of guide plate are formed of Teflon (trade mark), and metal portions to contact with webs are formed of a stainless steel; at least one of the resin portions and metal portions to contact with webs at the surface facing to webs has a surface roughness of 3 μm or less. It is also described that the guide plate for preventing curling at web edges is preferably disposed between the peeling-side edge of support and tenter-introduction portion, in particular near the tenter inlet is preferable.

JP-A No. 11-048271 discloses an invention in order to prevent cutting or fluctuation of webs during drying in tenters, in which webs are stretched and dried when the solvent content is 12% to 50% by mass, and a pressure of 0.2 to 10 kPa is applied to webs from both sides when the solvent content is no more than 10% by mass. It is also described, as preferable embodiments, that the application of tension is ceased when the solvent content is 4% by mass or more; when a pressure is applied by use of nip rolls from both sides of webs or films, the pair of nip rolls are preferably employed for 1 to 8 sets, the temperature at the pressuring is preferably 100° C. to 200° C.

JP-A No. 2002-036266 discloses an invention in order to produce high-quality thinner tacks, as the preferable embodiments, the difference of tensions applied to webs at front and back of tenters along the conveying direction is set 8 N/mm² or less; the process comprises preheating webs after a peeling step, stretching webs using tenters after the preheating, and relaxing the webs after the stretching in a level less than the stretched level in the stretching step, the temperature T1 at the preheating and stretching is set as no less than Tg−60° C. (Tg: grass transition temperature of film) and the temperature T2 at the relaxing step is set as T1−10° C.; the stretch rate at the stretching step is set as 0% to 30% on the basis of the web width immediately before the stretching step, and the stretch rate at the relaxing step is set to −10% to 10%.

JP-A No. 2002-225054 discloses an invention in order to make thinner i.e. 10 to 60 μm, to reduce weight and to improve moisture-permeability and durability, in which both edges of webs are gripped by clips and webs are stretched while preventing dry-shrinkage by supporting the edges till the residual solvent comes to 10% by mass, thereby to make the plane-orientation degree S into 0.0008 to 0.0020 (S=

[(Nx+Ny)/2]−Nz, Nx: refractive index in the highest direction of in-plain film, Ny: refractive index in the perpendicular direction with Nx, Nz: refractive index in thickness direction); the period from the flow-casting to peeling is controlled into 30 to 90 seconds; the peeled webs are stretched in traverse or longitudinal direction.

JP-A No. 2002-341144 describes a film-forming method from a solution including a stretching step in order to suppress optical fluctuation, in which mass concentration of a retardation-increasing agent has an optical distribution such that the concentration is higher as approaching to the central portion in film-width direction.

JP-A No. 2003-071863 discloses an invention in order to suppress haze, in which the stretching rate is preferably 0% to 100% in the width direction, and in cases utilized for protective films for polarizing plates, preferably 5% to 20%, particularly preferably 8% to 15%. It is also disclosed that the stretching rate is preferably 10% to 40%, more preferably 20% to 30% in cases utilized for phase-difference films; controlling Ro by the stretching rate and higher stretching rate are preferable for superior planarity of resulting films. It is also disclosed that the residual solvent content in the tenter process is preferably 20 to 100% by mass at starting the tenter, and preferably, films are dried with applying tenters till the residual solvent content comes to no more than 10% by mass, more preferably no more than 5% by mass. It is also disclosed that the drying temperature in the tenter process is preferably 30° C. to 150° C., more preferably 50° C. to 120° C., particularly preferably 70° C. to 100° C.; the lower is the drying temperature, the less is the evaporation of UV ray absorbers or plasticizers, thus reducing the process pollution, on the other hand, the higher is the drying temperature the more excellent is the planarity of films.

JP-A No. 2002-248639 disclosed an invention in order to reduce size fluctuation in the length and the width during reservation at higher temperatures and higher humidities, in which a film is produced by flow-casting a cellulose ester solution on a support, then continuously peeling and drying, the shrinkage rate at the drying is adjusted under the drying: 0≦shrinkage rate (%)≦0.1×residual solvent content (%) at peeling. It is also disclosed, as preferable embodiments, that the residual solvent content of peeled cellulose ester films is reduced no less than 30% by mass, while gripping the both ends of the films when the films have a residual solvent content of 40 to 100% by mass; the residual solvent content is 40 to 100% by mass at the tenter-conveyance inlet and the content at the outlet is 4 to 20% by mass; the tension to tenter-convey the cellulose ester films is adjusted to increase from the inlet to outlet of the tenter-conveyance; the tension to convey cellulose ester films under the tenter-conveyance is approximately the same as the tension in width direction of the cellulose ester films.

JP-A No. 2000-239403 discloses a film-forming process in order to produce thin films with excellent optical isotropy and planarity, in which residual solvent content X at peeling and residual solvent content Y at introducing into tenters is controlled in the process as: 0.3X≦Y≦0.9X.

JP-A No. 2002-286933 discloses stretching processes for flow-casting films, in which stretching processes under heating or solvent-containing conditions are employable, it is preferable that the stretching is carried out at a temperature lower than the glass transition temperature of resins in stretching processes under heating, on the other hand, when flow-cast films are stretched under solvent-containing conditions, it is possible that once-dried films are contacted again with a solvent to impregnate the solvent then the stretching is carried out.

Retardation-Increasing Agent

The retardation-increasing agent may be added into materials such as films thereby to adjust retardation values at various wavelengths.

The "retardation-increasing agent" herein means additives in which a Re retardation value of a cellulose acylate film containing an additive measured at wavelength 550 nm is 20 nm or more higher than the Re retardation value of the cellulose acylate film prepared in the same way except for not containing the additive measured at wavelength 550 nm. Preferably, the increase of the retardation value is 30 nm or more, more preferably 40 nm or more, particularly preferably 60 nm or more.

It is preferred that the retardation-increasing agent is a compound containing at least two aromatic rings. The content of the retardation-increasing agent is preferably 0.01 to 20 parts by mass based on 100 parts by mass of polymers, more preferably 0.1 to 10 parts by mass, still more preferably 0.2 to 5 parts by mass, most preferably 0.5 to 2 parts by mass. Two or more species of retardation-increasing agents may be used together.

It is preferred that the retardation-increasing agent exhibits a maximum absorption at a wavelength range of 250 to 400 nm and exhibits substantially no absorption at visible range.

The "aromatic ring" herein includes aromatic hetero rings in addition to aromatic hydrocarbon rings. Preferably, the aromatic hydrocarbon rings are six-membered rings or benzene rings.

The aromatic hetero rings are typically unsaturated hetero rings. The aromatic hetero rings are preferably five-membered rings, six-membered rings or seven-membered rings, more preferably five-membered rings or six-membered rings. The aromatic hetero rings have typically the highest number of double bonds. The hetero atom is preferably a nitrogen atom, oxygen atom or sulfur atom, particularly preferably nitrogen atom. Examples of the hetero rings include furan ring, thiophene ring, pyrrole ring, oxazole ring, isooxazole ring, thiazole ring, isothiazole ring, imidazole ring, pyrazole ring, furazan ring, triazole ring, pyran ring, pyridine ring, pyridazine ring, pyrimidine ring, pyrazine ring and 1,3,5-triazine ring.

Preferable aromatic rings are benzene ring, furan ring, thiophene ring, pyrrole ring, oxazole ring, thiazole ring, imidazole ring, triazole ring, pyridine ring, pyrimidine ring, pyrazine ring and 1,3,5-triazine ring; particularly preferable is 1,3,5-triazine ring. Specifically, the compounds disclosed in JP-A No. 2001-166144 are preferably utilized.

The number of aromatic rings that the retardation-increasing agent has is preferably 2 to 20, more preferably 2 to 12, still more preferably 2 to 8, particularly preferably 2 to 6.

The connection of two aromatic rings may be classified into (a) formation of a condensed ring, (b) linear connection by a single bond, (c) connection through a connecting group (i.e. no spiro bond is formed due to aromatic rings). The connection may be any one of (a) to (c).

Examples of the condensed rings (condensed rings from two or more aromatic rings) include indene ring, naphthalene ring, azulene ring, fluorene ring, phenanthrene ring, anthracene ring, acenaphthylene ring, biphenylene ring, naphthacene ring, pyrene ring, indole ring, isoindole ring, benzofuran ring, benzothiophene ring, indolyzine ring, benzooxazole ring, benzothiazole ring, benzoimidazole ring, benzotriazole ring, purine ring, indazole ring, chromene ring, quinoline ring, isoquinoline ring, quinolizine ring, quinazoline ring, cinnoline ring, quinoxaline ring, phthalazine ring, pteridine ring, carbazole ring, acridine ring, phenanthridine ring, xanthene ring, phenazine ring, phenothiazine ring, phenoxathiine ring, phenoxazine ring and thianthrene ring, preferable examples are naphthalene ring, azulene ring, indole ring, benzooxazole ring, benzothiazole ring, benzoimidazole ring, benzotriazole ring and quinoline ring.

The single bond (b) is preferably a bond between carbon atoms over two aromatic rings. It may be allowable that two or more single bonds join two aromatic rings to form an aliphatic ring or a non-aromatic hetero ring between the two aromatic rings.

It is preferable that the connecting group (c) is also a bond between carbon atoms over two aromatic rings. The connecting group is preferably an alkylene group, alkenylene group, alkynylene group, —CO—, —O—, —NH—, —S— or combination thereof. The connecting groups of such combination are shown below; these examples of atomic arrangement may be reversed symmetrically.

c1: —CO—O—,
c2: —CO—NH—,
c3: -alkylene-O—,
c4: —NH—CO—NH—,
c5: —NH—CO—O—,
c6: —O—CO—O—,
c7: —O-alkylene-O—,
c8: —CO-alkenylene-,
c9: —CO-alkenylene-NH—,
c10: —CO-alkenylene-O—,
c11: -alkylene-CO—O-alkylene-O—CO-alkylene-,
c12: —O-alkylene-CO—O-alkylene-O—CO-alkylene-O—,
c13: —O—CO-alkylene-CO—O—,
c14: —NH—CO-alkenylene,
c15: —O—CO-alkenylene.

The aromatic rings and the connecting groups have a substituent.

Examples of the substituent include halogen atoms (F, Cl, Br, I), hydroxyl, carboxyl, cyano, amino, nitro, sulfone, carbamoyl, sulfamoyl, ureide, alkyl groups, alkenyl groups, alkynyl groups, aliphatic acyl groups, aliphatic acyloxy groups, alkoxy groups, alkoxy carbonyl groups, alkoxy carbonylamino groups, alkylthio groups, alkylsulfonyl groups, aliphatic amide groups, aliphatic sulfonamide groups, aliphatic substituted-amino groups, aliphatic substituted-carbamoyl groups, aliphatic substituted-sulfamoyl groups, aliphatic substituted-ureide groups and non-aromatic heterocyclic groups.

The carbon-atom number in the alkyl groups is preferably 1 to 8. Typically, chain alkyl groups are more preferable than cyclic alkyl groups, and linear chain alkyl groups are more preferable. The alkyl groups may further contain a substituent such as hydroxyl, carboxyl, alkoxy and alkyl-substituted amino groups. Examples of the alkyl groups or substituted alkyl groups include methyl, ethyl, n-butyl, n-hexyl, 2-hydroxylethyl, 4-carboxybutyl, 2-methoxyethyl and 2-diethylaminothyl.

The carbon-atom number in the alkenyl groups is preferably 2 to 8.

Typically, chain alkenyl groups are more preferable than cyclic alkenyl groups, and linear chain alkenyl groups are more preferable. The alkenyl groups may further contain a substituent. Examples of the alkenyl groups include vinyl, allyl and 1-hexenyl.

The carbon-atom number in the alkynyl groups is preferably 2 to 8. Typically, chain alkynyl groups are more preferable than cyclic alkynyl groups, and linear chain alkynyl groups are more preferable. The alkynyl groups may further contain a substituent. Examples of the alkynyl groups include ethynyl, 1-butynyl and 1-hexynyl.

The carbon-atom number in the aliphatic acyl groups is preferably 1 to 10. Examples of the aliphatic acyl groups include acetyl, propanoyl and butanoyl. The carbon-atom number in the aliphatic acyloxy groups is preferably 1 to 10. Examples of the aliphatic acyloxy groups include acetoxy.

The carbon-atom number in the alkoxy groups is preferably 1 to 8. The alkoxy groups may further contain a substituent such as alkoxy groups. Examples of the alkoxy or substituted-alkoxy groups include methoxy, ethoxy, butoxy and methoxyethoxy.

The carbon-atom number in the alkoxycarbonyl groups is preferably 2 to 10. Examples of the alkoxycarbonyl groups include methoxycarbonyl and ethoxycarbonyl.

The carbon-atom number in the alkoxycarbonyl amino groups is preferably 2 to 10. Examples of the alkoxycarbonyl amino groups include methoxycarbonyl amino and ethoxycarbonyl amino.

The carbon-atom number in the alkylthio groups is preferably 1 to 12. Examples of the alkylthio groups include methylthio, ethylthio and octylthio.

The carbon-atom number in the alkylsulfonyl groups is preferably 1 to 8. Examples of the alkylsulfonyl groups include methanesulfonyl and ethanesulfonyl.

The carbon-atom number in the aliphatic amide groups is preferably 1 to 10. Examples of the aliphatic amide groups include acetamide.

The carbon-atom number in the aliphatic sulfoneamide groups is preferably 1 to 8. Examples of the aliphatic sulfoneamide groups include methane sulfoneamide, butane sulfoneamide and n-octane sulfoneamide.

The carbon-atom number in the aliphatic substituted-amino groups is preferably 1 to 10. Examples of the aliphatic substituted-amino groups include dimethylamino, diethylamino and 2-carboxyethylamino.

The carbon-atom number in the aliphatic substituted-carbamoyl groups is preferably 2 to 10. Examples of the aliphatic substituted-carbamoyl groups include methylcarbamoyl and diethlycarbamoyl.

The carbon-atom number in the aliphatic substituted-sulfamoyl groups is preferably 1 to 8. Examples of the aliphatic substituted-sulfamoyl groups include methylsulfamoyl and diethylsulfamoyl.

The carbon-atom number in the aliphatic substituted-ureide groups is preferably 2 to 10. Examples of the aliphatic substituted-ureide groups include methylureide. Examples of the non-aromatic heterocyclic groups include piperidino and morphorino.

The molecular weight of the retardation-increasing agents is preferably 300 to 800.

In addition to compounds having a 1,3,5-triazine ring, rod-like compounds having a linear molecular structure can be favorably used for the retardation-increasing agent. The linear molecular structure means that the molecular structure of the rod-like compound is linear in the thermodynamically most stable structure. The thermodynamically most stable structure can be determined by crystalline structure analyses or molecular orbital methods. For instance, the molecular orbital is calculated using a molecular-orbital software (e.g. WinMOPAC 2000, by FUJITSU), and the molecular structure can be determined in a way that the heat formation of the compound is the lowest. The linear molecular structure means that the angle between main chains in the molecular structure is no less than 140° in the thermodynamically most stable structure calculated by the way described above.

It is preferred that the rod-like compounds having at least two aromatic rings are those expressed by the general formula (1) below:

$$Ar^1\text{-}L^1\text{-}Ar^2 \qquad \text{General Formula (1):}$$

in which $Ar^1$ and $Ar^2$ are each independently an aromatic group.

In the first embodiment of the present invention, the aromatic group is one of aryl groups (aromatic hydrocarbon group), substituted aryl groups, aromatic heterocyclic groups or substituted aromatic heterocyclic groups.

The aryl groups and substituted aryl groups are more preferable than the aromatic heterocyclic groups and substituted aromatic heterocyclic groups. The heterocycle of aromatic heterocyclic groups are typically unsaturated one. The aromatic heterocycle is preferably a five-membered ring, six-membered ring or seven-membered ring, more preferably a five-membered ring or six-membered ring. The aromatic heterocycle typically has a maximum number of double bonds. The hetero atom is preferably a nitrogen, oxygen or sulfur atom, more preferably a nitrogen or sulfur atom. The aromatic ring of aromatic groups is preferably a benzene ring, furan ring, thiophene ring, pyrrole ring, oxazole ring, thiazole ring, imidazole ring, triazole ring, pyridine ring, pyrimidine ring and pyrazine ring; more preferably a benzene ring.

Examples of the substituents of substituted-aryl groups and substituted-aromatic heterocyclic groups include halogen atoms (F, Cl, Br and I), hydroxyl, carboxyl, cyano, amino; alkylamino such as methylamino, ethylamino, butylamino and dimethylamino; nitro, sulfo, carbamoyl; alkylcarbamoyl groups such as N-methylcarbamoyl, N-ethylcarbamoyl and N-dimethylcarbamoyl; sulfamoyl, alkylsulfamoyl groups such as N-methylsulfamoyl, N-ethylsulfamoyl and N-dimethylsulfamoyl; ureido, alkylureido groups such as N-methylureido, N,N-dimethylureido, N,N,N-trimethylureido, alkyl groups such as methyl, ethyl, propyl, butyl, pentyl, heptyl, octyl, isopropyl, s-butyl, t-amyl, cyclohexyl and cyclopethyl; alkenyl groups such as vinyl, allyl and hexenyl; alkynyl groups such as ethynyl and butynyl; acyl groups such as formyl, acetyl, butylyl, hexanolyl and lauryl; acyloxy groups such as acetoxy, butylyloxy, hexanoyloxy and lauryloxy; alkoxy groups such as methoxy, ethoxy, propoxy, butoxy, pentyloxy and octyloxy; aryloxy such as phenoxy; alkoxycarbonyl groups such as methoxycarbonyl, ethoxycarbonyl, propoxycarbonyl, butoxycarbonyl, pentyloxycarbonyl and heptyloxycarbonyl; aryloxycarbonyl groups such as phenoxycarbonyl; alkoxycarbonyl amino such as butoxycarbonyl amino hexyloxycarbonyl amino; alkylthio groups such as methylthio, ethylthio, propylthio, butylthio, pentylthio, heptylthio and octylthio; arylthio groups such as phenylthio; alkylsulfonyl groups such as methylsulfonyl, ethylsulfonyl, propylsulfonyl, butylsulfonyl, pentylsulfonyl, heptylsulfonyl and octylsulfonyl; amido groups such as acetoamido, butylamido, hexylamide and laurylamido; non-aromatic heterocyclic groups such as morpholine and pyrazinyl.

Preferable examples of the substituents of substituted-aryl groups and substituted-aromatic heterocyclic groups are halogen atoms, cyano, carboxyl, hydroxyl, amino, alkyl-substituted amino groups, acyl groups, acyloxy groups, amido groups, alkoxycarbonyl groups, alkoxy groups, alkylthio groups and alkyl groups. The alkyl portions and alkyl groups of the alkylamino groups, alkoxycarbonyl groups, alkoxy groups and alkylthio groups may further have a substituent. Examples Of the substituents at the alkyl portions and alkyl groups include halogen atoms, hydroxyl, carboxyl, cyano, amino, alkylamino groups, nitro, sulfone, carbamoyl, alkylcarbamoyl groups, sulfamoyl, alkylsulfamoyl groups, ureide, alkylureide groups, alkenyl groups, alkynyl groups, acyl groups, acyloxy groups, alkoxy groups, aryloxy groups, alkoxy carbonyl groups, aryloxy carbonyl groups, alkoxy carbonylamino groups, alkylthio groups, arylthio groups, alkylsulfonyl groups, amide groups and non-aromatic heterocyclic groups. Preferably, the substituents at the alkyl portions and alkyl groups are halogen atoms, hydroxyl, amino, alkylamino groups, acyl groups, acyloxy groups, acylamino groups, alkoxy carbonyl groups and alkoxy groups.

In the general formula (1) described above, $L^1$ is a divalent connecting group selected from the group consisting of alkylene groups, alkenylene groups, alkynylene groups, —O—, —CO— and combinations thereof.

The alkynylene groups have a cyclic structure. The cyclic alkylene group is preferably a cyclohexylene, more preferably 1,4-cyclohexylene. Preferable alkylene groups are linear alkylene groups rather than branched alkylene groups.

The carbon-atom number of the alkylene groups is preferably 1 to 20, more preferably 1 to 15, particularly preferably 1 to 10, still more preferably 1 to 8, most preferably 1 to 6.

Preferably, the alkenylene groups and alkynylene groups have a chain structure rather than a cyclic structure, and have a linear chain structure rather than a branched chain structure.

The carbon-atom number of the alkenylene groups and alkynylene groups is preferably 2 to 10, more preferably 2 to 8, particularly preferably 2 to 4, most preferably 2 (vinylene or ethynylene).

The carbon-atom number of the arylene groups is preferably 6 to 20, more preferably 6 to 16, particularly preferably 6 to 12.

In the molecular structure of the general formula (1), the angle of $Ar^1$ and $Ar^2$ in the $Ar^1\text{-}L^1\text{-}Ar^2$ is preferably 140° or more.

It is more preferable that the rod-like compounds are those expressed by the general formula (2) below:

$$Ar^1\text{-}L^2\text{-}X\text{-}L^3\text{-}Ar^2 \qquad \text{General Formula (2):}$$

In the general formula (2) described above, $Ar^1$ and $Ar^2$ are each independently an aromatic group. The meaning and examples of the aromatic group are substantially the same as those of general formula (1).

In the general formula (2) described above, $L^2$ and $L^3$ are each independently a divalent connecting group selected from the group consisting of alkylene groups, —O—, —CO— and combinations thereof.

The alkynylene groups preferably have a chain structure rather than a cyclic structure, and more preferably have a linear chain structure rather than a branched chain structure.

The carbon-atom number of the alkylene groups is preferably 1 to 10, more preferably 1 to 8, particularly preferably 1 to 6, still more preferably 1 to 4, most preferably 1 or 2 (methylene or ethylene).

The $L^2$ and $L^3$ are preferably each —O—CO— or CO—O— in particular.

In the general formula (2) described above, X is 1,4-cyclohexyl, vinylene or ethynylene. Specific examples of compounds expressed by the general formula (2) will be shown in the following.

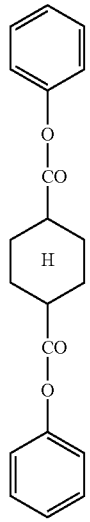
(1)
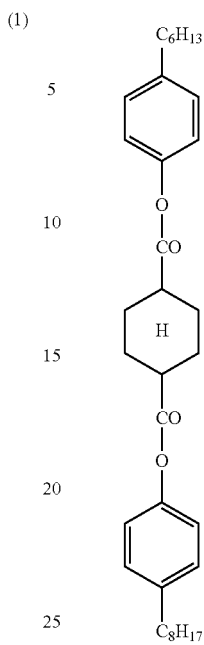
(2)
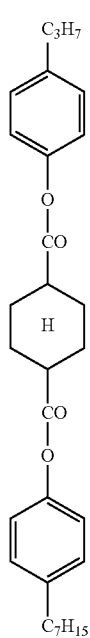
(3)
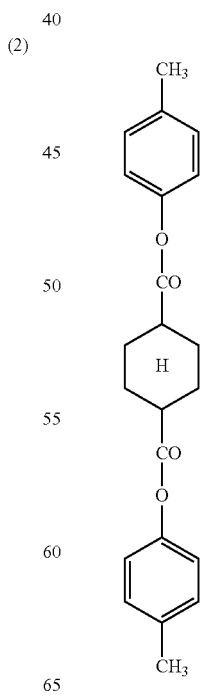
(4)

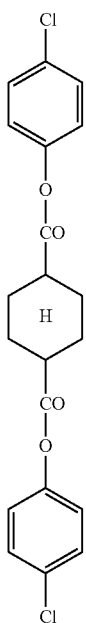
(5)
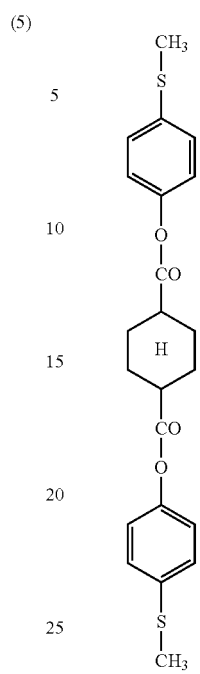
(6)
(7)
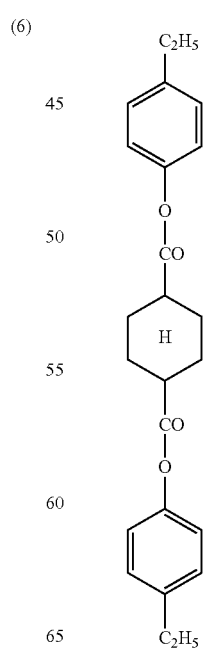
(8)

(9)
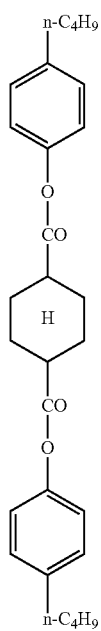
(11)
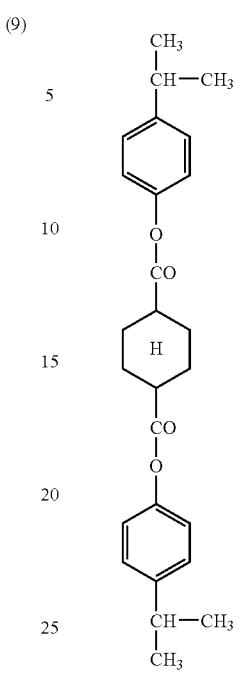
(10)
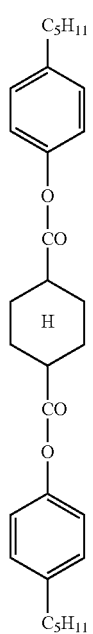
(12)
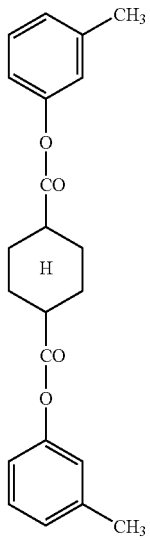

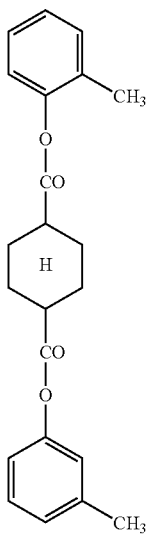 (13)
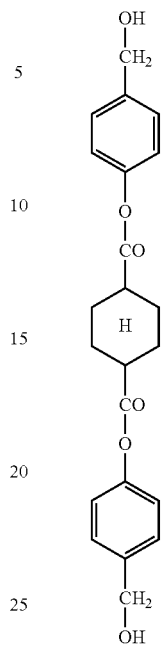 (15)
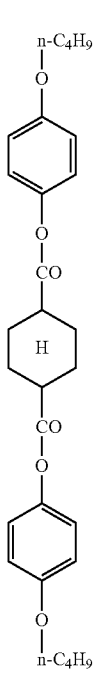 (14)
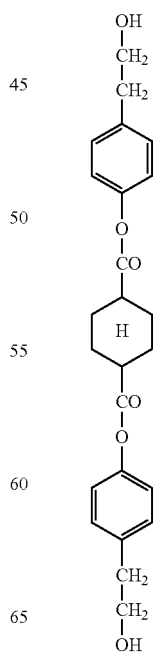 (16)

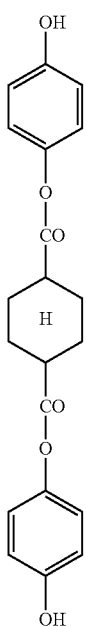
(17)
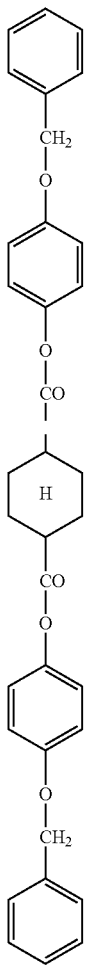
(18)
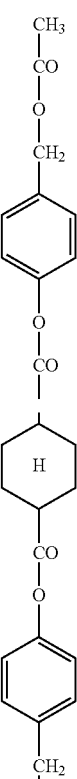
(19)
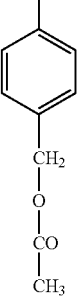
(20)
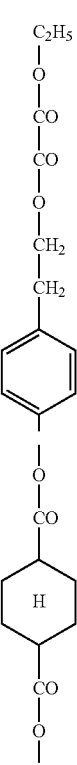

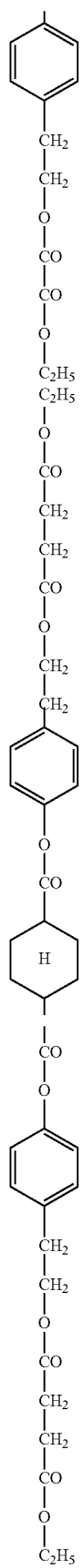
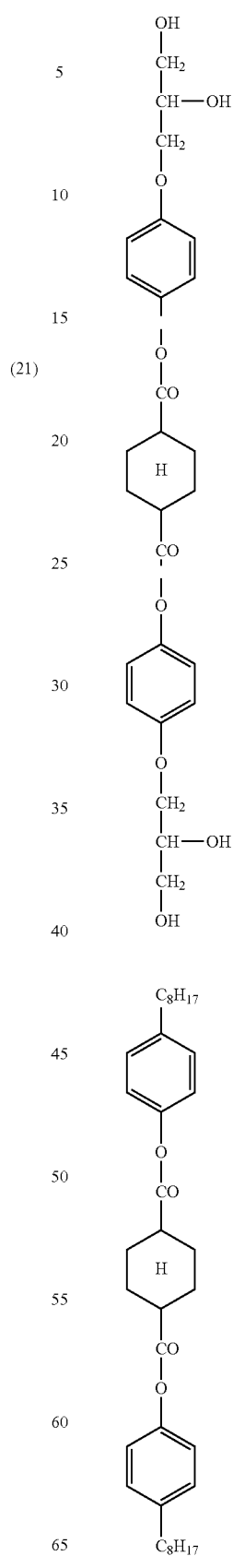
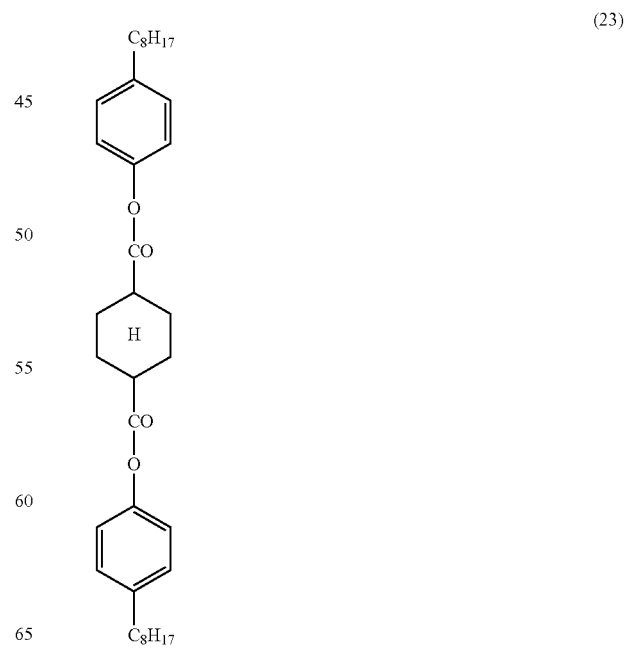

(24)
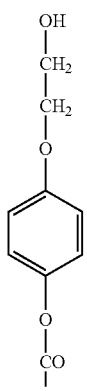
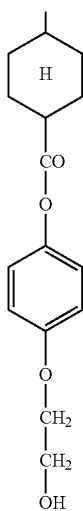
(25)
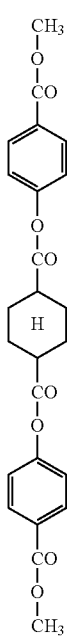
(26)
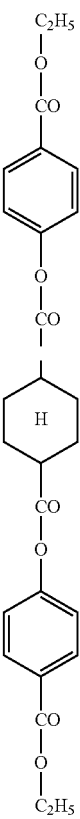
(27)
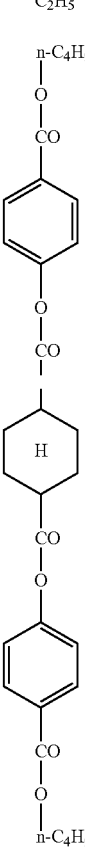

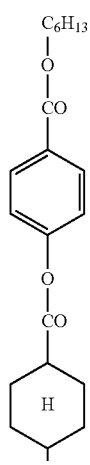
(28)
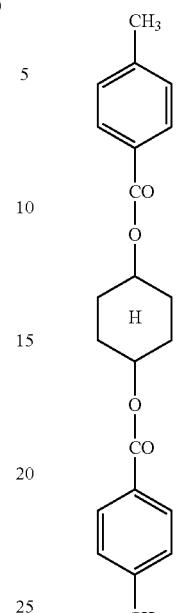
(30)
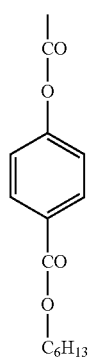
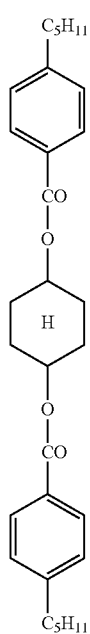
(29)
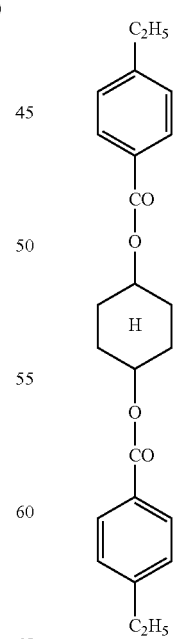
(31)

-continued
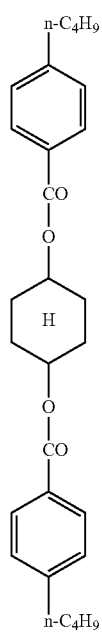
(32)
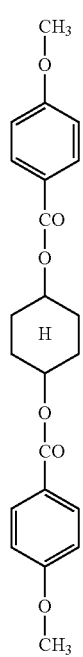
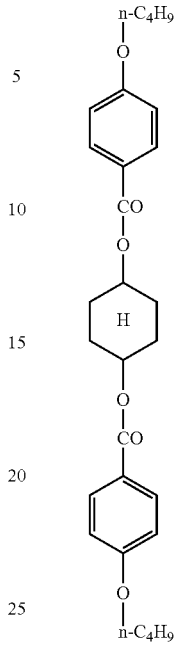
-continued
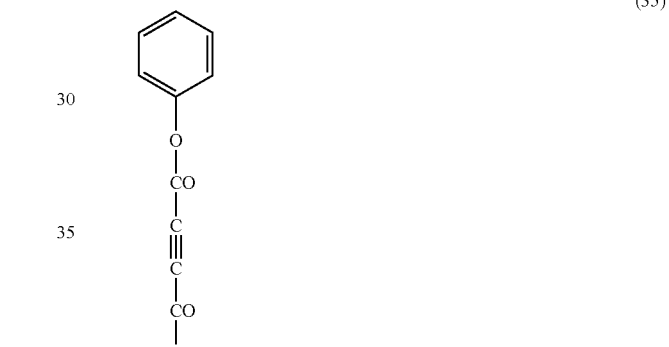
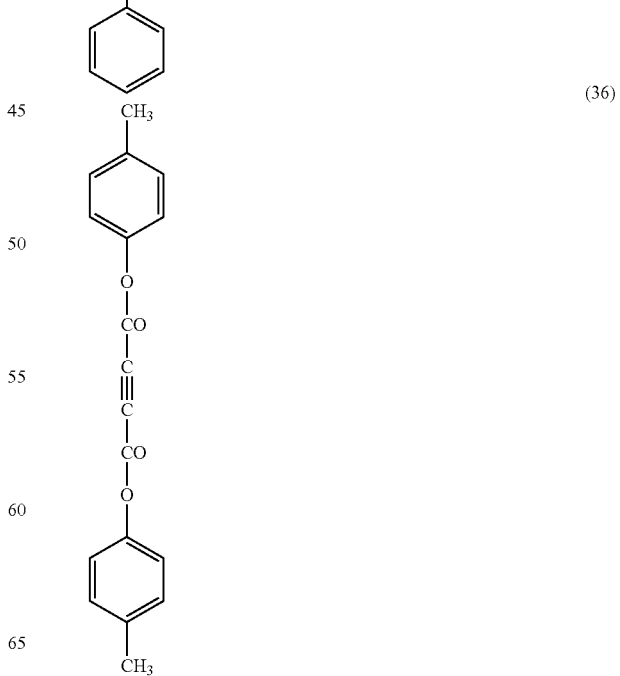

(37) 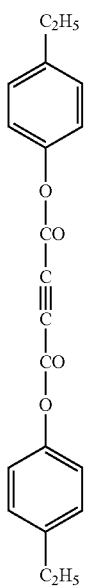
(38) 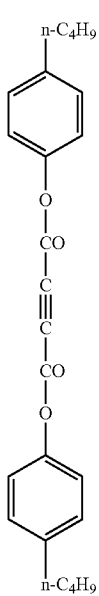
(39) 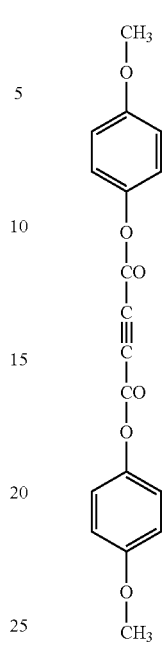
(40) 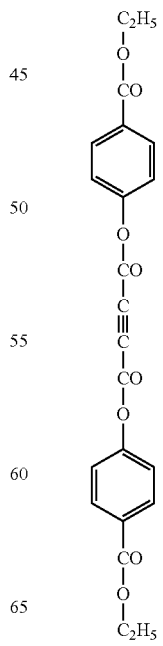

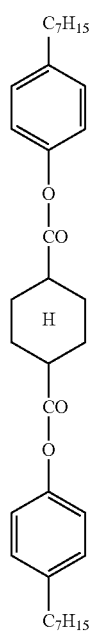 (41)
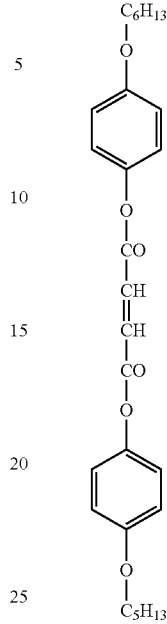 (43)
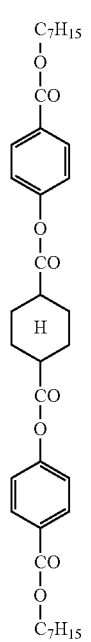 (42)
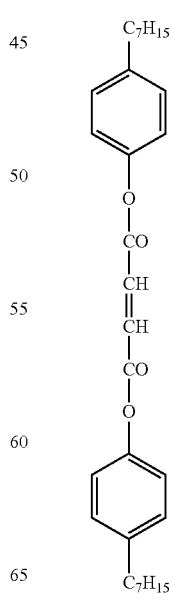 (44)

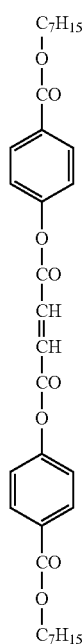

(45)

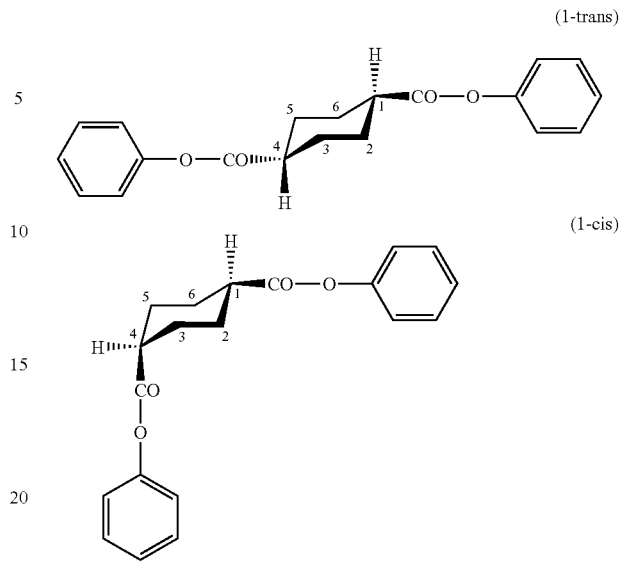

The compounds of specific examples of (1) to (34), (41) and (42) have each two asymmetric carbon atoms at 1st and 4th sites of cyclohexane ring. The compounds of specific examples of (1), (4) to (34), (41) and (42) have each only geometric isomers of trans and cis type rather than optical isomers since they have a symmetric meso-type molecular structure. Trans type (1-trans) and cis type (1-cis) of specific example (1) are shown below.

It is preferred, as described above, that the rod-like compounds have a linear molecular structure therefore are trans-type rather than cis-type.

The specific examples (2) and (3) have optical isomers of four isomers in total in addition to geometric isomers. It is preferred similarly that geometric isomers are trans-type rather than cis-type. The optical isomers may be D type, L type or a racemic body without limitation.

The compounds of specific examples (43) to (45) have a trans-type and a cis-type in the central vinylene bond; the trans-type is more preferable than the cis-type by the similar reason described above. The other preferable compounds are shown below.

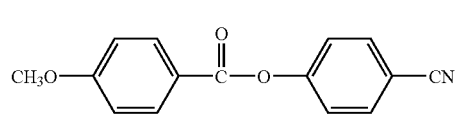
(46)

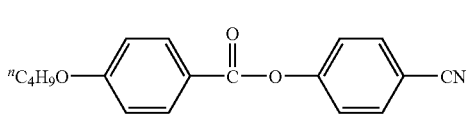
(47)

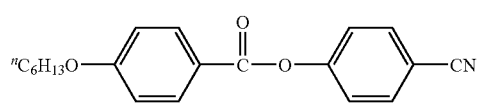
(48)

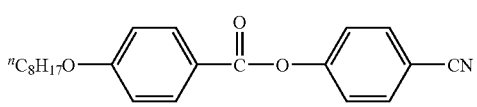
(49)

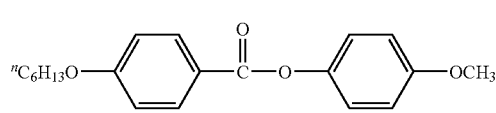
(50)

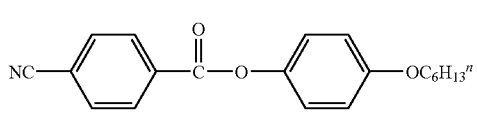
(51)

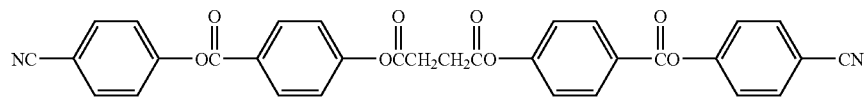
(52)

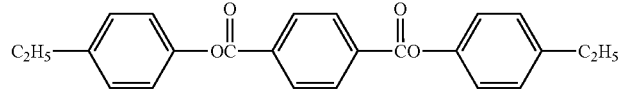
(53)

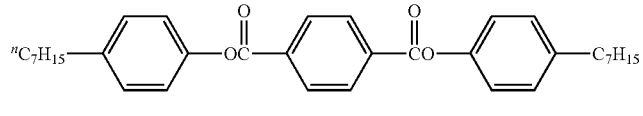
(54)

-continued

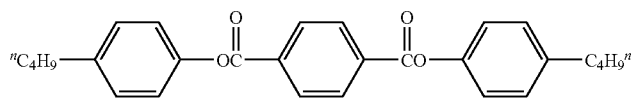
(55)

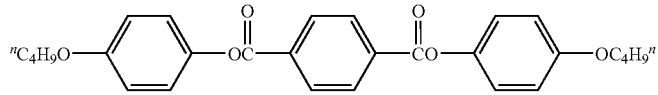
(55)

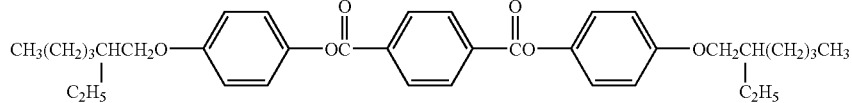
(57)

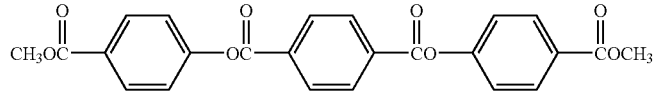
(58)

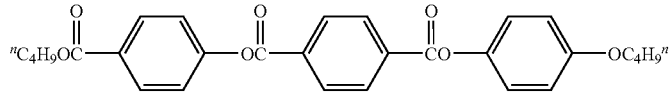
(59)

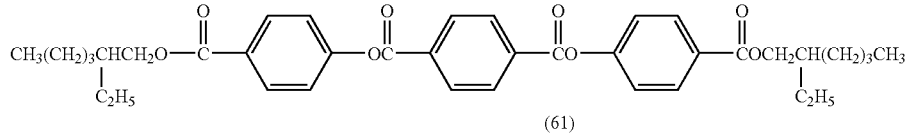
(60)

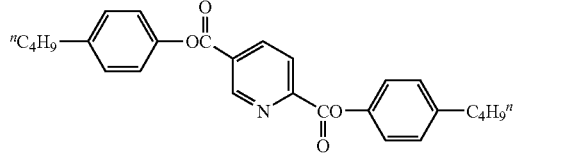
(61)

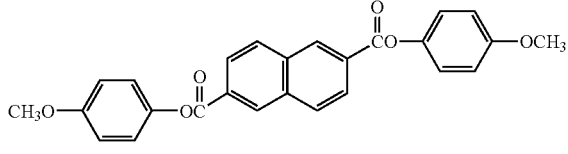
(62)

(63)

The rod-like compounds can be synthesized with reference to the following literatures: "Mol. Cryst. Liq. Cryst., vol. 53, p. 229 (1979)", "Mol. Cryst. Liq. Cryst., vol. 89, p. 93 (1982)", "Mol. Cryst. Liq. Cryst., vol. 145, p. 111 (1987)", "Mol. Cryst. Liq. Cryst., vol. 170, p. 43 (1989)", "J. Am. Chem. Soc., vol. 113, 1349 (1991)", "J. Am. Chem. Soc., vol. 118, 5346 (1996)", "J. Am. Chem. Soc., vol. 92, 1582 (1970)", "J. Org. Chem. vol. 40, p. 420 (1975)", and "Tetrahedron, vol. 48, No. 16, p. 3437 (1992)".

The retardation-increasing agent may contain two or more rod-like compounds of which the maximum absorption wavelength ($\lambda$max) is shorter than 250 nm in their UV ray absorption spectra in a solution. The content of the retardation-increasing agent is preferably 0.1 to 30% by mass based on the polymer amount, more preferably 0.5 to 20% by mass.

The aromatic compound is used in an amount of 0.01 to 20 parts by mass based on 100 parts mass of cellulose acylate. It is preferred that the aromatic compound is used in an amount of 0.05 to 15 parts by mass based on 100 parts mass of cellulose acylate, more preferably 0.1 to 10 parts by mass. Two or more compounds may be used together.

It is preferred that the cellulose acylate film is surface-treated. Examples of the surface treatment include corona discharge treatment, glow discharge treatment, burner treatment, acid treatment, alkaline saponification treatment and UV ray irradiation treatment. The surface treatment is also described in "Open Technology of Japanese Institute of Invention and Innovation (No. 2001-1745, pp. 30-32)".

The alkaline saponification treatment is carried out in a way that a cellulose acylate film is immersed into a saponification liquid or the saponification liquid is sprayed onto the cellulose acylate film, preferably is carried out by a coating process. Examples of the coating process include dip coating processes, curtain coating processes, extrusion coating processes, bar coating processes and E-type coating processes. The alkaline is preferably hydroxides of alkaline metals such as potassium and sodium. That is, the alkaline-treatment liquid is a solution of alkaline metal hydroxides. The concentration of hydroxide ion in the solution is preferably 0.1 to 3.0 mol/L. The wettability of the alkaline-treatment liquid with the second optically anisotropic layer or stability of the liquid can be improved by adding a solvent, surfactant or humectant such as diols and glycerin having proper wettability with the films. Examples of solvents having proper wettability with the films are alcohols such as isopropyl alcohol, n-butanol, methanol and ethanol. The alkaline-treatment liquids are also described in JP-A No. 2002-82226 and WO 02/46809.

An under-coat layer may be provided in addition to or in place of the surface treatment (see JP-A No. 07-333433); plural under-coat layers may be provided. For example, a polymer layer having both of a hydrophobic group and a hydrophilic group may be provided as a first under-coat layer and a hydrophilic polymer layer having a higher adhesiveness with an orientation film may be disposed thereon as a second under-coat layer (see JP-A No. 11-248940).

Orientation Film

The orientation film may be provided by such means as rubbing treatment of an organic compound, preferably a polymer; forming a layer having micro grooves; and accumulation of an organic compound such as ω-tricosane acid, dioctadecylmethylammonium chloride and methyl stearylate by Langmuir Brojet process (LB film). In addition, orientation films are also publicly conventional that yield an orientation upon applying an electric field or magnetic field or optical irradiation.

It is preferred that the orientation film is formed by rubbing-treatment of a polymer. The polymers for the orientation film have a molecular structure having a function to align liquid-crystal molecules. It is also preferred that the polymers for the orientation film have a function to fix an alignment of liquid crystal molecules in addition to the function to align liquid-crystal molecules. It is preferred, for example, that a side chain having a crosslinking functional group (e.g. double bond) is attached to a backbone chain of a polymer or a crosslinking functional group having a function to align liquid-crystal molecules is introduced into a side chain of the polymer. The polymer for the orientation film is preferably able to crosslink itself or by using a crosslinking agent. Examples of the crosslinkable polymers are described in paragraph [0022] of JP-A No. 08-338913. Examples of the crosslinkable polymers include polymethacrylate, polystyrene, polyolefin, polyvinyl alcohol, modified polyvinyl alcohol, poly(N-methylolacrylic amide), polyester, polyimide, polyvinyl acetate, carboxy methylcellulose, polycarbonate, and copolymers thereof. Silane coupling agents may also be utilized as the polymer. Preferable are water-soluble polymers such as poly(N-methylolacrylic amide), carboxy methylcellulose, gelatin, polyvinyl alcohol and modified polyvinyl alcohol; polyvinyl alcohol, modified polyvinyl alcohol are preferable in particular. It is particularly preferable that two or more species of polyvinyl alcohol or modified polyvinyl alcohol with different polymerization degrees are used together.

The saponification degree of the polyvinyl alcohol is preferably 70% to 100%, more preferably 80% to 100%. The polymerization degree of the polyvinyl alcohol is preferably 100 to 5000. The side chain having a function to align liquid crystal molecules has typically a hydrophobic group as the functional group. The specific functional group may be determined depending on the species of liquid crystal molecules or orientation conditions. The modifying group of the modified polyvinyl alcohol can be introduced by way of copolymer modification, chain-transfer modification or block-polymerization modification. Examples of the modifying group include hydrophilic groups such as carboxylic acid group, sulfonic acid group, phosphonic acid group, amino, ammonio, amido and thiol; hydrocarbon groups having a carbon-atom number of 10 to 100; fluorine-substituted hydrocarbon groups; alkylthio groups; polymerizable polymers such as unsaturated polymerizable groups, epoxy group and aziridinyl group; alkoxysilyl groups such as trialkoxysilyl, dialkoxysilyl and monoalkoxysilyl. The modified polyvinyl alcohol is described in JP-A Nos. 2000-155216 and 2002-62426, for example.

A polymer of the orientation film and a polyfunctional monomer in the first optically anisotropic layer may be co-polymerized by way that a side chain having the crosslinkable functional group is attached to the backbone chain of the orientation film or a crosslinking functional group having a function to align liquid-crystal molecules is introduced into a side chain of the polymer. As a result, not only between the polyfunctional polymer and the polyfunctional monomer, but also between the polymers of the orientation film and also between the polyfunctional monomer and the polymer of the orientation film can be firmly fixed by a covalent bond. As such, introduction of the crosslinkable functional group into the orientation film may remarkably improve the strength of optical compensation films. The crosslinkable functional group of the polymer of orientation films is described in paragraph [0080] of JP-A No. 2000-155216.

The polymer of orientation films may be crosslinked by use of a crosslinking agent rather than the crosslinkable functional group. Examples of the crosslinking agents include aldehydes, N-methylol compounds, dioxane derivatives, compounds through activation carboxyl group, active vinyl compounds, active halogen compounds, isooxazole and dialdehyde starches. Two or more crosslinking agents may be used together. The crosslinking agents are described in JP-A No. 2002-62426. Preferably, highly active aldehydes, in particular glutaraldehyde are employed. The content of the crosslinking agents is preferably 0.1 to 20% by mass based on the polymer, more preferably 0.5 to 15% by mass. It is preferred that the content of the crosslinking agents remaining in the orientation films is no more than 1% by mass, more preferably no more than 0.5% by mass. The reduction of residual amount of crosslinking agents may bring about sufficient durability without reticulation even under prolonged usage or reservation of liquid-crystal display devices at higher temperatures and humidities.

The orientation films may be formed by coating a liquid containing the polymer and the crosslinking agent on the second optically anisotropic layer, followed by heat-drying to crosslink, then rubbing thereof. The crosslinking reaction is carried out after the coating on the second optically anisotropic layer. In cases where water-soluble polymers such as polyvinyl alcohol are utilized for a material for forming the orientation films, mixed solvents of organic solvents such as methanol with a defoaming effect and water are preferably employed for the coating liquids. In cases of mixed solvent of water and methanol, the content of methanol is preferably no less than 1% by mass based on the entire solvent, more preferably no less than 9% by mass. Addition of organic solvents may suppress foaming, thus surface defects of orientation films and the first optically anisotropic layers may be effectively reduced.

The coating process of the orientation films may be preferably one of spin coating processes, dip coating processes, curtain coating processes, extrusion coating processes, rod coating processes or roll coating processes; particularly preferable is one of rod coating processes. The film thickness after drying is preferably 0.1 to 10 μm. The heat-drying may be carried out at 20° C. to 110° C. In order to cause sufficient crosslinking, the temperature is preferably 60° C. to 100° C., more preferably 80° C. to 100° C. The drying period may be 1 minute to 36 hours, preferably 1 to 30 minutes. It is preferred that the pH is adjusted to an optimum level depending on the crosslinking agents. In a case of glutaraldehyde, pH is preferably 4.5 to 5.5.

The orientation film may be prepared after the rubbing treatment of surfaces. The rubbing treatment may be similar as those widely employed in liquid-crystal orientation processes for LCDs. That is, surfaces of orientation films are rubbed in a certain direction using a paper, gauze, felt, rubber, nylon or polyester fiber, thereby to obtain an orientation.

Polarizing Plate

In the first embodiment of the present invention, the second optical anisotropic layer and the first optical anisotropic layer are laminated to at least one side of a polarizing film to prepare a laminated body, which has optical properties of optical compensation film of the first embodiment of the present invention.

Polarizing Film

The polarizing film comprises an orientation-type polarizing film or a coating-type polarizing film (by Optiva Inc.). The orientation-type polarizing film is formed from a binder and iodine or dichroic dye. The iodine or dichroic dye represents a polarization property through aligning in a binder. It is preferred that the iodine or dichroic dye is oriented along binder molecules or the dichroic dye is aligned in one direction through self-organization such as liquid crystals. Commercially available orientation-type polarizing films are typically produced by immersing a stretched film into a solution of iodine or a dichroic dye in a bath, thereby infiltrating the iodine or dichroic dye into the binder. The commercially available polarizing films need a thickness of at least 10 μm in order to take sufficient polarization property since the iodine or dichroic dye distributes from the polymer surface to about 4 μm thick (about 8 μm in total for both sides). The infiltration level may be controlled by the solution concentration of iodine or dichroic dye, bath temperature, and immersion period. The thickness of polarizing films is preferably no more than about 30 μm (typical thickness of currently available polarizing plates), more preferably no more than 25 μm, particularly preferably no more than 20 μm. In cases of no more than 20 μm, light-leak phenomena are likely to be non-observable in liquid crystal display devices of 17 inches.

The binder in the polarizing film may crosslink; the binder in the polarizing film may be a self-crosslinkable polymer. A polymer with a functional group or a polymer introduced with a functional group may be subjected to an irradiation, heat or pH-adjustment, thereby causing a reaction of the functional group to crosslink between polymers to form the polarizing film. The crosslinking structure may be introduced using a crosslinking agent. A bondable group may be introduced into the binder using a crosslinking agent of highly reactive compounds, thereby the crosslinkage can be formed between binders. The crosslinkage can be typically formed by applying a coating liquid containing a crosslinkable polymer or a mixture of a polymer and a crosslinking agent on a transparent substrate followed by heating thereof. The crosslinking step may be properly selected before the last step so as to assure the durability of final products.

The binder in polarizing films may be a self-crosslinkable polymer or a polymer crosslinkable with a crosslinking agent. Examples of the polymers include polymethylmethacrylate, polyacrylic acid, polymethacrylic acid, polystyrene, polyvinyl alcohol, modified polyvinyl alcohol, poly(N-methylolacrylic amido), polyvinyltoluene, chlorosulfonated polyethylene, nitrocellulose, chlorinated polyolefin such as polyvinyl chloride, polyester, polyimido, polyvinyl acetate, polyethylene, carboxy methylcellulose, polypropylene, polycarbonate and copolymers thereof such as acrylic acid-methacrylic acid copolymers, styrene-maleinimido copolymers, styrene-vinyltoluene copolymers, vinylacetate-vinylchloride copolymers and ethylene-vinylacetate copolymers. Silane coupling agents may be used as the polymer. Preferable are water-soluble polymers such as poly(N-methylolacrylic amide), carboxy methylcellulose, gelatin, polyvinyl alcohol and modified polyvinyl alcohol; polyvinyl alcohol, and modified polyvinyl alcohol are preferable in particular. It is particularly preferable that two or more species of polyvinyl alcohol or modified polyvinyl alcohol with different polymerization degrees are used together.

The saponification degree of the polyvinyl alcohol is preferably 70% to 100%, more preferably 80% to 100%, particularly preferably 95% to 100%. The polymerization degree of the polyvinyl alcohol is preferably 100 to 5000. The modified polyvinyl alcohols may be prepared by introducing a modifying group into polyvinyl alcohol by way of copolymerization modification, chain transfer modification or block polymerization modification. Examples of the modifying group introduced by copolymerization include —COONa, —Si(OX)$_3$ (X: hydrogen atom or an alkyl group), —N(CH$_3$)$_3$Cl, C$_9$H$_{19}$, —COO, —SO$_3$Na and —C$_{12}$H$_{25}$. Examples of the modifying group introduced by chain transfer modification include —COONa, —SH and —SC$_{12}$H$_{25}$. The polymerization degree of the modified polyvinyl alcohol is preferably 100 to 3000. The modified polyvinyl alcohol is described in JP-A No. 08-338913, 09-152509 and 09-316127. Unmodified polyvinyl alcohol and alkylthio-modified polyvinyl alcohol having a saponification degree of 85% to 95% are preferable in particular. Two or more species of the polyvinyl alcohol and modified polyvinyl alcohol may be used together.

The crosslinking agent is described in U.S. Reissue Pat. No. 23297. Boron compounds such as boric acid and pyroborate may be used as the crosslinking agent. A plenty of crosslinking agents of binders may increase the humidity-heat resistance of polarizing films; however, the amount of no less than 50% by mass of crosslinking agents may decrease the orientation of the iodine or dichroic dye. The content of the crosslinking agent is preferably 0.1 to 20% by mass based on the binder, more preferably 5 to 15% by mass. The binder contains some unreacted crosslinking agent even after the crosslinking reaction. Here, the amount of the residual crosslinking agent is preferably no more than 1.0% by mass within the binder, more preferably no more than 0.5% by mass. The amount of the crosslinking agent of more than 1.0% by mass within the binder may cause a problem in durability. Specifically, in cases where polarizing films with higher amount of crosslinking agents are installed into liquid-crystal display device and utilized for a long period or reserved at higher temperature-humidity conditions for a long period, the polarization degree may decrease.

Examples of the dichroic dye include azo dyes, stilbene dyes, pyrazolone dyes, triphenylmethane dyes, quinoline dyes, oxazine dyes, thiazine dyes, and anthraquinone dyes. The dichroic dye is preferably water-soluble; the dichroic dye preferably has a hydrophilic substituent such as sulfo, amino and hydroxyl. Examples of the dichroic dye include C.I. direct-yellow 12, C.I. direct-orange 39, C.I. direct-orange 72, C.I. direct-red 39, C.I. direct-red 79, C.I. direct-red 81, C.I. direct-red 83, C.I. direct-red 89, C.I. direct-violet 48, C.I. direct-blue 67, C.I. direct-blue 90, C.I. direct-green 59, C.I. acid-red 37. The dichroic dye is described in JP-A Nos. 01-161202, 01-172906, 01-172907, 01-183602, 01-248105, 01-265205 and 07-261024.

The dichroic dye may be utilized in a form of free acid or salt such as alkaline metal salts, ammonium salts and amine salts. Combined compositions of two or more dichroic dye may provide polarizing films having various colors. Such polarizing films may have an excellent single-plate transmissivity and a polarization rate that contains a compound or dye representing block color at orthogonalizing the polarization axes or that comprises various dichroic dyes so as to represent black color.

The polarizing film may be produced by stretching the binder in the longitudinal direction or MD direction of the polarizing film (stretching process) or by staining it using iodine or dichroic dye after rubbing (rubbing process). In the stretching process, the stretching rate is preferably 2.5 to 30.0 times, more preferably 3.0 to 10.0 times. The stretching process may be carried out under a dry condition in air or under a wet condition in water. The stretching rate under the dry condition is preferably 2.5 to 5.0 times, and the stretching rate under the wet condition is preferably 3.0 to 10.0 times. The stretching process may be divided into plural steps, which may lead to more uniform stretching even at higher stretching rates. A degree of stretching may be carried out in traverse or longitudinal direction in order to prevent shrinkage in width direction.

It is preferred that the polarizing film is stretched in an angle 10° to 80° inclined from the longitudinal direction in view of the process yield, which can be carried out by the two-axis tenter stretching in different steps between right and left. The two-axis stretching may be carried out similarly with conventional processes for producing films. The two-axis stretching is carried out at speeds different between right and left, thus the film thickness needs to be different between right and left before the stretching. In co-flow casting of films, the flow rate of binder solutions may be different between right and left by providing a taper with dies. The inclined angle is preferably adjusted to the transmittance axis of two polarizing plates and longitudinal or traverse direction of liquid cells. The inclined angle is typically 45°, but not limited to, since various liquid-crystal display devices have been developed, and the stretching direction is preferably adjustable to various displays.

In the processes described above, binder films may be produced with inclined stretching of 10° to 80° from the MD direction of polarizing films.

In the rubbing processes, conventional processes in liquid-crystal aligning processes may be applied. That is, surfaces of films are rubbed in a certain direction using a paper, gauze, felt, rubber, nylon or polyester fiber, thereby to obtain an orientation. The rubbing is typically carried out several times using a cloth with averaged hair graft formed from fibers having substantially uniform length and thickness. The lap angle of films over rubbing rolls is preferably 0.1 to 90°. Here, winding over 360° may bring about a stable rubbing treatment as described in JP-A No. 08-160430. In cases of rubbing treatment of long films, the film is preferably conveyed at a velocity of 1 to 100 m/min with a constant tension. The rubbing rolls are horizontally rotatable in the film progressing direction so as to adjust freely the rubbing angle. Preferably, the rubbing angle is selected within a range of 0° to 60°, preferably 40° to 50° and more preferably 45° for liquid-crystal display devices.

Preferably, a protective film is disposed on both sides of the polarizing films; preferably, a roll-like optically anisotropic layer is partially disposed on one side of the protective film. Preferable is the laminate of protective film/polarizing film/second optically anisotropic layer/first optically anisotropic layer, or protective film/polarizing film/second optically anisotropic layer/orientation film/first optically anisotropic layer. The polarizing film and the front side of the first optically anisotropic layer may be laminated. The lamination may be carried out using an adhesive. Such materials may be usable for the adhesive as polyvinyl alcohol resins (e.g. those modified by acetoacetyl, sulfonic acid, carboxyl, or oxyalkylene group) and boron compounds. Preferably, polyvinyl alcohol resins are employed. The thickness of the adhesive layer is preferably 0.01 to 10 μm thick after drying, more preferably 0.05 to 5 μm thick. An optical diffraction film or an anti-glare film may be laminated on the surface of the polarizing plate.

Liquid Crystal Display Device

The liquid crystal display device of the first embodiment according to the present invention comprises a liquid crystal cell and a polarizing plate of the first embodiment according to the present invention.

The polarizing plate of the first embodiment formed by laminating the optical compensation film and the polarizing film is favorably utilized for transmission liquid-crystal display devices.

In the inventive liquid-crystal display devices, the liquid-crystal layer of liquid-crystal cells satisfies at least one of Expressions (x) to (xii);

$1 \leq Re_1c450)(0°)/Re_1c650)(0°) \leq 1.25$:   Expression (x)

$1 \leq Re_1c450)(40°)/Re_1c650)(40°) \leq 1.25$:   Expression (xi)

$1 \leq Re_1c450)(-40°)/Re_1c650)(-40°) \leq 1.25$:   Expression (xii)

in which $Re_1c\lambda(\theta)$ is defined as the value of Re retardation determined in the condition that a light of wavelength λ (nm) is entered with an incident angle θ° from the normal line with the retardant phase axis being defined as the rotation axis (when the values of $Re_1\lambda(\theta)$ and $Re_1\lambda(-\theta)$ are different, the magnitude is decided so as to become $Re_1\lambda(\theta) > Re_1\lambda(-\theta)$).

In addition, the first optically anisotropic layer and the liquid-crystal layer of liquid-crystal cells satisfy at least one of Expressions (xiii) to (xv).

$0.9 \leq [Re_1c450)(0°)/Re_1c650)(0°)]/[Re_1450)(0°)/Re_1650)(0°)] \leq 1.1$:   Expression (xiii)

$0.9 \leq [Re_1c450)(40°)/Re_1c650)(40°)]/[Re_1450)(40°)/Re_1650)(40°)] \leq 1.1$:   Expression (xiv)

$0.9 \leq [Re_1c450)(-40°)/Re_1c650)(-40°)]/[Re_1450)(-40°)/Re_1650(-40°)] \leq 1.1$:   Expression (xv)

The liquid-crystal display devices according to the present invention will be explained with reference to figures, but to which the present invention should not be limited.

Transmissive Liquid-Crystal Display Device

The transmissive liquid-crystal display device is formed from a liquid-crystal cell and two polarizing plates disposed at both sides thereof. The polarizing plate is formed from a polarizing film and two protective films disposed at both sides thereof. The liquid-crystal cell is formed from a liquid crystal interposed between two electrode substrates.

The inventive optical compensation film of the first embodiment is disposed as one sheet between the liquid-crystal cell and one of two polarizing plates or as two sheets between the liquid-crystal cell and two polarizing plates.

The inventive polarizing plate in the first embodiment is utilized as at least one of two polarizing plates disposed at both sides of the liquid-crystal cell. In this construction, the inventive polarizing plate is disposed such that the optical compensation film faces the liquid-crystal cell. Preferably, the liquid-crystal cell is of OCB, ECB, IPC, FFS or TN.

The liquid-crystal cell of OCB mode is of bend-orientation mode in which rod-like liquid-crystal molecules are aligned substantially in a reverse direction i.e. symmetrically at upper and lower portions of liquid-crystal cell. Liquid-crystal display devices, which employing a liquid-crystal cell of bend-orientation mode, are disclosed in U.S. Pat. Nos. 4,583,825 and 5,410,422. Since rod-like liquid-crystal molecules are aligned symmetrically at upper and lower portions of liquid-crystal cell, the liquid-crystal cells of bend-orientation mode have an optically self-compensating function. Therefore, the liquid-crystal mode is called also OCB (Optically Compensatory Bend) liquid-crystal mode. Liquid-crystal display devices of bend-orientation mode have an advantage of higher response velocities.

Liquid-crystal cells of IPC mode have a configuration that rod-like liquid-crystal molecules are aligned substantially in parallel to substrates, and an electric field applied in parallel with a substrate surface leads to a two-dimensional response of liquid-crystal molecules. IPC mode corresponds to black display at applying no electric field, the transmissive axes of a pair of upper and lower polarizing plates are perpendicularly crossed. JP-A Nos. 10-54982, 11-202323, 09-292522, 11-133408, 11-305217, 10-307291 etc. disclose methods to reduce light-leak at black display in inclined directions and to improve viewable angle using optical compensation films.

In the liquid-crystal cells of TN mode, rod-like liquid crystal molecules are aligned substantially horizontally and also twisted 60° to 120° at applying no voltage. Liquid-crystal cells of TN mode have been utilized most widely as color TFT liquid-crystal display devices, and there exist many literatures concerning thereof.

The value of Δn×d of liquid-crystal cells in the OCB mode, ECB mode and TN mode is preferably 50 to 1000 nm, more preferably 300 to 1000 nm. The cells are preferably reflective or transmissive liquid-crystal cells. It is preferred that the color display is carried out by RGB pixels, cell gaps of the RGB pixels may be different for the respective pixels; voltages may be different for the respective pixels. Among these, the liquid crystal cell is preferably a bend-orientation liquid-crystal cell.

Bend Orientation Liquid-Crystal Cell

The bend orientation liquid-crystal cell is one that forms a bend orientation with a twist at central portion of liquid-crystal cells upon a voltage application.

FIG. 1 is a schematic cross-section that shows orientation of a liquid-crystal compound in a bend orientation liquid-crystal cell. As shown in FIG. 1, the bend orientation liquid-crystal cell has such a configuration that liquid-crystal compound 11 is interposed between upper substrate 14a and lower substrate 14b. The liquid-crystal compound 11 utilized for the bend orientation liquid-crystal cell typically has a positive permittivity anisotropy, preferably is a rod-like liquid-crystal molecule such as 11a to 11j. Orientation films 12a, 12b and electrode layers 13a, 13b are disposed with upper substrate 14a and lower substrate 14b respectively. The orientation film has a function to align rod-like liquid-crystal molecules 11a to 11j. RD is a rubbing direction of orientation films. Electrode layers have a function to apply a voltage to rod-like liquid-crystal molecules 11a to 11j.

When the voltage applied to the bend orientation liquid-crystal cell is low, as shown "off" in FIG. 1, the rod-like liquid-crystal molecules 11a to 11e near upper substrate 14a and the rod-like liquid-crystal molecules 11f to 11j near upper substrate 14b are aligned reversely or up-down symmetrically. The rod-like liquid-crystal molecules 11a, 11b, 11i and 11j near upper substrates 14a, 14b are aligned approximately horizontally and rod-like liquid-crystal molecules 11d to 11g at the central portion are aligned approximately vertically.

When the applied voltage is high, as shown "on" in FIG. 1, the rod-like liquid-crystal molecules 11a, 11j near the substrate 14a, 14b remain the approximately horizontal alignment; and the rod-like liquid-crystal molecules 11e, 11f at the central portion remains approximately vertical alignment. The rod-like liquid-crystal molecules 11b, 11c, 11d, 11g, 11h and 11i between the substrate and the central portion of the liquid crystal cell change the orientation by increasing the voltage, resulting in more vertical alignment than that of "off" condition. However, in the similar manner as "off" condition, the rod-like liquid-crystal molecules 11a to 11e near upper substrate 14a and the rod-like liquid-crystal molecules 11f to 11j near upper substrate 14b are aligned reversely or up-down symmetrically.

Polarizing Plate

Figure 2:
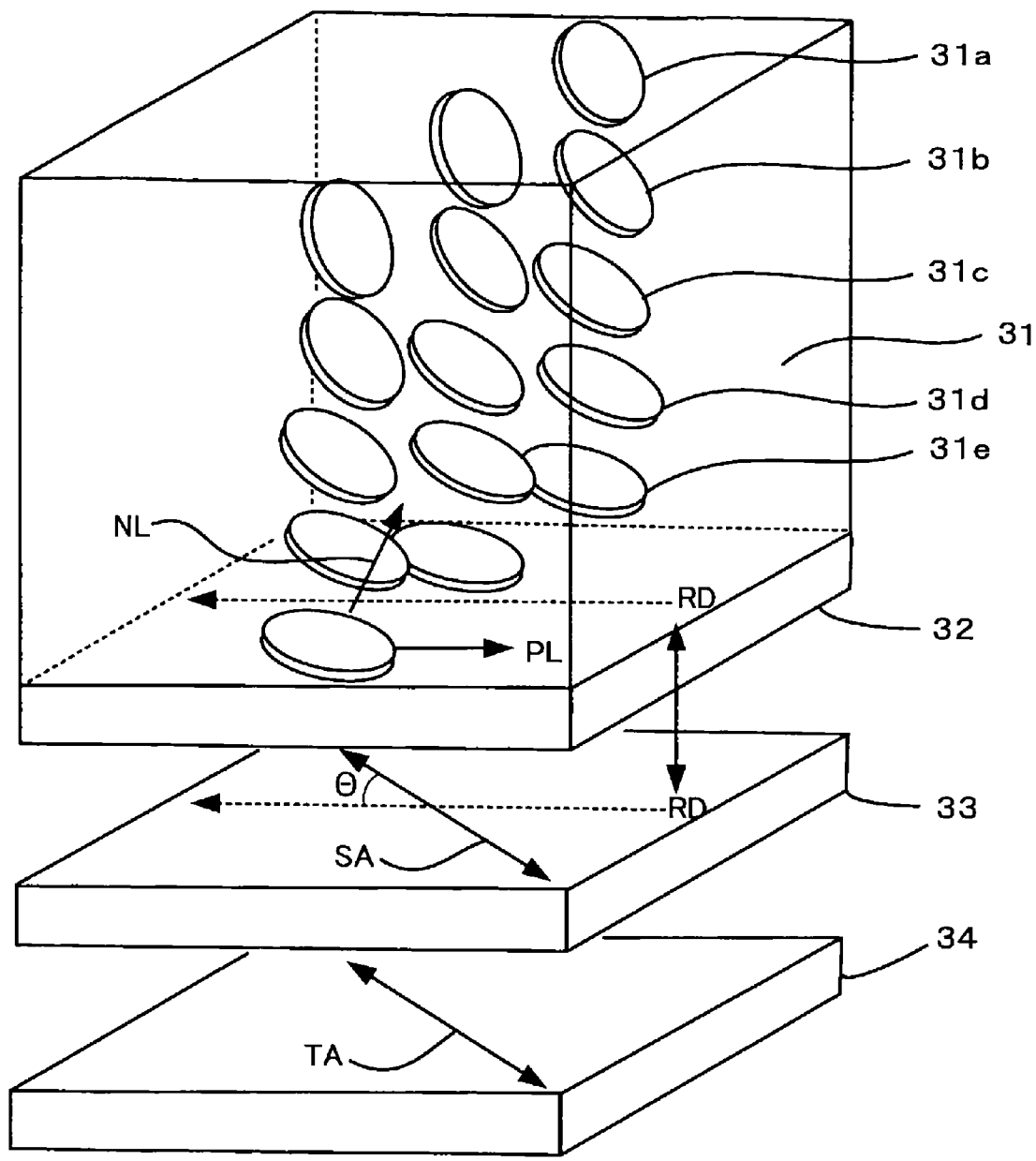
FIG. 2 is a schematic view that shows a polarizing plate of the first embodiment of the present invention.

FIG. 2 is a schematic view of a polarizing plate. The polarizing plate of FIG. 2 is a laminate formed from at least a first optically anisotropic layer 31, a second optically anisotropic layer 33 and a polarizing film 34. It is preferred that the first optically anisotropic layer 31 is formed from discotic liquid-crystal compounds 31a to 31e and the second optically anisotropic layer 33 is formed from a cellulose acylate film. The polarizing plate, shown in FIG. 2, has an orientation film 32 between the first optically anisotropic layer 31 and the second optically anisotropic layer 33. The discotic liquid-crystal compounds 31a to 31e of the first optically anisotropic layer 31 are flat molecules. The discotic liquid-crystal compounds 31a to 31e have each only one plane within the molecule i.e. a disc face. The disc face is inclined against the second optical anisotropic layer 33. The angle between the disc face and the second optically anisotropic layer increases as the distance increases between the discotic liquid-crystal compound and the orientation film. The average inclined angle is preferably 15° to 50°. When the inclined angle changes as shown in FIG. 2, the function of polarizing plates to enlarge the viewable angle can be remarkably increased. In addition, the polarizing plates with changeable inclined angles can also represent a function to prevent display-image reverse, tone change or coloring. The average of directions PL, where the normals NL of disc faces of discotic liquid-crystal compounds 31a to 31e are orthographed onto the second optically anisotropic layer 33, represents a relation of anti-parallel with the rubbing direction RD of orientation film 32.

In view of preferable function of the first embodiment according to the present invention, the angle between the average direction of normals of disc faces of discotic liquid-crystal compounds orthographed onto the second optically anisotropic layer and the in-plane phase delay axis is adjusted to substantially 45°. Accordingly, in the process for producing polarizing plates, the angle θ between the rubbing direction RD of orientation film 32 and the in-plane phase delay axis SA of the second optically anisotropic layer is adjusted to substantially 45°. Furthermore, in the first embodiment of the present invention, the second optically anisotropic layer and the polarizing film are arranged such that the in-plane phase-delay axis SA of the second optically anisotropic layer and the in-plane transmissive axis TA of polarizing film 34 are substantially parallel or perpendicular. In the polarizing plate shown in FIG. 2, one sheet of the second optically anisotropic layer is disposed in parallel. The in-plane phase delay axis SA of the second optically anisotropic layer 33 principally corresponds to the stretching direction of the second optically anisotropic layer 33. The in-plane transmissive axis TA of the polarizing film 34 principally corresponds to the perpendicular direction to the stretching direction of the polarizing film.

Optical Diffusion Film

Figure 3:
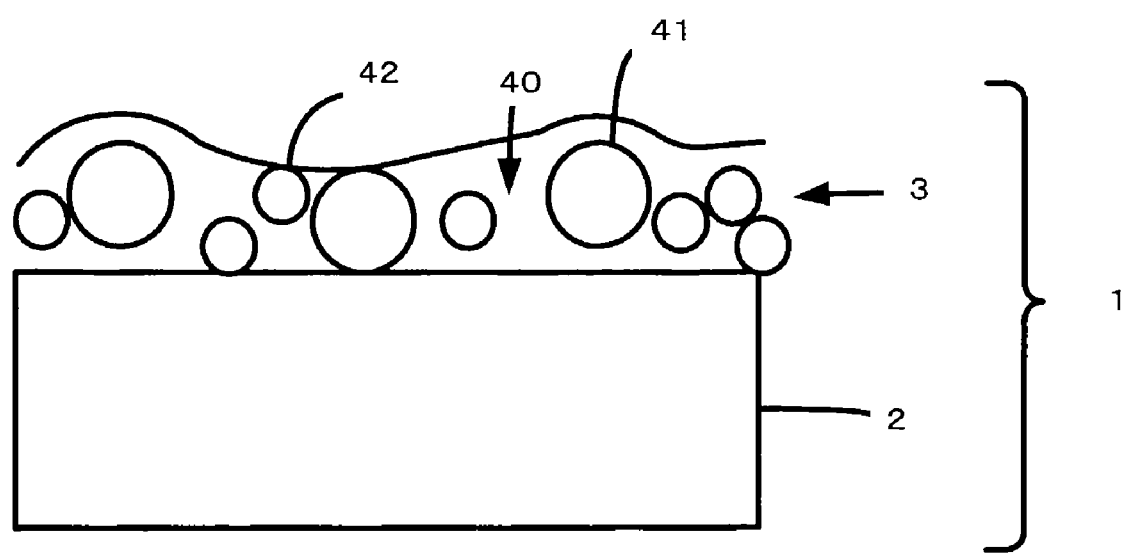
FIG. 3 is a schematic cross-section of a representative optical diffusion film.

The optical diffusion films and anti-glare films are favorably utilized to provide optical diffusion functions. FIG. 3 is a schematic cross-section of a representative optical diffusion film.

The optical diffusion film 1 shown in FIG. 3 is a laminate of transparent substrate film and optical diffusion layer 3 that contains, for example, first transparent fine particles 41 and second transparent fine particles 42 within transparent resin 40. In this explanation, there exist two species of transparent fine particles with different refractive indices and two particle size distributions; there may be one species with one refractive index and two particle size distributions or one species with one refractive index and one particle size distribution.

For example, the first transparent fine particles 41 are formed from a transparent resin and silica fine particles (average particle size: 1.0 µm, refractive index: 1.51) and the second transparent fine particles 42 are formed from a transparent resin and styrene beads (average particle size: 3.5 µm, refractive index: 1.61). The optical diffusion property can be derived by the refractive-index difference between the transparent fine particles 41, 42 and the transparent resin 40. The refractive-index difference is preferably 0.02 to 0.15. When the refractive-index difference is less than 0.02, no optical diffusion property may appear. When the refractive-index difference is more than 0.15, the films may be entirely whitened due to excessively high optical diffusion. The refractive-index difference is preferably 0.03 to 0.13, more preferably 0.04 to 0.10.

In cases where the polarizing films are employed into liquid-crystal display devices, it is preferred that an anti-reflective layer is disposed on the surface of visual side. It is preferred that inner haze of anti-reflective layers is no less than 50% from the viewpoint to suppress color change due to view angle of the liquid-crystal display devices. The anti-reflective layers are described in JP-A Nos. 2001-33783, 2001-343646 and 2002-328228.

Bend Orientation Liquid-Crystal Display Device

Figure 4:
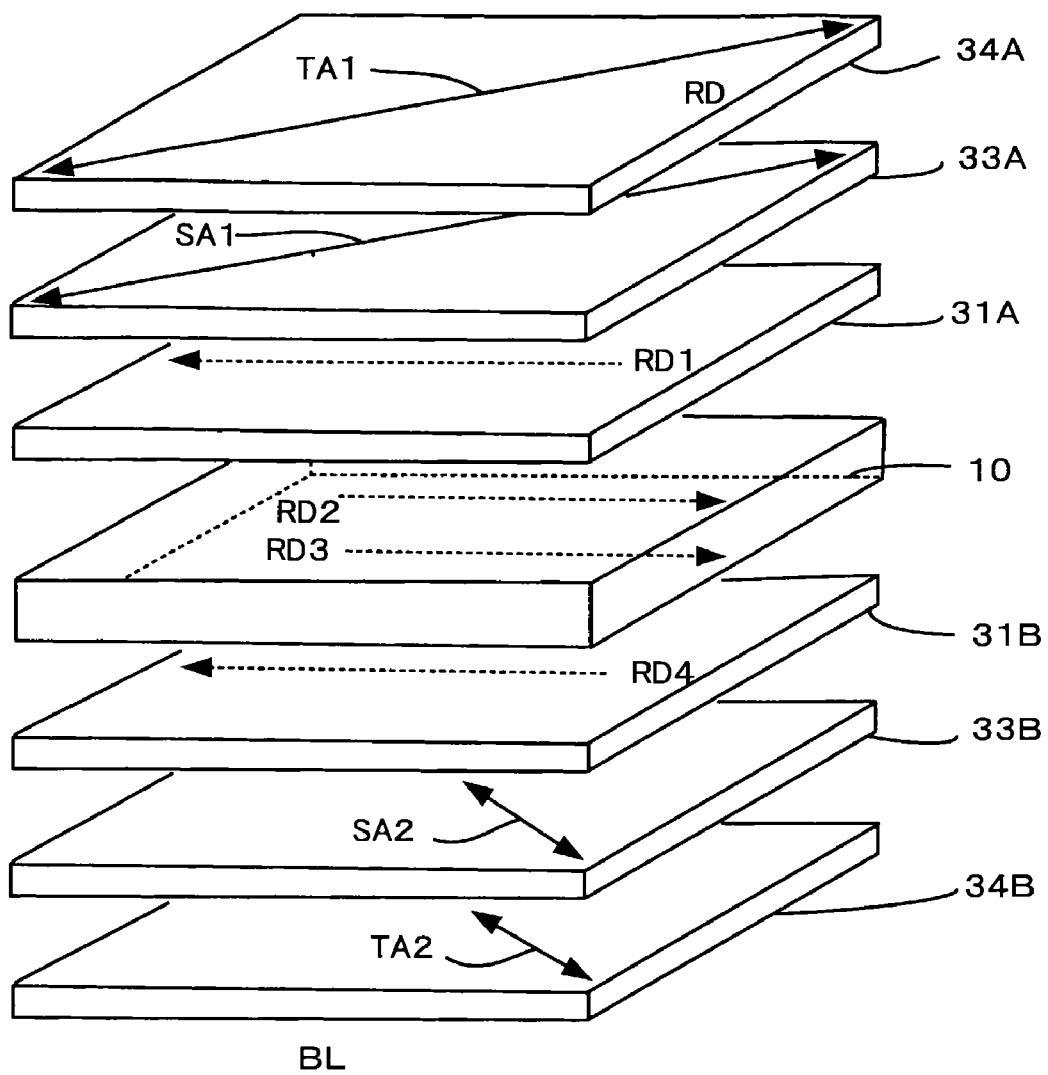
FIG. 4 is a schematic cross-section of a liquid-crystal display device of bend-orientation type in the first embodiment of the present invention.

FIG. 4 is a schematic cross-section of a bend orientation liquid-crystal display device of the first embodiment according to the present invention. The bend orientation liquid-crystal display device shown in FIG. 4 is formed of a bend-orientation liquid cell 10, a pair of polarizing plates 31A to 34A and 31B to 34B disposed both sides of the liquid cell, and a backlight BL. The bend-orientation liquid cell 10 corresponds to the liquid-crystal cell shown in FIG. 1. The upper, lower rubbing directions RD2, RD3 of the bend-orientation liquid cell 10 are the same. The polarizing plate is a laminate of the first optically anisotropic layer 31A (31B), the second optically anisotropic layer 33A (33B), and the polarizing film 34A (34B) in order from the side of the bend-orientation liquid cell 10. The rubbing directions RD1, RD4 of the discotic liquid-crystal of the first optically anisotropic layer 31A, 31B are reverse with the opposing rubbing directions RD2, RD3. As described above, the rubbing directions RD1, RD4 of the discotic liquid-crystal are reversely parallel with the average direction of normals of disc faces orthographed onto the second optically anisotropic layer. The angle between in-plane phase-delay axis SA1, SA2 of the second optically anisotropic layer 33A, 33B and in-plane transmissive axes TA1, TA2 of the polarizing films 34A, 34B is substantially 45° in the same plane with the rubbing direction RD1, RD4 of the discotic liquid-crystal compound. The two sheets of polarizing films 34A, 34B are disposed such that the in-plane transmissive axes are orthogonal or crossed nicols.

The other examples of the liquid-crystal display devices of the first embodiment will be explained with reference to figures.

ECB Mode-Type Liquid-Crystal Display Device

Figure 5:
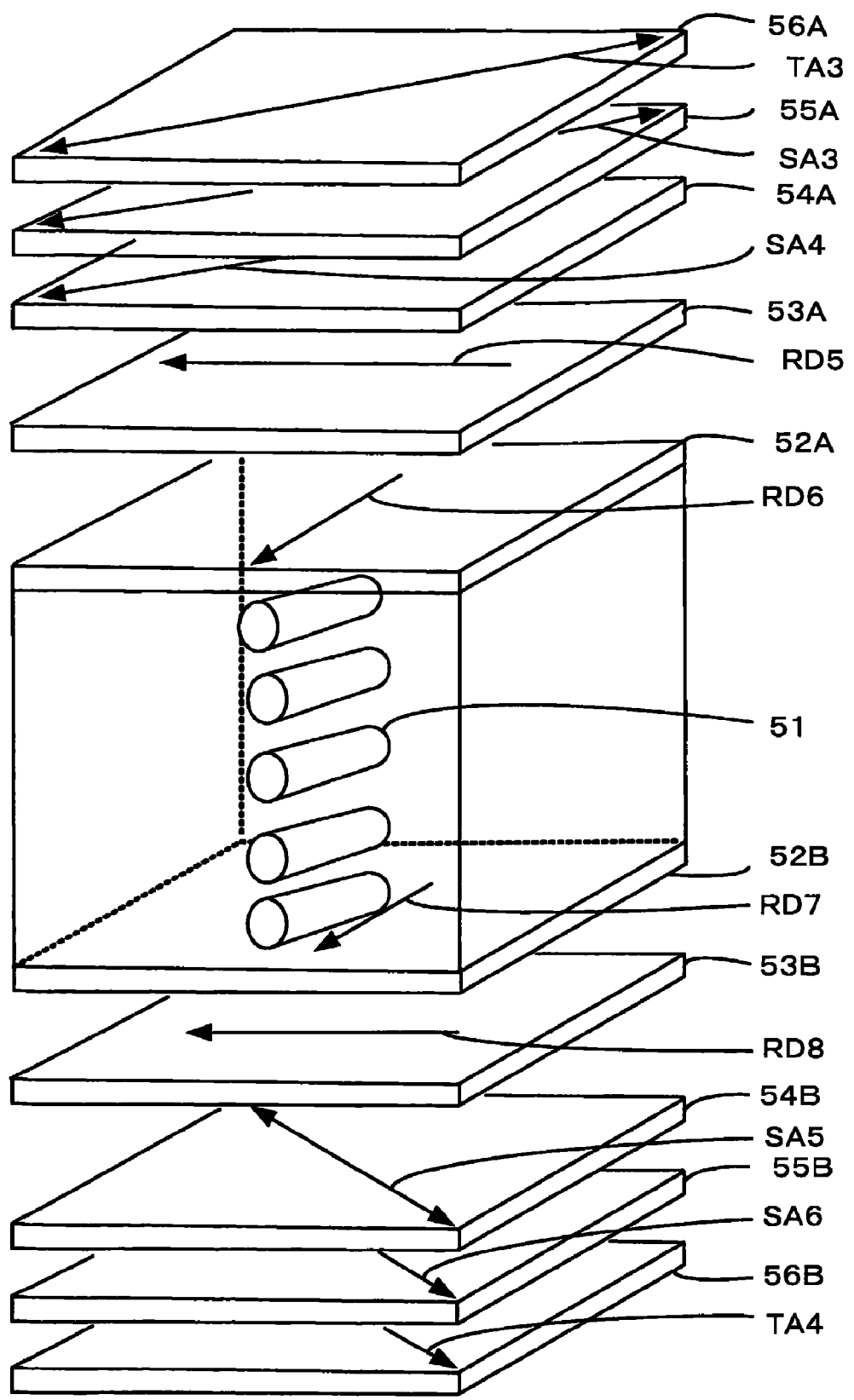
FIG. 5 is a schematic cross-section of a liquid-crystal display device of ECB mode type in the first embodiment of the present invention.

FIG. 5 is a schematic cross-section that shows a liquid-crystal display device of ECB mode-type. The liquid-crystal display device shown in FIG. 5 comprises a liquid-crystal layer containing a liquid-crystal compound 51 and substrates 52A, 52B that sandwich them. The upper substrate 52A and the lower substrate 52B have each an orientation film (not shown) and an electrode layer (not shown). Polarizing films 56A, 56B, sandwiching the liquid-crystal cell, are disposed. The first optically anisotropic layers 53A, 53B and the second optically anisotropic layers 54A, 54B are respectively disposed between the polarizing films 56A or 56B and the liquid-crystal cell. In addition to the first and the second optically anisotropic layers, the first optically anisotropic layers 55A, 55B may be disposed. Optionally, the first and the second optically anisotropic layers and the polarizing film are favorably integrated to utilize as a elliptical polarizing plate.

The first and the second optically anisotropic layers may be incorporated into the liquid-crystal display device as an integrated member or separate members. The first and the second optically anisotropic layers may be disposed between the liquid-crystal cell and the polarizing film of display side or between the liquid-crystal cell and the polarizing film of back-light side.

The transmissive axes TA3, TA4 of the polarizing film 56A, 56B are perpendicular each other and parallel with the phase-delay axes SA3, SA4 of the second optically anisotropic layers 54A, 54B.

The liquid-crystal cell is formed from upper substrate 52A, lower substrate 52B, and a liquid-crystal layer sandwiched by them. At the surface of the substrates 52A, 52B (hereinafter sometimes referred to as "inner surface"), which contacting with the liquid-crystal compound 51, an orientation film (not shown) is disposed. The orientation film has a function to align the liquid-crystal compound 51 through rubbing treatment. The rubbing direction RD6 of the upper substrate 52A and the rubbing direction RD7 of the lower substrate 52B are parallel, and the liquid-crystal compound 51 is arranged in parallel orientation without twist structure. A transparent electrode (not shown) capable of applying a voltage is disposed on the liquid-crystal layer of liquid-crystal compound 51 at the inner face of the substrate 52A, 52B. The transparent electrode has a function to apply a voltage to the liquid-crystal compound 51. The transparent electrode is typically formed of indium tin oxide (ITO).

The materials of liquid crystals may be properly selected; preferably, liquid-crystal materials with a positive permittivity are employed.

In the first embodiment of the present invention, the product $\Delta n \cdot d$ (d (µm): thickness of liquid-crystal layer, $\Delta n$: refractive-index anisotropy) is preferably 0.1 to 1.5 µm, more preferably 0.12 to 0.9 µm, still more preferably 0.15 to 0.5 µm. The product of this range may lead to bright, high-contrast display devices due to higher brightness of white display and lower brightness of black display. Here, these optimum values are of transmissive mode, and the optimum values of $\Delta n \cdot d$ in reflective mode are about half of those described above since the light path in liquid-crystal cells is doubled under the reflective mode.

The liquid-crystal display device having the construction described above represents a white display at applying no voltage and a normally white display of black display with lowered transmissivity at applying a high voltage. The black display generates when the Re of optical compensation films coincides with the retardation value of liquid crystal layers at applying no voltage.

In a non-driving condition where no driving voltage is applied to the respective electrodes (not shown) of substrates 52A, 52B, the liquid-crystal compound 51 in the liquid-crystal layer aligns approximately in parallel with the face of substrate 52A, 52B; consequently, the transmissive light changes the polarization condition by the double reflex effect of the liquid-crystal compound 51 and passes through the polarizing films 56A, 52B. The $\Delta n \cdot d$ value of the liquid-crystal layer is adjusted within the range described above so as to maximize the transmission light. On the contrary, in a driving condition where a driving voltage is applied to transparent electrodes (not shown), the liquid-crystal compound 51 comes to align vertically to the faces of substrates 52A, 52B depending on the magnitude of the applied voltage. However, the liquid-crystal compound 51 aligns approximately vertically at central portion between substrates, in parallel near the interface of substrates, and successively inclines toward the central portion; these conditions hardly generate perfect black-display. In addition, the average orientation of the liquid-crystal compound inclined near the interface of substrates varies depending on the view angle, that is, there appears view-angle dependency in which the transmissivity and brightness alter depending on the view angle. Accordingly, optical compensation films, which compensating the residual phase difference of liquid-crystal layers near the substrate face, can provide perfect black-display and higher front-contrast ratios.

IPS Mode-Type Liquid-Crystal Display Device

Figure 6:
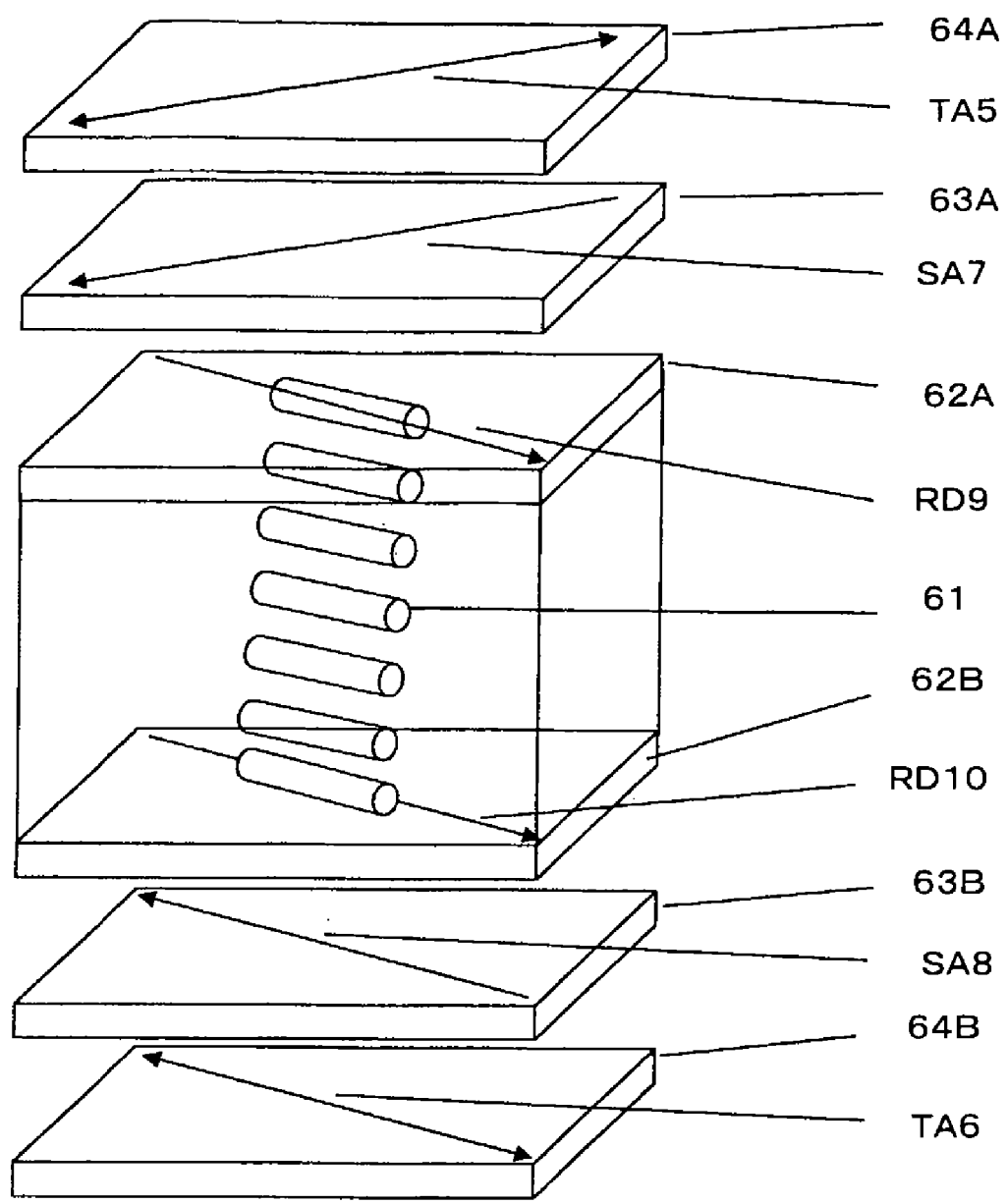
FIG. 6 is a schematic cross-section of a liquid-crystal display device of IPS mode type in the first embodiment of the present invention.

FIG. 6 is a schematic cross-section that shows a liquid-crystal display device of IPS mode-type. The liquid-crystal display device shown in FIG. 6 comprises a liquid-crystal layer containing a liquid-crystal compound 61 and substrates 62A, 62B that sandwich them. The upper substrate 62A and the lower substrate 62B have each an orientation film (not shown) and an electrode layer (not shown). Polarizing films 64A, 64B, sandwiching the liquid-crystal cell, are disposed. The first optically anisotropic layers 63A, 63B and the second optically anisotropic layers (not shown) are respectively disposed between the polarizing films 64A or 64B and the liquid-crystal cell. Optionally, the first and the second optically anisotropic layers and the polarizing film are favorably integrated to utilize as an elliptical polarizing plate.

The first and the second optically anisotropic layers may be incorporated into liquid-crystal display devices as an integrated member or separate members. The first and the second optically anisotropic layers may be disposed between the liquid-crystal cell and the polarizing film of display side or between the liquid-crystal cell and the polarizing film of back-light side.

The transmissive axes TA5, TA6 of the polarizing films 64A, 64B are perpendicular each other and parallel with the phase-delay axes SA7, SA8 of the second optically anisotropic layers 63A, 63B.

The liquid-crystal cell of the liquid-crystal display device, shown in FIG. 6, is formed of the upper substrate 62A, lower substrate 62B, and the liquid-crystal layer sandwiched therebetween. An orientation film (not shown) is disposed on the surface of substrate 62A, 62B where the liquid-crystal layer contacts, the orientation film aligns the liquid-crystal compound 61 approximately in parallel to the surface of substrate 62A, 62B, and also the orientation of liquid-crystal molecules at applying no voltage or lower voltages is controlled by rubbing direction RD9, RD10 on the orientation film. In addition, an electrode (not shown) capable of applying a voltage to liquid-crystal molecules is formed inside the substrate 62A, 62B.

Figure 7:
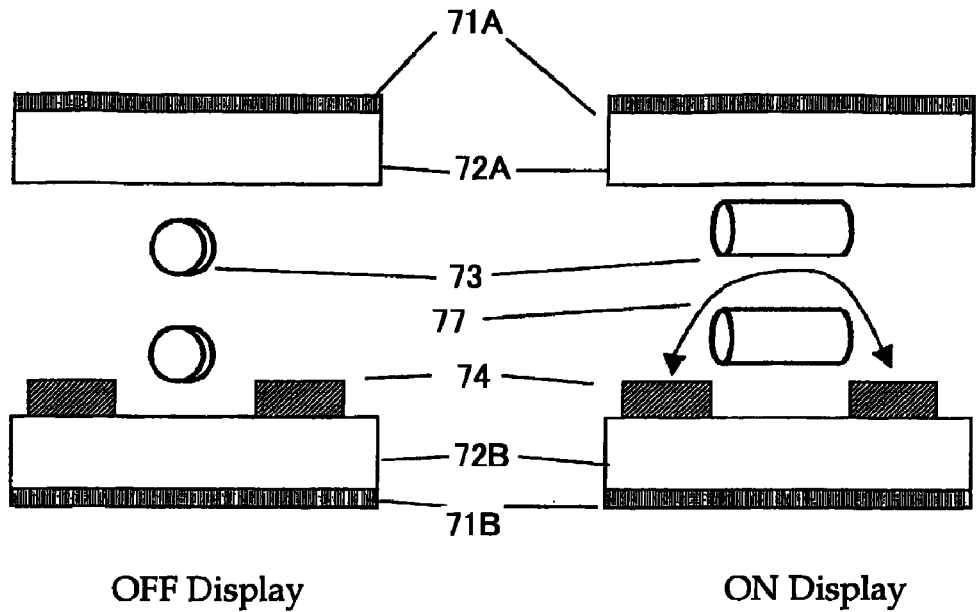
FIG. 7 is a schematic cross-section that shows an orientation of a liquid crystal compound in an IPS-mode liquid-crystal cell.

FIG. 7 is a schematic cross-section that shows orientation of liquid-crystal compounds in an IPS mode liquid-crystal cell, where a portion of pixels is shown within plural pixels with matrix-like electrodes. A linear electrode 74 is formed inside a pair of transparent substrates 71A, 71B, and a orientation-control film (not shown) is formed on the electrode 74. A rod-like liquid-crystal compound 73, sandwiched between substrate 71A and 71B, is aligned at applying no voltage such that the liquid-crystal compound 73 inclines some angle against the longitudinal direction of the linear electrode. The permittivity anisotropy of liquid crystals is envisaged as positive. When electric field 77 is applied, the liquid-crystal compound 73 aligns into the field direction. The optical transmissivity can be changed by arranging the polarizing plates 71A, 71B into a given angle. The angle between the surface of the lower substrate 71B and electric-field direction 77 is preferably no more than 20°, more preferably no more than 10° i.e. substantially parallel. In this specification, electric fields having an angle of no more than 20° are generically referred to as "parallel electric field". The linear electrode 74 may provide substantially the same effect whether the electrode is formed dividedly at upper and lower substrates or at only one substrate.

The liquid-crystal material utilized for the liquid-crystal display device of IPS mode-type is preferably nematic liquid crystals having a positive permittivity anisotropy $\Delta\epsilon$ and a thickness or gap of 2.8 µm to 4.5 µm of liquid-crystal layers. When the retardation $\Delta n \cdot d$ is adjusted between 0.25 µm to 0.32 µm, transmissive properties may be easily obtained with almost no wavelength dependency within visible-light range. The maximum transmissivity may be taken by combining the orientation film and the polarizing plate and rotating the liquid-crystal molecules at 45° from the rubbing direction to the electric-field direction. The thickness or gap of liquid-crystal layers may be adjusted by use of polymer beads. Needless to say, similar gaps may be obtained using glass beads, glass fibers, or columnar resin spacers. The liquid-crystal materials are preferably nematic liquid crystals. The larger is the permittivity anisotropy $\Delta\epsilon$, the more easily the driving voltage can be reduced; the smaller is the refractive index $\Delta n$, the thickness or gap of liquid-crystal layers can be thickened, the period for encapsulating liquid crystal can be shortened, and the gap fluctuation can be lessened.

FFS Mode-Type Liquid-Crystal Display Device

The optical compensation film of the first embodiment may be employed into liquid-crystal display devices of FFS-type having liquid crystals of FFS-mode.

Figure 8:
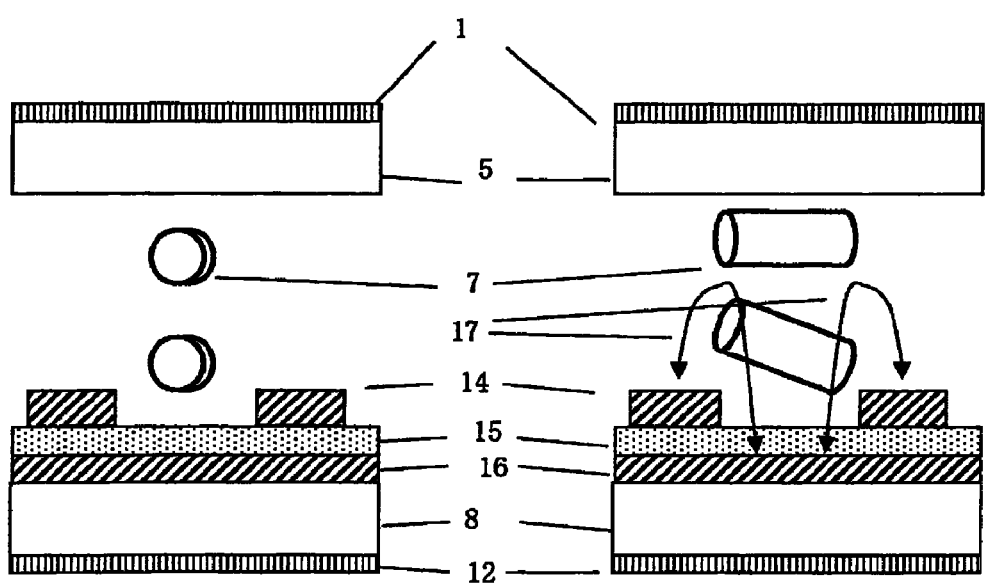
FIG. 8 is a schematic cross-section that shows an orientation of a liquid crystal compound in an FFS-mode liquid-crystal cell.

FIG. 8 is a schematic cross-section that shows an orientation of a liquid-crystal compound in a liquid-crystal cell of FFS-mode. The configuration is similar as the liquid-crystal cell of IPS-mode shown in FIG. 7, except that there exist an insulative layer 75 and an electrode 16 between the lower substrate 72B and the linear electrode 74.

The liquid-crystal display device of FFS-type has a configuration that a square electrode 16 and a linear electrode 74, and an insulative layer 75 therebetween. The traverse electric field generates with intervals of a few angstroms, thus the traverse electric field is typically sufficiently high to align the liquid-crystal molecules at upper electrode.

TN Mode-Type Liquid-Crystal Display Device

The optical compensation film of the first embodiment may be employed into liquid-crystal display devices of TN-type having liquid crystals of TN-mode. The liquid-crystal display devices of TN-type and liquid crystals of TN-mode may be conventional ones. The optical compensation films utilized for liquid-crystal display devices of TN-type are described in JP-A Nos. 03-9325, 06-148429, 08-50206 and 09-26572; "Mori et al., Jpn. J. Appl. Phys. vol. 36, p. 143 (1997), and Jpn. J. Appl. Phys. vol. 36, p. 1068 (1997)".

Second Embodiment

Optical Compensation Film

The optical compensation films of the second embodiment comprise an orientation film and an optically anisotropic layer containing a liquid-crystal compound.

The optical compensation films comprise at least two layers of, for example, a cellulose acylate film and an optically anisotropic layer having an in-plane anisotropy, preferably further comprise an orientation film to control the orientation of liquid-crystal compounds between the cellulose acylate film and the optically anisotropic layer. The cellulose film and the optically anisotropic layer may be of two or more sheets respectively. The "cellulose acylate film" encompasses cellulose acetate films.

The difference $\Delta\gamma s^d$ between $\gamma s^d_{(AL)}$ and $\gamma s^d_{(LC)}$ is no less than $-4.0$ erg/cm$^2$, wherein $\gamma s^d_{(AL)}$ is a dispersion force component of surface free energy of orientation film (AL), $\gamma s^d_{(LC)}$ is a dispersion force component of surface free energy of liquid-crystal compound (LC), and $\Delta\gamma s^d$ is calculated as follows:

$$\Delta\gamma s^d = \gamma s^d_{(LC)} - \gamma s^d_{(AL)} \qquad \text{Expression (A):}$$

The $\Delta\gamma s^d$ is no less than $-4.0$ erg/cm$^2$, preferably no less than $-1.0$ erg/cm$^2$, more preferably $0.0$ erg/cm$^2$ to $3.0$ erg/cm$^2$.

The surface free energy can be determined with reference to "D. K. Owens, J. Appl. Polym. Sci. 13, 1741 (1969)" on the basis of contact angles $\theta_{H2O}$ for pure water and $\theta_{CH2I2}$ for methylene iodide using the simultaneous expressions (1) and (2). When the contact angles $\theta_{GL}$ for glycerin is measured in place of pure water, simultaneous expressions (2) and (3) are employed.

Simultaneous Expression $$1+\cos\theta_{H2O} = 2\sqrt{\gamma s^d (\gamma_{H2O}{}^d/\gamma_{H2O}{}^v)^{1/2}} + 2\sqrt{\gamma s^h (\gamma_{H2O}{}^h/\gamma_{H2O}{}^v)^{1/2}} \qquad (1)$$

$$1+\cos\theta_{CH2I2} = 2\sqrt{\gamma s^d (\gamma_{CH2I2}{}^d/\gamma_{CH2I2}{}^v)^{1/2}} + 2\sqrt{\gamma s^h (\gamma_{CH2I2}{}^h/\gamma_{CH2I2}{}^v)^{1/2}}, \gamma_{H2O}{}^d=21.8, \gamma_{H2O}{}^h=51.0, \gamma_{H2O}{}^v=72.8, \gamma_{CH2I2}{}^d=49.5, \gamma_{CH2I2}{}^h=1.3, \gamma_{CH2I2}{}^v=50.8 \qquad (2)$$

$$1+\cos\theta_{GL} = 2\sqrt{\gamma s^d (\gamma_{GL}{}^d/\gamma_{GL}{}^v)^{1/2}} + 2\sqrt{\gamma s^h (\gamma_{GL}{}^h/\gamma_{GL}{}^v)^{1/2}}, \gamma_{GL}{}^d=37.4, \gamma_{GL}{}^h=26.0, \gamma_{GL}{}^v=63.4, GL: \text{glycerin} \qquad (3)$$

In the simultaneous expressions, $\gamma s^d$ and $\gamma s^h$ respectively correspond to the dispersion force component and the hydrogen bond component of surface free energy, and the total value $\gamma s^v (=\gamma s^d + \gamma s^h)$ is defined as the surface free energy.

The contact angle is measured in a way that samples are humidity-conditioned in a condition of 25° C. and 60% for 24 hours, then 10 μl of pure water, glycerin or methylene iodide is dropped under the condition on the surface of samples and the angle is measured after 30 seconds using Drop Master 500 (by Kyowa Interface Science Co.).

Optically Anisotropic Layer

The site to form the optically anisotropic layer may be properly selected depending on the application; preferably, an orientation film is formed on the cellulose acylate film and the optically anisotropic layer is formed on the orientation film. In addition, an optically anisotropic layer is formed on other substrate then the optically anisotropic layer may be transferred on the cellulose acylate film using adhesives etc.

The liquid-crystal compound in optically anisotropic layers may be properly selected depending on the application; the liquid-crystal compound may be one of rod-like or discotic liquid-crystal compounds.

The rod-like or discotic liquid-crystal compounds may be polymers or lower-molecular weight compounds. The compounds in the resulted optically anisotropic layers may be of non-liquid crystal. Specifically, such cases are allowable that lower molecular weight compounds are utilized to prepare optically anisotropic layers, and the lower molecular weight compounds lose the liquid crystalline state.

Rod-Like Liquid Crystal Compound

The rod-like liquid crystal compound may be azomethines, azoxys, cyanobiphenyls, cyanophenylesters, benzoic esters, cyclohexane carboxylic phenylesters, cyanophenylcyclohexanes, cyano-substituted phenylpyrimidine, alkoxy-substituted phenylpyrimidine, phenyldioxane, tolanes, and alkenyl cyclohexylbenzonitrile.

The rod-like liquid-crystal compounds may be a metal complex or an liquid-crystal polymer that contains the portion of rod-like liquid-crystal compounds as a repeating unit.

The rod-like liquid-crystal compounds are described, for example, in "Kikan Kagaku Review, vol. 22, Liquid Crystal Chemistry (1994), Japanese Chemical Society, Chapter 4, 7, 11", "Liquid Crystal Device Handbook, by Japan Society for the Promotion of Science, Chapter 3".

The double-reflex index of rod-like liquid-crystal compounds is preferably 0.001 to 0.7. It is preferred that the rod-like liquid-crystal compounds have a polymerizable group in order to fix the orientation condition. Preferable polymerizable groups are unsaturated polymerizable groups or epoxy groups, more preferable are unsaturated groups and in particular ethylenically unsaturated polymerizable groups.

Discotic Liquid-Crystal Compound

The discotic liquid-crystal compounds in the second embodiment may be the same as those of the first embodiment. The discotic liquid-crystal compounds may be expressed by the general formula (DI) or (DII), which are exemplified more specifically in the following, but not limited to.

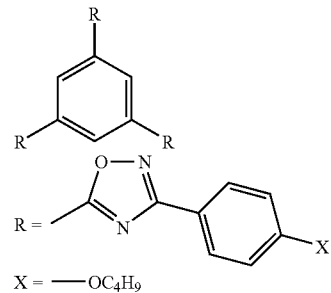

X = —OC$_4$H$_9$
D-1
—OC$_5$H$_{11}$
D-2
—OC$_6$H$_{13}$
D-3
—OC$_7$H$_{15}$
D-4
—OC$_8$H$_{17}$
D-5
—OCH$_2$CH(CH$_3$)C$_4$H$_9$
D-6
—O(CH$_2$)$_2$OCOCH═CH$_2$
D-7
—O(CH$_2$)$_3$OCOCH═CH$_2$
D-8
—O(CH$_2$)$_4$OCOCH═CH$_2$
D-9
—O(CH$_2$)$_5$OCOCH═CH$_2$
D-10
—O(CH$_2$)$_6$OCOCH═CH$_2$
D-11

—O(CH₂)₇OCOCH=CH₂

D-12

—O(CH₂)₈OCOCH=CH₂

D-13

—O(CH₂)₂CH(CH₃)OCOCH=CH₂

D-14

—O(CH₂)₃CH(CH₃)OCOCH=CH₂

D-15

—O(CH₂CH₂O)₂COCH=CH₂

D-16

—O(CH₂)₄OCOC(CH₃)=CH₂

D-17

—O(CH₂)₄OCOCH=CHCH₃

D-18

—O(CH₂)₄OCH=CH₂

D-19

—O(CH₂)₄—CH—CH₂
               \O/

D-20

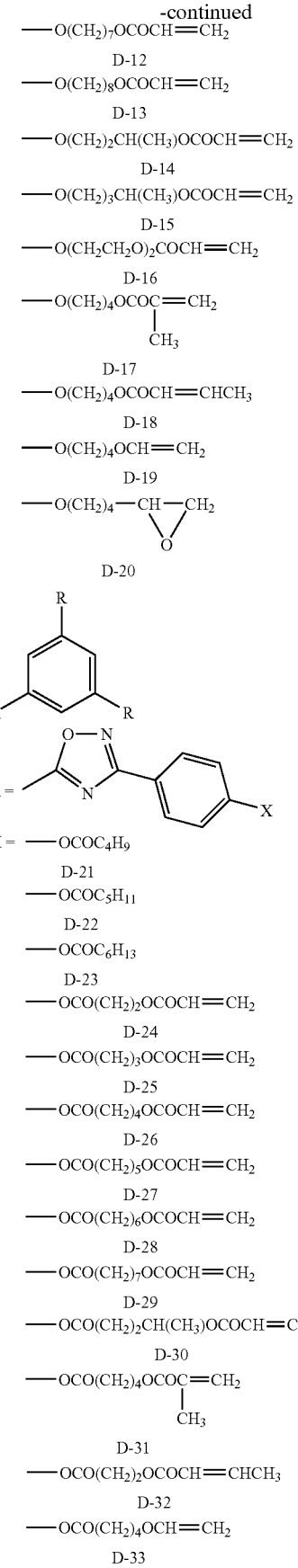

X = —OCOC₄H₉

D-21

—OCOC₅H₁₁

D-22

—OCOC₆H₁₃

D-23

—OCO(CH₂)₂OCOCH=CH₂

D-24

—OCO(CH₂)₃OCOCH=CH₂

D-25

—OCO(CH₂)₄OCOCH=CH₂

D-26

—OCO(CH₂)₅OCOCH=CH₂

D-27

—OCO(CH₂)₆OCOCH=CH₂

D-28

—OCO(CH₂)₇OCOCH=CH₂

D-29

—OCO(CH₂)₂CH(CH₃)OCOCH=CH₂

D-30

—OCO(CH₂)₄OCOC(CH₃)=CH₂

D-31

—OCO(CH₂)₂OCOCH=CHCH₃

D-32

—OCO(CH₂)₄OCH=CH₂

D-33

—OCO(CH₂)₄—CH—CH₂
                \O/

D-34

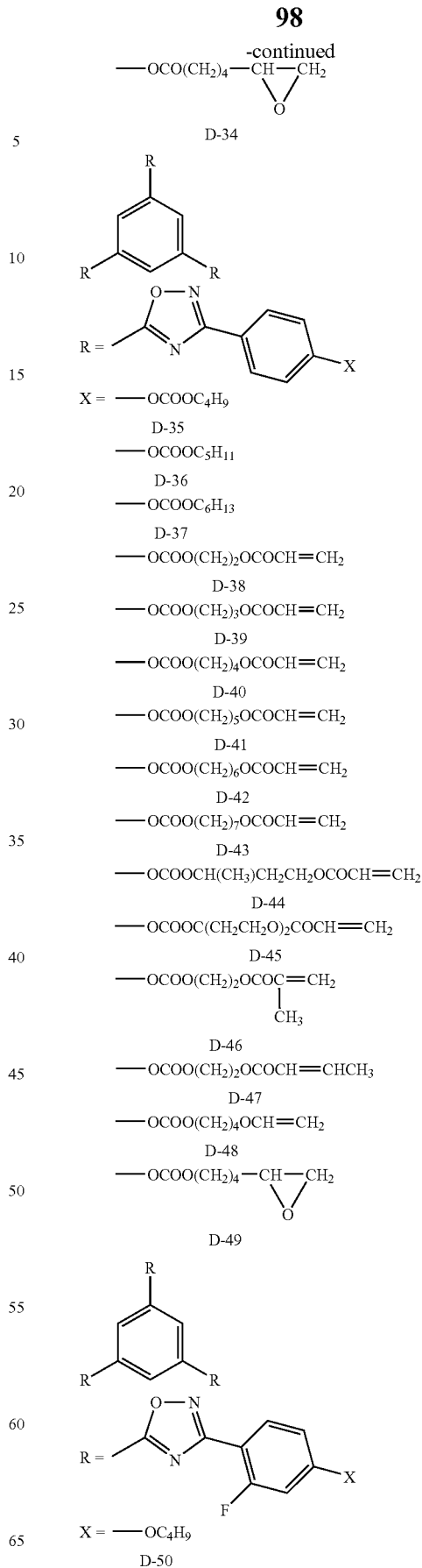

X = —OCOOC₄H₉

D-35

—OCOOC₅H₁₁

D-36

—OCOOC₆H₁₃

D-37

—OCOO(CH₂)₂OCOCH=CH₂

D-38

—OCOO(CH₂)₃OCOCH=CH₂

D-39

—OCOO(CH₂)₄OCOCH=CH₂

D-40

—OCOO(CH₂)₅OCOCH=CH₂

D-41

—OCOO(CH₂)₆OCOCH=CH₂

D-42

—OCOO(CH₂)₇OCOCH=CH₂

D-43

—OCOOCH(CH₃)CH₂CH₂OCOCH=CH₂

D-44

—OCOOC(CH₂CH₂O)₂COCH=CH₂

D-45

—OCOO(CH₂)₂OCOC=CH₂
                  |
                  CH₃

D-46

—OCOO(CH₂)₂OCOCH=CHCH₃

D-47

—OCOO(CH₂)₄OCH=CH₂

D-48

—OCOO(CH₂)₄—CH—CH₂
                 \O/

D-49

X = —OC₄H₉

D-50

-continued

—OC$_5$H$_{11}$
D-51
—OC$_6$H$_{13}$
D-52
—OC$_7$H$_{15}$
D-53
—OC$_8$H$_{17}$
D-54
—OCH$_2$CH(CH$_3$)C$_4$H$_9$
D-55
—O(CH$_2$)$_2$OCOCH=CH$_2$
D-56
—O(CH$_2$)$_3$OCOCH=CH$_2$
D-57
—O(CH$_2$)$_4$OCOCH=CH$_2$
D-58
—O(CH$_2$)$_5$OCOCH=CH$_2$
D-59
—O(CH$_2$)$_6$OCOCH=CH$_2$
D-60
—O(CH$_2$)$_7$OCOCH=CH$_2$
D-61
—O(CH$_2$)$_8$OCOCH=CH$_2$
D-62
—O(CH$_2$)$_2$CH(CH$_3$)OCOCH=CH$_2$
D-63
—O(CH$_2$)$_3$CH(CH$_3$)OCOCH=CH$_2$
D-64
—O(CH$_2$CH$_2$O)$_2$COCH=CH$_2$
D-65
—O(CH$_2$)$_4$OCOC=CH$_2$
        |
        CH$_3$
D-66
—O(CH$_2$)$_4$OCOCH=CHCH$_3$
D-67
—O(CH$_2$)$_4$OCH=CH$_2$
D-68
—O(CH$_2$)$_4$—CH—CH$_2$
              \ /
               O
D-69

X = —OCOC$_4$H$_9$
D-70
—OCOC$_5$H$_{11}$
D-71
—OCOC$_6$H$_{13}$
D-72

-continued

—OCO(CH$_2$)$_2$OCOCH=CH$_2$
D-73
—OCO(CH$_2$)$_3$OCOCH=CH$_2$
D-74
—OCO(CH$_2$)$_4$OCOCH=CH$_2$
D-75
—OCO(CH$_2$)$_5$OCOCH=CH$_2$
D-76
—OCO(CH$_2$)$_6$OCOCH=CH$_2$
D-77
—OCO(CH$_2$)$_7$OCOCH=CH$_2$
D-78
—OCO(CH$_2$)$_2$CH(CH$_3$)OCOCH=CH$_2$
D-79
—OCO(CH$_2$)$_4$OCOC=CH$_2$
          |
          CH$_3$
D-80
—OCO(CH$_2$)$_2$OCOCH=CHCH$_3$
D-81
—OCO(CH$_2$)$_4$OCH=CH$_2$
D-82
—OCO(CH$_2$)$_4$—CH—CH$_2$
                \ /
                 O
D-83

X = —OCOOC$_4$H$_9$
D-84
—OCOOC$_5$H$_{11}$
D-85
—OCOOC$_6$H$_{13}$
D-86
—OCOO(CH$_2$)$_2$OCOCH=CH$_2$
D-87
—OCOO(CH$_2$)$_3$OCOCH=CH$_2$
D-88
—OCOO(CH$_2$)$_4$OCOCH=CH$_2$
D-89
—OCOO(CH$_2$)$_5$OCOCH=CH$_2$
D-90
—OCOO(CH$_2$)$_6$OCOCH=CH$_2$
D-91
—OCOO(CH$_2$)$_7$OCOCH=CH$_2$
D-92
—OCOOCH(CH$_3$)CH$_2$CH$_2$OCOCH=CH$_2$
D-93
—OCOOC(CH$_2$CH$_2$O)$_2$COCH=CH$_2$
D-94

-continued

—OCOO(CH₂)₂OCOC=CH₂
          |
          CH₃
D-95

—OCOO(CH₂)₂OCOCH=CHCH₃
D-96

—OCOO(CH₂)₄OCH=CH₂
D-97

—OCOO(CH₂)₄—CH—CH₂
              \ /
               O
D-98

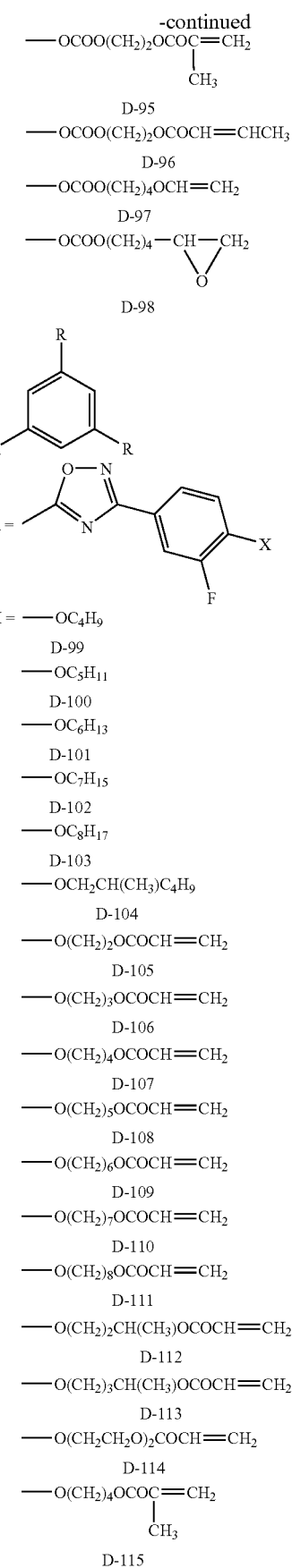

X = —OC₄H₉
D-99
—OC₅H₁₁
D-100
—OC₆H₁₃
D-101
—OC₇H₁₅
D-102
—OC₈H₁₇
D-103
—OCH₂CH(CH₃)C₄H₉
D-104
—O(CH₂)₂OCOCH=CH₂
D-105
—O(CH₂)₃OCOCH=CH₂
D-106
—O(CH₂)₄OCOCH=CH₂
D-107
—O(CH₂)₅OCOCH=CH₂
D-108
—O(CH₂)₆OCOCH=CH₂
D-109
—O(CH₂)₇OCOCH=CH₂
D-110
—O(CH₂)₈OCOCH=CH₂
D-111
—O(CH₂)₂CH(CH₃)OCOCH=CH₂
D-112
—O(CH₂)₃CH(CH₃)OCOCH=CH₂
D-113
—O(CH₂CH₂O)₂COCH=CH₂
D-114
—O(CH₂)₄OCOC=CH₂
          |
          CH₃
D-115

-continued

—O(CH₂)₄OCOCH=CHCH₃
D-116

—O(CH₂)₄OCH=CH₂
D-117

—O(CH₂)₄—CH—CH₂
           \ /
            O
D-118

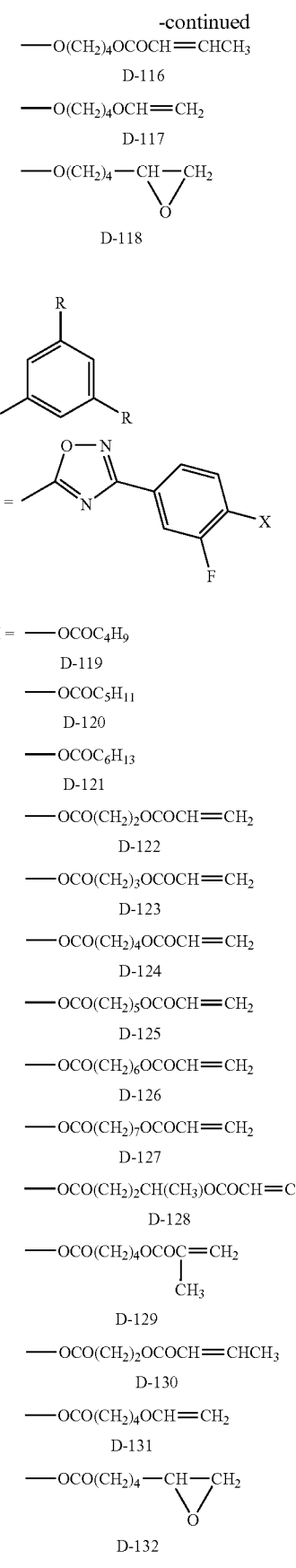

X = —OCOC₄H₉
D-119
—OCOC₅H₁₁
D-120
—OCOC₆H₁₃
D-121
—OCO(CH₂)₂OCOCH=CH₂
D-122
—OCO(CH₂)₃OCOCH=CH₂
D-123
—OCO(CH₂)₄OCOCH=CH₂
D-124
—OCO(CH₂)₅OCOCH=CH₂
D-125
—OCO(CH₂)₆OCOCH=CH₂
D-126
—OCO(CH₂)₇OCOCH=CH₂
D-127
—OCO(CH₂)₂CH(CH₃)OCOCH=CH₂
D-128
—OCO(CH₂)₄OCOC=CH₂
             |
             CH₃
D-129
—OCO(CH₂)₂OCOCH=CHCH₃
D-130
—OCO(CH₂)₄OCH=CH₂
D-131
—OCO(CH₂)₄—CH—CH₂
              \ /
               O
D-132

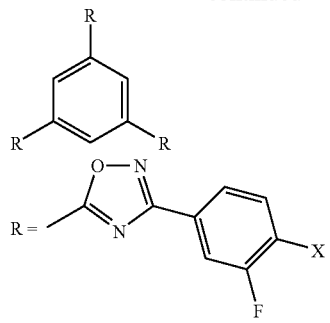

X= —OCOOC$_4$H$_9$
D-133
—OCOOC$_5$H$_{11}$
D-134
—OCOOC$_6$H$_{13}$
D-135
—OCOO(CH$_2$)$_2$OCOCH=CH$_2$
D-136
—OCOO(CH$_2$)$_3$OCOCH=CH$_2$
D-137
—OCOO(CH$_2$)$_4$OCOCH=CH$_2$
D-138
—OCOO(CH$_2$)$_5$OCOCH=CH$_2$
D-139
—OCOO(CH$_2$)$_6$OCOCH=CH$_2$
D-140
—OCOO(CH$_2$)$_7$OCOCH=CH$_2$
D-141
—OCOOCH(CH$_3$)CH$_2$CH$_2$OCOCH=CH$_2$
D-142
—OCOOC(CH$_2$CH$_2$O)$_2$COCH=CH$_2$
D-143
—OCOO(CH$_2$)$_2$OCOC=CH$_2$
         |
         CH$_3$
D-144
—OCOO(CH$_2$)$_2$OCOCH=CHCH$_3$
D-145
—OCOO(CH$_2$)$_4$OCH=CH$_2$
D-146
—OCOO(CH$_2$)$_4$—CH—CH$_2$
                   \ /
                    O
D-147

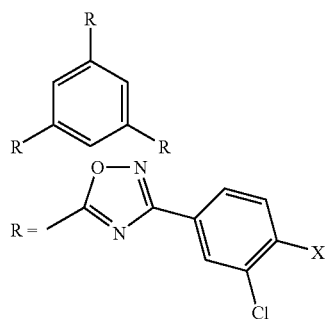

X= —OC$_6$H$_{13}$
D-148
—OCOC$_5$H$_{11}$
D-149

—OCOOC$_4$H$_9$
D-150
—O(CH$_2$)$_4$OCOCH=CH$_2$
D-151
—O(CH$_2$)$_6$OCOCH=CH$_2$
D-152
—OCO(CH$_2$)$_3$OCOCH=CH$_2$
D-153
—OCO(CH$_2$)$_4$OCOCH=CH$_2$
D-154
—OCOO(CH$_2$)$_2$OCOCH=CH$_2$
D-155
—OCOO(CH$_2$)$_4$OCOCH=CH$_2$
D-156

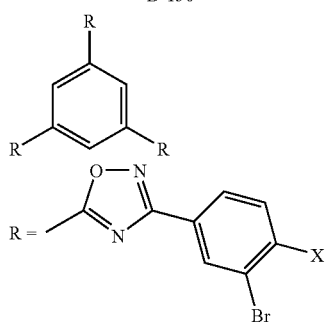

X= —OC$_6$H$_{13}$
D-157
—OCOC$_5$H$_{11}$
D-158
—OCOOC$_4$H$_9$
D-159
—O(CH$_2$)$_4$OCOCH=CH$_2$
D-160
—O(CH$_2$)$_6$OCOCH=CH$_2$
D-161
—OCO(CH$_2$)$_3$OCOCH=CH$_2$
D-162
—OCO(CH$_2$)$_4$OCOCH=CH$_2$
D-163
—OCOO(CH$_2$)$_2$OCOCH=CH$_2$
D-164
—OCOO(CH$_2$)$_4$OCOCH=CH$_2$
D-165

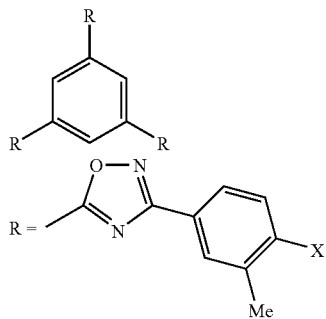

X= —OC$_6$H$_{13}$
D-166
—OCOC$_5$H$_{11}$
D-167

-continued

—OCOOC₄H₉
D-168
—O(CH₂)₄OCOCH=CH₂
D-169
—O(CH₂)₆OCOCH=CH₂
D-170
—OCO(CH₂)₃OCOCH=CH₂
D-171
—OCO(CH₂)₄OCOCH=CH₂
D-172
—OCOO(CH₂)₂OCOCH=CH₂
D-173
—OCOO(CH₂)₄OCOCH=CH₂
D-174

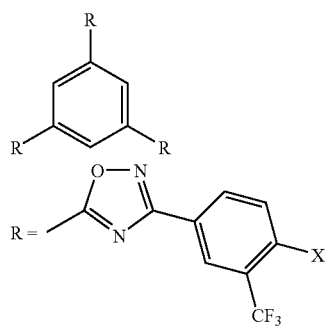

X = —OC₆H₁₃
D-175
—OCOC₅H₁₁
D-176
—OCOOC₄H₉
D-178
—O(CH₂)₄OCOCH=CH₂
D-179
—O(CH₂)₆OCOCH=CH₂
D-180
—OCO(CH₂)₃OCOCH=CH₂
D-181
—OCO(CH₂)₄OCOCH=CH₂
D-182
—OCOO(CH₂)₂OCOCH=CH₂
D-183
—OCOO(CH₂)₄OCOCH=CH₂
D-184

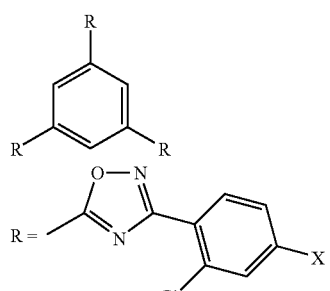

X = —OC₆H₁₃
D-185
—OCOC₅H₁₁
D-186

-continued

—OCOOC₄H₉
D-187
—O(CH₂)₄OCOCH=CH₂
D-188
—O(CH₂)₆OCOCH=CH₂
D-189
—OCO(CH₂)₃OCOCH=CH₂
D-190
—OCO(CH₂)₄OCOCH=CH₂
D-191
—OCOO(CH₂)₂OCOCH=CH₂
D-192
—OCOO(CH₂)₄OCOCH=CH₂
D-193

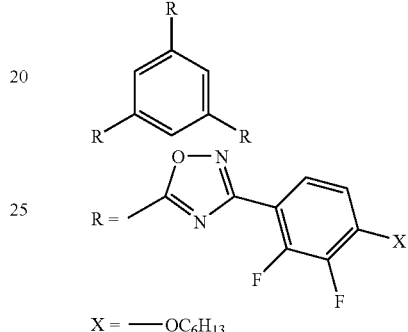

X = —OC₆H₁₃
D-194
—OCOC₅H₁₁
D-195
—OCOOC₄H₉
D-196
—O(CH₂)₄OCOCH=CH₂
D-197
—O(CH₂)₆OCOCH=CH₂
D-198
—OCO(CH₂)₃OCOCH=CH₂
D-199
—OCO(CH₂)₄OCOCH=CH₂
D-200
—OCOO(CH₂)₂OCOCH=CH₂
D-201
—OCOO(CH₂)₄OCOCH=CH₂
D-202

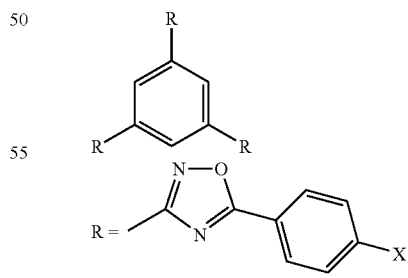

X = —OC₆H₁₃
D-203
—OCOC₅H₁₁
D-204
—OCOOC₄H₉
D-205

-continued

—O(CH₂)₄OCOCH=CH₂
D-206
—O(CH₂)₆OCOCH=CH₂
D-207
—OCO(CH₂)₃OCOCH=CH₂
D-208
—OCO(CH₂)₄OCOCH=CH₂
D-209
—OCOO(CH₂)₂OCOCH=CH₂
D-210
—OCOO(CH₂)₄OCOCH=CH₂
D-211

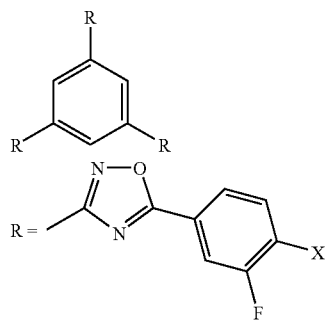

X = —OC₆H₁₃
D-212
—OCOC₅H₁₁
D-213
—OCOOC₄H₉
D-214
—O(CH₂)₄OCOCH=CH₂
D-215
—O(CH₂)₆OCOCH=CH₂
D-216
—OCO(CH₂)₃OCOCH=CH₂
D-217
—OCO(CH₂)₄OCOCH=CH₂
D-218
—OCOO(CH₂)₂OCOCH=CH₂
D-219
—OCOO(CH₂)₄OCOCH=CH₂
D-220

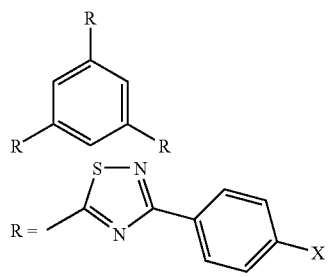

X = —OC₆H₁₃
D-221
—OCOC₅H₁₁
D-222
—OCOOC₄H₉
D-223
—O(CH₂)₆OCOCH=CH₂
D-224

-continued

—OCO(CH₂)₃OCOCH=CH₂
D-225
—OCOO(CH₂)₄OCOCH=CH₂
D-226

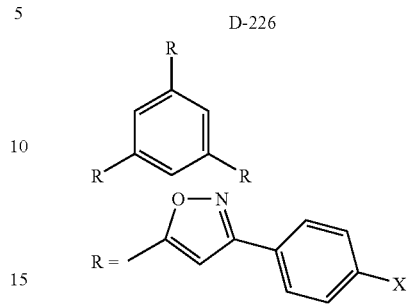

X = —OC₆H₁₃
D-227
—OCOC₅H₁₁
D-228
—OCOOC₄H₉
D-229
—O(CH₂)₆OCOCH=CH₂
D-230
—OCO(CH₂)₃OCOCH=CH₂
D-231
—OCOO(CH₂)₄OCOCH=CH₂
D-238

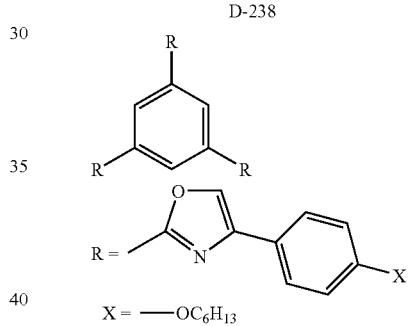

X = —OC₆H₁₃
D-233
—OCOC₅H₁₁
D-234
—OCOOC₄H₉
D-235
—O(CH₂)₆OCOCH=CH₂
D-236
—OCO(CH₂)₃OCOCH=CH₂
D-237
—OCOO(CH₂)₄OCOCH=CH₂
D-238

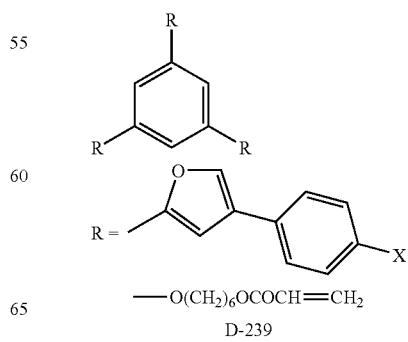

—O(CH₂)₆OCOCH=CH₂
D-239

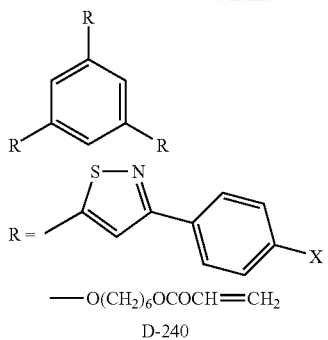
—O(CH₂)₆OCOCH=CH₂
D-240
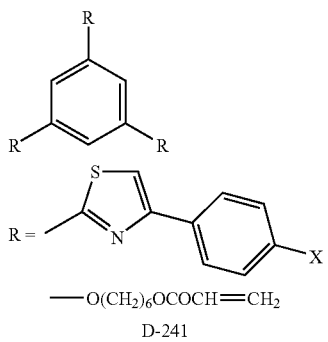
—O(CH₂)₆OCOCH=CH₂
D-241
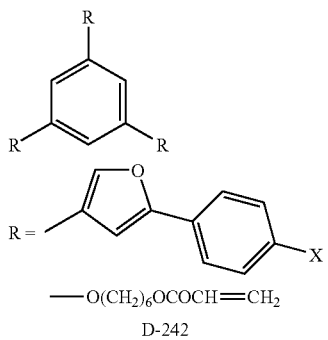
—O(CH₂)₆OCOCH=CH₂
D-242
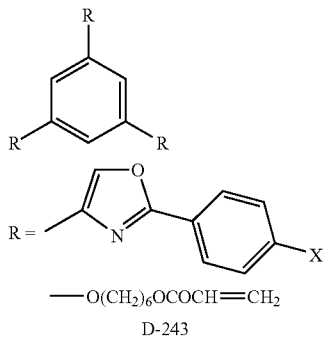
—O(CH₂)₆OCOCH=CH₂
D-243
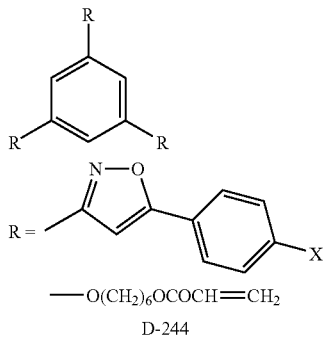
—O(CH₂)₆OCOCH=CH₂
D-244
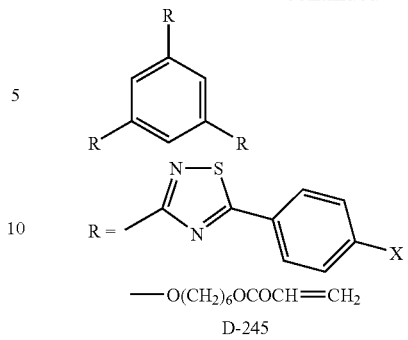
—O(CH₂)₆OCOCH=CH₂
D-245
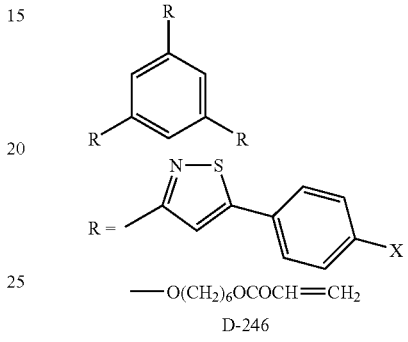
—O(CH₂)₆OCOCH=CH₂
D-246
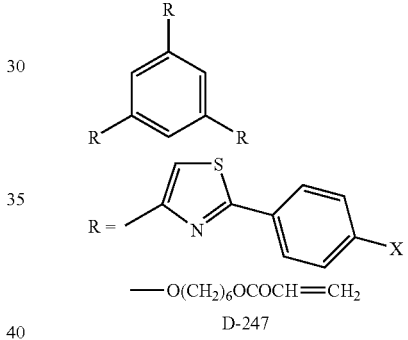
—O(CH₂)₆OCOCH=CH₂
D-247
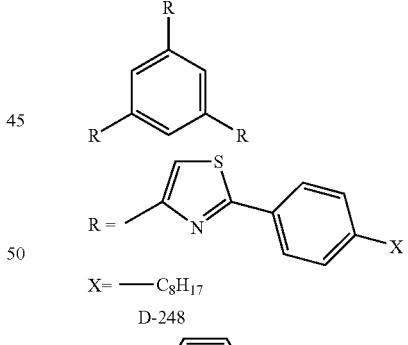
X= —C₈H₁₇
D-248
—⌬—OC₈H₁₇
D-249
—⌬—C₅H₁₁
D-250
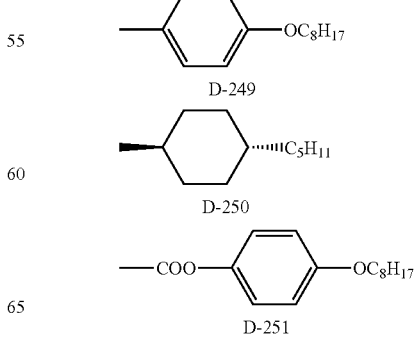
—COO—⌬—OC₈H₁₇
D-251

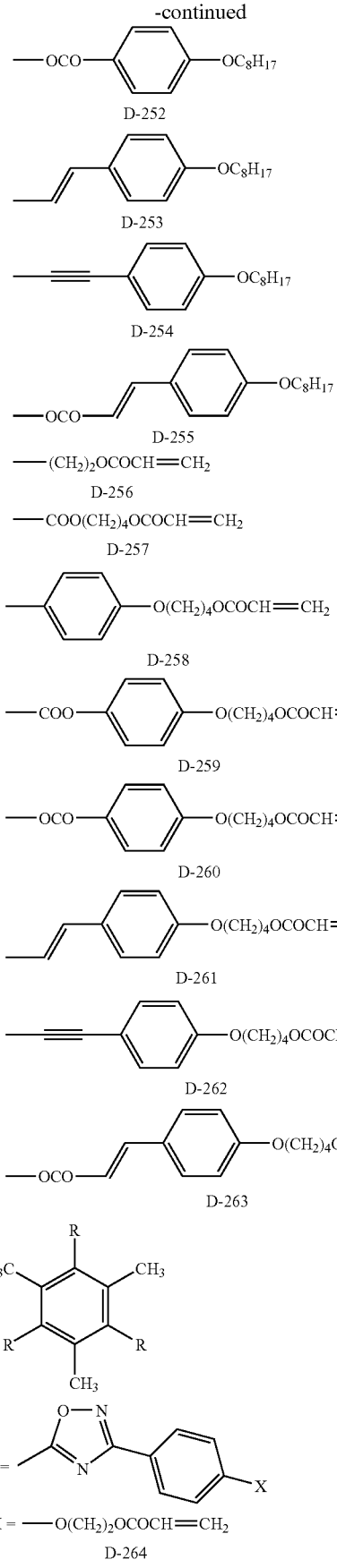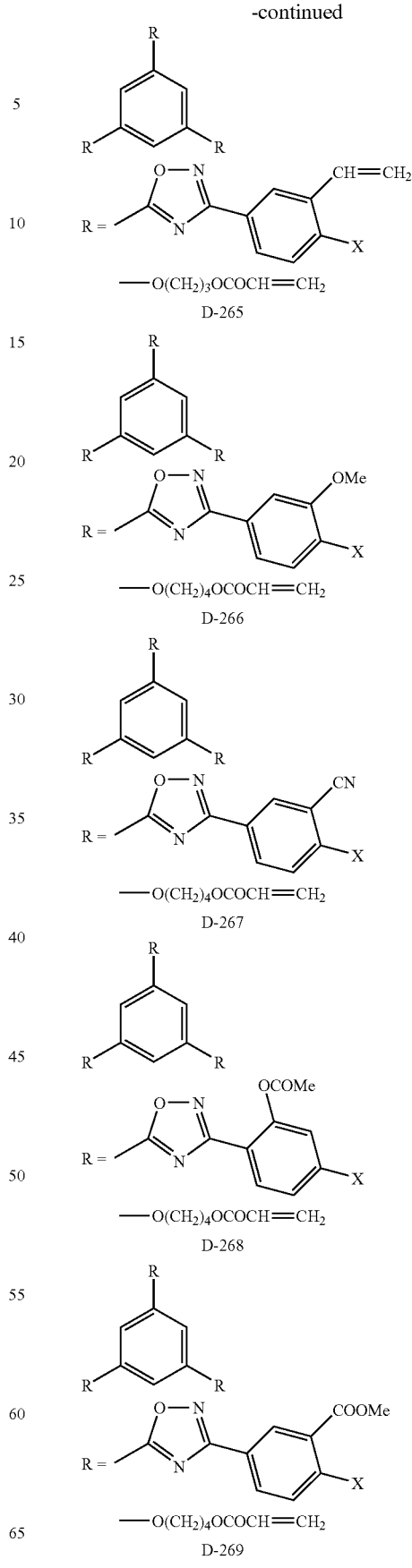

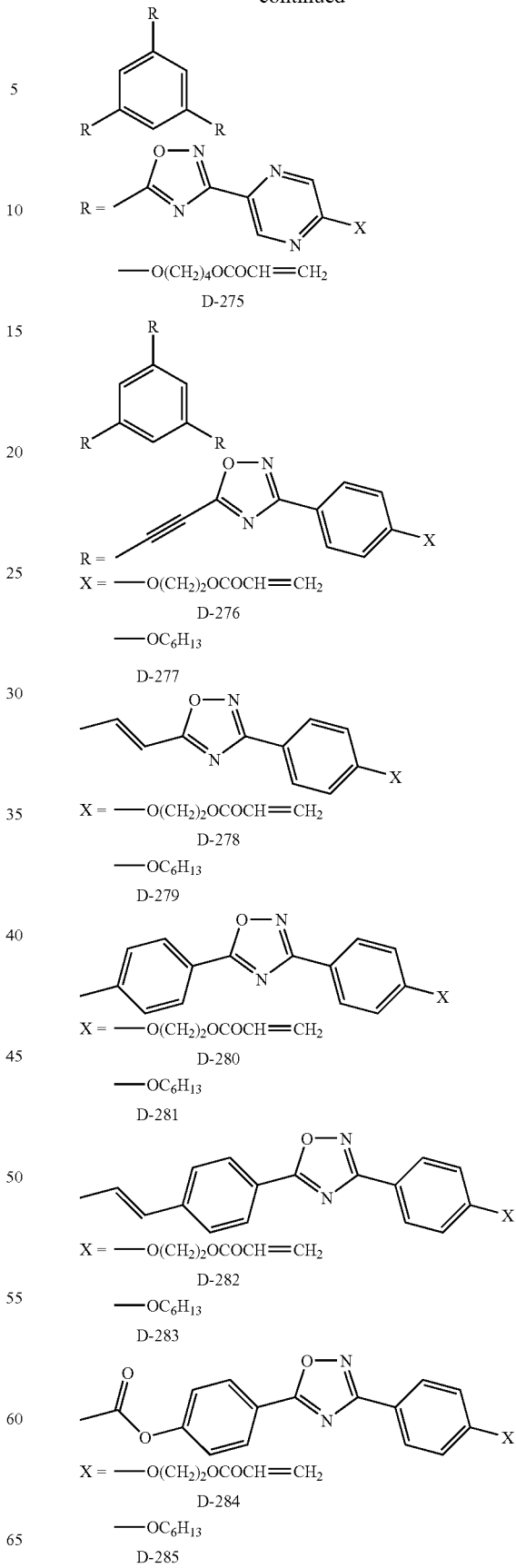

-continued

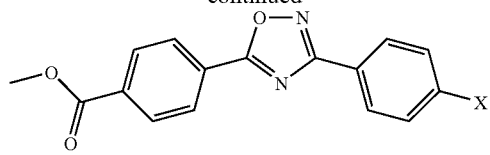

X = —O(CH₂)₂OCOCH=CH₂
D-286
—OC₆H₁₃
D-287

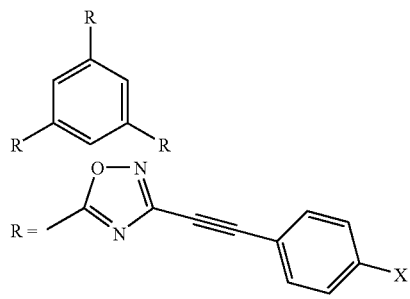

X = —O(CH₂)₂OCOCH=CH₂
D-287
—OC₆H₁₃
D-288

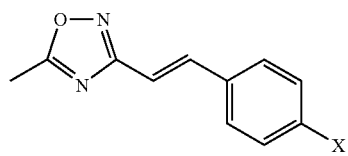

X = —O(CH₂)₂OCOCH=CH₂
D-289
—OC₆H₁₃
D-290

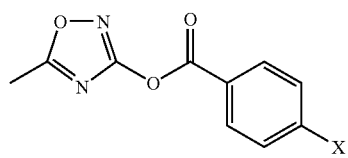

X = —O(CH₂)₂OCOCH=CH₂
D-291
—OC₆H₁₃
D-292

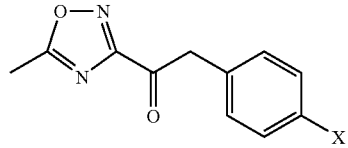

X = —O(CH₂)₂OCOCH=CH₂
D-293
—OC₆H₁₃
D-294

-continued

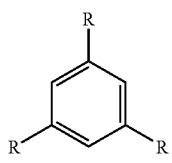

X = —OC₆H₁₃
D-295
—OCOC₅H₁₁
D-296
—OCOOC₄H₉
D-297
—O(CH₂)₄OCOCH=CH₂
D-298
—O(CH₂)₅OCOCH=CH₂
D-299
—OCO(CH₂)₃OCOCH=CH₂
D-300
—OCO(CH₂)₄OCOCH=CH₂
D-301
—OCOO(CH₂)₂OCOCH=CH₂
D-302
—OCOO(CH₂)₄OCOCH=CH₂
D-303
—OCOO(CH₂CH₂O)₂COCH=CH₂
D-304

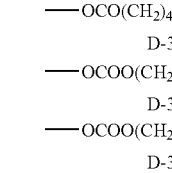

X = —OC₆H₁₃
D-305
—OCOC₅H₁₁
D-306
—OCOOC₄H₉
D-307
—O(CH₂)₄OCOCH=CH₂
D-308
—O(CH₂)₅OCOCH=CH₂
D-309
—OCO(CH₂)₃OCOCH=CH₂
D-310
—OCO(CH₂)₄OCOCH=CH₂
D-311
—OCOO(CH₂)₂OCOCH=CH₂
D-312

-continued

—OCOO(CH₂)₄OCOCH=CH₂
D-313

—OCOO(CH₂CH₂O)₂COCH=CH₂
D-314

[Structure: 1,3,5-trisubstituted benzene with 1,2,4-oxadiazole linked to naphthalene bearing X substituent at position 6]

X = —OC₆H₁₃
D-315

—OCOC₅H₁₁
D-316

—OCOOC₄H₉
D-317

—O(CH₂)₄OCOCH=CH₂
D-318

—O(CH₂)₅OCOCH=CH₂
D-319

—OCO(CH₂)₃OCOCH=CH₂
D-320

—OCO(CH₂)₄OCOCH=CH₂
D-321

—OCOO(CH₂)₂OCOCH=CH₂
D-322

—OCOO(CH₂)₄OCOCH=CH₂
D-323

—OCOO(CH₂CH₂O)₂COCH=CH₂
D-324

[Structure: 1,3,5-trisubstituted benzene with 1,2,4-oxadiazole linked to naphthalene bearing X substituent]

X = —O(CH₂)₄OCOCH=CH₂
D-325

—OCOO(CH₂)₄OCOCH=CH₂
D-326

—OCOO(CH₂CH₂O)₂COCH=CH₂
D-327

-continued

[Structure: 1,3,5-trisubstituted benzene with 1,2,4-oxadiazole linked to naphthalene bearing X substituent at position 6]

X = —O(CH₂)₄OCOCH=CH₂
D-328

—OCOO(CH₂)₄OCOCH=CH₂
D-329

—OCOO(CH₂CH₂O)₂COCH=CH₂
D-330

[Structure: 1,3,5-trisubstituted benzene with 1,2,4-oxadiazole linked to phenyl bearing X substituent at meta position]

X = —COOC₄H₉
D-331

—COOC₅H₁₁
D-332

—COOC₆H₁₃
D-333

—COO(CH₂)₂OCOCH=CH₂
D-334

—COO(CH₂)₃OCOCH=CH₂
D-335

—COO(CH₂)₄OCOCH=CH₂
D-336

—COO(CH₂)₅OCOCH=CH₂
D-337

—COO(CH₂)₆OCOCH=CH₂
D-338

—COO(CH₂)₇OCOCH=CH₂
D-339

—COO(CH₂)₈OCOCH=CH₂
D-340

—COO(CH₂CH₂O)₂COCH=CH₂
D-341

—COO(CH₂)₂CH(CH₃)OCOCH=CH₂
D-342

—COO(CH₂)₃CH(CH₃)OCOCH=CH₂
D-343

—COO(CH₂)₄CH(CH₃)OCOCH=CH₂
D-344

—COOCH₂CH(CH₃)CH₂OCOCH=CH₂
D-345

—COO(CH₂)₂CH(CH₃)(CH₂)₂OCOCH=CH₂
D-346

-continued

—COOCH(CH₃)(CH₂)₂OCOCH=CH₂

D-347

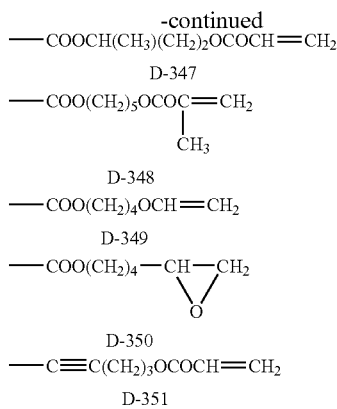

D-348

—COO(CH₂)₄OCH=CH₂

D-349

—COO(CH₂)₄—CH—CH₂
\\ /
O

D-350

—C≡C(CH₂)₃OCOCH=CH₂

D-351

The liquid-crystal layers expressed by the liquid crystal compounds and the expression temperatures are similar with those of the first embodiment.

In the second embodiment of the present invention, the rod-like liquid-crystal compounds or the disc-like liquid-crystal compounds are fixed into an orientation condition in the optically anisotropic layers. The orientation-average direction of molecular symmetric axes of these liquid-crystal compounds at the interface with the cellulose acylate film represents about 0° or 45° as the cross-link angle with an in-plane phase-delay axis of cellulose acylate films.

The term "about" allows a range of ±5° to the related angle, preferably ±3°, preferably ±2°. The average direction of molecular symmetric axes of liquid-crystal compounds in the optically anisotropic layers is preferably −2° to +2°, more preferably 43° to 47° from the longitudinal direction or pro-gressing-phase axis of supports.

In this embodiment, the terms of 0°, 45°, parallel, and perpendicular allow each a range of ±5° to the strict angle. The difference from the strict angle is preferably less than 4°, more preferably less than 3°. The mark + in terms of angles indicates clockwise direction, and the mark − indicates anti-clockwise direction. The term "phase-delay axis" means the direction at which the refractive index is the highest. The "visible light" region corresponds to 380 to 780 nm. The refractive indices are those measured at wavelength 550 nm unless indicated otherwise.

In cases where molecules have a rotational symmetry axis, the term "molecular symmetric axis" indicates the symmetry axis; the rotational symmetry is not necessary to be perfect. Generally, in disc-like liquid-crystal compounds, the molecular symmetry axis coincides with the line that penetrates the disc center perpendicularly to the disc face; in disc-like liquid-crystal compounds, the molecular symmetry axis coincides with the longitudinal molecular axis.

The average-orientation direction of molecular symmetry axes of liquid-crystal compounds may be usually adjusted by selecting materials of liquid-crystal compounds or orientation films or selecting rubbing-treatment processes.

In the present invention, for example, when an orientation film for forming optically anisotropic layers is to be produced through a rubbing treatment, an optically anisotropic layer having an average orientation direction of parallel)(0°) or 45° from the phase-delay axis of cellulose acylate films by way of rubbing the cellulose acylate films in a direction of 0° or 45° from the phase-delay axis.

The optical compensation film of the second embodiment may be produced continuously, for example, by employing a long cellulose acylate film of which the phase-delay axis is parallel with the longitudinal direction. More specifically, (i) preparing a orientation film by applying continuously a coating liquid for orientation films on a surface of long cellulose acylate film, (ii) rubbing continuously the surface of the orientation film in a direction of parallel or 45° from the longitudinal direction, (iii) applying continuously a coating liquid for optically anisotropic layers containing a liquid-crystal compound on the resulting orientation film, aligning the molecules of the liquid-crystal compound and fixing its condition. The resulting continuous long optical compensation film may be cut into a desirable shape before installing into liquid-crystal display devices.

As for the average orientation direction of molecular symmetry axes at the face side or air side of liquid crystal compounds, the average orientation direction is preferably about 0° and 45° from the phase-delay axis of cellulose acylate films, more specifically −3° to +3° or 42° to 48°, in particular −2° to +2° or 43° to 47°.

The average orientation direction of molecular symmetry axes of liquid crystal compounds is selected depending on the driving mode of the intended liquid crystal display device. As for the driving mode of Twisted Nematic (TN) mode, the direction is preferably about 0°, as for Optically Compensated Birefringence (OCB) mode, about 45° is preferable.

The average orientation direction of molecular symmetry axes at air side of liquid crystal compounds may be adjusted by selecting additives of liquid crystal compounds.

The additives utilized with liquid crystal compounds may be plasticizers, surfactants, polymerizable monomers, and polymerizable polymers. The deviation degree of orientation direction of molecular symmetry axes may be adjusted through selecting the liquid crystal compounds and additives. The surfactants are preferably compatible with surface tension of coating liquids described above.

It is preferred that the plasticizer, surfactant and polymerizable monomer utilized with the liquid-crystal compounds are compatible with discotic liquid-crystal compounds and able to change the inclination angle of the discotic liquid-crystal compounds or affect no inhibition on the orientation.

Examples of the polymerizable monomer are compounds having at least one of vinyl group, vinyloxy group, acryloyl group, and methacryloyl group.

The amount of the compounds described above is usually 1 to 50% by mass based on liquid-crystal compounds, preferably 5 to 30% by mass. When a polymerizable monomer having 4 or more of reactive functional groups is incorporated, the adhesion between orientation films and optically anisotropic layers may be enhanced.

When discotic liquid-crystal compounds are employed for the liquid-crystal compound, a polymer is preferably employed that have some compatibility with the discotic liquid-crystal compounds and changes the inclination angle of the discotic liquid-crystal compounds.

Examples of the polymer include cellulose esters. The cellulose esters are exemplified by cellulose acetate, cellulose acetate propionate, hydroxypropyl cellulose and cellulose acetate butylate.

The amount of the polymer is preferably 0.1 to 10% by mass based on discotic liquid-crystal compounds, more preferably 0.1 to 8% by mass, particularly preferably 0.1 to 5% by mass so as not to disturb the alignment of discotic liquid-crystal compounds.

The transition temperature of liquid-crystal phase/solid phase of discotic liquid-crystal compounds into discotic nematic is preferably 70° C. to 300° C., more preferably 70° C. to 170° C.

In the second embodiment of the present invention, the optically anisotropic layer has at least in-plane optical anisotropy. The in-plane retardation Re of optically anisotropic layers is preferably 3 to 300 nm, more preferably 5 to 200 nm, particularly preferably 10 to 100 nm.

The thick retardation Rth of optically anisotropic layers is preferably 20 to 400 nm, more preferably 50 to 200 nm. The thickness of optically anisotropic layers is preferably 0.1 to 20 μm, more preferably 0.5 to 15 μm, particularly preferably 1 to 10 μm.

Figure 9:
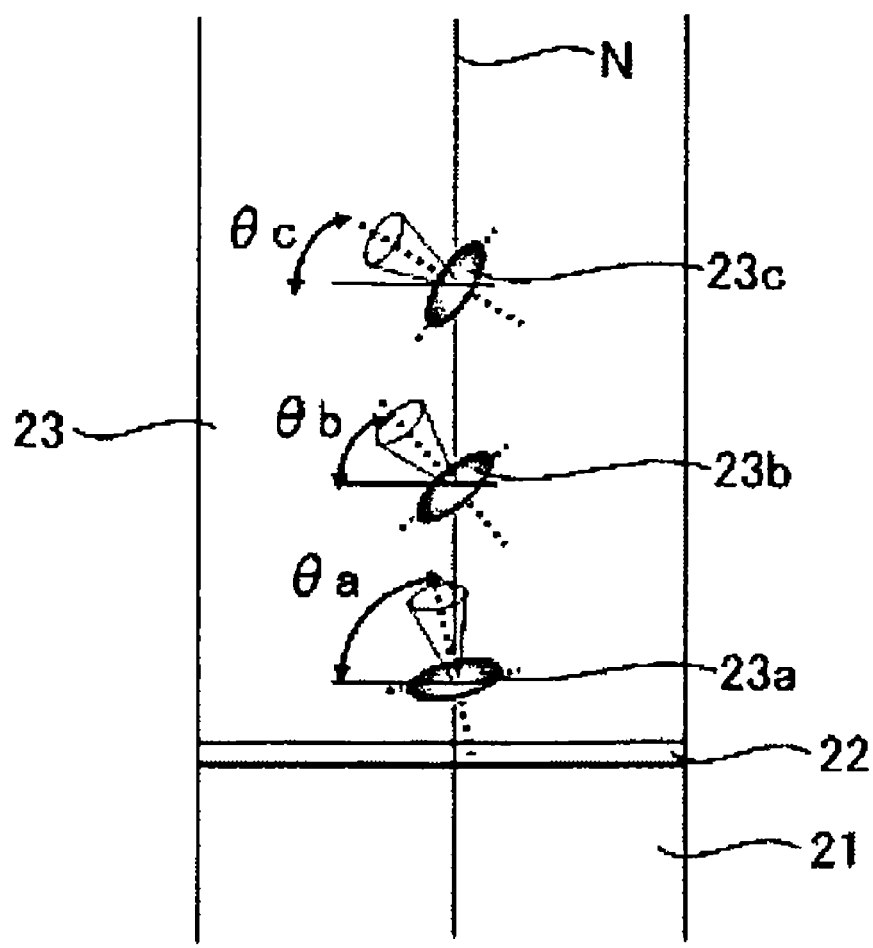
FIG. 9 is a schematic view that shows an exemplary optically anisotropic layer in the second embodiment of the present invention.

FIG. 9 shows schematically an exemplary simplified cross-section of an optically anisotropic layer according to the present invention. An optically anisotropic layer 23 is disposed on an orientation film 22 formed on support 21. The average inclination angle (hereinafter sometimes referred to as "tilt angle" or "pretilt angle") of discotic liquid-crystal compounds 23a, 23b and 23c of optically anisotropic layer 23 increases entirely gradually as the increase of the distance in thickness direction from the bottom of the optically anisotropic layer. In FIG. 1, N is a normal of the transparent support. The discotic liquid-crystal compounds are planar molecules, thus there exists one plane i.e. a disc face in each molecule.

The average inclination angle is preferably no more than 45°, more preferably 35° to 45°. When the average inclination angle is determined, the minimum of the inclination angle is preferably 0° to 85°, more preferably 5° to 40°. The maximum of the inclination angle is preferably 5° to 90°, more preferably 30° to 85°. In addition, the difference between maximum and minimum of the average inclination angle is preferably 5° to 70°, more preferably 10° to 60°.

In optically anisotropic layers where disc-like or rod-like liquid-crystal compounds are aligned, it is difficult to determine directly and accurately the tilt angle θ1 at one surface and the tilt angle θ2 at another surface ("tilt angle" is defined as the angle between the physical symmetry axis and the interface of optically anisotropic layer). Accordingly, θ1 and θ2 are calculated herein in the following process. This process is effective to express a relation between partial optical properties of optical films.

In this process, the following items are taken into assumption for easy calculation.

i) Optically anisotropic layers are considered as a multi-layer body formed of layers containing disc-like or rod-like liquid-crystal compounds, and the layers of the smallest unit is considered as optically uniaxial.

ii) The tilt angle of each layer changes as a linear function along the thickness direction of optically anisotropic layers.

Specific calculation process is as follows:

(1) Retardation values are measured for three or more angles while changing incident angle of measuring irradiation onto optically anisotropic layers within a plane where the tilt angle of each layer changes as a linear function along the thickness direction of optically anisotropic layers. It is preferred that the normal direction of optically anisotropic layers is defined as 0° and the retardation values are measured at −40°, 0°, +40° for convenience. These measurements can be carried out, for example, by KOBRA-21ADH, KOBRA-WR (by Oji Scientific Instrument), transmissive ellipsometer AEP-100 (by SHIMAZDU Co.), M150, M520 (JASCO Co.), ARB10A (Uniopt Co.) etc.

(2) Refractive index at ordinary light for each layer is defined as "no", refractive index at abnormal light is defined as "ne" (no and ne are assumed to be the same for respective layers), and thickness of entire multi-layer body is defined as "d". In addition, θ1 and θ2 are calculated on the assumption that the tilt direction of the respective layers coincides with the uniaxial optical-axis direction while fitting the calculation of the retardation value with the measured value using θ1 and θ2 as variables.

The values of no and ne may be taken from literatures or catalogues, or measured by Abbe refractive meter. The thickness of optically anisotropic layers may be measured by film-thickness meters using optical interference or photographs of scanning electron microscopy.

As for FIG. 9, for example, the inclination angle of discotic structure unit is the smallest (shown as θa) at the side of support 22, the largest at the most distant site (shown as θc), and intermediate (shown as θb) at the intermediate site.

Orientation Film

The orientation film in the second embodiment of the present invention is, for example, disposed on a transparent support of cellulose acylate films. The orientation film has a function to define the orientation direction of liquid-crystal compounds.

The orientation film is a polymer layer which has been subjected to orientation-treatment such as rubbing. The polymer of the polymer layer is preferably polyvinyl alcohol.

The polyvinyl alcohol may be those of which the hydroxyl group is substituted by a group containing vinyl, oxiranyl or aziridinyl. It is preferred that these are attached indirectly to polymer chain of polyvinyl alcohol through a bonding group such as ether bond (—O—), urethane bond (—OCONH—), acetal bond ((—O—)$_2$CH—), or ester bond (—OCO—); more preferably, a group containing vinyl, oxiranyl or aziridinyl is attached to polyvinyl alcohol along with the bonding group.

The polyvinyl alcohol may be the polymers expressed by the formula (I) below.

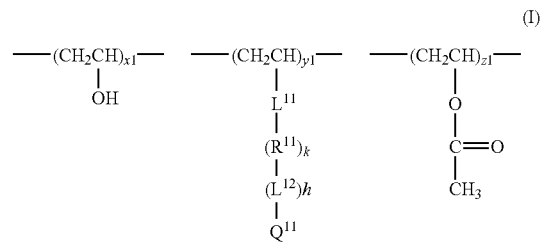

In the formula (I), $L^{11}$ represents one of ether bond, urethane bond, acetal bond and ester bond; $R^{11}$ represents one of alkylene groups and alkyleneoxy groups, $L^{12}$ is a bonding group between $R^{11}$ and $Q^{11}$; $Q^{11}$ is one of vinyls, oxiranyls and aziridinyls; x1 is 10 to 99.9 mole %, y1 is 0.01 to 80 mole %, z1 is 0 to 70 mole %, and x1+y1+z1=100 mole %; k and h are each an integer of 0 or 1.

Examples of $R^{11}$ in the general formula (I) include alkylene groups having 1 to 24 carbon atoms; alkylene groups having 3 to 24 carbon atoms of which the at least one non-adjacent $CH_2$ group is substituted by —O—, —CO—, —NH—, —NR$^7$— (R$^7$: alkyl groups having 1 to 4 carbon atoms or aryl groups having 6 to 15 carbon atoms), —S—, —SO$_2$—, or arylene having 6 to 15 carbon atoms; alkylene groups substituted by alkyl, aryl, alkoxy, aryloxy, alkylthio, arylthio, halogen, alkylcarbonyl, arylcarbonyl, alkylsulfonyl, arylsulfonyl, hydroxyl, mercapto, amino, alkylcarbonyloxy, alkylsulfonyloxy, arylsulfonyloxy, alkylcarbonylthio, arylcarbonylthio, alkylsulfonylthio, arylsulfonylthio, alkylcarbonylamino, arylcarbonylamino, alkylsulfonylamino, arylsulfonylamino, carboxy, or sulfo.

It is preferred that $R^{11}$ represents one of —R$^2$—, —R$^3$—(O—R$^4$)$_l$—OR$^5$—, —R$^3$—CO—R$^6$—, —R$^3$—NH—R$^6$—, —R$^3$—NR$^7$—R$^6$—, —R$^3$—S—R$^6$—, —R$^3$—SO$_2$—R$^6$—, and —R$^3$-A$^2$-R$^6$— (R$^2$, R$^3$, R$^4$, R$^5$ and R$^6$: alkylene group having 1 to 24 carbon atoms, $R^7$: alkyl group having 1 to 12 carbon atoms or aryl group having 6 to 15 carbon atoms, $A^2$: arylene group having 6 to 24 carbon atoms, t: integer of 0 to 4).

More preferably, $R^{11}$ represents —$R^2$— or —$R^3$—(O—$CH_2CH_2$)$_t$— ($R^2$ and $R^3$ are each an alkylene group having 1 to 12 carbon atoms; t is an integer of 1 to 12); among these, preferable are alkylene groups having 1 to 12 carbon atoms.

The alkylene groups may have a substituent. Examples of the substituent include alkyl groups having 1 to 24 carbon atoms, aryl groups having 6 to 24 carbon atoms, alkoxy groups having 1 to 24 carbon atoms, aryloxy groups having 6 to 24 carbon atoms, alkylthio groups having 1 to 24 carbon atoms, arylthio groups having 6 to 24 carbon atoms, halogen atoms (F, Cl, Br), alkylcarbonyl groups having 2 to 24 carbon atoms, arylcarbonyl groups having 7 to 24 carbon atoms, alkylsulfonyl groups having 1 to 24 carbon atoms, arylsulfonyl groups having 6 to 24 carbon atoms, hydroxyl group, mercapto group, amino group, alkylcarbonyloxy groups having 2 to 24 carbon atoms, arylcarbonyloxy groups having 7 to 24 carbon atoms, alkylsulfonyloxy groups having 1 to 24 carbon atoms, arylsulfonyloxy groups having 6 to 24 carbon atoms, alkylcarbonylthio groups having 2 to 24 carbon atoms, arylcarbonylthio groups having 7 to 24 carbon atoms, alkylsulfonylthio groups having 1 to 24 carbon atoms, arylsulfonylhio groups having 2 to 24 carbon atoms, alkylcarbonylamino groups having 2 to 24 carbon atoms, arylcarbonylamino groups having 7 to 24 carbon atoms, alkylsulfonylamino groups having 2 to 24 carbon atoms, arylsulfonylamino groups having 6 to 24 carbon atoms, carboxyl group and sulfo group.

Examples of preferable substituents of the alkylene groups described above include alkyl groups having 1 to 24 carbon atoms (in particular 1 to 12 carbon atoms), aryl groups having 6 to 24 carbon atoms (in particular 6 to 14 carbon atoms), and alkoxyalkyl groups having 2 to 24 carbon atoms (in particular 2 to 12 carbon atoms).

Examples of the alkyl groups described above include methyl, ethyl, n-pentyl, n-hexyl, n-heptyl, n-octyl, n-nonyl, n-decyl, n-undecyl, n-dodecyl, i-propyl, i-butyl, sec-butyl, t-amyl and 2-ethylhexyl.

Examples of the aforementioned alkyl groups substituted by 1 to 4 alkoxy groups include 2-methoxyethyl, 2-(2-methoxyethoxy)ethyl, 2-[2-(2-methoxyethoxy)ethoxy]ethyl, 2-n-butoxylethyl, 2-ethoxyethyl, 2-(2-ethoxyethoxy)ethyl, 3-methoxypropyl, 3-ethoxypropyl, 3-n-propyloxypropyl and 2-methylbuthyloxymethyl.

Examples of the aforementioned aryl groups include phenyl, 2-tryl, 3-tryl, 4-tryl, 2-anisyl, 3-anisyl, 4-anisyl, 2-biphenyl, 3-biphenyl, 4-biphenyl, 2-chlorophenyl, 3-chlorophenyl, 4-chlorophenyl, 1-naphthyl, and 2-naphthyl. The aryl group may be a heterocyclic group; examples thereof include pyridyl, pyrimidyl, thiazolyl and oxazolyl.

$L^{12}$ in the general formula (I) is preferably —O—, —S—, —CO—, —O—CO—, —CO—O—, —O—CO—O—, —CO—O-CO—, —NRCO—, —CONR—, —NR—, —NRCONR—, —NRCO—O—, —OCONR— (R: hydrogen atom or lower alkyl groups), for example.

-($L^{12}$)$_n$-$Q^{11}$- in the general formula (I) is preferably vinyl, vinyloxy, acryloyl, methacryloyl, crotonoyl, acryloyloxy, methacryloyloxy, crotonoyloxy, biphenyloxy, vinylbenzoyloxy, styryl, 1,2-epoxyethyl, 1,2-epoxypropyl, 2,3-epoxypropyl, 1,2-iminoethyl, 1,2-iminopropyl or 2,3-iminopropyl, for example. Among these, preferable are acryloyl, methacryloyl, acryloyloxy and methacryloyloxy in particular.

The carbon-atom number in the alkyl or alkoxy groups described above is preferably 1 to 24, more preferably 1 to 12.

Examples of the alkyl groups include unsubstituted alkyl groups such as methyl, ethyl, n-pentyl, n-hexyl, n-heptyl, n-octyl, n-nonyl, n-decyl, n-undecyl, n-dodecyl, i-propyl, i-butyl, sec-butyl, t-amyl and 2-ethylhexyl; alkyl groups substituted by 1 to 4 alkyl groups such as 2-methoxyethyl, 2-(2-methoxyethoxy)ethyl, 2-[2-(2-methoxyethoxy)ethoxy]ethyl, 2-n-butoxylethyl, 2-ethoxythyl, 2-(2-ethoxyethoxy)ethyl, 3-methoxypropyl, 3-ethoxypropyl, 3-n-propyloxypropyl, 3-benzyloxypropyl and 2-methylbuthyloxymethyl; aralkyl groups such as 2-phenylethyl and 2-(4-n-butyloxyphenyl)ethyl; vinylalkyl groups such as vinylmethyl, 2-vinylethyl, 5-vinylpentyl, 6-vinylhexyl, 7-vinylheptyl and 8-vinyloctyl; vinyloxy alkyl groups such as 2-vinyloxyethyl, 5-vinyloxypentyl, 6-vinyloxyhexyl, 7-vinyloxyheptyl and 8-vinyloxyoctyl; oxiranylalkyl groups such as 3,4-epoxybutyl, 4,5-epoxypentyl, 5,6-epoxyhexyl, 6,7-epoxyheptyl, 7,8-epoxyoctyl and 6,7-epoxyoctyl; acryloyloxyalkyl groups such as 2-acryloyloxyethyl, 3-acryloyloxypropyl, 4-acryloyloxybutyl, 5-acryloyloxypentyl, 6-acryloyloxyhexyl, 7-acryloyloxyheptyl and 8-acryloyloxyoctyl; methacryloyloxyalkyl groups such as 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl and 8-methacryloyloxyoctyl; crotonoyloxyalkyl groups such as 2-crotonoyloxyethyl, 3-crotonoyloxypropyl, 4-crotonoyloxybutyl, 5-crotonoyloxypentyl, 6-crotonoyloxyhexyl, 7-crotonoyloxyheptyl and 8-crotonoyloxyoctyl.

In the general formula (I), x1+y1+z1=100, x1 is preferably 50 to 99.9% by mole, y1 is preferably 0.01 to 50% by mole, more preferably 0.01 to 20% by mole, still more preferably 0.01 to 10% by mole, particularly preferably 0.01 to 5% by mole, z1 is preferably 0.01 to 50% by mole.

When x1 is increased, the value of $\gamma s^h_{(AL)}$ comes to be easily increased, thus the value $\gamma s^d_{(AL)}$ can be lowered. As such, $\gamma s^d_{(AL)}$ can be controlled by the vale of x1.

Retardation-Increasing Agent

It is preferred that a retardation-increasing agent is incorporated into the optical compensation films of the second embodiment in order to take an appropriate retardation value. The retardation-increasing agents are substantially the same as those of the first embodiment.

In the optical compensation films of the second embodiment, the retardation value can be easily controlled through controlling the difference between dispersion force components of surface free energy into no less than −4.0 erg/cm$^2$, or selecting appropriately a disc-like liquid-crystal compound for the liquid-crystal compound, thus the optical compensation films can be favorably employed into polarizing plates of liquid-crystal display devices. The liquid-crystal display devices of the second embodiment are substantially the same with the first embodiment except that the optical compensation films and the parameters of retardation values are exchanged into those of the second embodiment.

Third Embodiment

Optical Compensation Film

The optical compensation films of the third embodiment have an optically anisotropic layer formed by polymerizing and curing a composition, in which the composition comprises at least a liquid crystal compound, and the ratio of GPC pattern area, in a range of above 5000 of molecular weight in GPC chart after maintaining at 60° C. and 60% of relative humidity for three days, to entire GPC pattern area is no more than 0.1% (polystyrene conversion).

The GPC chart means the chart in which GPC is measured by the conditions and apparatuses described in GPC measurement method described below.

GPC pattern area in a range of above 5000 of molecular weight means the area that is represented as having molecular weights of no less than 5000 in polystyrene conversion from elution period and detected strength of elution pattern; the entire GPC pattern area means the area of entire elution pattern on GPC chart.

GPC Measuring Process (i) A sample is weighed and dissolved into tetrahydrofuran (THF) to prepare a sample solution of 0.1% by mass.

(ii) The sample solution of 10 μl was injected into a GPC measurement apparatus and flowed for 20 minutes to measure the elution period of the sample detected at around UV wavelength λ=254 nm.

Apparatus: HLC-8220 (TOSOH Co.)
Guard Column: TSK guardcolumn Super HZ-H
Column: TSK gel Super HZM-H, Super HZ4000, Super HZ2000 three series (TOSOH Co.)
Temperature: 40° C.
Solvent: Tetrahydrofuran (THF)
Velocity: 0.35 ml/min It is preferred that the composition, containing the liquid-crystal compounds in this embodiment, contains also a compound that can suppress polymerization reaction.

The compound that can suppress polymerization reaction may be properly selected depending on the application; preferably, the compound does not degrade the crystalline property and does not diminish significantly the curing property. The compounds that can suppress polymerization reaction may be the conventional polymerization inhibitors described in, for example, Captor 3 of "Handbook '99UV/EB Curing Material and Market, CMC Publishing Co."

The compounds that can suppress polymerization reaction may be usable in minute amounts with regard to polymerizable liquid-crystal compounds; preferably, the amount is 0.005 to 3% by mass based on the polymerizable liquid-crystal compounds, more preferably 0.01 to 1% by mass. Preferable content of the compounds in optically polymerizable layers is no more than 10 mg/m² or 0.1 mmol/m² from the viewpoint of quality of cured films.

The process to detect the presence of the compounds to suppress polymerization is exemplified by fragmental analysis of TOS-SIMS measurement obtained for surface or cross-section of optically anisotropic layers.

Support

The optical compensation films of the third embodiment may have a support. It is preferred that the support is a polymer film and is transparent, more specifically having a light transmission of no less than 80%.

Examples of the polymers of the polymer films include cellulose esters, norbornene polymers and polymethylmethacrylate. The cellulose esters may be cellulose acetates, cellulose diacetates etc. Commercially available norbornene polymers are Arton, Zeonex (product name) etc.

The polymer film is preferably cellulose ester films, more preferably lower aliphatic esters of cellulose. The lower aliphatic esters mean those having a carbon-atom number of 6 or less. The cellulose ester films are preferably of cellulose acetate, cellulose propionate or cellulose butylate, particularly preferable is cellulose acetate. Mixed aliphatic esters such as cellulose acetate propionate and cellulose acetate butylate may also be available.

Conventional polycarbonates and polysulfones, liable to be birefringent, may be usable as the optical films in the present invention provided that the birefringence is controlled by modifying the molecules as described in WO00/26705.

In cases where the optical compensation films are utilized as a polarizing-plate protective film or a phase-difference film, the polymer films are preferably of cellulose acetate having an acetification degree of 55.0% to 62.5%, more preferably 57.0% to 62.0%.

The acetification degree means an amount of acetic acid bonded to unit mass of cellulose. The acetification degree can be determined by measurement and calculation of the in accordance with ASTM D-817-91 of test method for cellulose acetate etc.

The viscosity average polymerization degree (DP) of the cellulose acetate is preferably no less than 250, more preferably no less than 290. It is also preferred that the cellulose acetate has narrower molecular-weight distributions of Mw/Mn (Mw: mass average molecular weight, Mn: number average molecular weight) in gel permeation chromatography. Specifically, the Mw/Mn is preferably 1.0 to 1.7, more preferably 1.0 to 1.65, particularly preferably 1.0 to 1.6.

The cellulose acetate tends to have lower substitution degrees at 6th site rather than equivalent degrees in 2nd, 3rd, 6th sites. It is preferred that the polymer films in the third embodiment have a substitution degree at 6th site equivalent or higher than those at 2nd and 3rd sites.

The rate of the substitution degree at 6th site based on total substitution degrees at 2nd, 3rd, 6th sites is preferably 30% to 40%, more preferably 31% to 40%, particularly preferably 32% to 40%. The substitution degree at the 6th site is preferably no less than 0.88. The substitution degrees can be measured by NMR. The cellulose acetate having higher substitution degrees at 6th site may be synthesized with reference to JP-A No. 11-5851.

The other details in this embodiment are substantially the same as the first and second embodiments except for the surface free energy and the tilt angle.

EXAMPLES

The present invention will be explained with reference to examples, but the present invention should not be construed to be limited to these examples. In the descriptions bellow, all parts and % are expressed by mass unless indicated otherwise.

Examples of First Embodiment

Example 1

Preparation of Second Optically Anisotropic Layer A

Preparation of Cellulose Acetate Solution

The ingredients in Table 1 were charged into a container and heated while stirring to dissolve the ingredients, thereby to prepare a cellulose acetate solution.

TABLE 1

| Ingredient | Outer-Layer Side | Inner-Layer Side |
|---|---|---|
| Cellulose Acetate | Substitution Rate 2.87 | Substitution Rate 2.75 |
|  | Acetification Rate 60.9% | Acetification Rate 59.5% |
|  | 100 parts | 100 parts |

TABLE 1-continued

| Ingredient | Outer-Layer Side | Inner-Layer Side |
|---|---|---|
| Triphenylphosphate (plasticiser) | 7.8 parts | 7.8 parts |
| Biphenyldiphenylphosphate (plasticiser) | 3.9 parts | 3.9 parts |
| Methylchloride (solvent) | 300 parts | 300 parts |
| Methanol (solvent) | 45 parts | 45 parts |
| Dye (360FP, Sumitomo Chemical Co.) | 0.0009 part | 0.0009 part |
| Retardation-Increasing Agent (41-trans) | 1.32 parts | 1.32 parts |

The resulting cellulose acetate solution (dope) was flow-cast to form a film using a flow-casting machine having a band of 2 m wide and 65 m long. The film was dried for one minute after the film temperature rose to 40° C. on the band then was peeled away, followed by being stretched 28% in the width direction by use of tenters under drying gas of 140° C. Then the film was dried using a gas flow of 135° C. for 20 minutes, consequently the second optically anisotropic layer A was prepared with a residual solvent content of 0.3% by mass. The second optically anisotropic layer A had a width of 1340 mm and a thickness of 88 μm.

Optical-Property Measurement of Second Optically Anisotropic Layer A

The resulting second optically anisotropic layer A was measured in terms of retardation Re using KOBRA-ADH (by Oji Scientific Instrument). $Re_2 450(0)/Re_2 650(0)$, $Re_2 450(40)/Re_2 650(40)$ and $Re_2 450(-40)/Re_2 650(-40)$ are shown in Table 2.

Saponification of Second Optically Anisotropic Layer A

On one surface of the second optically anisotropic layer A, isopropyl alcohol containing 1.5 mol/L of potassium hydroxide was coated at an amount of 25 ml/m², then the coating was allowed to stand at 25° C. for 5 seconds, and rinsed with flowing water for 10 seconds before the surface of the film was dried through blowing air at 25° C. Consequently, one surface of the second optically anisotropic layer A was saponified.

Preparation of Coating Liquid for Orientation Film

A coating liquid for orientation film was prepared from the ingredients below.

| Modified PVA of the formula below | 10 parts |
|---|---|
| Water | 371 parts |
| Methanol | 119 parts |
| Glutaraldehyde (crosslinker) | 0.5 part |

Modified PVA

—(CH$_2$—CH)$_{87.8}$—  —(CH$_2$—CH)$_{12.0}$—
    |                            |
   OH                         O—CO—CH$_3$

—(CH$_2$—CH)$_{0.2}$—
    |
   O—CO—⟨phenyl⟩—O—(CH$_2$)$_4$—O—CO—CH=CH$_2$

Formation of Orientation Film

To the saponified surface of the second optically anisotropic layer A, the coating liquid for orientation film was coated at an amount of 24 ml/m², using No. 14 wire bar coater. The coating was dried by gas flow of 60° C. for 60 seconds and then 90° C. for 150 seconds. The resulting film was then subjected to rubbing in the stretching direction (approximately the phase-delay axis) and also in a direction of 45° from the stretching direction.

Preparation of First Optically Anisotropic Layer a and Optical Compensation Film A Preparation of Coating Film A coating liquid was prepared by dissolving ingredients shown below into methylethylketone.

| Methylethylketone | 400 parts |
|---|---|
| Discotic liquid crystal compound [1] | 100 parts |
| Orientation control agent [2] | 0.4 part |
| Photopolymerization Initiator [3] | 3 parts |
| Sensitizer [4] | 1 part |

[1] structural formula D-89 shown below
[2] air-interface orientation-control agent V-(1) shown below
[3] Irgacure 907, by Ciba Geigy Co.
[4] Kayacure DETX, by Nippon Kayaku Co.

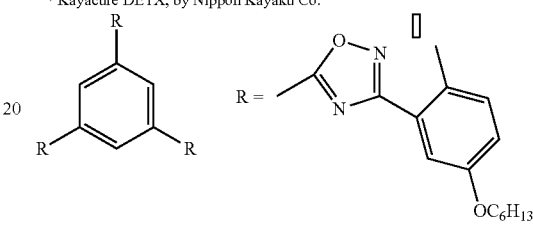

Air-Interface Orientation-Control Agent V-(1)

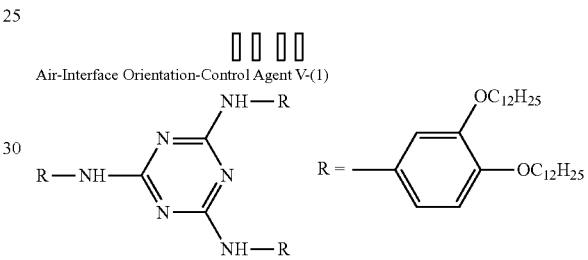

The coating liquid described above was coated on the orientation film described above using No. 3.0 wire bar, then these were attached to a metal frame and were heated at 95° C. for 2 minutes in a temperature-controlled bath, thereby the discotic liquid-crystal compound was oriented. Then the film was irradiated UV-rays of 120 W/cm² at 80° C. for 1 minute thereby to polymerize the discotic liquid-crystal compound, thereafter allowed to cool to room temperature. Consequently, the first optically anisotropic layer A was prepared and the optical compensation film was prepared.

Optical-Property Measurement of First Optically Anisotropic Layer A

An orientation film was formed on a glass plate in the same manner as the first optically anisotropic layer A described above, and the first optically anisotropic layer A was prepared on the orientation film, then was measured in terms of retardation Re using KOBRA-ADH (by Oji Scientific Instrument). $Re_1 450(0)/Re_1 650(0)$, $Re_1 450(40)/Re_1 650(40)$ and $Re_1 450(-40)/Re_1 650(-40)$ are shown in Table 2.

Preparation of Elliptical Polarizing Plate A

Iodine was adsorbed onto a stretched polyvinyl alcohol film to prepare a polymerization film.

Then the side of the second optically anisotropic layer A of the resulting optical compensation film A was laminated to one side of the polarizing film using a polyvinyl alcohol adhesive. The phase-delay axis of the second optically anisotropic layer A and the transmissive axis of the polarizing film were disposed in parallel. A commercially available cellulose triacetate film (Fujitack TD80UF, by Fujifilm Co.) was saponified in the same manner as described above, and laminated to opposite side of the polarizing film, thereby to produce an ellipse polarizing plate A.

Example 1A

Preparation of Bend-Orientation Liquid-Crystal Cell A

Two glass substrates with an ITO electrode were applied with a polyimide film as an orientation film, then the orientation film was rubbing-treated. The resulting two glass substrates were disposed oppositely such that the rubbing directions were in parallel, and the cell gap was adjusted to 4.1 µm. To the cell gap, a liquid-crystal compound (ZL11132, Merck Co.) with Δn of 0.1396 was injected thereby to prepare a bend-orientation liquid-crystal cell A.

The bend-orientation liquid-crystal cell A was determined in terms of retardation Re using KOBRA-ADH (by Oji Scientific Instrument). $Re_1c450(0)/Re_1c650(0)$, $Re_1c450(40)/Re_1c650(40)$ and $Re_1c450(-40)/Re_1c650(-40)$ are shown in Table 3.

Preparation and Evaluation of Liquid-Crystal Display Device A

A liquid-crystal display device A was prepared by combining the bend-orientation liquid-crystal cell A and the two sheets of ellipse polarizing plates A. The resulting liquid-crystal display device A was disposed on a backlight, and the bend-orientation liquid-crystal cell A was applied using a rectangular-wave voltage of 55 Hz. The voltage at which black brightness (front brightness) came to the smallest was determined while adjusting the voltage using a brightness meter (BM-5, by TOPCON Co.). The voltage in the direction of panel face (face V), and color shift ΔC (u', v') between azimuthal angle 0° and polar angle 60° (v') and azimuthal angle 180° and polar angle 60° (v') were measured. The results are shown in Table 3.

In addition, the inventive liquid-crystal display device A was evaluated in terms of brightness and color in accordance with criteria shown below. The results are shown in Table 3.
A: no change in color property, remarkably excellent
B: some and partial change in color property
C: remarkable change in color property.

Example 2

Preparation of Second Optically Anisotropic Layer B

A total of 100 parts of cellulose acetate with an acetification degree of 60.7% to 61.1%, 2.35 parts of the retardation-increasing agent shown below, 2.75 parts of triphenyl phosphate, and 2.20 parts of biphenyldiphenyl phosphate were dissolved into 232.75 parts of methylene chloride, 42.57 parts of methanol and 8.50 parts of n-butanol.

Retardation-Increasing Agent

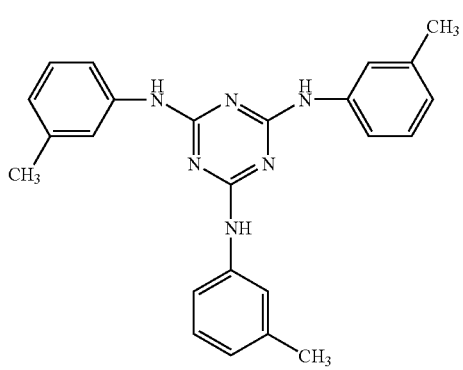

The resulting dope was flow-cast to form a film using a flow-casting machine having a band of 2 meters (m) wide and 65 m long. The film was dried for one minute after the film temperature rose to 40° C. on the band then was peeled away, followed by being stretched 26% in the width direction by use of tenters and drying gas of 140° C. Then the film was dried using a gas flow of 135° C. for 20 minutes, consequently the second optically anisotropic layer B was prepared with a residual solvent content of 0.3% by mass. The second optically anisotropic layer B had a width of 1340 mm and a thickness of 88 µm.

The resulting second optically anisotropic layer B was determined in terms of retardation Re using KOBRA-ADH (by Oji Scientific Instrument). $Re_2450(0)/Re_2650(0)$, $Re_2450(40)/Re_2650(40)$ and $Re_2450(-40)/Re_2650(-40)$ are shown in Table 2.

Preparation of First Optically Anisotropic Layer B and Optical Compensation Film B

A first optically anisotropic layer B was disposed on the resulting second optically anisotropic layer B in the same manner as Example 1, thereby to prepare an optical compensation film B.

Preparation of Ellipse Polarizing Plate B

An ellipse polarizing plate B containing the optical compensation film B was prepared in the similar manner as Example 1.

Example 2A

Preparation of Bend-Orientation Liquid-Crystal Cell B

The resulting ellipse polarizing plate B was laminated on the bend-orientation liquid-crystal cell B to prepare a liquid-crystal display device B, and the retardation Re of the bend-orientation liquid-crystal cell B was evaluated in a similar manner as Example 1A. The results are shown in Table 3.

Preparation and Evaluation of Liquid-Crystal Display Device B

A liquid-crystal display device B was prepared in a similar manner as Example 1A, which was evaluated in a similar manner as Example 1A. The results are shown in Table 3.

Example 3

Preparation of Second Optically Anisotropic Layer C

The transparent protective film used in Example 1 of JP-A No. 2000-284124 was used as a second optically anisotropic layer C in place of the second optically anisotropic layer A in Example 1.

The resulting second optically anisotropic layer C was determined in terms of retardation Re using KOBRA-ADH (by Oji Scientific Instrument). $Re_2450(0)/Re_2650(0)$, $Re_2450(40)/Re_2650(40)$ and $Re_2450(-40)/Re_2650(-40)$ are shown in Table 2.

Preparation of First Optically Anisotropic Layer C and Optical Compensation Film C A first optically anisotropic layer C was prepared in a similar manner as Example 1 except that the wire bar was changed into No. 3.4 and then an optical compensation film C was prepared.

Preparation of Ellipse Polarizing Plate C

An ellipse polarizing plate C containing the optical compensation film C was prepared in the similar manner as Example 1.

Example 3A

Preparation of ECB Liquid-Crystal Cell C

An ECB liquid-crystal cell C was prepared in such a way that the cell gap was adjusted to 3.5 µm, a liquid-crystal material with a positive permittivity anisotropy was encapsulated between substrates through introducing dropwise and the Δn·d was adjusted to 300 nm. The liquid-crystal material had a refractive-index anisotropy, Δn=0.0854 (589 nm, 20°) and Δε=+8.5 (MLC-9100, Merck Co.).

The resulting ECB liquid-crystal cell C was determined in terms of retardation Re using KOBRA-ADH (by Oji Scientific Instrument). $Re_1c450(0)/Re_1c650(0)$, $Re_1c450(40)/Re_1c650(40)$ and $Re_1c450(-40)/Re_1c650(-40)$ are shown in Table 3.

Preparation and Evaluation of Liquid-Crystal Display Device C

A liquid-crystal display device C was prepared in a similar manner as Example 1A, which was evaluated in a similar manner as Example 1A. The results are shown in Table 3.

Example 4

Preparation and Evaluation of Second Optically Anisotropic Layer D

A second optically anisotropic layer D was prepared in the same manner as Example 1, and the retardation Re was evaluated in a similar manner as Example 1. The results are shown in Table 2.

Preparation of First Optically Anisotropic Layer D and Optical Compensation Film D A first optically anisotropic layer D of Example 4 was prepared in a similar manner as Example 1 except that the rubbing direction of the first optically anisotropic layer A was changed into the direction parallel to the longitudinal direction of the roll, and the first optically anisotropic layer D was evaluated in terms of retardation Re. The results are shown in Table 2.

Preparation of Elliptical Polarizing Plate D

An elliptical polarizing plate D of Example 4 containing the resulting optical compensation film D was prepared in the same manner as Example 1, except that the lamination was carried out in a manner that the phase-delay axis of the second optically anisotropic layer and the transmissive axis of polarizer are perpendicular each other.

Example 4A

Preparation of Tn Orientation Liquid-Crystal Cell D

In the preparation of TN orientation liquid-crystal cell D, the cell gap (d) was adjusted to 5 μm, and a liquid-crystal material with a positive permittivity anisotropy was encapsulated between substrates through introducing dropwise and the Δn·d was adjusted to 420 nm (Δn: refractive anisotropy of liquid-crystal material). In addition, the twist angle of liquid-crystal layer of the liquid-crystal cell was adjusted to 90°, the ellipse polarizing plate D was laminated to the upper and lower sides of the cell, as shown in FIG. 2, such that the absorption axis of the ellipse polarizing plate D of Example 4 coincides with the rubbing direction of upper and lower substrates thereby to prepare a TN orientation liquid-crystal layer D.

The resulting TN orientation liquid-crystal cell D was determined in terms of retardation Re using KOBRA-ADH (by Oji Scientific. Instrument). $Re_1c450(0)/Re_1c650(0)$, $Re_1c450(40)/Re_1c650(40)$ and $Re_1c450(-40)/Re_1c650(-40)$ are shown in Table 2.

Preparation and Evaluation of Liquid-Crystal Display Device D

A liquid-crystal display device D was prepared in a similar manner as Example 1A, which was evaluated in a similar manner as Example 1A. The results are shown in Table 3.

Example 5

Preparation of Second Optically Anisotropic Layer E

The ingredients shown below were poured into a mixing tank, the ingredients were dissolved while heating and stirring to prepare a cellulose acetate solution.

| Ingredients of Cellulose Acetate Solution | |
|---|---|
| Cellulose acetate (acetification degree: 60.9%)[1] | 100 parts |
| Triphenyl phosphate (plasticizer) | 7.8 parts |
| Biphenyldiphenyl phosphate (plasticizer) | 3.9 parts |
| Methylene chloride (first solvent) | 300 parts |
| Methanol (second solvent) | 54 parts |
| 1-Butanol (third solvent) | 11 parts |

[1] polymerization degree: 300, Mn/Mw = 1.5

Into another mixing tank, 16 parts of the retardation-increasing agent A shown below, 8 parts of the retardation-increasing agent B shown below, 0.28 part of silicon dioxide fine particles (average particle size: 0.1 μm), 80 parts of methylene chloride, and 20 parts of methanol were poured and stirred while heating thereby to prepare a solution of retardation-increasing agent (dispersion of fine particles). The solution of retardation-increasing agent of 45 parts was mixed to 474 parts of cellulose acetate solution and stirred sufficiently to prepare a dope.

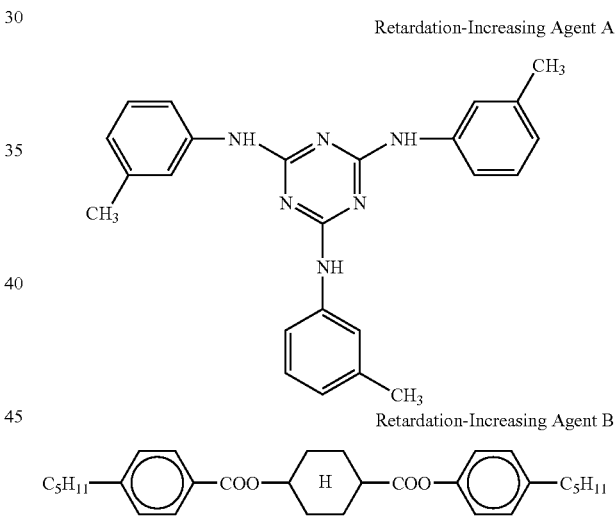

Retardation-Increasing Agent A

Retardation-Increasing Agent B

The resulting dope was flow-cast using a flow-casting machine having a band of 2 m wide and 65 m long. The film having a residual-solvent content of 15% by mass was traverse-stretched using a tenter at 130° C. and stretching rate of 20%, the film was maintained at 50° C. for 30 seconds in the stretched condition, then clips were removed to prepare a cellulose acetate film. The residual solvent content was 5% by mass at completing the stretching, and the residual solvent content was reduced through additional drying to prepare a second optically anisotropic layer E with a residual solvent content of less than 0.1% by mass. The Tg of the cellulose acylate film was 140° C., and the thickness of the cellulose acetate film was 88 μm.

The resulting second optically anisotropic layer E was determined in terms of retardation Re using KOBRA-ADH (by Oji Scientific Instrument). $Re_2450(0)/Re_2650(0)$, $Re_2450(40)/Re_2650(40)$ and $Re_2450(-40)/Re_2650(-40)$ are shown in Table 2.

Preparation of First Optically Anisotropic Layer E and Optical Compensation Film E An orientation film was formed on one surface of the resulting second optically anisotropic layer E in a similar manner as Example 1. Then a coating liquid of the composition, shown below, and containing a rod-like liquid-crystal compound was prepared, and the coating liquid was applied continuously on the orientation-film surface of the optical compensation film that was being conveyed at 20 m/min by way of rotating No. 5.0 wire bar at 391 rpm in the same direction with the conveying direction.

The solvent was dried in a process to heat continuously from room temperature to 90° C., then the rod-like liquid-crystal compound was oriented by way of heating at 90° C. for 90 seconds under a wind velocity of 2.5 m/sec at the film surface of the optically anisotropic layer in a drying zone at 90° C. Then the film was conveyed to a drying zone of 80° C., and UV rays of illuminance 600 mW was irradiated for 4 seconds using a UV ray-irradiation device (UV lamp: output 160 W/cm², emission length: 1.6 m) thereby to progress crosslinking reaction to fix the rod-like liquid-crystal compound at the orientation. Thereafter, the film was cooled to room temperature, and taken up cylindrically to form a roll. Consequently, the first optically anisotropic layer E was prepared and the optical compensation film E was prepared.

Preparation of Coating Liquid Containing Rod-Like Liquid Crystal Compound

The ingredients shown below were dissolved into methylethylketone to prepare a coating liquid that containing a rod-like liquid-crystal compound.

A portion of the resulting roll of the optically anisotropic layer E was cut off to take a sample. From the sample, the optically anisotropic layer containing the rod-like liquid-crystal compound was peeled away, and its optical property was measured. In addition, it was confirmed that rod-like liquid-crystal molecules were aligned substantially vertically to the film face in the optically anisotropic layer.

The resulting first optically anisotropic layer E was determined in terms of retardation Re using KOBRA-ADH (by Oji Scientific Instrument). $Re_1 450(0)/Re_1 650(0)$, $Re_1 450(40)/Re_1 650(40)$ and $Re_1 450(-40)/Re_1 650(-40)$ are shown in Table 2. Both of $Re_1 450(0)$ and $Re_1 650(0)$ were 0 nm.

Preparation of Ellipse Polarizing Plate E

Ellipse polarizing plate E was prepared, in a similar manner as Example 1, from the resulting optical polarizing film E.

Example 5A

Preparation and Evaluation of IPS-mode Liquid-Crystal Cell E

On a sheet of glass substrate, electrodes were disposed with a distance of 20 μm between adjacent electrodes, over which a polyimide film was disposed as an orientation film, which was then rubbing-treated. On another sheet of glass substrate, a polyimide film was disposed, which was then rubbing-treated to prepare an orientation film. Ellipse polarizing plates E were laminated on upper and lower sides of the cell through an adhesive such that the absorption axis of the ellipse polarizing plates E prepared in Example E coincides with the rubbing direction of the upper and lower substrates. Two

| | |
|---|---|
| Rod-like liquid-crystal compound shown below | 100 parts |
| Photopolymerization initiator [1] | 3 parts |
| Sensitizer (Kayacure DETX) [2] | 1 part |
| Fluorine-containing polymer | 0.2 part |
| Pyridinium salt shown below | 2 parts |
| Methylethylketone | 198 parts |

[1] Irgacure 907, by Ciba Geigy Co.
[2] by Nippon Kayaku Co.

Rod-Like Liquid-Crystal Compound

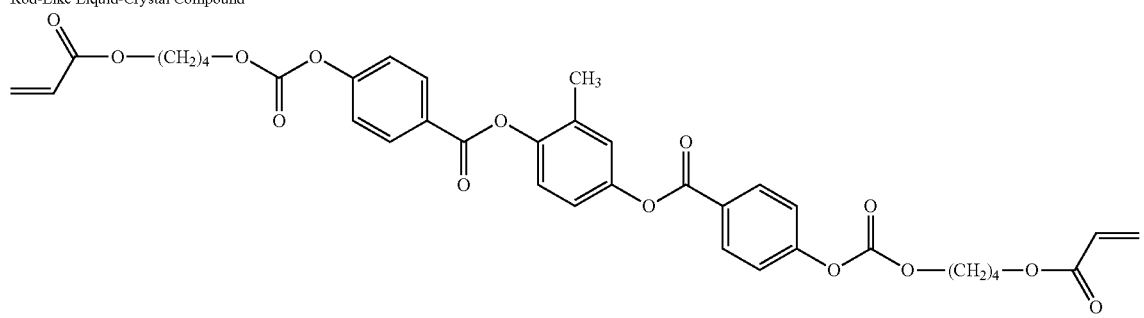

Fluorine-Containing Polymer

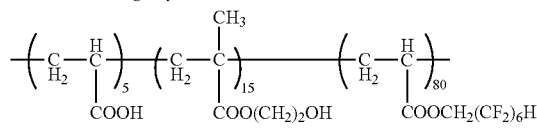

Pyridinium Salt

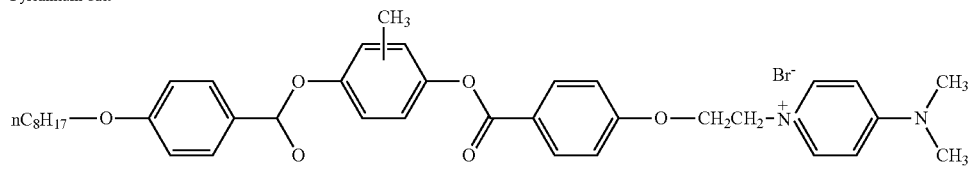

sheets of glass substrates were laminated such that the orientation films faced each other, the cell gap was 3.9 μm, and the rubbing directions of the two glass substrates were parallel. Then a nematic liquid-crystal composition having a refractive-index anisotropy (Δn) of 0.0769 and a permittivity anisotropy (Δε) of 4.5 was encapsulated to prepare a horizontally-aligned liquid-crystal cell of IPS mode. The value Δn·d of the liquid-crystal layer was 300 nm. The retardation Re was measured in terms of the liquid-crystal cell of IPS mode in the same manner as Example 1. The results are shown in Table 3.

Preparation and Evaluation of Liquid-Crystal Display Device E

Liquid-crystal display device E was prepared and evaluated in a similar manner as Example 1. The results are shown in Table 3.

Comparative Example 1

Preparation and Evaluation of Second Optically Anisotropic Layer F

Second optically anisotropic layer F was prepared and evaluated for the retardation Re in a similar manner as Example 1. $Re_2 450(0)/Re_2 650(0)$, $Re_2 450(40)/Re_2 650(40)$ and $Re_2 450(-40)/Re_2 650(-40)$ are shown in Table 2.

Preparation of First Optically Anisotropic Layer F and Optical Compensation Film F Preparation of Coating Liquid The ingredients shown below were dissolved into methylethylketone to prepare a coating liquid.

| | |
|---|---|
| Methylethylketone | 204 parts |
| Discotic liquid crystal compound*[1] | 91 parts |
| Ethyleneoxide-modified trimethylolpropanetriacrylate*[2] | 9 parts |
| Cellulose acetate butylate*[3] | 1 part |
| Photopolymerization Initiator*[4] | 3 parts |
| Sensitizer*[5] | 1 part |

*[1] structural formula D-89
*[2] V#360, by Osaka Organic Chemistry Co.
*[3] CAB531-1, by Eastman Chemical Co.
*[4] Irgacure 907, by Ciba Geigy Co.
*[5] Kayacure DETX, by Nippon Kayaku Co.

Preparation of First Optically Anisotropic Layer F and Optical Compensation Film F The coating liquid described above was coated on the orientation film described above using No. 3.4 wire bar, which were attached to a metal frame and heated at 130° C. for 2 minutes in a temperature-controlled bath, thereby the discotic liquid-crystal compound was oriented. Then the film was irradiated UV-rays of 120 W/cm² at 110° C. for 1 minute using a high-pressure mercury lamp thereby to polymerize the discotic liquid-crystal compound, thereafter allowed to cool to room temperature. Consequently, the first optically anisotropic layer F was prepared and the optical compensation film F was prepared.

In a similar manner as Example 1, an orientation film was disposed on a glass plate, onto which a first optically anisotropic layer F was formed, then the retardation Re was measured using KOBRA-ADH (by Oji Scientific Instrument). $Re_1 450(0)/Re_1 650(0)$, $Re_1 450(40)/Re_1 650(40)$ and $Re_1 450(-40)/Re_1 650(-40)$ are shown in Table 2.

Preparation of Ellipse Polarizing Plate F

Ellipse polarizing plate F was prepared from the resulting optical polarizing film F.

Comparative Example 1A

Preparation of Bend-Orientation Liquid-Crystal Cell F

The ellipse polarizing plate F of Comparative Example 1 was laminated on the bend-orientation liquid-crystal cell F to prepare a liquid-crystal display device F, and was evaluated in a similar manner as Example 1A. The results are shown in Table 3.

Comparative Example 2

Preparation and Evaluation of Second Optically Anisotropic Layer G

The second optically anisotropic layer G of Comparative Example 2 was prepared and the retardation was evaluated in a similar manner as Example 2. $Re_2 450(0)/Re_2 650(0)$, $Re_2 450(40)/Re_2 650(40)$ and $Re_2 450(-40)/Re_2 650(-40)$ are shown in Table 2.

Preparation of First Optically Anisotropic Layer G and Optical Compensation Film G The first optically anisotropic layer G of Comparative Example 2 was prepared and the retardation was evaluated in a similar manner as Comparative Example 1. $Re_1 450(0)/Re_1 650(0)$, $Re_1 450(40)/Re_1 650(40)$ and $Re_1 450(-40)/Re_1 650(-40)$ are shown in Table 2.

Preparation of Ellipse Polarizing Plate G

Ellipse polarizing plate G was prepared from the optically anisotropic polarizing layer G of Comparative Example 2 and also the optically anisotropic polarizing layer F of Comparative Example 1.

Comparative Example 2A

Preparation and Evaluation of Liquid-Crystal Display Device G

The ellipse polarizing plate G of Comparative Example 2 was laminated on the bend-orientation liquid-crystal cell A to prepare a liquid-crystal display device G, and was evaluated in a similar manner as Example 1. The results are shown in Table 3.

TABLE 2

| | Configuration | 1 | | | 2 | | |
|---|---|---|---|---|---|---|---|
| | | (a) | (b) | (c) | (a) | (b) | (c) |
| Ex. 1 | First, Second Optically Anisortopic Layer A | 1.14 | 1.16 | 1.13 | 0.52 | 0.73 | 0.73 |
| Ex. 2 | First, Second Optically Anisotropic Layer B | 1.14 | 1.16 | 1.13 | 1.05 | 1.04 | 1.06 |
| Ex. 3 | First, Second Optically Anisotropic Layer C | 1.14 | 1.16 | 1.13 | 0.8 | 0.8 | 0.8 |
| Ex. 4 | First, Second Optically Anisotropic Layer D | 1.14 | 1.16 | 1.13 | 0.8 | 0.8 | 0.8 |
| Ex. 5 | First, Second Optically Anisotropic Layer E | — | 1.16 | 1.16 | 1.07 | 1.06 | 1.06 |
| Com. Ex. 1 | First, Second Optically Anisotropic Layer F | 1.27 | 1.28 | 1.29 | 0.52 | 0.73 | 0.73 |
| Com. Ex. 2 | First, Second Optically Anisotropic Layer G | 1.27 | 1.28 | 1.29 | 1.05 | 1.04 | 1.06 |

In Table 2, 1(a) represents $Re_1450(0)/Re_1650(0)$ in Expression (i), 1(b) represents $Re_1450(40)/Re_1650(40)$ in Expression (ii), 1(c) represents $Re_1450(-40)/Re_1650(-40)$ in Expression (iii), 2(a) represents $Re_2450(0)/Re_2650(0)$ in Expression (iv), 2(b) represents $Re_2450(40)/Re_2650(40)$ in Expression (v), and 2(c) represents $Re_2450(-40)/Re_2650(-40)$ in Expression (vi).

TABLE 3

|  | Configuration of Liquid Crystal | 3 (a) | 3 (b) | 3 (c) | 4 (a) | 4 (b) | 4 (c) | Color Change | Face V | Color Shift |
|---|---|---|---|---|---|---|---|---|---|---|
| Ex. 1A | Bend LC DisplayDevice A | 1.12 | 1.13 | 1.12 | 1.02 | 1.03 | 1.01 | A | 0.44 | 0.01 |
| Ex. 2A | Bend LC DisplayDevice B | 1.12 | 1.13 | 1.12 | 1.02 | 1.03 | 1.01 | A | 0.44 | 0.02 |
| Ex. 3A | ECB LC DisplayDevice C | 1.15 | 1.16 | 1.16 | 0.9 | 1 | 0.97 | A | 0.44 | 0.01 |
| Ex. 4A | TN LC DisplayDevice D | 1.08 | 1.09 | 1.09 | 1.06 | 1.06 | 1.04 | A | 0.44 | 0.01 |
| Ex. 5A | IPS LC DisplayDevice E | 1.11 | 1.11 | 1.11 | — | 1.05 | 1.05 | A | 0.45 | 0.01 |
| Com. Ex. 1A | Bend LC DisplayDevice F | 1.12 | 1.13 | 1.12 | 1.13 | 1.13 | 1.15 | C | 0.38 | 0.03 |
| Com. Ex. 2A | Bend LC DisplayDevice G | 1.12 | 1.13 | 1.12 | 1.13 | 1.13 | 1.15 | C | 0.38 | 0.04 |

In Table 3, 3(a) represents $Re_1c450(0)/Re_1c650(0)$ in Expression (x), 3(b) represents $Re_1c450(40)/Re_1c650(40)$ in Expression (xi), 3(c) represents $Re_1c450(-40)/Re_1c650(-40)$ in Expression (xii), 4(a) represents $[(Re_1c450(0)/Re_1c650(0))/(Re_1450(0)/Re_1650(\theta))]$ in Expression (xiii), i.e. 3(a)/1(a); 4(b) represents $[(Re_1c450(40)/Re_1c650(40))/(Re_1450(40)/Re_1650(40))]$ in Expression (xiv), i.e. 3(b)/1(b); and 4(c) represents $[(Re_1c450(-40)/Re_1c650(-40))/(Re_1450(-40)/Re_1650(-40))]$ in Expression (xv), i.e. 3(c)/1(c).

The results of Tables 2 and 3 demonstrate that the ranges of the retardation Re 1(a) to 1(c) of the first optically anisotropic layers and the retardation Re 2(a) to 2(c) of the second optically anisotropic layers in the liquid-crystal display devices of Examples 1A to 5A are more preferable compared to those of Comparative Examples 1A and 2A, which results in superior liquid-crystal display with less color change.

Furthermore, it is confirmed that the ranges of the retardation Re 3(a) to 3(c) of the first optically anisotropic layers and the retardation Re 4(a) to 4(c) of the second optically anisotropic layers in the liquid-crystal display devices of Examples 1A to 5A are more preferable than those of Comparative Examples 1A and 2A, which results in superior face V and color shift and improvement in view-angle dependency and wavelength dependency.

Example of Second Embodiment

Example 1

Preparation of Cellulose Acetate Film

The ingredients shown below were poured into a mixing tank, the ingredients were dissolved while heating and stirring to prepare a cellulose acetate solution.

| Ingredients of Cellulose Acetate Solution | |
|---|---|
| Cellulose acetate (acetification degree: 60.9%) | 100 parts |
| Triphenyl phosphate (plasticizer) | 7.8 parts |
| Biphenyldiphenyl phosphate (plasticizer) | 3.9 parts |

| Ingredients of Cellulose Acetate Solution | |
|---|---|
| Methylene chloride | 300 parts |
| Methanol | 45 parts |

Into another mixing tank, 4 parts of cellulose acetate (acetification degree: 60.9%, linter), 25 parts of the retardation-increasing agent shown below, 0.5 part of silica fine particles (average particle size: 20 nm), 80 parts of methylene chloride, and 20 parts of methanol were poured and stirred while heating thereby to prepare a solution of retardation-increasing agent.

Retardation-Increasing Agent

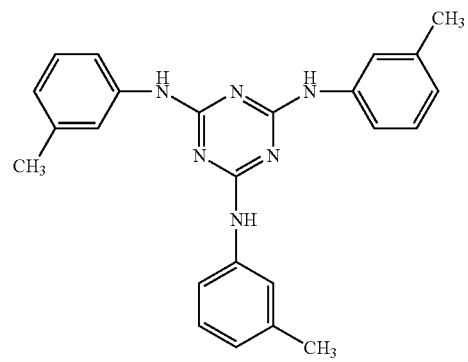

The aforesaid solution of the retardation-increasing agent of 18.5 parts was mixed with the aforesaid cellulose acetate solution of 470 parts to stir sufficiently to prepare a dope. The amount of the retardation-increasing agent was 3.5% by mass based on the cellulose acetate. The film having a residual-solvent content of 35% by mass was peeled away from a band then traverse-stretched using a tenter at 150° C. and stretching rate of 30%, the film was maintained at 130° C. for 45 seconds without clips to prepare a cellulose acetate film 1. The residual-solvent content of the cellulose acetate film 1 was 0.2% by mass, and the film thickness was 88 μm.

Similarly, the aforesaid solution of the retardation-increasing agent of 47.6 parts was mixed with the aforesaid cellulose acetate solution of 470 parts to stir sufficiently to prepare a dope. The amount of the retardation-increasing agent was 9.0% by mass based on the cellulose acetate. The film having a residual-solvent content of 35% by mass was peeled away from a band then traverse-stretched using a tenter at 125° C. and stretching rate of 42%, the film was maintained at 120° C. for 45 seconds without clips to prepare a cellulose acetate film 2. The residual-solvent content of the cellulose acetate film 2 was 0.2% by mass, and the film thickness was 87 μm.

Saponification of Cellulose Acetate Film

On one surface of each of the cellulose acetate films 1 and 2, isopropyl alcohol solution dissolving 1.5 N potassium hydroxide was coated at an amount of 25 ml/m², then the coating was allowed to stand at 25° C. for 5 seconds, followed by rinsing with flowing water for 10 seconds and the surface of the film was dried through blowing air at 25° C. Consequently, one side of the respective cellulose acetate films was saponified.

Orientation-Film Formation

The coating liquid for orientation film of the ingredients shown below was coated on one side of each of the saponified cellulose acetate films 1 and 2 with No. 14 wire bar coater in an amount of 24 ml/m², then the coating was dried by warm wind at 60° C. for 60 seconds and then 90° C. for 150 seconds to form an orientation film H-2.

| Composition of Orientation-Film Coating Liquid | |
|---|---|
| Modified polyvinyl alcohol of formula (B) below *1) | 10 parts |
| Water | 371 parts |
| Methanol | 119 parts |
| Glutaraldehyde (crosslinker) | 0.5 part |

*1) Poval PVA-103, by Kuraray Co. Ltd.

Formula (B)

$$-(CH_2-CH)_x-(CH_2-CH)_y-(CH_2-CH)_z-$$
with pendant groups: OH; O-C(=O)-NH-(chain)-OCOC=CH₂/CH₃; O-C(=O)-CH₃

In the formula (B), x=98, y=2.

Measurement of Surface Free Energy of Orientation Film

Surface free energy of the resulting films was determined in accordance with the process for measuring surface free energy shown below. The results are shown in Table 4.

Process for Measuring Surface Free Energy

The surface free energy was determined with reference to "D. K. Owens, J. Appl. Polym. Sci. 13, 1741 (1969)" on the basis of measured contact angles $\theta_{H2O}$ for pure water and $\theta_{CH2I2}$ for methylene iodide using the simultaneous expressions (1) and (2). When the contact angles $\theta_{GL}$ for glycerin was measured in place of pure water, simultaneous expressions (2) and (3) were employed.

Simultaneous Expression $$1+\cos\theta_{H2O} = 2\sqrt{\gamma s^d}(\gamma_{H2O}^d/\gamma_{H2O}^v)^{1/2} + 2\sqrt{\gamma s^h}(\gamma_{H2O}^h/\gamma_{H2O}^v)^{1/2} \quad (1)$$

$$1+\cos\theta_{CH2I2} = 2\sqrt{\gamma s^d}(\gamma_{CH2I2}^d/\gamma_{CH2I2}^v)^{1/2} + 2\sqrt{\gamma s^h}(\gamma_{CH2I2}^h/\gamma_{CH2I2}^v)^{1/2}$$
$\gamma_{H2O}^d=21.8, \gamma_{H2O}^h=51.0, \gamma_{H2O}^v=72.8, \gamma_{CH2I2}^d=49.5, \gamma_{CH2I2}^h=1.3, \gamma_{CH2I2}^v=50.8$ (2)

$$1+\cos\theta_{GL} = 2\sqrt{\gamma s^d}(\gamma_{GL}^d/\gamma_{GL}^v)^{1/2} + 2\sqrt{\gamma s^h}(\gamma_{GL}^h/\gamma_{GL}^v)^{1/2}$$
$\gamma_{GL}^d=37.4, \gamma_{GL}^h=26.0, \gamma_{GL}^v=63.4$, GL:glycerin (3)

In the simultaneous expressions, $\gamma s^d$ and $\gamma s^h$ respectively correspond to the dispersion force component and the hydrogen bond component of surface free energy, and the total value $\gamma s^v (=\gamma s^d+\gamma s^h)$ is defined as the surface free energy.

The contact angle was measured in a way that samples were humidity-conditioned in a condition of 25° C. and 60% of humidity for 24 hours, then 10 μl of pure water, glycerin or methylene iodide was dropped on the surface of samples and the angle was measured after 30 seconds using prop Master 500 (by Kyowa Interface Science Co.).

Rubbing Treatment

While the cellulose acetate film, on which the orientation film having been formed, was being conveyed at a velocity of 20 m/min, a rubbing roll of 300 mm diameter was arranged in a direction of 45° from the longitudinal direction and subjected to rubbing-treatment of the surface of the orientation film under rotating at 650 rpm. The contact length between the rubbing roll and the film was 18 meters (m).

Preparation of Optically Anisotropic Layer

The coating liquid for optically anisotropic layer of the composition shown below was applied continuously on the aforesaid orientation film that was being conveyed at 20 m/min by way of rotating a No. 3.0 wire bar at 391 rpm in the same direction with the conveying direction.

| Composition of Coating Liquid for Optically Anisotropic Layer | |
|---|---|
| Discotic liquid crystal compound*1) | 100 parts |
| Cellulose acetate butylate*2) | 1 part |
| Photopolymerization Initiator*3) | 3 parts |
| Sensitizer*4) | 1 part |
| Fluoroaliphatic group-containing copolymer*5) | 0.22 part |
| Methylethylketone | 226.34 parts |

*1) exemplified compound D-337
*2) CAB531-1, by Eastman Chemical Co.
*3) Irgacure 907, by Ciba Geigy Co.
*4) Kayacure DETX, by Nippon Kayaku Co.
*5) Megafac F780, by Dainippon Ink & Chemical Inc.

The solvent was dried in a process to heat continuously from room temperature to 100° C., then the discotic liquid-crystal compound was oriented by way of heating at 120° C. for 120 seconds under a wind velocity of 2.5 m/sec at the film surface of the discotic liquid-crystal compound layer in a drying zone at 120° C. Then the film was conveyed to a drying zone of 100° C., and UV rays of illuminance 600 mW was irradiated for 4 seconds using a UV ray irradiation device (UV lamp: output 160 W/cm, emission length: 1.6 m) thereby to progress crosslinking reaction to fix the discotic liquid-crystal compound at the orientation. Thereafter, the film was cooled to room temperature, and taken up cylindrically to form a roll. As such, the optical compensation film of Example 1 was prepared.

Measurement of Optical Property

A portion of the resulting optical compensation film was cut off to take a sample for measuring optical properties. The retardation Re of the optically anisotropic layer of the sample was 30.0 nm, in which the measurement was carried out by irradiating a light of wavelength 550 nm in the normal direction of the film using KOBRA-ADH (by Oji Scientific Instrument) under 25° C. and 55% RH. In the optically anisotropic layer, the angle (inclination angle) between the disc-face of the discotic liquid-crystal compound and the face of support represented continuous change in the layer-depth direction, and the average inclination angle was 24.5°.

Measurement of Surface Free Energy of Liquid-Crystal Compound

A test liquid, prepared from the ingredients below, was dropped on a glass plate and a film of about 2 μm thick at dry state was formed through controlling revolution number at spin coating; then the film was gradually heated at a ramp rate of 10° C./min to the temperature of 5° C. higher than the temperature where the liquid crystal compound comes to isotropic, at which time the film was cured by irradiating UV rays of 500 mJ/cm$^2$, thereby to prepare sample L-1. The surface free energy was then measured using the process described above. The results are shown in Table 5.

The difference between $\gamma s^d_{(AL)}$ and $\gamma s^d_{(LC)}$ was calculated from the expression (A) shown below, wherein $\gamma s^d_{(AL)}$ is a dispersion force component of surface free energy of orientation film, and $\gamma s^d_{(LC)}$ is a dispersion force component of surface free energy of liquid-crystal compound. The results are shown in Table 6.

| Composition of Test Liquid | |
|---|---|
| Discotic liquid crystal compound*[1] | 100 parts |
| Photopolymerization Initiator*[2] | 3 parts |
| Sensitizer*[3] | 1 part |
| Methylethylketone | 226.34 parts |

*[1] exemplified compound D-337
*[2] Irgacure 907, by Ciba Geigy Co.
*[3] Kayacure DETX, by Nippon Kayaku Co.

$$\Delta\gamma s^d = \gamma s^d_{(LC)} - \gamma s^d_{(AL)} \qquad \text{Expression (A):}$$

Evaluation of Orientation

Films were observed by visual inspection and microscopic observation, and evaluated in accordance with the following criteria. The results are shown in Table 6.

A: surface condition is uniform, and uniform quenching appears at quenching condition;

B: surface condition is nonuniform e.g. streak, and nonuniform quenching appears at quenching condition.

Example 2

An optical compensation film of Example 2 was prepared in the same manner as Example 1, except that an orientation film H-5 was formed using a modified polyvinyl alcohol expressed by formula (B) described above (x=98, y=2, z=2), then in a similar manner as Example 1, the orientation film H-5 was evaluated in terms of the surface free energy, and also the optical compensation film was evaluated in terms of average inclination angle, $\Delta\gamma s^d$, and orientation. These results are shown in Tables 4 and 6.

Example 3

An optical compensation film of Example 3 was prepared in the same manner as Example 1, except that orientation film H-1 was formed using the modified polyvinyl alcohol (x=86.33, y=1.67, z=12) instead of the modified polyvinyl alcohol expressed by formula (B) and the liquid crystal compound was also changed into the exemplified compound D-89, then in a similar manner as Example 1, a sample L-2 was prepared from the liquid crystal compound and was evaluated in terms of the surface free energy, and also the optical compensation film was evaluated in terms of average inclination angle, $\Delta\gamma s^d$, and orientation. These results are shown in Tables 5 and 6.

Example 4

An optical compensation film of Example 4 was prepared in the same manner as Example 1, except that the liquid crystal compound was changed into exemplified compound D-112, then in a similar manner as Example 1, a sample L-3 was prepared from the liquid crystal compound and was evaluated in terms of the surface free energy, and also the optical compensation film was evaluated in terms of average inclination angle, $\Delta\gamma s^d$, and orientation. These results are shown in Tables 5 and 6.

Example 5

An optical compensation film of Example 5 was prepared in the same manner as Example 1, except that an orientation film H-3 was formed using a modified polyvinyl alcohol expressed by formula (B) described above (x=88, y=12, PVA-203, by Kuraray Co. Ltd.) and also the liquid crystal compound was changed into the exemplified compound D-351, then in a similar manner as Example 1, the orientation film H-3 was evaluated in terms of the surface free energy, and a sample L-4 was prepared from the liquid crystal compound and was evaluated in terms of average inclination angle, $\Delta\gamma s^d$, and orientation. These results are shown in Tables 5 and 6.

Example 6

An optical compensation film of Example 6 was prepared in the same manner as Example 5, except that the liquid crystal compound was changed into the exemplified compound D-92, then in a similar manner as Example 5, a sample L-5 was prepared from the liquid crystal compound and was evaluated in terms of the surface free energy, and also the optical compensation film was evaluated in terms of average inclination angle, $\Delta\gamma s^d$, and orientation. These results are shown in Tables 5 and 6.

Example 7

An optical compensation film of Example 7 was prepared in the same manner as Example 1, except that the liquid crystal compound was changed into the exemplified compound D-346, then in a similar manner as Example 1, a sample L-6 was prepared from the liquid crystal compound and was evaluated in terms of the surface free energy, and also the optical compensation film was evaluated in terms of average inclination angle, $\Delta\gamma s^d$, and orientation. These results are shown in Tables 5 and 6.

Example 8

An optical compensation film of Example 8 was prepared in the same manner as Example 7, except that the orientation film was changed into H-5, then in a similar manner as Example 7, the optical compensation film was evaluated in terms of average inclination angle, $\Delta\gamma s^d$, and orientation. These results are shown in Table 6.

Comparative Example 1

An optical compensation film of Comparative Example 1 was prepared in the same manner as Example 1, except that the orientation film was changed into H-1, then in a similar manner as Example 1, the optical compensation film was evaluated in terms of average inclination angle, zysd, and orientation. These results are shown in Table 6.

Comparative Example 2

An optical compensation film of Comparative Example 2 was prepared in the same manner as Example 1, except that the orientation film was changed into H-3, then in a similar manner as Example 1, the optical compensation film was evaluated in terms of average inclination angle, $\Delta\gamma s^d$, and orientation. These results are shown in Table 6.

Comparative Example 3

An optical compensation film of Comparative Example 3 was prepared in the same manner as Example 1, except that an orientation film H-4 was formed using a modified polyvinyl alcohol expressed by formula (B) described above (x=78, y=22, PVA-403, by Kuraray Co. Ltd.), then in a similar manner as Example 1, the orientation film H-4 was evaluated in terms of the surface free energy, and also the optical compensation film was evaluated in terms of average inclination angle, $\Delta\gamma s^d$, and orientation. These results are shown in Tables 4 and 6.

Comparative Example 4

An optical compensation film of Comparative Example 4 was prepared in the same manner as Example 4, except that the orientation film was changed into H-1, and the optical compensation film was evaluated, in the same manner as Example 4, for average inclination angle, $\Delta\gamma s^d$, and orientation. These results are shown in Table 6.

Comparative Example 5

An optical compensation film of Comparative Example 5 was prepared in the same manner as Example 4, except that the orientation film was changed into H-3, and the optical compensation film was evaluated, in the same manner as Example 4, for average inclination angle, $\Delta\gamma s^d$, and orientation. These results are shown in Table 6.

Comparative Example 6

An optical compensation film of Comparative Example 6 was prepared in the same manner as Example 4, except that the orientation film was changed into H-4, and the optical compensation film was evaluated, in the same manner as Example 4, for average inclination angle, $\Delta\gamma s^d$, and orientation. These results are shown in Table 6.

TABLE 4

| Orientation Film | Polyvinyl Alcohol | | | Contact Angle (°) | | Surface Free Energy (erg/cm²) | | |
|---|---|---|---|---|---|---|---|---|
| | x | y | z | Glycerine | CH₂I₂ | $\gamma s^d$ | $\gamma s^h$ | $\gamma s^v$ |
| H-1 | 86.33 | 1.67 | 12 | 65.1 | 39.5 | 37.9 | 2.1 | 40.0 |
| H-2 | 98 | 2 | 0 | 53.6 | 40.8 | 31.2 | 10.3 | 41.5 |
| H-3 | 88 | 12 | 0 | 63.5 | 36.8 | 39.0 | 2.2 | 41.3 |
| H-4 | 78 | 22 | 0 | 66.7 | 38.0 | 39.9 | 1.2 | 41.1 |
| H-5 | 96 | 2 | 2 | 50.0 | 39.0 | 30.9 | 12.5 | 43.5 |

The results of Table 4 demonstrate that higher rates of vinyl alcohol unit in polyvinyl alcohol may make easy to increase the $\gamma s^h{}_{(AL)}$ of hydrogen bond component of surface free energy in the orientation films, which in turn may make easy to decrease $\gamma s^d{}_{(AL)}$. Accordingly, it is confirmed that $\Delta\gamma s^d$ can be controlled by the rate of vinyl alcohol unit.

TABLE 5

| | Liquid Crystal Compound | Contact Angle (°) | | Surface Free Energy (erg/cm²) | | |
|---|---|---|---|---|---|---|
| Sample | | H₂O | CH₂I₂ | $\gamma s^d$ | $\gamma s^h$ | $\gamma s^v$ |
| L-1 | D-337 | 64.2 | 36.3 | 33.3 | 10.2 | 43.5 |
| L-2 | D-89 | 68.5 | 30.0 | 38.6 | 6.0 | 44.6 |
| L-3 | D-112 | 70.5 | 42.4 | 32.0 | 7.4 | 39.4 |
| L-4 | D-351 | 65.6 | 27.5 | 38.6 | 7.3 | 46.0 |
| L-5 | D-92 | 66.5 | 34.4 | 35.3 | 8.1 | 43.5 |
| L-6 | D-346 | 64.0 | 36.0 | 33.1 | 10.0 | 43.1 |

TABLE 6

| | Liquid Crystal Compound | Orientation Film | $\Delta\gamma s^d$ (erg/cm²) | Average Inclination Angle | Orientation |
|---|---|---|---|---|---|
| Ex. 1 | D-337 | H-2 | 2.1 | 35.0 | A |
| Ex. 2 | D-337 | H-5 | 2.4 | 33.5 | A |
| Ex. 3 | D-89 | H-1 | 0.7 | 33.0 | A |
| Ex. 4 | D-112 | H-2 | 0.8 | 34.5 | A |
| Ex. 5 | D-351 | H-3 | −0.4 | 34.7 | A |
| Ex. 6 | D-92 | H-3 | −3.7 | 40.2 | A |
| Ex. 7 | D-346 | H-2 | 1.9 | 35.4 | A |
| Ex. 8 | D-346 | H-5 | 2.2 | 33.4 | A |
| Com. Ex. 1 | D-337 | H-1 | −4.6 | 89.0 | B: streak |
| Com. Ex. 2 | D-337 | H-3 | −5.7 | 42.6 | B: streak |
| Com. Ex. 3 | D-337 | H-4 | −6.6 | 89.6 | B: streak |
| Com. Ex. 4 | D-112 | H-1 | −5.8 | 53.5 | B: streak |
| Com. Ex. 5 | D-112 | H-3 | −7.0 | 42.6 | B: streak |
| Com. Ex. 6 | D-112 | H-4 | −7.9 | 89.8 | B: streak |

The results of Table 6 demonstrate that the optical compensation films of Examples 1 to 8 can represent superior orientation due to $\Delta\gamma s^d$ of no less than −4.0 erg/cm².

Example 9

Preparation of Polarizing Plate

A polarizing film was prepared by way of adsorbing iodine onto a stretched polyvinyl alcohol film, then the optical compensation film of Example 1 was laminated on one side of the polarizing film using an adhesive of polyvinyl alcohol type. The transmissive axis of the polarizing film and the phase-delay axis of the phase difference plate were arranged to be parallel.

A commercially available cellulose triacetate film (Fujitack TD80UF, by Fujifilm Co.) was saponified in the same manner as described above, and laminated to opposite side of the polarizing film using an adhesive of polyvinyl alcohol type thereby to prepare a polarizing plate.

Actual Evaluation in Liquid-Crystal Display Device
Preparation of Bend-Orientation Liquid-Crystal Cell Two glass substrates with an ITO (indium tin oxide) electrode were applied with a polyimide film as an orientation film, then the orientation film was rubbing-treated. The resulting two glass substrates were disposed oppositely such that the rubbing directions are in parallel, and the cell gap was adjusted to 4.0 μm. To the cell gap, a liquid-crystal compound (ZL11132, Merck Co.) with Δn of 0.1396 was injected thereby to prepare a bend-orientation liquid-crystal cell.

The resulting two polarizing plates were laminated to sandwich the resulting bend-orientation cell such that the optically anisotropic layer of the polarizing plate faces the cell substrate, and the rubbing direction of the liquid-crystal cell and the rubbing direction of the opposing optically anisotropic layer are antiparallel. A rectangular wave of 55 Hz was applied to the liquid crystal cell, normally white mode was selected at white display 2 V and black display 5 V; and the voltage was measured at which the front transmissivity comes to the smallest.

Evaluation of Color Shift

The liquid crystal cell having the optical compensation film of Example 1 was evaluated in terms of color shift at azimuthal angle θ°, polar angle 60° and azimuthal angle 180°, polar angle 60° using ConoScope™ (by autronic-MELCHERS GmbH, GE). The results are shown in Table 7.

Example 10

A liquid crystal display device was prepared and evaluated with respect to color shift in the same manner as Example 9, except the polarizing plate was prepared using the optical compensation film of Example 2. The results are shown in Table 7.

Example 11

A liquid crystal display device was prepared and evaluated with respect to color shift in the same manner as Example 9, except the polarizing plate was prepared using the optical compensation film of Example 3. The results are shown in Table 7.

Example 12

A liquid crystal display device was prepared and evaluated with respect to color shift in the same manner as Example 9, except the polarizing plate was prepared using the optical compensation film of Example 4. The results are shown in Table 7.

Example 13

A liquid crystal display device was prepared and evaluated with respect to color shift in the same manner as Example 9, except the polarizing plate was prepared using the optical compensation film of Example 5. The results are shown in Table 7.

Example 14

A liquid crystal display device was prepared and evaluated with respect to color shift in the same manner as Example 9, except the polarizing plate was prepared using the optical compensation film of Example 6. The results are shown in Table 7.

Example 15

A liquid crystal display device was prepared and evaluated with respect to color shift in the same manner as Example 9, except the polarizing plate was prepared using the optical compensation film of Example 7. The results are shown in Table 7.

Example 16

A liquid crystal display device was prepared and evaluated with respect to color shift in the same manner as Example 9, except the polarizing plate was prepared using the optical compensation film of Example 8. The results are shown in Table 7.

Comparative Example 7

A liquid crystal display device was prepared and evaluated with respect to color shift in the same manner as Example 9, except the polarizing plate was prepared using the optical compensation film of Comparative Example 1. The results are shown in Table 7.

Comparative Example 8

A liquid crystal display device was prepared and evaluated with respect to color shift in the same manner as Example 9, except the polarizing plate was prepared using the optical compensation film of Comparative Example 2. The results are shown in Table 7.

Comparative Example 9

A liquid crystal display device was prepared and evaluated with respect to color shift in the same manner as Example 9, except the polarizing plate was prepared using the optical compensation film of Comparative Example 3. The results are shown in Table 7.

Comparative Example 10

A liquid crystal display device was prepared and evaluated with respect to color shift in the same manner as Example 9, except the polarizing plate was prepared using the optical compensation film of Comparative Example 4. The results are shown in Table 7.

Comparative Example 11

A liquid crystal display device was prepared and evaluated with respect to color shift in the same manner as Example 9, except the polarizing plate was prepared using the optical compensation film of Comparative Example 5. The results are shown in Table 7.

Comparative Example 12

A liquid crystal display device was prepared and evaluated with respect to color shift in the same manner as Example 9, except the polarizing plate was prepared using the optical compensation film of Comparative Example 6. The results are shown in Table 7.

TABLE 7

| | Optically Compensation Film | Liquid Crystal Compound | Color Shift |
|---|---|---|---|
| Ex. 9 | Ex. 1 | D-337 | 0.05 |
| Ex. 10 | Ex. 2 | D-337 | 0.05 |
| Ex. 11 | Ex. 3 | D-89 | 0.05 |
| Ex. 12 | Ex. 4 | D-112 | 0.05 |
| Ex. 13 | Ex. 5 | D-351 | 0.05 |
| Ex. 14 | Ex. 6 | D-92 | 0.05 |
| Ex. 15 | Ex. 7 | D-346 | 0.05 |
| Ex. 16 | Ex. 8 | D-346 | 0.05 |
| Com. Ex. 7 | Com. Ex. 1 | D-337 | — |
| Com. Ex. 8 | Com. Ex. 2 | D-337 | — |
| Com. Ex. 9 | Com. Ex. 3 | D-337 | — |
| Com. Ex. 10 | Com. Ex. 4 | D-112 | — |
| Com. Ex. 11 | Com. Ex. 5 | D-112 | — |
| Com. Ex. 12 | Com. Ex. 6 | D-112 | — |

The liquid crystal devices of Comparative Examples 7 to 12 in Table 7 could not be evaluated in terms of color shift due to many streaks on the optical compensation films.

The results of Table 7 demonstrate that the liquid crystal devices of Examples 9 to 16, having optical compensation films of the second embodiment, represent less color shift, in particular, employing the liquid crystal compounds expressed by the general formula (DI) results in still favorable improvement in color shift.

Examples of Third Embodiment

Example 1

Preparation of Optical Compensation Film

Preparation of Cellulose Acetate Film
The ingredients shown below were poured into a mixing tank, the ingredients were dissolved while heating and stirring to prepare a cellulose acetate solution.

| Ingredients of Cellulose Acetate Solution | |
| --- | --- |
| Cellulose acetate (acetification degree: 60.9%) | 100 parts |
| Triphenyl phosphate | 7.8 parts |
| Biphenyldiphenyl phosphate | 3.9 parts |
| Methylene chloride | 300 parts |
| Methanol | 45 parts |

Into another mixing tank, 4 parts of cellulose acetate (acetification degree: 60.9%, linter), 25 parts of the retardation-increasing agent shown below, 0.5 part of silica fine particles (average particle size: 20 nm), 80 parts of methylene chloride, and 20 parts of methanol were poured and stirred while heating thereby to prepare a solution of retardation-increasing agent.

Retardation-Increasing Agent

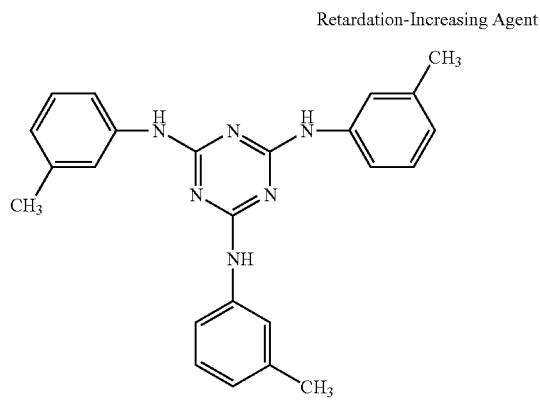

The aforesaid solution of the retardation-increasing agent of 18.5 parts was mixed with the aforesaid cellulose acetate solution of 470 parts to stir sufficiently to prepare a dope. The amount of the retardation-increasing agent was 3.5% by mass based on the cellulose acetate. The film, having a residual-solvent content of 35% by mass, was peeled away from a band then traverse-stretched using a tenter at 150° C. and stretching rate of 30%, the film was maintained at 130° C. for 45 seconds without clips to prepare a cellulose acetate film 1. The residual-solvent content of the cellulose acetate film 1 was 0.2% by mass, and the film thickness was 88 μm.

Similarly, the aforesaid solution of the retardation-increasing agent of 47.6 parts was mixed with the aforesaid cellulose acetate solution of 470 parts to stir sufficiently to prepare a dope. The amount of the retardation-increasing agent was 9.0% by mass based on the cellulose acetate. The film, having a residual-solvent content of 35% by mass, was peeled away from a band then traverse-stretched using a tenter at 125° C. and stretching rate of 42%, the film was maintained at 120° C. for 45 seconds without clips to prepare a cellulose acetate film 2. The residual-solvent content of the cellulose acetate film 2 was 0.2% by mass, and the film thickness was 87 μm.

Saponification of Cellulose Acetate Film
On one surface of each of the cellulose acetate films 1 and 2, isopropyl alcohol solution dissolving 1.5 N potassium hydroxide was coated at an amount of 25 ml/m², then the coating was allowed to stand at 25° C. for 5 seconds, followed by rinsing with flowing water for 10 seconds and the surface of the film was dried through blowing air at 25° C. Consequently, one surface of the respective cellulose acetate films was saponified.

Orientation-Film Formation
The coating liquid for orientation film of the ingredients shown below was coated on one surface of each of the saponified cellulose acetate films 1 and 2 with No. 14 wire bar coater in an amount of 24 ml/m², then the coating was dried by warm wind at 60° C. for 60 seconds and then 90° C. for 150 seconds to form an orientation film H-1.

| Composition of Orientation-Film Coating Liquid | |
| --- | --- |
| Modified polyvinyl alcohol of formula (B) below | 10 parts |
| Water | 371 parts |
| Methanol | 119 parts |
| Glutaraldehyde (crosslinker) | 0.5 part |

Formula (B)

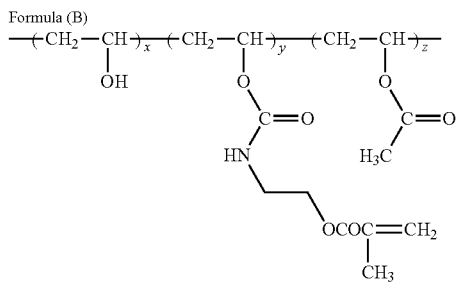

In the formula (B), x=86.33, y=1.67, z=12.

Rubbing Treatment While the cellulose acetate film, on which the orientation film having been formed, was being conveyed at a velocity of 20 m/min, a rubbing roll of 300 mm diameter was arranged in a direction of 45° from the longitudinal direction and subjected to rubbing-treatment of the surface of the orientation film under rotating at 650 rpm. The contact length between the rubbing roll and the film was 18 meters (m).

Preparation of Composition Containing Disc-Like Liquid Crystal Compound
The compositions containing disc-like liquid crystal compounds were prepared as shown in Table 8. Specifically, powdery liquid-crystal compounds were dissolved into methylethylketone (MEK) followed by addition of additive compounds in the amounts shown Table 8.

Table 8 shows also the ratio of GPC pattern area in a range of molecular weights of above 5000 to the entire patter area in GPC charts with respect to before and after storage simulation. In Table 8, "Before Storage under Heating" indicates the measurements in a condition of MEK solution, and "After Storage under Heating" indicates the measurements in a condition after 3 days at 60° C. and 60 RH %.

TABLE 8

| Composition/ LCC | LCC | Additive Compound | Amount (ppm) | GPC Area Ratio Before Storage under Heating | GPC Area Ratio After Storage under Heating |
|---|---|---|---|---|---|
| DL-1 | D-337 | HMM | 500 | 0.00 | 0.05 |
| DL-2 | D-337 | HMM | 10000 | 0.00 | 0.04 |
| DL-3 | D-337 | HMM | 2000 | 0.00 | 0.01 |
| DL-4 | D-337 | HMM | 5000 | 0.00 | 0.01 |
| DL-5 | D-337 | HMM | 10000 | 0.00 | 0.00 |
| DL-6 | D-337 | Irgnox1010 | 1000 | 0.00 | 0.07 |
| DL-7 | D-337 | Irgnox1010 | 2000 | 0.00 | 0.06 |
| DL-8 | D-337 | Irgnox1010 | 10000 | 0.00 | 0.00 |
| DL-9 | D-89 | HMM | 1000 | 0.00 | 0.03 |
| DL-10 | D-89 | Irgnox1010 | 1000 | 0.00 | 0.05 |
| DL-11 | D-346 | HMM | 1000 | 0.00 | 0.04 |
| DL-12 | D-346 | Irgnox1010 | 1000 | 0.00 | 0.06 |
| D337 | D-337 | — | — | 0.00 | 0.25 |
| D346 | D-89 | — | — | 0.00 | 0.32 |
| D346 | D-346 | — | — | 0.00 | 0.22 |
| (A) | (A) | — | — | 0.00 | 0.25 |

LCC: Liquid Crystal Compound

In Table 8, "DL" in column "Composition/LCC" indicates a composition, "D" indicates a liquid-crystal compound with no additive, "A" indicates the disc-like liquid-crystal compound A.

In addition, HMM means hydroquinone monomethylether, Irgnox 1010 is a product by Ciba Speciality Chemicals Inc.

Preparation of Coating-Liquid Sample

Coating liquid samples 001 and 002 shown below were prepared. In addition, coating liquid samples 003 to 016 were prepared in the same manner as sample 002 except that the disc-like liquid-crystal compound A was changed into compositions DL-1 to DL-12 or liquid-crystal compounds D-89, D-346. The compositions shown in Table 9 were prepared such that the amounts of disc-like liquid-crystal compounds are equivalent.

The disc-like liquid-crystal compound A, compositions DL-1 to DL-12, and liquid-crystal compounds D-89, D-346 were each a powder after long-period storage simulation at 60° C. and 50 RH % for 7 days.

Coating-Liquid Sample 001

| | |
|---|---|
| Disc-like liquid crystal compound (A) | 91 parts |
| Ethyleneoxide-modified trimethylolpropanetriacrylate *[1] | 9 parts |
| Cellulose acetate butylate *[2] | 1.1 part |
| Photopolymerization Initiator *[3] | 3 parts |
| Sensitizer *[4] | 1 part |
| Fluoroaliphatic group-containing copolymer *[5] | 0.22 part |
| Methylethylketone | 226.34 parts |

*[1] V#360, by Osaka Organic Chemistry Co.
*[2] CAB531-1, by Eastman Chemical Co.
*[3] Irgacure 907, by Ciba Geigy Co.
*[4] Kayacure DETX, by Nippon Kayaku Co.
*[5] Megafac F780, by Dainippon Ink & Chemical Inc.

Disc-like Liquid Crystal Compound (A)

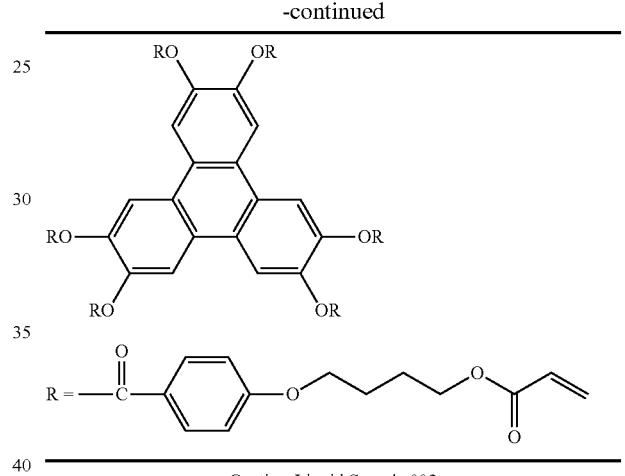

Coating-Liquid Sample 002

| | |
|---|---|
| Disc-like liquid crystal compound (D-337) | 100 parts |
| Cellulose acetate butylate *[1] | 1 part |
| Photopolymerization Initiator *[2] | 3 parts |
| Sensitizer *[3] | 1 part |
| Fluoroaliphatic group-containing copolymer *[4] | 0.22 part |
| Methylethylketone | 226.34 parts |

*[1] CAB531-1, by Eastman Chemical Co.
*[2] Irgacure 907, by Ciba Geigy Co.
*[3] Kayacure DETX, by Nippon Kayaku Co.
*[4] Megafac F780, by Dainippon Ink & Chemical Inc.

TABLE 9

| Coating-Liquid Sample | Liquid-Crystal Compound |
|---|---|
| 103 | DL-1 |
| 104 | DL-2 |
| 105 | DL-3 |
| 106 | DL-4 |
| 107 | DL-5 |
| 108 | DL-6 |
| 109 | DL-7 |
| 110 | DL-8 |
| 111 | D-89 |
| 112 | DL-9 |
| 113 | DL-10 |

TABLE 9-continued

| Coating-Liquid Sample | Liquid-Crystal Compound |
|---|---|
| 114 | D-346 |
| 115 | DL-11 |
| 116 | DL-12 |
| Reference | D-337 |
| Reference | (A) |

Preparation of Optically Anisotropic Layer

The coating-liquid sample 001 for optically anisotropic layer was applied continuously on the rubbing-treated surface of the orientation film, which being conveyed at 15 m/min, by way of rotating a No. 3.0 wire bar at 300 rpm in the same direction with the conveying direction.

The solvent was dried in a process to heat continuously from room temperature to 105° C., then the disc-like liquid-crystal compound was oriented by way of heating for 120 seconds under a wind velocity of 2.5 m/sec at the film surface of the disc-like liquid-crystal compound layer in a drying zone at 125° C. Then the film was conveyed to a drying zone of 105° C., and UV rays of illuminance 600 mW was irradiated for 4 seconds using a UV ray irradiation device (UV lamp: output 160 W/cm, emission length: 1.6 m) thereby to progress crosslinking reaction to fix the discotic liquid-crystal compound at the orientation. Thereafter, the film was cooled to room temperature, and taken up cylindrically to form a roll. As such, the optical compensation film of sample 101 was prepared.

Measurement of Optical Property

A portion of the resulting optical compensation film was cut off to take a sample for measuring optical properties. The retardation Re of the optically anisotropic layer of the sample was 30.0 nm, in which the measurement was carried out by irradiating a light of wavelength 550 nm in the normal direction of the film using KOBRA-ADH (by Oji Scientific Instrument) under 25° C. and 55% RH.

Samples 102 to 116 were prepared in a similar manner as coating sample 101 using coating-liquid samples 002 to 016. The shortest period for the polymerizable liquid-crystal compound to orient on the orientation film was primarily determined for the respective coating-liquid samples under the coating conditions, thus the heating period or drying period in drying zone was controlled for the respective coating-liquid samples as shown in Table 10.

These samples were measured in terms of the retardation in accordance with the process described above and also evaluated in terms of items shown in Table 10 below. The results are shown summarily in Table 10.

Evaluation of Adhesion on Optically anisotropic Layer

Optical compensation films were fixed on a glass plate using an adhesive, then the films were cross-cut into 10 by 10 areas of 2 mm pitch and 5 μm depth. Then NT tape (by Nitto Denko Co.) was laminated on the film and adhered by rubbing the surface 10 times back and forth using a weight of 100 g, and peeled away after allowing to stand overnight, then the number of peeled sites in 100 squares was counted.

A: 0 to 5 sites, excellent
B: 6 to 20, non-rejection but somewhat inferior
C: 21 to 100, rejection Evaluation of Bright Spot and Defect in Film The number of bright spots and defects was counted under a transmissive light of cross nicol condition of polarizing plate in polarization microscopy.

A: 0 to 10 sites, excellent
B: 11 to 100, non-rejection but somewhat inferior
C: 100 or more, rejection Example 2

Preparation of Polarizing Plate

A polarizing film was prepared by way of adsorbing iodine onto a stretched polyvinyl alcohol film, then the optical compensation film of sample 101 prepared in Example 1 was laminated on one side of the polarizing film using an adhesive of polyvinyl alcohol type. The transmissive axis of the polarizing film and the phase-delay axis of the phase difference plate were arranged to be parallel.

A commercially available cellulose triacetate film (Fujitack TD80UF, by Fujifilm Co.) was saponified in the same manner as described above, and laminated to opposite side of the polarizing film using an adhesive of polyvinyl alcohol type thereby to prepare a polarizing plate.

Other polarizing plates were prepared in a similar manner while changing sample 101 into samples 102 to 116.

Example 3

Actual Evaluation in Liquid-Crystal Display Device

Preparation of Bend-Orientation Liquid-Crystal Cell

Two glass substrates with ITO electrodes were applied a polyimide film as an orientation film, then the orientation film was rubbing-treated. The resulting two glass substrates were disposed oppositely such that the rubbing directions are in parallel, and the cell gap was adjusted to 4.0 μm. To the cell gap, a liquid-crystal compound (ZL11132, Merck Co.) with Δn of 0.1396 was injected thereby to prepare a bend-orientation liquid-crystal cell.

The resulting two polarizing plates were laminated to sandwich the resulting bend-orientation cell such that the optically anisotropic layer of the polarizing plate faces the cell substrate, and the rubbing direction of the liquid-crystal cell and the rubbing direction of the opposing optically anisotropic layer are antiparallel.

A rectangular wave of 55 Hz was applied to the liquid crystal cell, normally white mode was selected at white display 2 V and black display 5 V; and the voltage was measured at which the front transmissivity comes to the smallest.

Polarizing plates were produced using the samples 101 to 116, and liquid-crystal cells were produced using the polarizing plates. The black-display transmissivity of the liquid-crystal cells was measured by EZ-Contrast 160 tester (By ELDI Co.). The results are shown in Table 10.

TABLE 10

| Sample | LCC | GPC Area Ratio Before Storage under Heating | GPC Area Ratio After Storage under Heating | Re (nm) | Average Inclination Angle | Bright Spot & Defect | Adhesion | Transmissivity | Drying Period (second) | Remark |
|---|---|---|---|---|---|---|---|---|---|---|
| 101 | (A) | 0 | 0.25 | 30 | 30 | A | A | 0.03 | 120 | Com. |
| 102 | D-337 | 0 | 0.25 | 31 | 30 | C | A | 0.12 | 90 | Com. |
| 103 | DL-1 | 0 | 0.05 | 31 | 30 | A | A | 0.02 | 90 | Ex. |
| 104 | DL-2 | 0 | 0.04 | 31 | 30 | A | A | 0.01 | 90 | Ex. |
| 105 | DL-3 | 0 | 0.01 | 32 | 30 | A | A | 0.01 | 90 | Ex. |
| 106 | DL-4 | 0 | 0.01 | 32 | 31 | A | B | 0.01 | 90 | Ex. |
| 107 | DL-5 | 0 | 0 | 32 | 31 | A | B | 0.01 | 90 | Ex. |
| 108 | DL-6 | 0 | 0.07 | 31 | 30 | A | A | 0.01 | 90 | Ex. |
| 109 | DL-7 | 0 | 0.06 | 32 | 30 | A | A | 0.01 | 90 | Ex. |
| 110 | DL-8 | 0 | 0 | 32 | 31 | A | B | 0.01 | 90 | Ex. |
| 111 | D-89 | 0 | 0.32 | 30 | 31 | C | A | 0.15 | 90 | Com. |
| 112 | DL-9 | 0 | 0.03 | 31 | 31 | A | A | 0.02 | 90 | Ex. |
| 113 | DL-10 | 0 | 0.05 | 31 | 30 | A | A | 0.02 | 90 | Ex. |
| 114 | D-346 | 0 | 0.22 | 32 | 29 | C | A | 0.11 | 90 | Com. |
| 115 | DL-11 | 0 | 0.04 | 31 | 30 | A | A | 0.02 | 90 | Ex. |
| 116 | DL-12 | 0 | 0.06 | 31 | 29 | A | A | 0.02 | 90 | Ex. |

LCC: Liquid Crystal Compound
Ex.: Example
Com.: Comparative Example

The results of Table 10 demonstrate that the inventive samples or compositions may bring about less bright spots and defects with no change of optical properties and superior adhesion which being one of film-strength factors, thus may lead to lower transmissivity and proper black brightness in the resulting liquid-crystal display devices. From the comparison between samples 103 to 105 and samples 106 to 107, samples 108 to 109 and sample 110, it is suggested that there exist a preferable point in the additive amount when the polymerizable reaction of polymerizable liquid-crystal compounds in the third embodiment is to be controlled by an additive compound. In addition, it is confirmed that the drying period of samples 103 to 116 is shorter than that of sample 101, thus polymerizable liquid-crystal compounds with shorter heating period for orientation may be favorably employed in the present invention while maintaining the other appropriate properties.

The optical compensation films, polarizing plates and liquid-crystal display devices may be appropriately utilized for optical apparatuses or instruments such as portable telephones, monitors of personal computers and televisions.

The invention claimed is:

1. An optical compensation film, comprising:
a first optically anisotropic layer, and
a second optically anisotropic layer,
wherein the first optically anisotropic layer satisfies at least one of the following Expressions (i) to (iii):

$$1 \leq Re_1 450(0°)/Re_1 650(0°) \leq 1.25: \quad \text{Equation (i)}$$

$$1 \leq Re_1 450(40°)/Re_1 650(40°) \leq 1.25: \quad \text{Equation (ii)}$$

$$1 \leq Re_1 450(-40°)/Re_1 650(-40°) \leq 1.25: \quad \text{Equation (iii)}$$

in Expressions (i) to (iii), $Re_1 \lambda(\theta)$ is defined as the value of Re retardation in the first optically anisotropic layer determined in the condition that a light of wavelength $\lambda$(nm) is entered at an incident angle $\theta°$ from the normal line with the retardant phase being defined as the rotation axis, wherein when the values of $Re_1 \lambda(\theta)$ and $Re_1 \lambda(-\theta)$ are different, the magnitude is decided so as to become $Re_1 \lambda(\theta) > Re_1 \lambda(-\theta)$, wherein the first optically anisotropic layer is composed of at least a disc-like liquid-crystal compound, and
wherein the disc-like liquid crystal compound comprises at least a compound expressed by the general formula (DI):

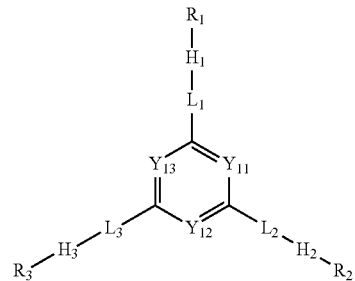

General Formula (DI)

in general formula (DI), $Y_{11}$, $Y_{12}$ and $Y_{13}$ represent each independently a methine or nitrogen atom; $L_1$, $L_2$ and $L_3$ represent each independently a connecting group of single bond or divalent bond; $H_1$, $H_2$ and $H_3$ represent each independently one expressed by the general formula (DI-A) or (DI-B); $R_1$, $R_2$ and $R_3$ represent each independently one expressed by the general formula (DI-R);

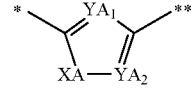

General formula (DI-A)

in the general formula (DI-A), $YA_1$ and $YA_2$ each represents a nitrogen atom; XA represents an oxygen atom; * indicates a site to bond with $L_1$ to $L_3$; ** indicates a site to bond with $R_1$ to $R_3$;

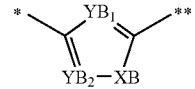

General formula (DI-B)

in the general formula (DI-B), $YB_1$ and $YB_2$ each represents a nitrogen atom; XB represents an oxygen atom; * indicates a site to bond with $L_1$ to $L_3$; ** indicates a site to bond with $R_1$ to $R_3$;

$$*\text{-}(\text{-}L_{21}\text{-}M)_{n1}\text{-}L_{22}\text{-}L_{23}\text{-}Q_1 \qquad \text{General formula (DI-R):}$$

in general formula (DI-R), * indicates a site to bond with a five-membered ring in general formula (DI); $L_{21}$ represents a connecting group of single bond or divalent bond; $L_{22}$ represents a divalent connecting group selected from the group consisting of —O—, —O—CO—, —CO—O—, —O—CO—O—, —S—, —NH—, —SO$_2$—, —CH$_2$—, —CH=CH— and —C≡C—; $L_{23}$ represents a divalent connecting group selected from the group consisting of —O—, —S—, —C(=O)—, —SO$_2$—, —NH—, —CH$_2$—, —CH=CH—, and —C≡C—; M represents a divalent connecting group having at least a cyclic structure; $Q_1$ represent independently a polymerizable group or hydrogen atom; n1 is an integer of 0 to 4.

2. The optical compensation film according to claim 1, wherein the second optically anisotropic layer satisfies at least one of Expressions (iv) to (vi) below:

$$0.3 \leq Re_2 450(0°)/Re_2 650(0°) \leq 1.1: \qquad \text{Expression (iv)}$$

$$0.3 \leq Re_2 450(40°)/Re_2 650(40°) \leq 1.1: \qquad \text{Expression (v)}$$

$$0.3 \leq Re_2 450(-40°)/Re_2 650(-40°) \leq 1.1: \qquad \text{Expression (vi)}$$

in Expressions (iv) to (vi), $Re_2\lambda(\theta)$ is defined as the value of Re retardation in the second optically anisotropic layer determined in the condition that a light of wavelength $\lambda$(nm) is entered with at an incident angle $\theta°$ from the normal line with the retardant phase being defined as the rotation axis (when the values of $Re_2\lambda(\theta)$ and $Re_2\lambda(-\theta)$ are different, the magnitude is decided so as to become $Re_2\lambda(\theta) > Re_2\lambda(-\theta)$).

3. The optical compensation film according to claim 1, wherein the first optically anisotropic layer and the second optically anisotropic layer satisfy at least one of Expressions (vii) to (ix) below:

$$Re_1 450(0°)/Re_1 650(0°) > Re_2 450(0°)/Re_2 650(0°): \qquad \text{Expression (vii)}$$

$$Re_1 450(40°)/Re_1 650(40°) > Re_2 450(40°)/Re_2 650(40°): \qquad \text{Expression (viii)}$$

$$Re_1 450(-40°)/Re_1 650(-40°) > Re_2 450(-40°)/Re_2 650(-40°): \qquad \text{Expression (ix)}$$

in Expressions (vii) to (ix), $Re_2\lambda(\theta)$ is defined as the value of Re retardation in the second optically anisotropic layer determined in the condition that a light of wavelength $\lambda$(nm) is entered at an incident angle $\theta°$ from the normal line with the retardant phase being defined as the rotation axis, wherein when the values of $Re_2\lambda(\theta)$ and $Re_2\lambda(-\theta)$ are different, the magnitude is decided so as to become $Re_2\lambda(\theta) > Re_2\lambda(-\theta)$.

4. The optical compensation film according to claim 1, wherein the average inclination angle of the disc-like liquid crystal compound is no more than 45°.

5. The optical compensation film according to claim 1, wherein the second optically anisotropic layer is formed of a cellulose acylate film.

6. A polarizing plate comprising:
a polarizing film, and
an optical compensation film on at least one side of the polarizing film, wherein the optical compensation film comprises a first optically anisotropic layer, and
a second optically anisotropic layer, wherein the first optically anisotropic layer satisfies at least one of the following Expressions (i) to (iii):

$$1 \leq Re_1 450(0°)/Re_1 650(0°) \leq 1.25: \qquad \text{Equation (i)}$$

$$1 \leq Re_1 450(40°)/Re_1 650(40°) \leq 1.25: \qquad \text{Equation (ii)}$$

$$1 \leq Re_1 450(-40°)/Re_1 650(-40°) \leq 1.25: \qquad \text{Equation (iii)}$$

in Expressions (i) to (iii), $Re_1\lambda(\theta)$ is defined as the value of Re retardation in the first optically anisotropic layer determined in the condition that a light of wavelength $\lambda$(nm) is entered at an incident angle Er from the normal line with the retardant phase being defined as the rotation axis, wherein when the values of $Re_1\lambda(\theta)$ and $Re_1\lambda(-\theta)$ are different, the magnitude is decided so as to become $Re_1\lambda(\theta) > Re_1\lambda(-\theta)$;

wherein the first optically anisotropic layer is composed of at least a disc-like liquid-crystal compound, and wherein the disc-like liquid crystal compound comprises at least a compound expressed by the general formula (DI):

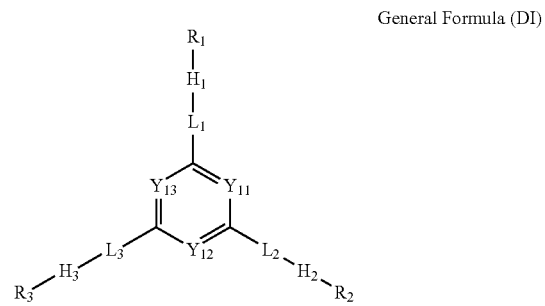

General Formula (DI)

in general formula (DI), $Y_{11}$, $Y_{12}$ and $Y_{13}$ represent each independently a methine or nitrogen atom; $L_1$, $L_2$ and $L_3$ represent each independently a connecting group of single bond or divalent bond; $H_1$, $H_2$ and $H_3$ represent each independently one expressed by the general formula (DI-A) or (DI-B); $R_1$, $R_2$ and $R_3$ represent each independently one expressed by the general formula (DI-R);

General formula (DI-A)

in the general formula (DI-A), $YA_1$ and $YA_2$ each represents a nitrogen atom; XA represents an oxygen atom; * indicates a site to bond with $L_1$ to $L_3$; ** indicates a site to bond with $R_1$ to $R_3$;

General formula (DI-B)

in the general formula (DI-B), $YB_1$ and $YB_2$ each represents a nitrogen atom; XB represents an oxygen atom; * indicates a site to bond with $L_1$ to $L_3$; ** indicates a site to bond with $R_1$ to $R_3$;

$$*\text{-}(\text{-}L_{21}\text{-}M)_{n1}\text{-}L_{22}\text{-}L_{23}\text{-}Q_1 \qquad \text{General formula (DI-R):}$$

in general formula (DI-R), * indicates a site to bond with a five-membered ring in general formula (DI); $L_{21}$ represents a connecting group of single bond or divalent bond; $L_{22}$ represents a divalent connecting group selected from the group consisting of —O—, —O—CO—, —CO—O—, —O—CO—O—, —S—, —NH—, —SO$_2$—, —CH$_2$—, —CH=CH— and —C≡C—; $L_{23}$ represents a divalent connecting group selected from the group consisting of —O—, —S—, —C(=O)—, —SO$_2$—, —NH—, —CH$_2$—, —CH=CH—, and —C≡C—; M represent a divalent connecting group having at least a cyclic structure; $Q_1$ represent independently a polymerizable group or hydrogen atom; n1 is an integer of 0 to 4.

7. A liquid-crystal display device, comprising:
a liquid crystal cell, and
a polarizing plate,
wherein the polarizing plate comprises a polarizing film, and
an optical compensation film on at least one side of the polarizing film,
wherein the optical compensation film comprises a first optically anisotropic layer, and a second optically anisotropic layer,
wherein the first optically anisotropic layer satisfies at least one of the following Expressions (i) to (iii):

$$1 \leq Re_1 450)(0°)/Re_1 650)(0°) \leq 1.25: \quad \text{Equation (i)}$$

$$1 \leq Re_1 450)(40°)/Re_1 650)(40°) \leq 1.25: \quad \text{Equation (ii)}$$

$$1 \leq Re_1 450)(-40°)/Re_1 650)(-40°) \leq 1.25: \quad \text{Equation (iii)}$$

in Expressions (i) to (iii), $Re_1\lambda(\theta)$ is defined as the value of Re retardation in the first optically anisotropic layer determined in the condition that a light of wavelength $\lambda$(nm) is entered at an incident angle $\theta°$ from the normal line with the retardant phase being defined as the rotation axis, wherein when the values of $Re_1\lambda(\theta)$ and $Re_1\lambda(-\theta)$ are different, the magnitude is decided so as to become $Re_1\lambda(\theta) > Re_1\lambda(-\theta)$;
wherein the first optically anisotropic layer is composed of at least a disc-like liquid-crystal compound, and
wherein the disc-like liquid crystal compound comprises at least a compound expressed by the general formula (DI):

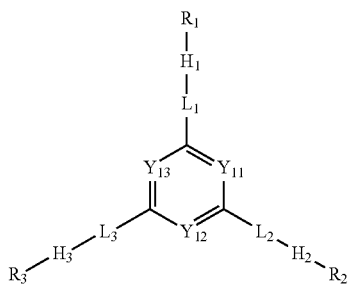

General Formula (DI)

in general formula (DI), $Y_{11}$, $Y_{12}$ and $Y_{13}$ represent each independently a methine or nitrogen atom; $L_1$, $L_2$ and $L_3$ represent each independently a connecting group of single bond or divalent bond; $H_1$, $H_2$ and $H_3$ represent each independently one expressed by the general formula (DI-A) or (DI-B); $R_1$, $R_2$ and $R_3$ represent each independently one expressed by the general formula (DI-R);

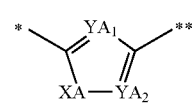

General formula (DI-A)

in the general formula (DI-A), $YA_1$ and $YA_2$ each represents a nitrogen atom; XA represents an oxygen atom; * indicates a site to bond with $L_1$ to $L_3$; ** indicates a site to bond with $R_1$ to $R_3$;

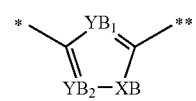

General formula (DI-B)

in the general formula (DI-B), $YB_1$ and $YB_2$ each represents a nitrogen atom; XB represents an oxygen atom; * indicates a site to bond with $L_1$ to $L_3$; ** indicates a site to bond with $R_1$ to $R_3$;

$$*\text{-}(\text{-}L_{21}\text{-}M)_{n1}\text{-}L_{22}\text{-}L_{23}\text{-}Q_1 \quad \text{General formula (DI-R):}$$

in general formula (DI-R), * indicates a site to bond with a five-membered ring in general formula (DI); $L_{21}$ represents a connecting group of single bond or divalent bond; $L_{22}$ represents a divalent connecting group selected from the group consisting of —O—, —O—CO—, —CO—O—, —O—CO—O—, —S—, —NH—, —SO$_2$—, —CH$_2$—, —CH=CH— and —C≡C—; $L_{23}$ represents a divalent connecting group selected from the group consisting of —O—, —S—, —C(=O)—, —SO$_2$—, —NH—, —CH$_2$—, —CH=CH—, and —C≡C—; M represents a divalent connecting group having at least a cyclic structure; $Q_1$ represent independently a polymerizable group or hydrogen atom; n1 is an integer of 0 to 4.

8. The liquid-crystal display device according to claim 7, wherein the liquid-crystal layer of the liquid-crystal cell satisfies at least one of Expressions (x) to (xii):

$$1.0 \leq [Re_1 c450)(0°)/Re_1 c650)(0°)] \leq 1.25: \quad \text{Expression (x)}$$

$$1.0 \leq [Re_1 c450)(40°)/Re_1 c650)(40°)] \leq 1.25: \quad \text{Expression (xi)}$$

$$1.0 \leq [Re_1 c450)(-40°)/Re_1 c650)(-40°)] \leq 1.25: \quad \text{Expression (xii)}$$

in which $Re_1 c\lambda(\theta)$ is defined as the value of Re retardation determined in the condition that a light of wavelength $\lambda$(nm) is entered with at an incident angle $\theta°$ from the normal line with the retardant phase being defined as the rotation axis (when the values of $Re_1 c\lambda(\theta)$ and $Re_1 c\lambda(-\theta)$ are different, the magnitude is decided so as to become $Re_1 c\lambda(\theta) > Re_1 c\lambda(-\theta)$).

9. The liquid-crystal display device according to claim 7, wherein the first optically anisotropic layer and the liquid-crystal layer of the liquid-crystal cell respectively have optical characteristics satisfying at least one of Expressions (xiii) to (xv):

$$0.9 < [Re_1 c450)(0°)/Re_1 c650)(0°)]/[Re_1 450)(0°)/Re_1 650)(0°)] < 1.1: \quad \text{Expression (xiii)}$$

$$0.9 < [Re_1 c450)(40°)/Re_1 c650)(40°)]/[Re_1 450)(40°)/Re_1 650)(40°)] < 1.1: \quad \text{Expression (xiv)}$$

$$0.9 < [Re_1 c450)(-40°)/Re_1 c650)(-40°)]/[Re_1 450)(-40°)/Re_1 650)(-40°)] < 1.1: \quad \text{Expression (xv)}$$

in which $Re_1c\lambda(\theta)$ is defined as the value of Re retardation determined in the condition that a light of wavelength λ(nm) is entered at an incident angle θ° from the normal line with the retardant phase being defined as the rotation axis, wherein when the values of $Re_1c\lambda(\lambda)$ and $Re_1c\lambda(-\theta)$ are different, the magnitude is decided so as to become $Re_1c\lambda(\theta) > Re_1c\lambda(-\theta)$.

10. The liquid-crystal display device according to claim 7, wherein the liquid crystal cell is composed of one selected from the group consisting of OCB, TN, ECB, IPS and FFS.

11. An optical compensation film, comprising:
an optically anisotropic layer,
wherein the optically anisotropic layer comprises an orientation film and a liquid crystal compound, and $\gamma s^d_{(AL)}$ and $\gamma s^d_{(LC)}$ satisfy the following relation:

$$\gamma s^d_{(LC)} - \gamma s^d_{(AL)} \geq -4.0 \text{ erg/cm}^2$$

wherein $\gamma s^d_{(AL)}$ is a dispersion force component of surface free energy of the orientation film and $\gamma s^d_{(LC)}$ is a dispersion force component of surface free energy of the liquid-crystal compound, and
wherein the liquid crystal compound comprises at least a compound expressed by the general formula (DI):

General Formula (DI)

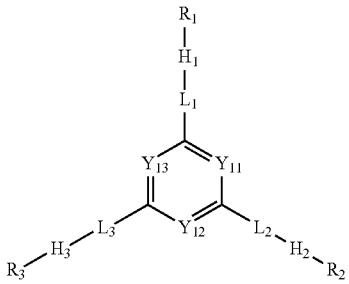

in the general formula (DI), $Y_{11}$, $Y_{12}$ and $Y_{13}$ represent each independently a methine or nitrogen atom; $L_1$, $L_2$ and $L_3$ represent each independently a connecting group of single bond or divalent bond; $H_1$, $H_2$, $H_3$ represent each independently one expressed by the general formula (DI-A) or (DI-B); $R_1$, $R_2$ and $R_3$ represent each independent one expressed by the general formula (DI-R);

General formula (DI-A)

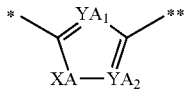

in the general formula (DI-A), $YA_1$ and $YA_2$ each represents a nitrogen atom; XA represents an oxygen atom; * indicates a site to bond with $L_1$ to $L_3$; ** indicates a site to bond with $R_1$ to $R_3$;

General formula (DI-B)

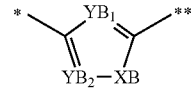

in the general formula (DI-B), $YB_1$ and $YB_2$ each represents a nitrogen atom; XB represents an oxygen atom; * indicates a site to bond with $L_1$ to $L_3$; ** indicates a site to bond with $R_1$ to $R_3$;

$$*-(-L_{21}-M)_{n1}-L_{22}-L_{23}-Q_1 \quad \text{General formula (DI-R):}$$

in the general formula (DI-R), * indicates a site to bond with a five-membered ring in general formula (DI); $L_{21}$ represents a connecting group of single bond or divalent bond; $L_{22}$ represents a divalent connecting group selected from the group consisting of —O—, —O—CO—, —CO—O—, —O—CO—O—, —S—, —NH—, —SO$_2$—, —CH$_2$—, —CH=CH—, and —C≡C—; $L_{23}$ represents a divalent connecting group selected from the group consisting of —O—, —S—, —C(=O)—, —SO$_2$—, —NH—, —CH$_2$—, —CH=CH—, and —C≡C—; M represents a divalent connecting group having at least a cyclic structure; $Q_1$ represents independently a polymerizable group or hydrogen atom; n1 is an integer of 0 to 4.

12. The optical compensation film according to claim 11, wherein the average inclination angle of the liquid crystal compound is no more than 45°.

13. The optical compensation film according to claim 11, wherein the orientation film comprises a vinyl alcohol compound.

14. The optical compensation film according to claim 13, wherein the vinyl alcohol compound is a polymer expressed by the formula (I):

(I)

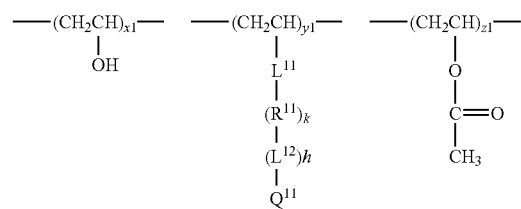

wherein in the formula (I), $L^{11}$ represents one of ether bond, urethane bond, acetal bond and ester bond; $R^{11}$ represents one of alkylene groups and alkyleneoxy groups, $L^{12}$ is a bonding group between $R^{11}$ and $Q^{11}$; $Q^{11}$ is one of vinyls, oxiranyls and aziridinyls; x1 is 50 to 99.9 mole %; x1+y1+z1=100 mole %, and k and h are each an integer of 0 or 1.

* * * * *